(12) United States Patent
Kondo et al.

(10) Patent No.: US 8,134,613 B2
(45) Date of Patent: Mar. 13, 2012

(54) IMAGE PROCESSING APPARATUS AND METHOD, AND IMAGE PICKUP APPARATUS

(75) Inventors: Tetsujiro Kondo, Tokyo (JP); Takashi Sawao, Tokyo (JP); Junichi Ishibashii, Saitama (JP); Takahiro Nagano, Kanagawa (JP); Naoki Fujiwara, Tokyo (JP); Toru Miyake, Tokyo (JP); Seiji Wada, Kanagawa (JP)

(73) Assignee: Sony Corporation, Tokyo (JP)

(*) Notice: Subject to any disclaimer, the term of this patent is extended or adjusted under 35 U.S.C. 154(b) by 2354 days.

(21) Appl. No.: 10/297,632

(22) PCT Filed: Apr. 1, 2002

(86) PCT No.: PCT/JP02/03249
§ 371 (c)(1),
(2), (4) Date: Sep. 8, 2003

(87) PCT Pub. No.: WO02/085001
PCT Pub. Date: Oct. 24, 2002

(65) Prior Publication Data
US 2004/0061795 A1      Apr. 1, 2004

(30) Foreign Application Priority Data

Apr. 10, 2001 (JP) .................................. 2001-11438
Apr. 10, 2001 (JP) ................................. 2001-111437

(51) Int. Cl.
*H04N 5/262* (2006.01)
*H04N 5/228* (2006.01)
*G06K 9/40* (2006.01)
*G06K 9/00* (2006.01)

(52) U.S. Cl. ...................... 348/239; 348/208.6; 382/254; 382/132

(58) Field of Classification Search .................... None
See application file for complete search history.

(56) References Cited

U.S. PATENT DOCUMENTS 5,504,523 A * 4/1996 Wight et al. ............... 348/208.4
(Continued)

FOREIGN PATENT DOCUMENTS
EP          0 933 727         8/1999
(Continued)

OTHER PUBLICATIONS

Dufaux F et al.: "Motion estimation techniques for digital TV: a review and a new contribution" Proceedings of the IEEE USA, vol. 83, No. 6, Jun. 1995, pp. 858-876, XP000518740 ISSN: 0018-9219, pp. 359-367.

(Continued)

*Primary Examiner* — Luong T Nguyen
(74) *Attorney, Agent, or Firm* — Frommer Lawrence & Haug LLP; William S. Frommer; Thomas F. Presson

(57) ABSTRACT

The present invention particularly relates to an image processing apparatus in which motion blur contained in a blurred image can be eliminated. An area specifying unit 103 specifies a non-mixed area formed of a foreground area consisting of foreground object components which form a foreground object and a background area consisting of background object components which form a background object, or a mixed area in which the foreground object components and the background object components are mixed. A separating/blur-eliminating unit 1503 simultaneously performs processing for separating the foreground object components and the background object components from the pixel data of the mixed area and processing for eliminating motion blur from the separated foreground object components based on a result obtained by specifying the area. The present invention is applicable to an image processing apparatus in which a difference between a signal detected by an image-capturing device and the real world is considered.

54 Claims, 107 Drawing Sheets

U.S. PATENT DOCUMENTS

| | | | |
|---|---|---|---|
| 5,764,803 A * | 6/1998 | Jacquin et al. | 382/236 |
| 5,812,787 A * | 9/1998 | Astle | 709/247 |
| 6,128,046 A | 10/2000 | Totsuka et al. | |
| 6,404,901 B1 * | 6/2002 | Itokawa | 382/103 |
| 6,563,874 B1 * | 5/2003 | Lu | 375/240.12 |

FOREIGN PATENT DOCUMENTS

| | | |
|---|---|---|
| EP | 1 164 545 | 12/2001 |
| EP | 1 411 473 | 4/2004 |
| GB | 2 280 812 | 2/1995 |
| JP | 7-65163 | 3/1995 |
| JP | 8 111810 | 4/1996 |
| JP | 10 93957 | 4/1998 |
| JP | 2000-30040 | 1/2000 |

OTHER PUBLICATIONS

Lequang D et al.: "Motion field and image intensity segmentation for object-oriented coding of video sequences" Proceedings of the SPIE—The International Society for Optical Engineering SPIE-Int. Soc. Opt. Eng USA, vol. 3024, 1997, pp. 711-722, XP002399417 ISSN: 0277-786X.

* cited by examiner

FIG. 3
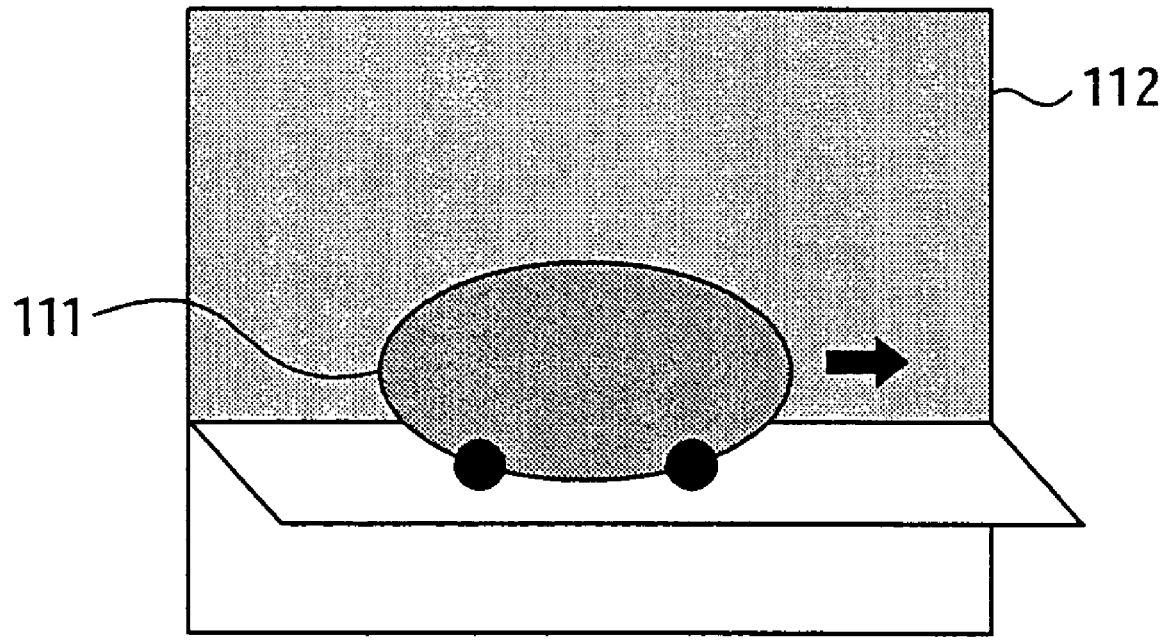
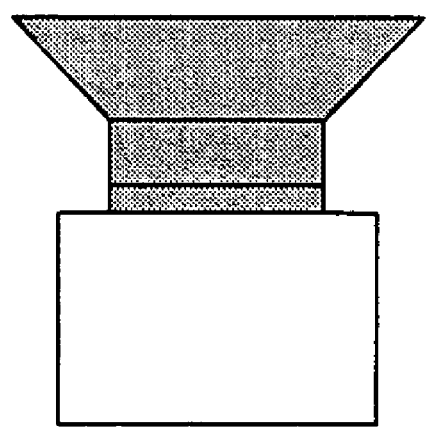

| AREA | | DESCRIPTION |
|---|---|---|
| BACKGROUND AREA | | STATIONARY PORTION |
| FOREGROUND AREA | | MOVING PORTION |
| MIXED AREA | COVERED BACKGROUND AREA | PORTION CHANGING FROM BACKGROUND TO FOREGROUND |
| | UNCOVERED BACKGROUND AREA | PORTION CHANGING FROM FOREGROUND TO BACKGROUND |

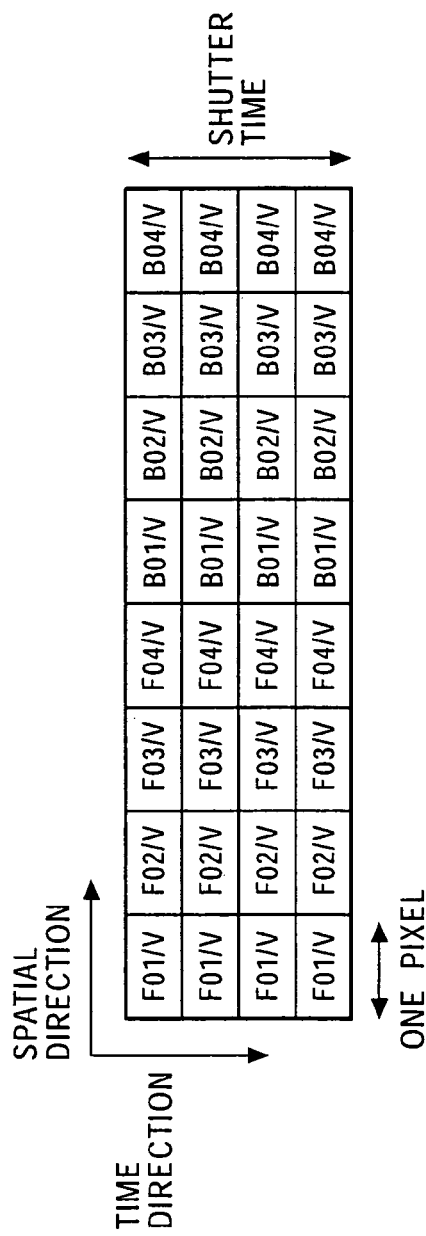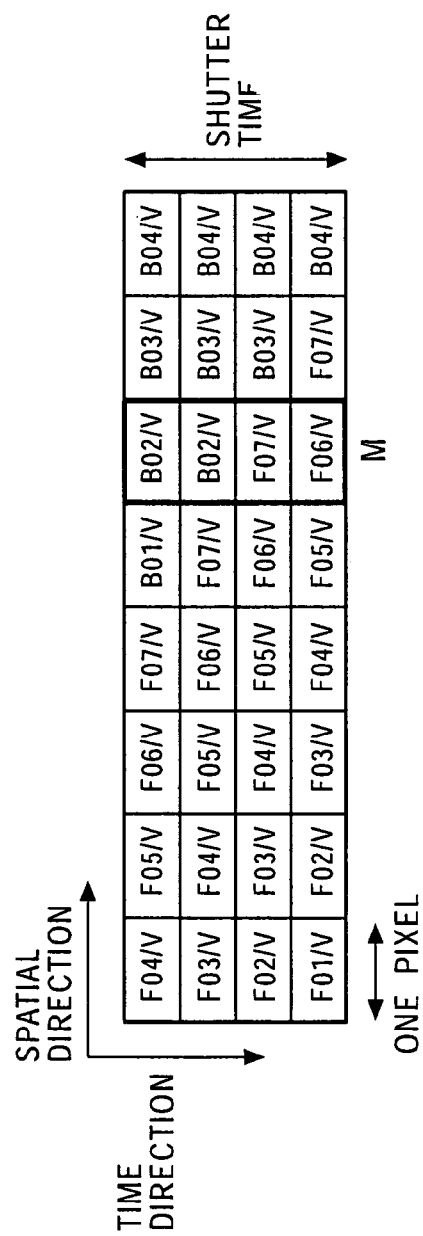

FIG. 25

| AREA DETERMINATION | STATIONARY/MOVING DETERMINATION BETWEEN FRAME #n-2 AND FRAME #n-1 | STATIONARY/MOVING DETERMINATION BETWEEN FRAME #n-1 AND FRAME #n | STATIONARY/MOVING DETERMINATION BETWEEN FRAME #n AND FRAME #n+1 | STATIONARY/MOVING DETERMINATION BETWEEN FRAME #n+1 AND FRAME #n+2 |
|---|---|---|---|---|
| COVERED-BACKGROUND-AREA DETERMINATION | STATIONARY | MOVING | — | — |
| STATIONARY-AREA DETERMINATION | — | STATIONARY | STATIONARY | — |
| MOVING-AREA DETERMINATION | — | MOVING | MOVING | — |
| UNCOVERED-BACKGROUND-AREA DETERMINATION | — | — | MOVING | STATIONARY |

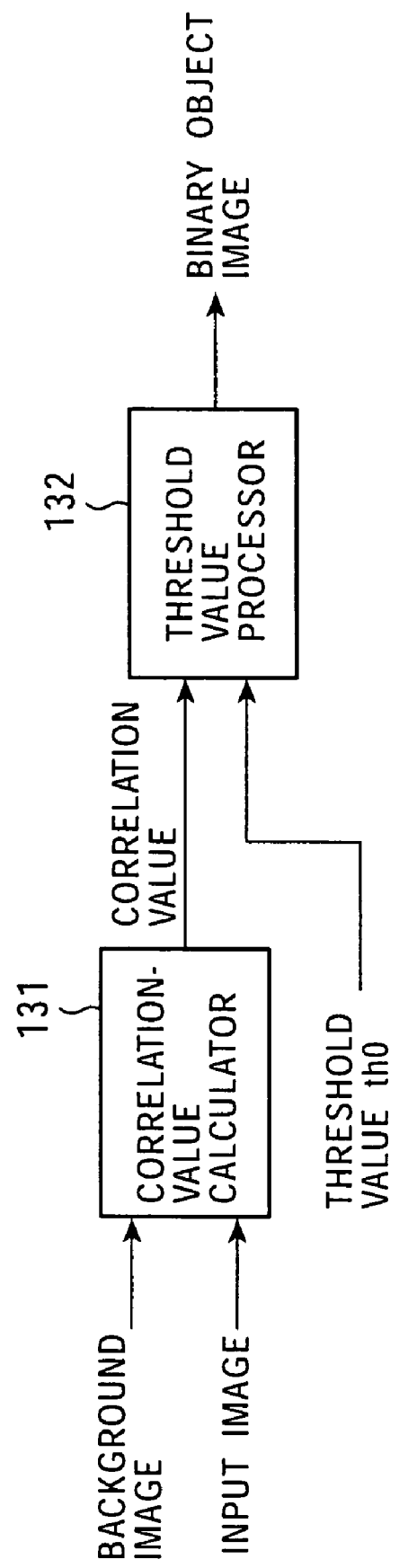

FIG. 33A

| $X_0$ | $X_1$ | $X_2$ |
|---|---|---|
| $X_3$ | $X_4$ | $X_5$ |
| $X_6$ | $X_7$ | $X_8$ |

FIG. 33B

| $Y_0$ | $Y_1$ | $Y_2$ |
|---|---|---|
| $Y_3$ | $Y_4$ | $Y_5$ |
| $Y_6$ | $Y_7$ | $Y_8$ |

FIG. 34A

| $X_0$ | $X_1$ | $X_2$ |
|---|---|---|
| $X_3$ | $X_4$ | $X_5$ |
| $X_6$ | $X_7$ | $X_8$ |

FIG. 34B

| $Y_0$ | $Y_1$ | $Y_2$ |
|---|---|---|
| $Y_3$ | $Y_4$ | $Y_5$ |
| $Y_6$ | $Y_7$ | $Y_8$ |

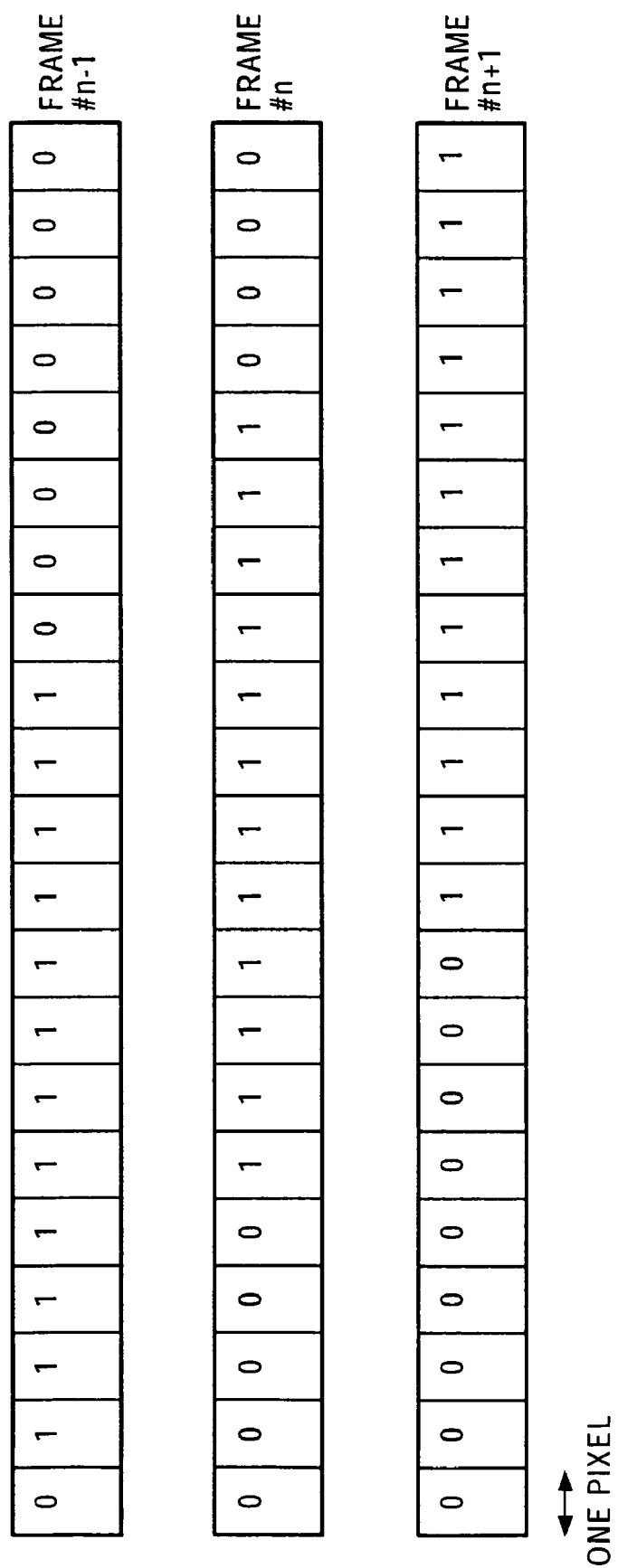

FIG. 37

| | BACKGROUND AREA | FOREGROUND AREA | COVERED BACKGROUND AREA | UNCOVERED BACKGROUND AREA |
|---|---|---|---|---|
| FRAME #n-1 | — | 1 | 0 | — |
| FRAME #n | 0 | 1 | 1 | 1 |
| FRAME #n+1 | — | 1 | — | 0 |

FIG. 66A
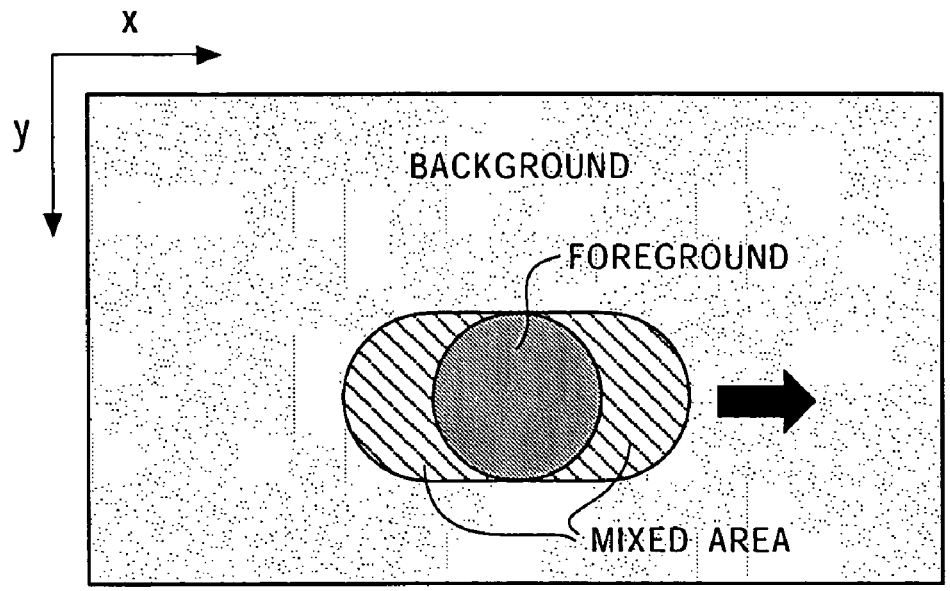
SEPARATE FOREGROUND AND BACKGROUND
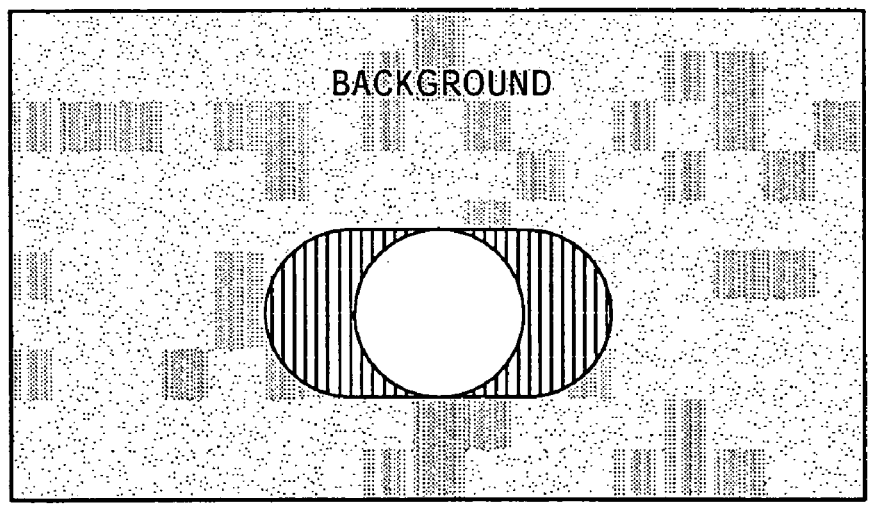
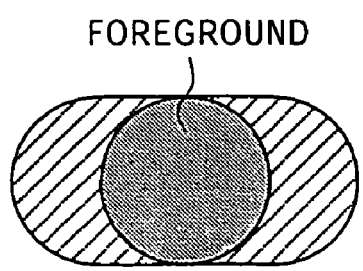

FIG. 81
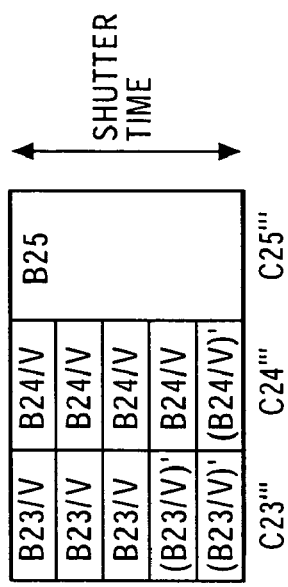
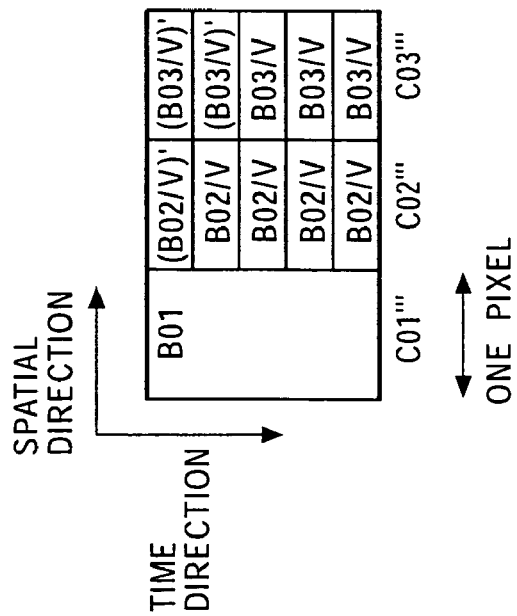

IMAGE PROCESSING APPARATUS AND METHOD, AND IMAGE PICKUP APPARATUS

TECHNICAL FIELD

The present invention relates to image processing apparatuses, and more particularly, to an image processing apparatus in which a difference between a signal detected by a sensor and the real world is taken into consideration.

BACKGROUND ART

A technique for detecting incidents occurring in the real world by a sensor and for processing sampled data output from the image sensor is widely used.

For example, motion blur occurs in an image obtained by capturing an object moving in front of a predetermined stationary background with a video camera if the moving speed is relatively high.

Hitherto, in order to prevent such motion blur, for example, the speed of an electronic shutter is increased so as to decrease the exposure time.

However, in the method in which the shutter speed is increased, it is necessary to adjust the shutter speed of a video camera before capturing an image. Accordingly, there is a problem in which blurred images cannot be corrected to obtain sharp images.

DISCLOSURE OF INVENTION

The present invention has been made in view of the above-described background. Accordingly, it is an object of the present invention to make it possible to eliminate motion blur contained in a blurred image.

A first image processing apparatus of the present invention includes: area specifying means for specifying a non-mixed area formed of a foreground area consisting of foreground object components which form a foreground object of image data and a background area consisting of background object components which form a background object of the image data, or a mixed area in which the foreground object components and the background object components area mixed; and processing execution means for simultaneously performing, based on a result obtained by specifying the area by the area specifying means, processing for separating the foreground object components and the background object components from pixel data of the mixed area, and processing for eliminating motion blur from the separated foreground object components.

The image processing apparatus may further include equal-portion detection means for detecting an equal portion consisting of adjacent pixel data of the foreground area whose values are substantially equal to each other. The processing execution means may simultaneously perform at least the processing for separating the foreground object components and the background object components from the pixel data of the mixed area and the processing for eliminating motion blur from the separated foreground object components based on the detected equal portion and the result obtained by specifying the area by the area specifying means.

The image processing apparatus may further include unit-of-processing determining means for-determining a unit of processing consisting of a plurality of the foreground object components and the background object components based on a position of the equal portion. The processing execution means may simultaneously perform, for each unit of processing, the processing for separating the foreground object components and the background object components and the processing for eliminating motion blur from the separated foreground object components.

The unit-of-processing determining means may determine the unit of processing corresponding to the pixel data belonging to the mixed area or the foreground area which is located on one straight line and which is other than the pixel data of the equal portion.

The equal-portion detection means may detect the equal portion by comparing a difference of the pixel data with a threshold.

The equal-portion detection means may detect the equal portion consisting of the adjacent pixel data having the number of pixels greater than or equal to the number of pixels corresponding to the amount of movement of the foreground object.

The processing execution means may simultaneously perform the processing for separating the foreground object components and the background object components and the processing for eliminating motion blur from the separated foreground object components by applying a calculation corresponding to a motion vector.

The processing execution means may include: model acquiring means for acquiring a model corresponding to the unit of processing and a motion vector; equation generating means for generating, based on the acquired model, an equation corresponding to a relationship between the pixel data of the unit of processing and the foreground object components and the background object components contained in the unit of processing; and calculation means for calculating the foreground object components and the background object components contained in the unit of processing based on the generated equation.

A first image processing method of the present invention includes: an area specifying step of specifying a non-mixed area formed of a foreground area consisting of foreground object components which form a foreground object of image data and a background area consisting of background object components which form a background object of the image data, or a mixed area in which the foreground object components and the background object components area mixed; and a processing execution step of simultaneously performing, based on a result obtained by specifying the area by the processing of the area specifying step, processing for separating the foreground object components and the background object components from the pixel data of the mixed area, and processing for eliminating motion blur from the separated foreground object components.

The image processing method may further include an equal-portion detection step of detecting an equal portion consisting of adjacent pixel data of the foreground area whose values are substantially equal to each other. In the processing of the processing execution step, at least the processing for separating the foreground object components and the background object components from the pixel data of the mixed area and the processing for eliminating motion blur from the separated foreground object components may be simultaneously performed based on the detected equal portion and the result obtained by specifying the area by the area specifying step.

The image processing method may further include a unit-of-processing determining step of determining a unit of processing consisting of a plurality of the foreground object components and the background object components based on a position of the equal portion. In the processing of the processing execution step, the processing for separating the foreground object components and the background object components and the processing for eliminating motion blur from the separated foreground object components may be simultaneously performed for each unit of processing.

In the processing of the unit-of-processing determining step, the unit of processing corresponding to the pixel data belonging to the mixed area or the foreground area which is located on one straight line and which is other than the pixel data of the equal portion may be determined.

In the processing of the equal-portion detection step, the equal portion may be detected by comparing a difference of the pixel data with a threshold.

In the processing of the equal-portion detection step, the equal portion consisting of the adjacent pixel data having the number of pixels greater than or equal to the number of pixels corresponding to an amount of movement of the foreground object may be detected.

In the processing of the processing execution step, the processing for separating the foreground object components and the background object components and the processing for eliminating motion blur from the separated foreground object components may be simultaneously performed by applying a calculation corresponding to a motion vector.

The processing of the processing execution step may include: a model acquiring step of acquiring a model corresponding to the unit of processing and a motion vector; an equation generating step of generating, based on the acquired model, an equation corresponding to a relationship between the pixel data of the unit of processing and the foreground object components and the background object components contained in the unit of processing; and a calculation step of calculating the foreground object components and the background object components contained in the unit of processing based on the generated equation.

A program of a first storage medium of the present invention includes: an area specifying step of specifying a non-mixed area formed of a foreground area consisting of foreground object components which form a foreground object of image data and a background area consisting of background object components which form a background object of the image data, or a mixed area in which the foreground object components and the background object components area mixed; and a processing execution step of simultaneously performing, based on a result obtained by specifying the area by the processing of the area specifying step, processing for separating the foreground object components and the background object components from the pixel data of the mixed area, and processing for eliminating motion blur from the separated foreground object components.

The program of the storage medium may further include an equal-portion detection step of detecting an equal portion consisting of adjacent pixel data of the foreground area whose values are substantially equal to each other. In the processing of the processing execution step, at least the processing for separating the foreground object components and the background object components from the pixel data of the mixed area and the processing for eliminating motion blur from the separated foreground object components may be simultaneously performed based on the detected equal portion and the result obtained by specifying the area by the area specifying step.

The program of the storage medium may further include a unit-of-processing determining step of determining a unit of processing consisting of a plurality of the foreground object components and the background object components based on a position of the equal portion. In the processing of the processing execution step, the processing for separating the foreground object components and the background object components and the processing for eliminating motion blur from the separated foreground object components may be simultaneously performed for each unit of processing.

In the processing of the unit-of-processing determining step, the unit of processing corresponding to the pixel data belonging to the mixed area or the foreground area which is located on one straight line and which is other than the pixel data of the equal portion may be determined.

In the processing of the equal-portion detection step, the equal portion may be detected by comparing a difference of the pixel data with a threshold.

In the processing of the equal-portion detection step, the equal portion consisting of the adjacent pixel data having the number of pixels greater than or equal to the number of pixels corresponding to an amount of movement of the foreground object may be detected.

In the processing of the processing execution step, the processing for separating the foreground object components and the background object components and the processing for eliminating motion blur from the separated foreground object components may be simultaneously performed by applying a calculation corresponding to a motion vector.

The processing of the processing execution step may include: a model acquiring step of acquiring a model corresponding to the unit of processing and a motion vector; an equation generating step of generating, based on the acquired model, an equation corresponding to a relationship between the pixel data of the unit of processing and the foreground object components and the background object components contained in the unit of processing; and a calculation step of calculating the foreground object components and the background object components contained in the unit of processing based on the generated equation.

A first program of the present invention allows a computer to execute: an area specifying step of specifying a non-mixed area formed of a foreground area consisting of foreground object components which form a foreground object of image data and a background area consisting of background object components which form a background object of the image data, or a mixed area in which the foreground object components and the background object components area mixed; and a processing execution step of simultaneously performing, based on a result obtained by specifying the area by the processing of the area specifying step, processing for separating the foreground object components and the background object components from the pixel data of the mixed area, and processing for eliminating motion blur from the separated foreground object components.

The program may further include an equal-portion detection step of detecting an equal portion consisting of adjacent pixel data of the foreground area whose values are substantially equal to each other. In the processing of the processing execution step, at least the processing for separating the foreground object components and the background object components from the pixel data of the mixed area and the processing for eliminating motion blur from the separated foreground object components may be simultaneously performed based on the detected equal portion and the result obtained by specifying the area by the processing of the area specifying step.

The program may further include a unit-of-processing determining step of determining a unit of processing consisting of a plurality of the foreground object components and the background object components based on a position of the equal portion. In the processing of the processing execution step, the processing for separating the foreground object components and the background object components and the processing for eliminating motion blur from the separated foreground object components may be simultaneously performed for each unit of processing.

In the processing of the unit-of-processing determining step, the unit of processing corresponding to the pixel data belonging to the mixed area or the foreground area which is located on one-straight line and which is other than the pixel data of the equal portion may be determined.

In the processing of the equal-portion detection step, the equal portion may be detected by comparing a difference of the pixel data with a threshold.

In the processing of the equal-portion detection step, the equal portion consisting of the adjacent pixel data having the number of pixels greater than or equal to the number of pixels corresponding to an amount of movement of the foreground object may be detected.

In the processing of the processing execution step, the processing for separating the foreground object components and the background object components and the processing for eliminating motion blur from the separated foreground object components may be simultaneously performed by applying a calculation corresponding to a motion vector.

The processing of the processing execution step may include: a model acquiring step of acquiring a model corresponding to the unit of processing and a motion vector; an equation generating step of generating, based on the acquired model, an equation corresponding to a relationship between the pixel data of the unit of processing and the foreground object components and the background object components contained in the unit of processing; and a calculation step of calculating the foreground object components and the background object components contained in the unit of processing based on the generated equation.

A second image processing apparatus of the present invention includes: input means for inputting image data having an object area consisting of object components which form an object; and motion-blur eliminating means for eliminating motion blur occurring in the object area by assuming that values of part of the pixel data in the object area of the image data input by the input means are substantially equal.

The input means may input the image data having a foreground area consisting of foreground object components which form the object, a background area consisting of background object components which form a background object, and a mixed area in which the foreground object components and the background object components are mixed. The motion-blur eliminating means may eliminate motion blur occurring in the foreground area by assuming that values of part of the pixel data in the foreground area of the image data input by the input means are substantially equal.

The image processing apparatus may further include equal-portion detection means for detecting an equal portion in which the values of the pixel data in the foreground area of the image data are substantially equal. The motion-blur eliminating means may eliminate motion blur occurring in the foreground area based on the equal portion detected by the equal-portion detection means.

The image processing apparatus may further include unit-of-processing determining means for determining a unit of processing consisting of a plurality of the foreground object components based on a position of the equal portion. The motion-blur eliminating means may eliminate motion blur of the foreground area for each unit of processing.

The unit-of-processing determining means may determine the unit of processing corresponding to the pixel data belonging to the mixed area or the foreground area which is located on one straight line and which is other than the pixel data of the equal portion.

The image processing apparatus may further include area specifying means for specifying the foreground area, the background area, or the mixed area.

The equal-portion detection means may detect the equal portion by comparing a difference of the pixel data with a threshold.

The equal-portion detection means may detect the equal portion consisting of the adjacent pixel data having the number of pixels greater than or equal to the number of pixels corresponding to an amount of movement of the foreground object.

The motion-blur eliminating means may eliminate motion blur occurring in the foreground area by applying a calculation corresponding to a motion vector.

The motion-blur eliminating means may include: model acquiring means for acquiring a model corresponding to the unit of processing and a motion vector; equation generating means for generating, based on the-acquired model, an equation corresponding to a relationship between the pixel data of the unit of processing and the foreground object components contained in the unit of processing; and calculation means for calculating the foreground object components contained in the unit of processing based on the generated equation.

The motion-blur eliminating means may simultaneously perform processing for separating the pixel data of the mixed area into the foreground object components and the background object components and processing for eliminating motion blur from the separated foreground object components based on area information indicating a non-mixed area consisting of the foreground area and the background area or the mixed area and based on the equal portion.

The image processing apparatus may further include unit-of-processing determining means for determining a unit of processing consisting of a plurality of the foreground object components and the background object components based on a position of the equal portion. The processing execution means may simultaneously perform, for each unit of processing, the processing for separating the foreground object components and the background object components and the processing for eliminating motion blur from the separated foreground object components.

The unit-of-processing determining means may determine the unit of processing corresponding to the pixel data belonging to the mixed area or the foreground area which is located on one straight line and which is other than the pixel data of the equal portion.

The image processing apparatus may further include area specifying means for specifying the foreground area, the background area, or the mixed area.

The equal-portion detection means may detect the equal portion by comparing a difference of the pixel data with a threshold.

The equal-portion detection means may detect the equal portion consisting of adjacent pixel data having the number of pixels greater than or equal to the number of pixels corresponding to an amount of movement of the foreground object.

The unit-or-processing determining means may simultaneously perform the processing for separating the foreground object components and the background object components and the processing for eliminating motion blur from the separated foreground object components by applying a calculation corresponding to a motion vector.

The unit-of-processing determining means may include: model acquiring means for acquiring a model corresponding to the unit of processing and a motion vector; equation generating means for generating, based on the acquired model, an equation corresponding to a relationship between the pixel data of the unit of processing and the foreground object components and the background object components contained in the unit of processing; and calculation means for calculating the foreground object components and the background object components contained in the unit of processing based on the generated equation.

A second image processing method of the present invention includes: an input step of inputting image data having an object area consisting of object components which form an object; and a motion-blur eliminating step of eliminating motion blur occurring in an object area by assuming that values of part of the pixel data in the object area of the image data input by the processing of the input step are substantially equal.

In the processing of the input step, the image data having a foreground area consisting of foreground object components which form the object, a background area consisting of background object components which form a background object, and a mixed area in which the foreground object components and the background object components are mixed may be input. In the processing of the motion-blur eliminating step, motion blur occurring in the foreground area may be eliminated by assuming that values of part of the pixel data in the foreground area of the image data input by the processing of the input step are substantially equal.

The image processing method may further include an equal-portion detection step of detecting an equal portion in which the values of the pixel data in the foreground area of the image data are substantially equal. In the processing of the motion-blur eliminating step, motion blur occurring in the foreground area may be eliminated based on the equal portion detected by the processing of the equal-portion detection step.

The image processing method may further include a unit-of-processing determining step of determining a unit of processing consisting of a plurality of the foreground object components based on a position of the equal portion. In the processing of the motion-blur eliminating step, motion blur of the foreground area may be eliminated for each unit of processing.

In the processing of the unit-of-processing determining step, the unit of processing corresponding to the pixel data belonging to the mixed area or the foreground area which is located on one straight line and which is other than the pixel data of the equal portion may be determined.

The image processing method may further include an area specifying step of specifying the foreground area, the background area, or the mixed area.

In the processing of the equal-portion detection step, the equal portion may be detected by comparing a difference of the pixel data with a threshold.

In the processing of the equal-portion detection step, the equal portion consisting of the adjacent pixel data having the number of pixels greater than or equal to the number of pixels corresponding to an amount of movement of the foreground object may be detected.

In the processing of the motion-blur eliminating step, motion blur occurring in the foreground area may be eliminated by applying a calculation corresponding to a motion vector.

The processing of the motion-blur eliminating step may include: a model acquiring step of acquiring a model corresponding to the unit of processing and a motion vector; an equation generating step of generating, based on the acquired model, an equation corresponding to a relationship between the pixel data of the unit of processing and the foreground object components contained in the unit of processing; and a calculation step of calculating the foreground object components contained in the unit of processing based on the generated equation.

In the processing of the motion-blur eliminating step, processing for separating the pixel data of the mixed area into the foreground object components and the background object components and processing for eliminating motion blur from the separated foreground object components may be simultaneously performed based on area information indicating a non-mixed area consisting of the foreground area and the background area or the mixed area and based on the equal portion.

The image processing method may further include a unit-of-processing determining step of determining a unit of processing consisting of a plurality of the foreground object components and the background object components based on a position of the equal portion. In the processing of the processing execution step, the processing for separating the foreground object components and the background object components and the processing for eliminating motion blur from the separated foreground object components may be simultaneously performed for each unit of processing.

In the processing of the unit-of-processing determining step, the unit of processing corresponding to the pixel data belonging to the mixed area or the foreground area which is located on one straight line and which is other than the pixel data of the equal portion may be determined.

The image processing method may further include an area specifying step of specifying the foreground area, the background area, or the mixed area.

In the processing of the equal-portion detection step, the equal portion may be detected by comparing a difference of the pixel data with a threshold.

In the processing of the equal-portion detection step, the equal portion consisting of adjacent pixel data having the number of pixels greater than or equal to the number of pixels corresponding to an amount of movement of the foreground object may be detected.

In the processing of the unit-or-processing determining step, the processing for separating the foreground object components and the background object components and the processing for eliminating motion blur from the separated foreground object components may be simultaneously performed by applying a calculation corresponding to a motion vector.

The processing of the unit-of-processing determining step may include: a model acquiring step of acquiring a model corresponding to the unit of processing and a motion vector; an equation generating step of generating, based on the acquired model, an equation corresponding to a relationship between the pixel data of the unit of processing and the foreground object components and the background object components contained in the unit of processing; and a calculation step of calculating the foreground object components and the background object components contained in the unit of processing based on the generated equation.

A program of a second storage medium includes: an input step of inputting image data having an object area consisting of object components which form an object; and a motion-blur eliminating step of eliminating motion blur occurring in the object area by assuming that values of part of the pixel data in the object area of the image data input by the processing of the input step are substantially equal.

In the processing of the input step, the image data having a foreground area consisting of foreground object components which form the object, a background area consisting of background object components which form a background object, and a mixed area in which the foreground object components and the background object components are mixed may be input. In the processing of the motion-blur eliminating step, motion blur occurring in the foreground area may be eliminated by assuming that values of part of the pixel data in the foreground area of the image data input by the processing of the input step are substantially equal.

The program of the storage medium may further include an equal-portion detection step of detecting an equal portion in which the values of the pixel data in the foreground area of the image data are substantially equal. In the processing of the motion-blur eliminating step, motion blur occurring in the foreground area may be eliminated based on the equal portion detected by the processing of the equal-portion detection step.

The program of the storage medium may further include a unit-of-processing determining step of determining a unit of processing consisting of a plurality of the foreground object components based on a position of the equal portion. In the processing of the motion-blur eliminating step, motion blur of the foreground area may be eliminated for each unit of processing.

In the processing of the unit-of-processing determining step, the unit of processing corresponding to the pixel data belonging to the mixed area or the foreground area which is located on one straight line and which is other than the pixel data of the equal portion may be determined.

The program of the storage medium may further include an area specifying step of specifying the foreground area, the background area, or the mixed area.

In the processing of the equal-portion detection step, the equal portion may be detected by comparing a difference of the pixel data with a threshold.

In the processing of the equal-portion detection step, the equal portion consisting of the adjacent pixel data having the number of pixels greater than or equal to the number of pixels corresponding to an amount of movement of the foreground object may be detected.

In the processing of the motion-blur eliminating step, motion blur occurring in the foreground area may be eliminated by applying a calculation corresponding to a motion vector.

The processing of the motion-blur eliminating step may include: a model acquiring step of acquiring a model corresponding to the unit of processing and a motion vector; an equation generating step of generating, based on the acquired model, an equation corresponding to a relationship between the pixel data of the unit of processing and the foreground object components contained in the unit of processing; and a calculation step of calculating the foreground object components contained in the unit of processing based on the generated equation.

In the processing of the motion-blur eliminating step, processing for separating the pixel data of the mixed area into the foreground object components and the background object components and processing for eliminating motion blur from the separated foreground object components may be simultaneously performed based on area information indicating a non-mixed area consisting of the foreground area and the background area or the mixed area and based on the equal portion.

The program of the storage medium may further include a unit-of-processing determining step of determining a unit of processing consisting of a plurality of the foreground object components and the background object components based on a position of the equal portion. In the processing of the processing execution step, the processing for separating the foreground object components and the background object components and the processing for eliminating motion blur from the separated foreground object components may be simultaneously performed for each unit of processing.

In the processing of the unit-of-processing determining step, the unit of processing corresponding to the pixel data belonging to the mixed area or the foreground area which is located on one straight line and which is other than the pixel data of the equal portion may be determined.

The program of the storage medium may further include an area specifying step of specifying the foreground area, the background area, or the mixed area.

In the processing of the equal-portion detection step, the equal portion may be detected by comparing a difference of the pixel data with a threshold.

In the processing of the equal-portion detection step, the equal portion consisting of adjacent pixel data having the number of pixels greater than or equal to the number of pixels corresponding to an amount of movement of the foreground object may be detected.

In the processing of the unit-or-processing determining step, the processing for separating the foreground object components and the background object components and the processing for eliminating motion blur from the separated foreground object components may be simultaneously performed by applying a calculation corresponding to a motion vector.

The processing of the unit-of-processing determining step may include: a model acquiring step of acquiring a model corresponding to the unit of processing and a motion vector; an equation generating step of generating, based on the acquired model, an equation corresponding to a relationship between the pixel data of the unit of processing and the foreground object components and the background object components contained in the unit of processing; and a calculation step of calculating the foreground object components and the background object components contained in the unit of processing based on the generated equation.

A second program of the present invention allows a computer to execute: an input step of inputting image data having an object area consisting of object components which form an object; and a motion-blur eliminating step of eliminating motion blur occurring in the object area by assuming that values of part of the pixel data in the object area of the image data input by the processing of the input step are substantially equal.

In the processing of the input step, the image data having a foreground area consisting of foreground object components which form the object, a background area consisting of background object components which form a background object, and a mixed area in which the foreground object components and the background object components are mixed may be input. In the processing of the motion-blur eliminating step, motion blur occurring in the foreground area may be eliminated by assuming that values of part of the pixel data in the foreground area of the image data input by the processing of the input step are substantially equal.

The program may further include an equal-portion detection step of detecting an equal portion in which the values of the pixel data in the foreground area of the image data are substantially equal. In the processing of the motion-blur eliminating step, motion blur occurring in the foreground area may be eliminated based on the equal portion detected by the processing of the equal-portion detection step.

The program may further include a unit-of-processing determining step of determining a unit of processing consisting of a plurality of the foreground object components based on a position of the equal portion. In the processing of the motion-blur eliminating step, motion blur of the foreground area may be eliminated for each unit of processing.

In the processing of the unit-of-processing determining step, the unit of processing corresponding to the pixel data belonging to the mixed area or the foreground area which is located on one straight line and which is other than the pixel data of the equal portion may be determined.

The program may further include an area specifying step of specifying the foreground area, the background area, or the mixed area.

In the processing of the equal-portion detection step, the equal portion may be detected by comparing a difference of the pixel data with a threshold.

In the processing of the equal-portion detection step, the equal portion consisting of the adjacent pixel data having the number of pixels greater than or equal to the number of pixels corresponding to an amount of movement of the foreground object may be detected.

In the processing of the motion-blur eliminating step, motion blur occurring in the foreground area may be eliminated by applying a calculation corresponding to a motion vector.

The processing of the motion-blur eliminating step may include: a model acquiring step of acquiring a model corresponding to the unit of processing and a motion vector; an equation generating step of generating, based on the acquired model, an equation corresponding to a relationship between the pixel data of the unit of processing and the foreground object components contained in the unit of processing; and a calculation step of calculating the foreground object components contained in the unit of processing based on the generated equation.

In the processing of the motion-blur eliminating step, processing for separating the pixel data of the mixed area into the foreground object components and the background object components and processing for eliminating motion blur from the separated foreground object components may be simultaneously performed based on area information indicating a non-mixed area consisting of the foreground area and the background area or the mixed area and based on the equal portion.

The program may further include a unit-of-processing determining step of determining a unit of processing consisting of a plurality of the foreground object components and the background object components based on a position of the equal portion. In the processing of the processing execution step, the processing for separating the foreground object components and the background object components and the processing for eliminating motion blur from the separated foreground object components may be simultaneously performed for each unit of processing.

In the processing of the unit-of-processing determining step, the unit of processing corresponding to the pixel data belonging to the mixed area or the foreground area which is located on one straight line and which is other than the pixel data of the equal portion may be determined.

The program may further include an area specifying step of specifying the foreground area, the background area, or the mixed area.

In the processing of the equal-portion detection step, the equal portion may be detected by comparing a difference of the pixel data with a threshold.

In the processing of the equal-portion detection step, the equal portion consisting of adjacent pixel data having the number of pixels greater than or equal to the number of pixels corresponding to an amount of movement of the foreground object may be detected.

In the processing of the unit-or-processing determining step, the processing for separating the foreground object components and the background object components and the processing for eliminating motion blur from the separated foreground object components may be simultaneously performed by applying a calculation corresponding to a motion vector.

The processing of the unit-of-processing determining step may include: a model acquiring step of acquiring a model corresponding to the unit of processing and a motion vector; an equation generating step of generating, based on the acquired model, an equation corresponding to a relationship between the pixel data of the unit of processing and the foreground object components and the background object components contained in the unit of processing; and a calculation step of calculating the foreground object components and the background object components contained in the unit of processing based on the generated equation.

A first image-capturing apparatus of the present invention includes: image-capturing means for outputting a subject image captured by an image-capturing device including a predetermined number of pixels and having a time integrating function as image data formed of a predetermined number of pixel data; area specifying means for specifying a non-mixed area formed of a foreground area consisting of foreground object components which form a foreground object of the image data and a background area consisting of background object components which form a background object of the image data, or a mixed area in which the foreground object components and the background object components area mixed; and processing execution means for simultaneously performing, based on a result obtained by specifying the area by the area specifying means, processing for separating the foreground object components and the background object components from the pixel data of the mixed area, and processing for eliminating motion blur from the separated foreground object components.

The image-capturing apparatus may further include equal-portion detection means for detecting an equal portion consisting of adjacent pixel data of the foreground area whose values are substantially equal to each other. The processing execution means may simultaneously perform at least the processing for separating the foreground object components and the background object components from the pixel data of the mixed area and the processing for eliminating motion blur from the separated foreground object components based on the detected equal portion and the result obtained by specifying the area by the area specifying means.

The image-capturing apparatus may further include unit-of-processing determining means for determining a unit of processing consisting of a plurality of the foreground object components and the background object components based on a position of the equal portion. The processing execution means may simultaneously perform, for each unit of processing, the processing for separating the foreground object components and the background object components and the processing for eliminating motion blur from the separated foreground object components.

The unit-of-processing determining means may,determine the unit of processing corresponding to the pixel data belonging to the mixed area or the foreground area which is located on one straight line and which is other than the pixel data of the equal portion.

The equal-portion detection means may detect the equal portion by comparing a difference of the pixel data with a threshold.

The equal-portion detection means may detect the equal portion consisting of the adjacent pixel data having the number of pixels greater than or equal to the number of pixels corresponding to an amount of movement of the foreground object.

The processing execution means may simultaneously perform the processing for separating the foreground object components and the background object components and the processing for eliminating motion blur from the separated foreground object components by applying a calculation corresponding to a motion vector.

The processing execution means may include: model acquiring means for acquiring a model corresponding to the unit of processing and a motion vector; equation generating means for generating, based on the acquired model, an equation corresponding to a relationship between the pixel data of the unit of processing and the foreground object components and the background object components contained in the unit of processing; and calculation means for calculating the foreground object components and the background object components contained in the unit of processing based on the generated equation.

A second image-capturing apparatus of the present invention includes: image-capturing means for outputting a subject image captured by an image-capturing device including a predetermined number of pixels and having a time integrating function as image data formed of a predetermined number of pixel data and having an object area consisting of object components which form an object; and motion-blur eliminating means for eliminating motion blur occurring in the object area by assuming that values of part of the pixel data in the object area of the image data are substantially equal.

The input means may input the image data having a foreground area consisting of foreground object components which form the object, a background area consisting of background object components which form a background object, and a mixed area in which the foreground object components and the background object components are mixed. The motion-blur eliminating means may eliminate motion blur occurring in the foreground area by assuming that values of part of the pixel data in the foreground area of the image data input by the input means are substantially equal.

The image-capturing apparatus may further include equal-portion detection means for detecting an equal portion in which the values of the pixel data in the foreground area of the image data are substantially equal. The motion-blur eliminating means may eliminate motion blur occurring in the foreground area based on the equal portion detected by the equal-portion detection means.

The image-capturing apparatus may further include unit-of-processing determining means for determining a unit of processing consisting of a plurality of the foreground object components based on a position of the equal portion. The motion-blur eliminating means may eliminate motion blur of the foreground area for each unit of processing.

The unit-of-processing determining means may determine the unit of processing corresponding to the pixel data belonging to the mixed area or the foreground area which is located on one straight line and which is other than the pixel data of the equal portion.

The image-capturing apparatus may further include area specifying means for specifying the foreground area, the background area, or the mixed area.

The equal-portion detection means may detect the equal portion by comparing a difference of the pixel data with a threshold.

The equal-portion detection means may detect the equal portion consisting of the adjacent pixel data having the number of pixels greater than or equal to the number of pixels corresponding to an amount of movement of the foreground object.

The motion-blur eliminating means may eliminate motion blur occurring in the foreground area by applying a calculation corresponding to a motion vector.

The motion-blur eliminating means may include: model acquiring means for acquiring a model corresponding to the unit of processing and a motion vector; equation generating means for generating, based on the acquired model, an equation corresponding to a relationship between the pixel data of the unit of processing and the foreground object components contained in the unit of processing; and calculation means for calculating the foreground object components contained in the unit of processing based on the generated equation.

The motion-blur eliminating means may simultaneously perform processing for separating the pixel data of the mixed area into the foreground object components and the background object components and processing for eliminating motion blur from the separated foreground object components based on area information indicating a non-mixed area consisting of the foreground area and the background area or the mixed area and based on the equal portion.

The image-capturing apparatus may further include unit-of-processing determining means for determining a unit of processing consisting of a plurality of the foreground object components and the background object components based on a position of the equal portion. The processing execution means may simultaneously perform, for each unit of processing, the processing for separating the foreground object components and the background object components and the processing for eliminating motion blur from the separated foreground object components.

The unit-of-processing determining means may determine the unit of processing corresponding to the pixel data belonging to the mixed area or the foreground area which is located on one straight line and which is other than the pixel data of the equal portion.

The image-capturing apparatus may further include area specifying means for specifying the foreground area, the background area, or the mixed area.

The equal-portion detection means may detect the equal portion by comparing a difference of the pixel data with a threshold.

The equal-portion detection means may detect the equal portion consisting of adjacent pixel data having the number of pixels greater than or equal to the number of pixels corresponding to an amount of movement of the foreground object.

The unit-or-processing determining means may simultaneously perform the processing for separating the foreground object components and the background object components and the processing for eliminating motion blur from the separated foreground object components by applying a calculation corresponding to a motion vector.

The unit-of-processing determining means may include: model acquiring means for acquiring a model corresponding to the unit of processing and a motion vector; equation generating means for generating, based on the acquired model, an equation corresponding to a relationship between the pixel data of the unit of processing and the foreground object components and the background object components contained in the unit of processing; and calculation means for calculating the foreground object components and the background object components contained in the unit of processing based on the generated equation.

BRIEF DESCRIPTION OF THE DRAWINGS

FIG. 3 illustrates the image capturing performed by a sensor.

FIG. 9 illustrates a model in which pixel values are expanded in the time direction and the period corresponding to the shutter time is divided.

FIG. 10 illustrates a model in which pixel values are expanded in the time direction and the period corresponding to the shutter time is divided.

FIG. 25 illustrates the conditions for determining the area.

FIG. 32 is a block diagram illustrating the configuration of a binary-object-image extracting portion 302.

FIG. 33A illustrates the calculation of a correlation value.

FIG. 33B illustrates the calculation of a correlation value.

FIG. 34A illustrates the calculation of a correlation value.

FIG. 34B illustrates the calculation of a correlation value.

FIG. 35 illustrates an example of the binary object image.

FIG. 37 illustrates determinations made by an area determining portion 342.

FIG. 66A illustrates an input image, a foreground component image, and a background component image.

FIG. 81 illustrates the processing for adjusting background components.

BEST MODE FOR CARRYING OUT THE INVENTION

Figure 1:
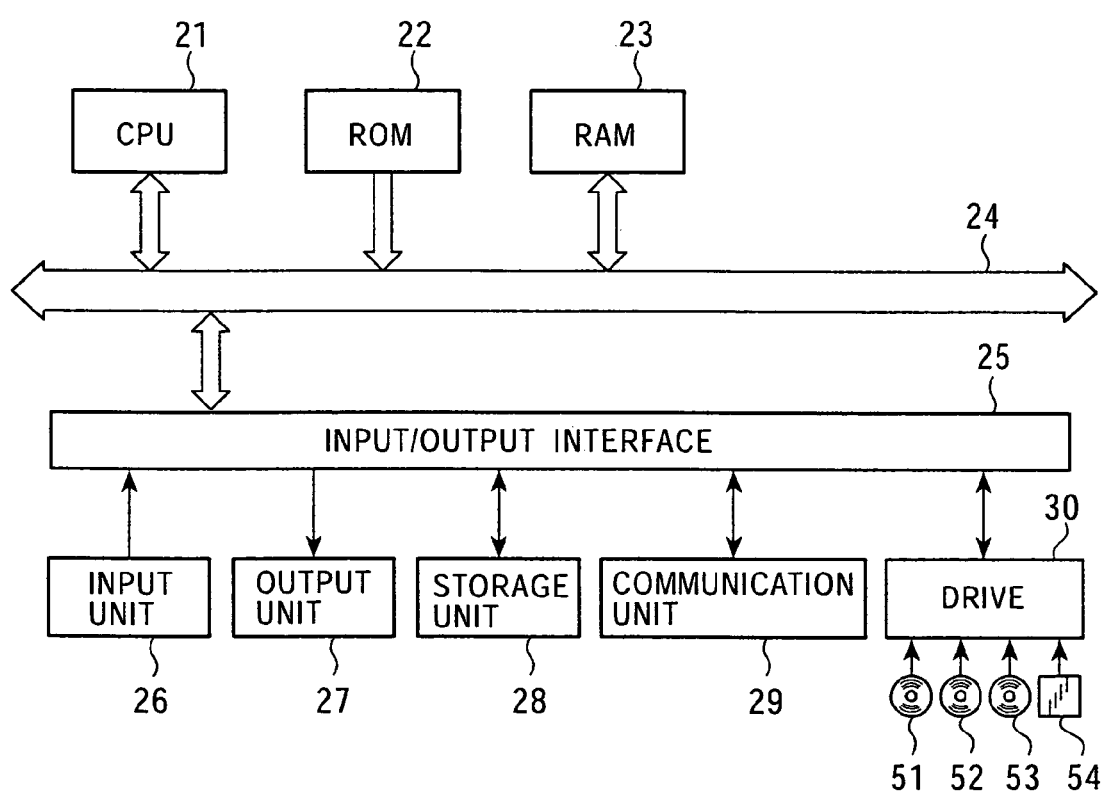
FIG. 1 is a block diagram illustrating the configuration of an embodiment of a signal processing apparatus according to the present invention.

FIG. 1 is a block diagram illustrating the configuration of an embodiment of a signal processing apparatus according to the present invention. A CPU (Central Processing Unit) 21 executes various types of processing according to programs stored in a ROM (Read Only Memory) 22 or in a storage unit 28. Programs executed by the CPU 21 and data are stored in a RAM (Random Access Memory) 23 as required. The CPU 21, the ROM 22, and the RAM 23 are connected to each other by a bus 24.

An input/output interface 25 is also connected to the CPU 21 via the bus 24. An input unit 26, which is formed of a video camera, a keyboard, a mouse, a microphone, and so on, and an output unit 27, which is formed of a display, a speaker, and so on, are connected to the input/output interface 25. The CPU 21 executes various types of processing in response to a command input from the input unit 26. The CPU 21 then outputs an image or sound obtained as a result of the processing to the output unit 27.

The storage unit 28 connected to the input/output interface 25 is formed of, for example, a hard disk, and stores programs executed by the CPU 21 and various types of data. A communication unit 29 communicates with an external device via the Internet or another network. In this example, the communication unit 29 serves as an obtaining unit for obtaining an output of a sensor.

Alternatively, a program may be obtained via the communication unit 29 and stored in the storage unit 28.

A drive 30 connected to the input/output interface 25 drives a magnetic disk 51, an optical disc 52, a magneto-optical disk 53, a semiconductor memory 54, or the like, when such a recording medium is attached to the drive 30, and obtains a program or data stored in the corresponding medium. The obtained program or data is transferred to the storage unit 28 and stored therein if necessary.

A description is given below, by taking a more specific example, of a signal processing apparatus for specifying an area having embedded significant information from data obtained by a sensor or for extracting embedded significant information. In the following example, a CCD line sensor or a CCD area sensor corresponds to the sensor, the area information or the mixture ratio corresponds to significant information, and the mixture of a foreground and a background in the mixed area corresponds to motion blur or a distortion.

Figure 2:
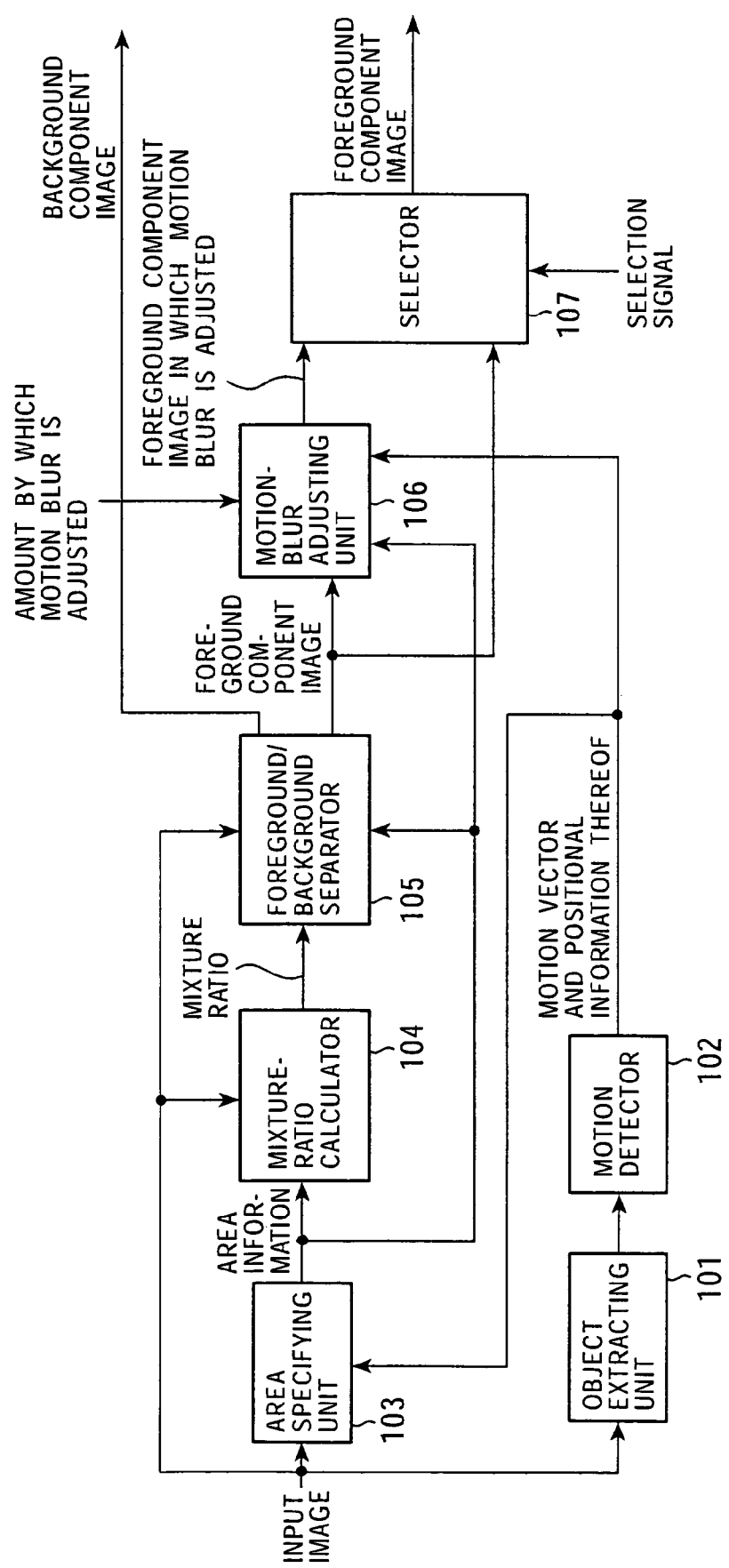
FIG. 2 is a block diagram illustrating the signal processing apparatus.

FIG. 2 is a block diagram illustrating the signal processing apparatus.

It does not matter whether the individual functions of the signal processing apparatus are implemented by hardware or software. That is, the block diagrams of this specification may be hardware block diagrams or software functional block diagrams.

Motion blur is a distortion contained in an image corresponding to a moving object caused by the movement of an object to be captured in the real world and the image-capturing characteristics of the sensor.

In this specification, an image to be captured corresponding to an object in the real world is referred to as an image object.

An input image supplied to the signal processing apparatus is supplied to an object extracting unit 101, an area specifying unit 103, a mixture-ratio calculator 104, and a foreground/background separator 105.

The object extracting unit 101 extracts a rough image object corresponding to a foreground object contained in the input image, and supplies the extracted image object to a motion detector 102. The object extracting unit 101 detects, for example, an outline of the foreground image object contained in the input image so as to extract a rough image object corresponding to the foreground object.

The object extracting unit 101 extracts a rough image object corresponding to a background object contained in the input image, and supplies the extracted image object to the motion detector 102. The object extracting unit 101 extracts a rough image object corresponding to the background object from, for example, the difference between the input image and the extracted image object corresponding to the foreground object.

Alternatively, for example, the object extracting unit 101 may extract the rough image object corresponding to the foreground object and the rough image object corresponding to the background object from the difference between the background image stored in a built-in background memory and the input image.

The motion detector 102 calculates a motion vector of the roughly extracted image object corresponding to the foreground object according to a technique, such as block matching, gradient, phase correlation, or pel-recursive technique, and supplies the calculated motion vector and the motion-vector positional information (which is information for specifying the positions of the pixels corresponding to the motion vector) to an area specifying unit 103 and a motion-blur extracting unit 106.

The motion vector output from the motion detector 102 contains information corresponding to the amount of movement v.

The motion detector 102 may output the motion vector of each image object, together with the pixel positional information for specifying the pixels of the image object, to the motion-blur adjusting unit 106.

The amount of movement v is a value indicating a positional change in an image corresponding to a moving object in units of the pixel pitch. For example, if an object image corresponding to a foreground is moving such that it is displayed at a position four pixels away from a reference frame when it is positioned in the subsequent frame, the amount of movement v of the object image corresponding to the foreground is 4.

The object extracting unit 101 and the motion detector 102 are needed when adjusting the amount of motion blur corresponding to a moving object.

The area specifying unit 103 determines to which of a foreground area, a background area, or a mixed area each pixel of the input image belongs, and supplies information indicating to which area each pixel belongs (hereinafter referred to as "area information") to the mixture-ratio calculator 104, the foreground/background separator 105, and the motion-blur adjusting unit 106.

The mixture-ratio calculator 104 calculates the mixture ratio corresponding to the pixels contained in a mixed area 63 (hereinafter referred to as the "mixture ratio $\alpha$") based on the input image, the motion vector and the positional information thereof supplied from the motion detector 102, and the area information supplied from the area specifying unit 103, and supplies the mixture ratio $\alpha$ to the foreground/background separator 105.

The mixture ratio $\alpha$ is a value indicating the ratio of the image components corresponding to the background object (hereinafter also be referred to as "background components") to the pixel value as expressed by equation (3), which is shown below.

The foreground/background separator 105 separates the input image into a foreground component image formed of only the image components corresponding to the foreground object (hereinafter also be referred to as "foreground components") and a background component image formed of only the background components based on the area information supplied from the area specifying unit 103 and the mixture ratio $\alpha$ supplied from the mixture-ratio calculator 104, and supplies the foreground component image to the motion-blur adjusting unit 106 and a selector 107. The separated foreground component image may be set as the final output. A more precise foreground and background can be obtained compared to a known method in which only a foreground and a background are specified without considering the mixed area.

The motion-blur adjusting unit 106 determines the unit of processing indicating at least one pixel contained in the foreground component image based on the amount of movement v obtained from the motion vector and based on the area information. The unit of processing is data that specifies a group of pixels to be subjected to the motion-blur adjustments.

Based on the amount by which the motion blur is to be adjusted, which is input into the signal processing apparatus, the foreground component image supplied from the foreground/background separator 105, the motion vector and the positional information thereof supplied from the motion detector 102, and the unit of processing, the motion-blur adjusting unit 106 adjusts the amount of motion blur contained in the foreground component image by removing, decreasing, or increasing the motion blur contained in the foreground component image. The motion-blur adjusting unit 106 then outputs the foreground component image in which amount of motion blur is adjusted to the selector 107. It is not essential that the motion vector and the positional information thereof be used.

The selector 107 selects one of the foreground component image supplied from the foreground/background separator 105 and the foreground component image in which the amount of motion blur is adjusted supplied from the motion-blur adjusting unit 106 based on, for example, a selection signal reflecting a user's selection, and outputs the selected foreground component image.

An input image supplied to the signal processing apparatus is discussed below with reference to FIGS. 3 through 18.

FIG. 3 illustrates image capturing performed by a sensor. The sensor is formed of, for example, a CCD (Charge-Coupled Device) video camera provided with a CCD area sensor, which is a solid-state imaging device. An object 111 corresponding to a foreground in the real world moves, for example, horizontally from the left to the right, between an object 112 corresponding to a background and the sensor.

The sensor captures the image of the object 111 corresponding to the foreground together with the image of the object 112 corresponding to the background. The sensor outputs the captured image in units of frames. For example, the sensor outputs an image having 30 frames per second. The exposure time of the sensor can be 1/30 second. The exposure time is a period from when the sensor starts converting input light into electrical charge until when the conversion from the input light to the electrical charge is finished. The exposure time is also referred to as a "shutter time".

Figure 4:
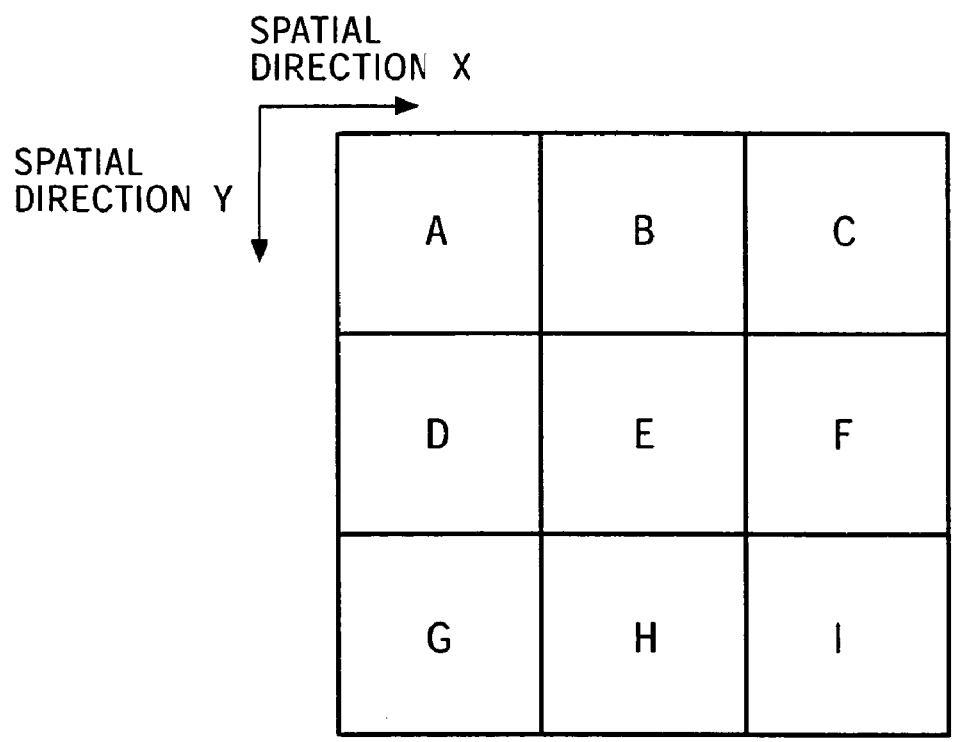
FIG. 4 illustrates the arrangement of pixels.

FIG. 4 illustrates the arrangement of pixels. In FIG. 4, A through I indicate the individual pixels. The pixels are disposed on a plane of a corresponding image. One detection device corresponding to each pixel is disposed on the sensor. When the sensor performs image capturing, each detection device outputs a pixel value of the corresponding pixel forming the image. For example, the position of the detection device in the X direction corresponds to the horizontal direction on the image, while the position of the detection device in the Y direction corresponds to the vertical direction on the image.

Figure 5:
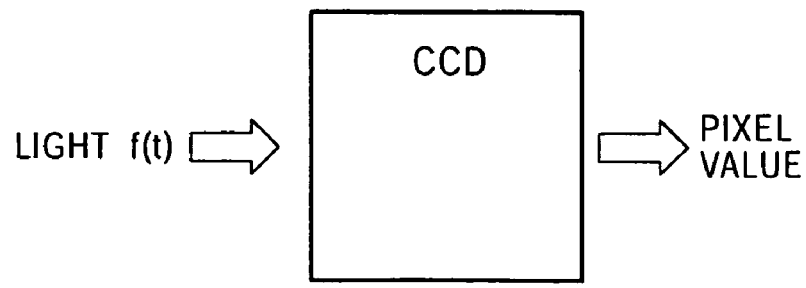
FIG. 5 illustrates the operation of a detection device.

As shown in FIG. 5, the detection device, which is, for example, a CCD, converts input light into electrical charge during a period corresponding to a shutter time, and stores the converted electrical charge. The amount of charge is almost proportional to the intensity of the input light and the period for which the light is input. The detection device sequentially adds the electrical charge converted from the input light to the stored electrical charge during the period corresponding to the shutter time. That is, the detection device integrates the input light during the period corresponding to the shutter time and stores the electrical charge corresponding to the amount of integrated light. It can be considered that the detection device has an integrating function with respect to time.

The electrical charge stored in the detection device is converted into a voltage value by a circuit (not shown), and the voltage value is further converted into a pixel value, such as digital data, and is output. Accordingly, each pixel value output from the sensor is a value projected on a linear space, which is a result of integrating a certain three-dimensional portion of the object corresponding to the foreground or the background with respect to the shutter time.

The signal processing apparatus extracts significant information embedded in the output signal, for example, the mixture ratio $\alpha$, by the storage operation of the sensor. The signal processing apparatus adjusts the amount of distortion, for example, the amount of motion blur, caused by the mixture of the foreground image object itself. The signal processing apparatus also adjusts the amount of distortion caused by the mixture of the foreground image object and the background image object.

Figure 6A:
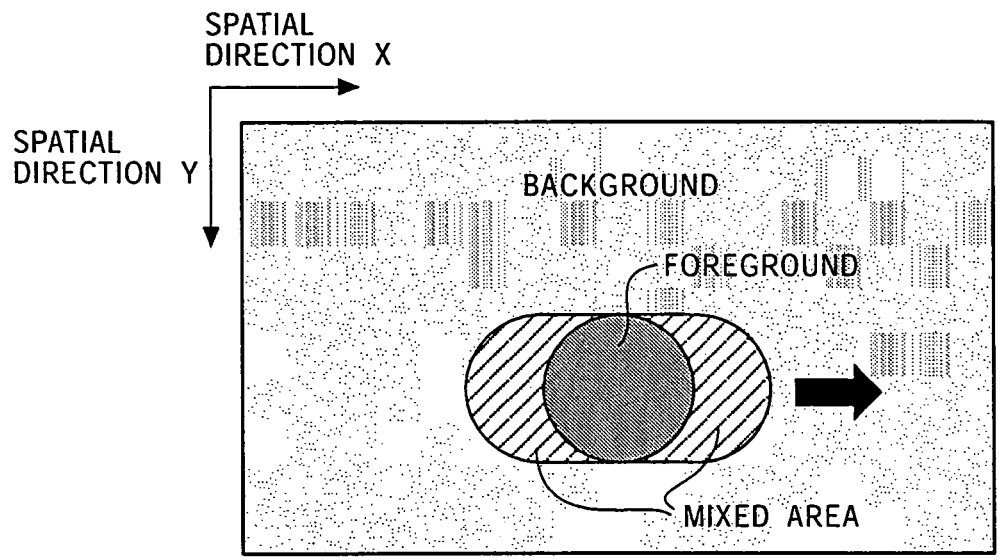
FIG. 6A illustrates an image obtained by image-capturing an object corresponding to a moving foreground and an object corresponding to a stationary background.

FIG. 6A is a view illustrating an image obtained by capturing a moving object 111 corresponding to a foreground and a stationary object 112 corresponding to a background. In the example shown in FIG. 6A, the object corresponding to the foreground is moving horizontally from the left to the right with respect to the screen.

Figure 6B:
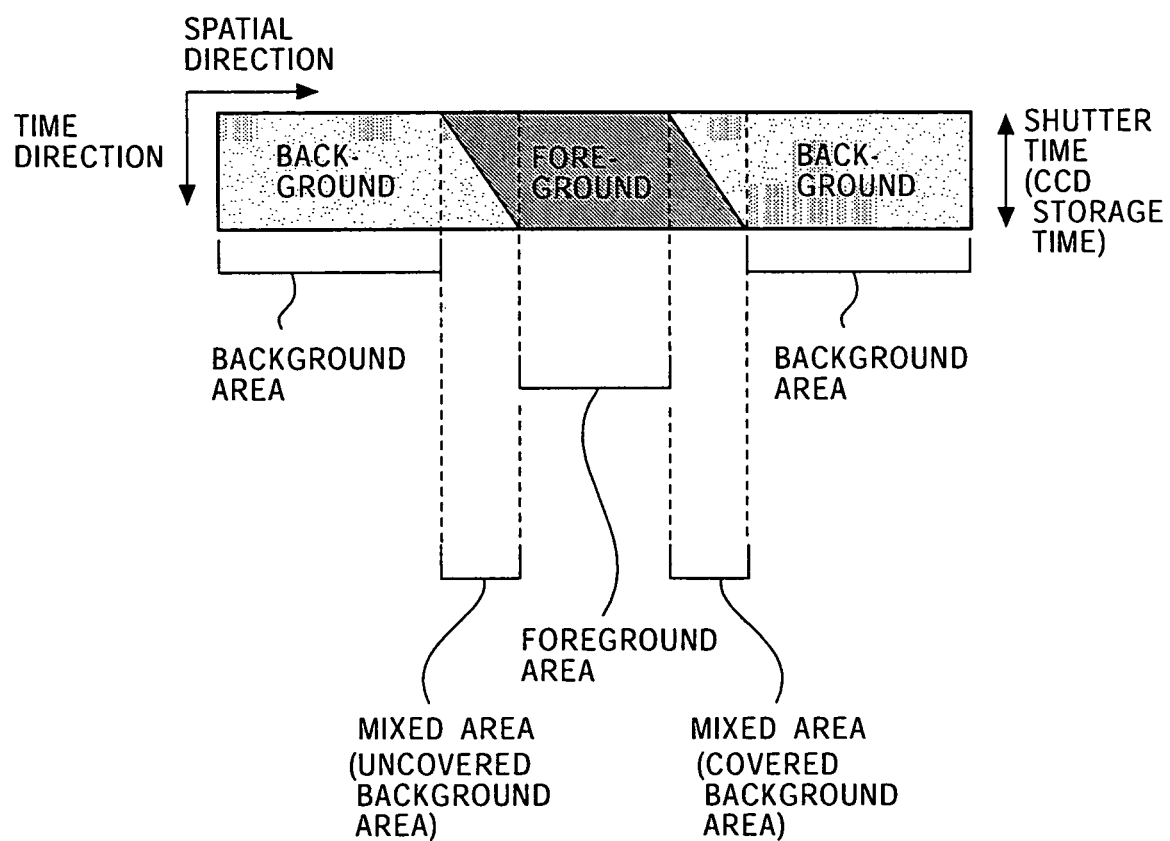
FIG. 6B illustrates a model obtained by expanding in the time direction pixel values corresponding to one line of an image.

FIG. 6B illustrates a model obtained by expanding pixel values corresponding to one line of the image shown in FIG. 6A in the time direction. The horizontal direction shown in FIG. 6B corresponds to the spatial direction X in FIG. 6A.

The values of the pixels in the background area are formed only from the background components, that is, the image components corresponding to the background object. The values of the pixels in the foreground area are formed only from the foreground components, that is, the image components corresponding to the foreground object.

The values of the pixels of the mixed area are formed from the background components and the foreground components. Since the values of the pixels in the mixed area are formed from the background components and the foreground components, it may be referred to as a "distortion area". The mixed area is further classified into a covered background area and an uncovered background area.

The covered background area is a mixed area at a position corresponding to the leading end in the direction in which the foreground object is moving, where the background components are gradually covered with the foreground over time.

In contrast, the uncovered background area is a mixed area corresponding to the trailing end in the direction in which the foreground object is moving, where the background components gradually appear over time.

As discussed above, the image containing the foreground area, the background area, or the covered background area or the uncovered background area is input into the area specifying unit 103, the mixture-ratio calculator 104, and the foreground/background separator 105 as the input image.

Figures 7, 8:
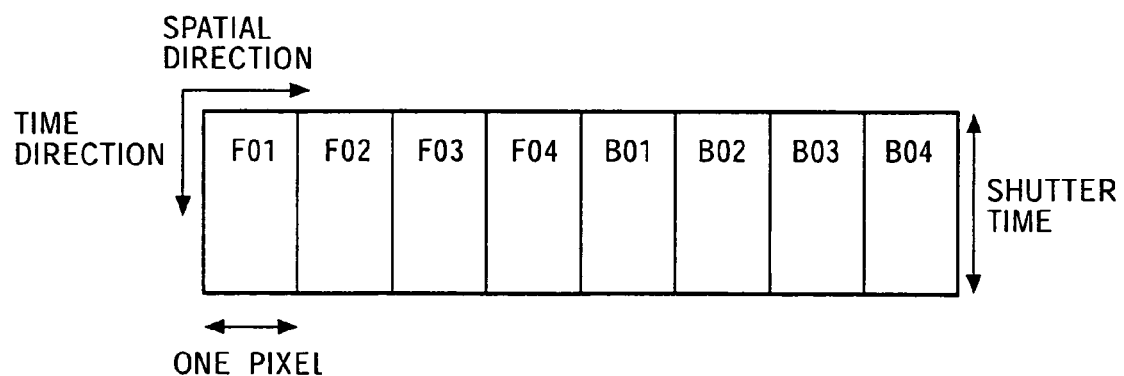
FIG. 7 illustrates a background area, a foreground area, a mixed area, a covered background area, and an uncovered background area.
FIG. 8 illustrates a model obtained by expanding in the time direction the pixel values of pixels aligned side-by-side in an image obtained by image-capturing an object corresponding to a stationary foreground and an the object corresponding to a stationary background.

FIG. 7 illustrates the background area, the foreground area, the mixed area, the covered background area, and the uncovered background area discussed above. In the areas corresponding to the image shown in FIG. 6, the background area is a stationary portion, the foreground area is a moving portion, the covered background area of the mixed area is a portion that changes from the background to the foreground, and the uncovered background area of the mixed area is a portion that changes from the foreground to the background.

FIG. 8 illustrates a model obtained by expanding in the time direction the pixel values of the pixels aligned side-by-side in the image obtained by capturing the image of the object corresponding to the stationary foreground and the image of the object corresponding to the stationary background. For example, as the pixels aligned side-by-side, pixels arranged in one line on the screen can be selected.

The pixel values indicated by F01 through F04 shown in FIG. 8 are values of the pixels corresponding to the object of the stationary foreground. The pixel values indicated by B01 through B04 shown in FIG. 8 are values of the pixels corresponding to the object of the stationary background.

In the vertical direction in FIG. 8, time elapses from the top to the bottom in FIG. 8. The position at the top side of the rectangle in FIG. 8 corresponds to the time at which the sensor starts converting input light into electrical charge, and the position at the bottom side of the rectangle in FIG. 8 corresponds to the time at which the conversion from the input light into the electrical charge is finished. That is, the distance from the top side to the bottom side of the rectangle in FIG. 8 corresponds to the shutter time.

The pixels shown in FIG. 8 are described below assuming that, for example, the shutter time is equal to the frame size.

The horizontal direction in FIG. 8 corresponds to the spatial direction X in FIG. 6. More specifically, in the example shown in FIG. 8, the distance from the left side of the rectangle indicated by "F01" in FIG. 8 to the right side of the rectangle indicated by "B04" is eight times the pixel pitch, i.e., eight consecutive pixels.

When the foreground object and the background object are stationary, the light input into the sensor does not change during the period corresponding to the shutter time.

The period corresponding to the shutter time is divided into two or more portions of equal periods. For example, if the number of virtual divided portions is 4, the model shown in FIG. 8 can be represented by the model shown in FIG. 11. The number of virtual divided portions can be set according to the amount of movement v of the object corresponding to the foreground within the shutter time. For example, the number of virtual divided portions is set to 4 when the amount of movement v is 4, and the period corresponding to the shutter time is divided into four portions.

Figure 11:
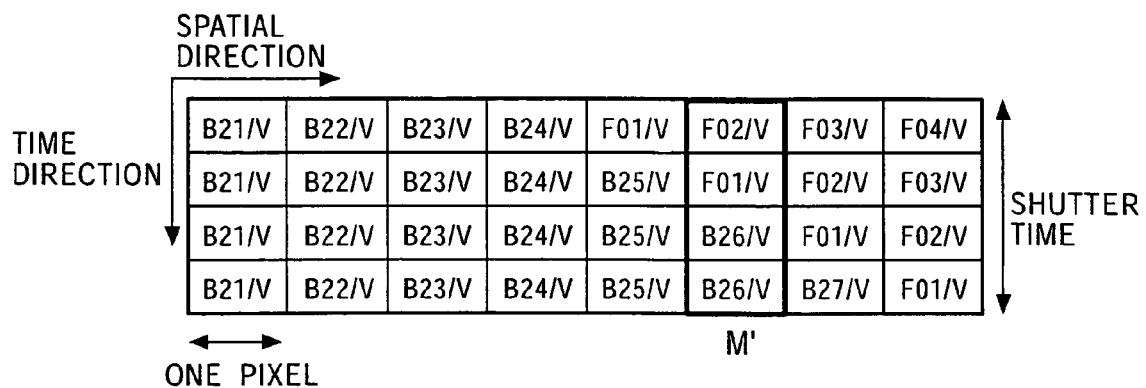
FIG. 11 illustrates a model in which pixel values are expanded in the time direction and the period corresponding to the shutter time is divided.

The uppermost line in FIG. 11 corresponds to the first divided period from when the shutter has opened. The second line in FIG. 11 corresponds to the second divided period from when the shutter has opened. The third line in FIG. 11 corresponds to the third divided period from when the shutter has opened. The fourth line in FIG. 11 corresponds to the fourth divided period from when the shutter has opened.

The shutter time divided in accordance with the amount of movement v is also hereinafter referred to as the "shutter time/v".

When the object corresponding to the foreground is stationary, the light input into the sensor does not change, and thus, the foreground component F01/v is equal to the value obtained by dividing the pixel value F01 by the number of virtual divided portions. Similarly, when the object corresponding to the foreground is stationary, the foreground component F02/v is equal to the value obtained by dividing the pixel value F02 by the number of virtual divided portions, the foreground component F03/v is equal to the value obtained by dividing the pixel value F03 by the number of virtual divided portions, and the foreground component F04/v is equal to the value obtained by dividing the pixel value F04 by the number of virtual divided portions.

When the object corresponding to the background is stationary, the light input into the sensor does not change, and thus, the background component B01/v is equal to the value obtained by dividing the pixel value B01 by the number of virtual divided portions. Similarly, when the object corresponding to the background is stationary, the background component B02/v is equal to the value obtained by dividing the pixel value B02 by the number of virtual divided portions, the background component B03/v is equal to the value obtained by dividing the pixel value B03 by the number of virtual divided portions, and the background component B04/v is equal to the value obtained by dividing the pixel value B04 by the number of virtual divided portions.

More specifically, when the object corresponding to the foreground is stationary, the light corresponding to the foreground object input into the sensor does not change during the period corresponding to the shutter time. Accordingly, the foreground component F01/v corresponding to the first portion of the shutter time/v from when the shutter has opened, the foreground component F01/v corresponding to the second portion of the shutter time/v from when the shutter has opened, the foreground component F01/v corresponding to the third portion of the shutter time/v from when the shutter has opened, and the foreground component F01/v corresponding to the fourth portion of the shutter time/v from when the shutter has opened become the same value. The same applies to F02/v through F04/v, as in the case of F01/v.

When the object corresponding to the background is stationary, the light corresponding to the background object input into the sensor does not change during the period corresponding to the shutter time. Accordingly, the background component B01/v corresponding to the first portion of the shutter time/v from when the shutter has opened, the background component B01/v corresponding to the second portion of the shutter time/v from when the shutter has opened, the background component B01/v corresponding to the third portion of the shutter time/v from when the shutter has opened, and the background component B01/v corresponding to the fourth portion of the shutter time/v from when the shutter has opened become the same value. The same applies to B02/v through B04/v.

A description is given of the case in which the object corresponding to the foreground is moving and the object corresponding to the background is stationary.

FIG. 10 illustrates a model obtained by expanding in the time direction the pixel values of the pixels in one line, including a covered background area, when the object corresponding to the foreground is moving to the right in FIG. 10. In FIG. 10, the amount of movement v is 4. Since one frame is a short period, it can be assumed that the object corresponding to the foreground is a rigid body moving with constant velocity. In FIG. 10, the object image corresponding to the foreground is moving such that it is positioned four pixels to the right with respect to a reference frame when it is displayed in the subsequent frame.

In FIG. 10, the pixels from the leftmost pixel to the fourth pixel belong to the foreground area. In FIG. 10, the pixels from the fifth pixel to the seventh pixel from the left belong to the mixed area, which is the covered background area. In FIG. 10, the rightmost pixel belongs to the background area.

The object corresponding to the foreground is moving such that it gradually covers the object corresponding to the background over time. Accordingly, the components contained in the pixel values of the pixels belonging to the covered background area change from the background components to the foreground components at a certain time during the period corresponding to the shutter time.

For example, the pixel value M surrounded by the thick frame in FIG. 10 is expressed by equation (1) below.

$$M=B02/v+B02/v+F07/v+F06/v \qquad (1)$$

For example, the fifth pixel from the left contains a background component corresponding to one portion of the shutter time/v and foreground components corresponding to three portions of the shutter time/v, and thus, the mixture ratio α of the fifth pixel from the left is 1/4. The sixth pixel from the left contains background components corresponding to two portions of the shutter time/v and foreground components corresponding to two portions of the shutter time/v, and thus, the mixture ratio α of the sixth pixel from the left is 1/2. The seventh pixel from the left contains background components corresponding to three portions of the shutter time/v and a foreground component corresponding to one portion of the shutter time/v, and thus, the mixture ratio α of the fifth pixel from the left is 3/4.

It can be assumed that the object corresponding to the foreground is a rigid body, and the foreground object is moving with constant velocity such that it is displayed four pixels to the right in the subsequent frame. Accordingly, for example, the foreground component F07/v of the fourth pixel from the left in FIG. 10 corresponding to the first portion of the shutter time/v from when the shutter has opened is equal to the foreground component of the fifth pixel from the left in FIG. 10 corresponding to the second portion of the shutter time/v from when the shutter has opened. Similarly, the foreground component F07/v is equal to the foreground component of the sixth pixel from the left in FIG. 10 corresponding to the third portion of the shutter time/v from when the shutter has opened, and the foreground component of the seventh pixel from the left in FIG. 10 corresponding to the fourth portion of the shutter time/v from when the shutter has opened.

It can be assumed that the object corresponding to the foreground is a rigid body, and the foreground object is moving with constant velocity such that it is displayed four pixels to the right in the subsequent frame. Accordingly, for example, the foreground component F06/v of the third pixel from the left in FIG. 10 corresponding to the first portion of the shutter time/v from when the shutter has opened is equal to the foreground component of the fourth pixel from the left in FIG. 10 corresponding to the second portion of the shutter time/v from when the shutter has opened. Similarly, the foreground component F06/v is equal to the foreground component of the fifth pixel from the left in FIG. 10 corresponding to the third portion of the shutter time/v from when the shutter has opened, and the foreground component of the sixth pixel from the left in FIG. 10 corresponding to the fourth portion of the shutter time/v from when the shutter has opened.

It can be assumed that the object corresponding to the foreground is a rigid body, and the foreground object is moving with constant velocity such that it is displayed four pixels to the right in the subsequent frame. Accordingly, for example, the foreground component F05/v of the second pixel from the left in FIG. 10 corresponding to the first portion of the shutter time/v from when the shutter has opened is equal to the foreground component of the third pixel from the left in FIG. 10 corresponding to the second portion of the shutter time/v from when the shutter has opened. Similarly, the foreground component F05/v is equal to the foreground component of the fourth pixel from the left in FIG. 10 corresponding to the third portion of the shutter time/v from when the shutter has opened, and the foreground component of the fifth pixel from the left in FIG. 10 corresponding to the fourth portion of the shutter time/v from when the shutter has opened.

It can be assumed that the object corresponding to the foreground is a rigid body, and the foreground object is moving with constant velocity such that it is displayed four pixels to the right in the subsequent frame. Accordingly, for example, the foreground component F04/v of the left most pixel in FIG. 10 corresponding to the first portion of the shutter time/v from when the shutter has opened is equal to the foreground component of the second pixel from the left in FIG. 10 corresponding to the second portion of the shutter time/v from when the shutter has opened. Similarly, the foreground component F04/v is equal to the foreground component of the third pixel from the left in FIG. 10 corresponding to the third portion of the shutter time/v from when the shutter has opened, and the foreground component of the fourth pixel from the left in FIG. 10 corresponding to the fourth portion of the shutter time/v from when the shutter has opened.

Since the foreground area corresponding to the moving object contains motion blur as discussed above, it can also be referred to as a "distortion area".

FIG. 11 illustrates a model obtained by expanding in the time direction the pixel values of the pixels in one line including an uncovered background area when the object corresponding to the foreground is moving to the right in FIG. 11. In FIG. 11, the amount of movement v is 4. Since one frame is a short period, it can be assumed that the object corresponding to the foreground is a rigid body moving with constant velocity. In FIG. 11, the object image corresponding to the foreground is moving to the right such that it is positioned four pixels to the right with respect to a reference frame when it is displayed in the subsequent frame.

In FIG. 11, the pixels from the leftmost pixel to the fourth pixel belong to the background area. In FIG. 11, the pixels from the fifth pixel to the seventh pixels from the left belong to the mixed area, which is an uncovered background area. In FIG. 11, the rightmost pixel belongs to the foreground area.

The object corresponding to the foreground which covers the object corresponding to the background is moving such that it is gradually removed from the object corresponding to the background over time. Accordingly, the components contained in the pixel values of the pixels belonging to the uncovered background area change from the foreground components to the background components at a certain time of the period corresponding to the shutter time.

For example, the pixel value M' surrounded by the thick frame in FIG. 11 is expressed by equation (2).

$$M'=F02/v+F01/v+B26/v+B26/v \qquad (2)$$

For example, the fifth pixel from the left contains background components corresponding to three portions of the shutter time/v and a foreground component corresponding to one shutter portion of the shutter time/v, and thus, the mixture ratio α of the fifth pixel from the left is 3/4. The sixth pixel from the left contains background components corresponding to two portions of the shutter time/v and foreground components corresponding to two portions of the shutter time/v, and thus, the mixture ratio α of the sixth pixel from the left is 1/2. The seventh pixel from the left contains a background component corresponding to one portion of the shutter time/v and foreground components corresponding to three portions of the shutter time/v, and thus, the mixture ratio α of the seventh pixel from the left is 1/4.

When equations (1) and (2) are generalized, the pixel value M can be expressed by equation (3):

$$M = \alpha \cdot B + \sum_i Fi/v \qquad (3)$$

where α is the mixture ratio, B indicates a pixel value of the background, and Fi/v designates a foreground component.

It can be assumed that the object corresponding to the foreground is a rigid body, which is moving with constant velocity, and the amount of movement is 4. Accordingly, for example, the foreground component F01/v of the fifth pixel from the left in FIG. 11 corresponding to the first portion of the shutter time/v from when the shutter has opened is equal to the foreground component of the sixth pixel from the left in FIG. 11 corresponding to the second portion of the shutter time/v from when the shutter has opened. Similarly, the foreground component F01/v is equal to the foreground component of the seventh pixel from the left in FIG. 11 corresponding to the third portion of the shutter time/v from when the shutter has opened, and the foreground component of the eighth pixel from the left in FIG. 11 corresponding to the fourth portion of the shutter time/v from when the shutter has opened.

It can be assumed that the object corresponding to the foreground is a rigid body, which is moving with constant velocity, and the amount of movement v is 4. Accordingly, for example, the foreground component F02/v of the sixth pixel from the left in FIG. 11 corresponding to the first portion of the shutter time/v from when the shutter has opened is equal to the foreground component of the seventh pixel from the left in FIG. 11 corresponding to the second portion of the shutter time/v from when the shutter has opened. Similarly, the foreground component F02/v is equal to the foreground component of the eighth pixel from the left in FIG. 11 corresponding to the third portion of the shutter time/v from when the shutter has opened.

It can be assumed that the object corresponding to the foreground is a rigid body, which is moving with constant velocity, and the amount of movement v is 4. Accordingly, for example, the foreground component F03/v of the seventh pixel from the left in FIG. 11 corresponding to the first portion of the shutter time/v from when the shutter has opened is equal to the foreground component of the eighth pixel from the left in FIG. 11 corresponding to the second portion of the shutter time/v from when the shutter has opened.

It has been described with reference to FIGS. 9 through 11 that the number of virtual divided portions is 4. The number of virtual divided portions corresponds to the amount of movement v. Generally, the amount of movement v corresponds to the moving speed of the object corresponding to the foreground. For example, if the object corresponding to the foreground is moving such that it is displayed four pixels to the right with respect to a certain frame when it is positioned in the subsequent frame, the amount of movement v is set to 4. The number of virtual divided portions is set to 4 in accordance with the amount of movement v. Similarly, when the object corresponding to the foreground is moving such that it is displayed six pixels to the left with respect to a certain frame when it is positioned in the subsequent frame, the amount of movement v is set to 6, and the number of virtual divided portions is set to 6.

Figure 12:
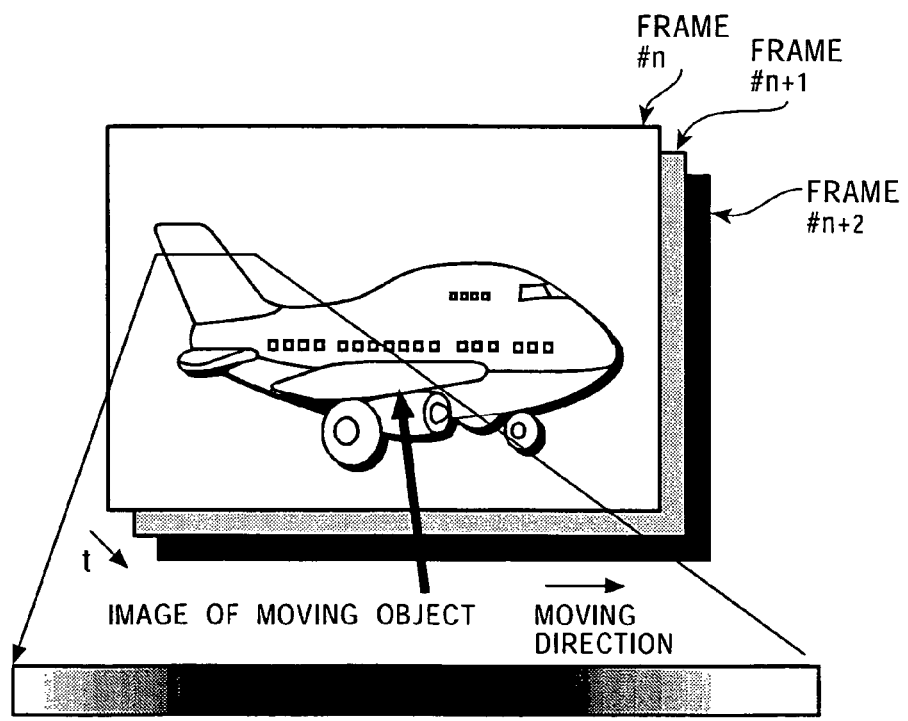
FIG. 12 illustrates an example in which pixels in a foreground area, a background area, and a mixed area are extracted.
Figure 13:
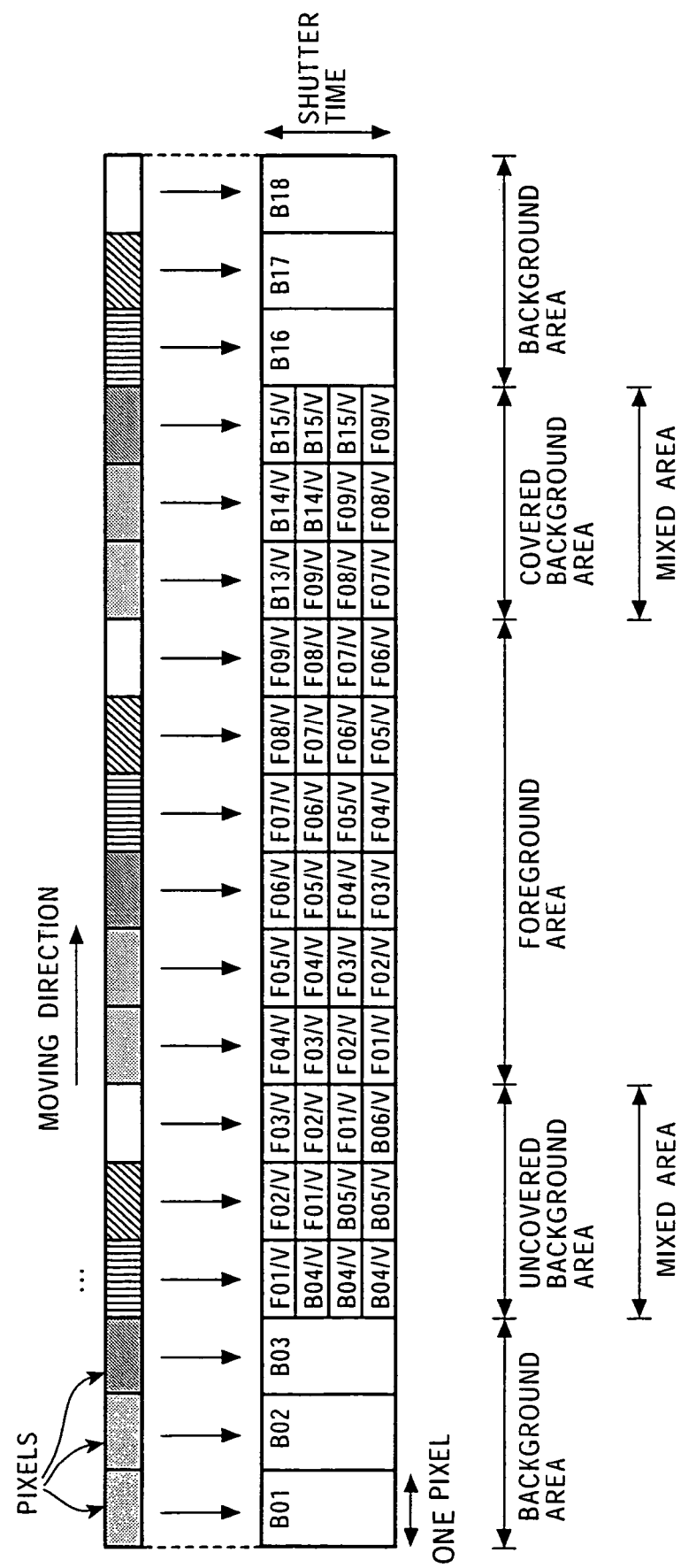
FIG. 13 illustrates the relationships between pixels and a model obtained by expanding the pixel values in the time direction.

FIGS. 12 and 13 illustrate the relationship of the foreground area, the background area, and the mixed area which consists of a covered background or an uncovered background, which are discussed above, to the foreground components and the background components corresponding to the divided periods of the shutter time.

FIG. 12 illustrates an example in which pixels in the foreground area, the background area, and the mixed area are extracted from an image containing a foreground corresponding to an object moving in front of a stationary background. In the example shown in FIG. 12, the object corresponding to the foreground is horizontally moving with respect to the screen.

Frame #n+1 is a frame subsequent to frame #n, and frame #n+2 is a frame subsequent to frame #n+1.

Pixels in the foreground area, the background area, and the mixed area are extracted from one of frames #n through #n+2, and the amount of movement v is set to 4. A model obtained by expanding the pixel values of the extracted pixels in the time direction is shown in FIG. 13.

Since the object corresponding to the foreground is moving, the pixel values in the foreground area are formed of four different foreground components corresponding to the shutter time/v. For example, the leftmost pixel of the pixels in the foreground area shown in FIG. 13 consists of F01/v, F02/v, F03/v, and F04/v. That is, the pixels in the foreground contain motion blur.

Since the object corresponding to the background is stationary, light input into the sensor corresponding to the background during the shutter time does not change. In this case, the pixel values in the background area do not contain motion blur.

The pixel values in the mixed area consisting of a covered background area or an uncovered background area are formed of foreground components and background components.

A description is given below of a model obtained by expanding in the time direction the pixel values of the pixels which are aligned side-by-side in a plurality of frames and which are located at the same positions when the frames are overlapped when the image corresponding to the object is moving. For example, when the image corresponding to the object is moving horizontally with respect to the screen, pixels aligned on the screen can be selected as the pixels aligned side-by-side.

Figure 14:
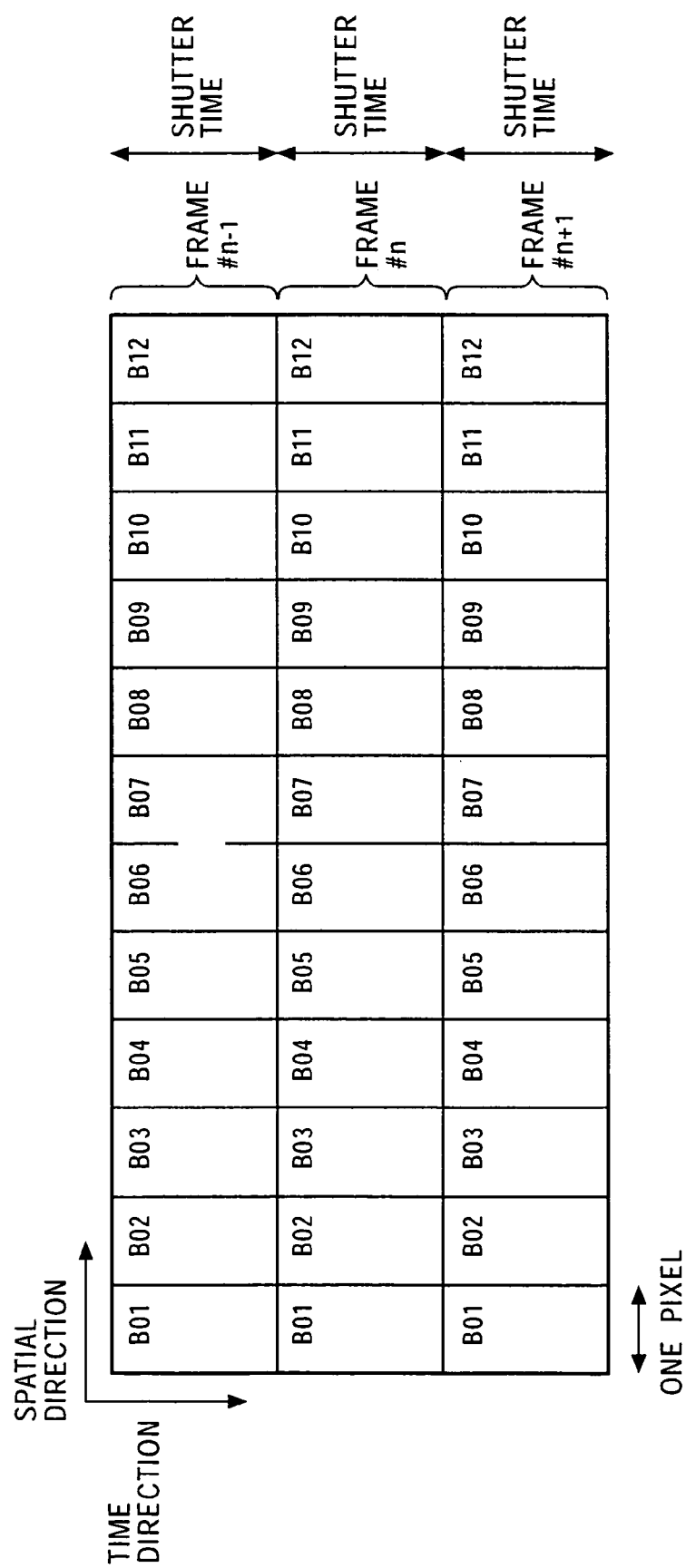
FIG. 14 illustrates a model in which pixel values are expanded in the time direction and the period corresponding to the shutter time is divided.

FIG. 14 illustrates a model obtained by expanding in the time direction the pixels which are aligned side-by-side in three frames of an image obtained by capturing an object corresponding to a stationary background and which are located at the same positions when the frames are overlapped. Frame #n is the frame subsequent to frame #n−1, and frame #n+1 is the frame subsequent to frame #n. The same applies to the other frames.

The pixel values B01 through B12 shown in FIG. 14 are pixel values corresponding to the stationary background object. Since the object corresponding to the background is stationary, the pixel values of the corresponding pixels in frame #n−1 through frame #n+1 do not change. For example, the pixel in frame #n and the pixel in frame #n+1 located at the corresponding position of the pixel having the pixel value B05 in frame #n−1 have the pixel value B05.

Figure 15:
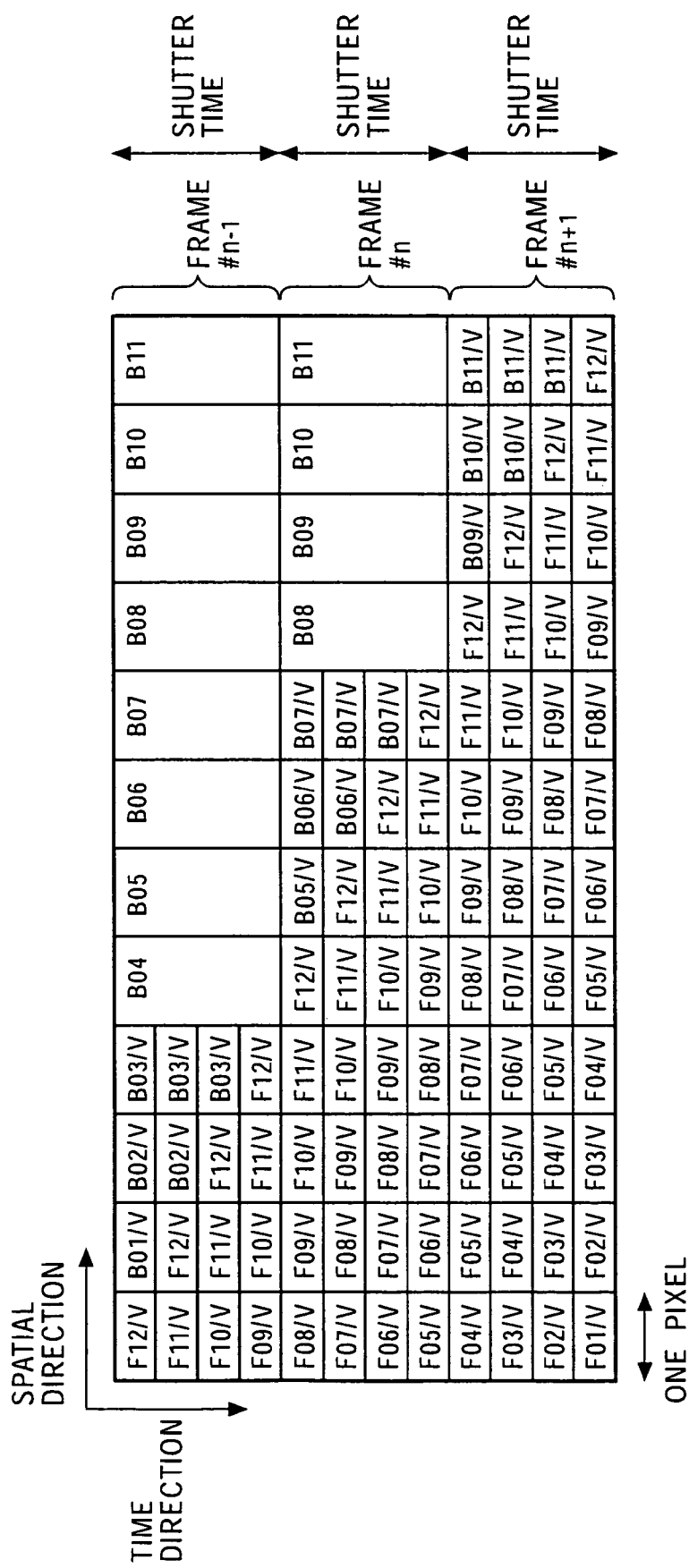
FIG. 15 illustrates a model in which pixel values are expanded in the time direction and the period corresponding to the shutter time is divided.

FIG. 15 illustrates a model obtained by expanding in the time direction the pixels which are aligned side-by-side in three frames of an image obtained by capturing an object corresponding to a foreground that is moving to the right in FIG. 15 together with an object corresponding to a stationary background and which are located at the same positions when the frames are overlapped. The model shown in FIG. 15 contains a covered background area.

In FIG. 15, it can be assumed that the object corresponding to the foreground is a rigid body moving with constant velocity, and that it is moving such that it is displayed four pixels to the right in the subsequent frame. Accordingly, the amount of movement v is 4, and the number of virtual divided portions is 4.

For example, the foreground component of the leftmost pixel of frame #n−1 in FIG. 15 corresponding to the first portion of the shutter time/v from when the shutter has opened is F12/v, and the foreground component of the second pixel from the left in FIG. 15 corresponding to the second portion of the shutter time/v from when the shutter has opened is also F12/v. The foreground component of the third pixel from the left in FIG. 15 corresponding to the third portion of the shutter time/v from when the shutter has opened and the foreground component of the fourth pixel from the left in FIG. 15 corresponding to the fourth portion of the shutter time/v from when the shutter has opened are F12/v.

The foreground component of the leftmost pixel of frame #n−1 in FIG. 15 corresponding to the-second portion of the shutter time/v from when the shutter has opened is F11/v. The foreground component of the second pixel from the left in FIG. 15 corresponding to the third portion of the shutter time/v from when the shutter has opened is also F11/v. The foreground component of the third pixel from the left in FIG. 15 corresponding to the fourth portion of the shutter time/v from when the shutter has opened is F11/v.

The foreground component of the leftmost pixel of frame #n−1 in FIG. 15 corresponding to the third portion of the shutter time/v from when the shutter has opened is F10/v. The foreground component of the second pixel from the left in FIG. 15 corresponding to the fourth portion of the shutter time/v from when the shutter has opened is also F10/v. The foreground component of the leftmost pixel of frame #n−1 in FIG. 15 corresponding to the fourth portion of the shutter time/v from when the shutter has opened is F09/v.

Since the object corresponding to the background is stationary, the background component of the second pixel from the left of frame #n−1 in FIG. 15 corresponding to the first portion of the shutter time/v from when the shutter has opened is B01/v. The background components of the third pixel from the left of frame #n−1 in FIG. 15 corresponding to the first and second portions of the shutter time/v from when the shutter has opened are B02/v. The background components of the fourth pixel from the left of frame #n−1 in FIG. 15 corresponding to the first through third portions of the shutter time/v from when the shutter has opened are B03/v.

In frame #n−1 in FIG. 15, the leftmost pixel from the left belongs to the foreground area, and the second through fourth pixels from the left belong to the mixed area, which is a covered background area.

The fifth through twelfth pixels from the left of frame #n−1 in FIG. 15 belong to the background area, and the pixel values thereof are B04 through B11, respectively.

The first through fifth pixels from the left in frame #n in FIG. 15 belong to the foreground area. The foreground component in the shutter time/v in the foreground area of frame #n is any one of F05/v through F12/v.

It can be assumed that the object corresponding to the foreground is a rigid body moving with constant velocity, and that it is moving such that the foreground image is displayed four pixels to the right in the subsequent frame. Accordingly, the foreground component of the fifth pixel from the left of frame #n in FIG. 15 corresponding to the first portion of the shutter time/v from when the shutter has opened is F12/v, and the foreground component of the sixth pixel from the left in FIG. 15 corresponding to the second portion of the shutter time/v from when the shutter has opened is also F12/v. The foreground component of the seventh pixel from the left in FIG. 15 corresponding to the third portion of the shutter time/v from when the shutter has opened and the foreground component of the eighth pixel from the left in FIG. 15 corresponding to the fourth portion of the shutter time/v from when the shutter has opened are F12/v.

The foreground component of the fifth pixel from the left of frame #n in FIG. 15 corresponding to the second portion of the shutter time/v from when the shutter has opened is F11/v. The foreground component of the sixth pixel from the left in FIG. 15 corresponding to the third portion of the shutter time/v from when the shutter has opened is also F11/v. The foreground component of the seventh pixel from the left in FIG. 15 corresponding to the fourth portion of the shutter time/v from when the shutter has opened is F11/v.

The foreground component of the fifth pixel from the left of frame #n in FIG. 15 corresponding to the third portion of the shutter time/v from when the shutter has opened is F10/v. The foreground component of the sixth pixel from the left in FIG. 15 corresponding to the fourth portion of the shutter time/v from when the shutter has opened is also F10/v. The foreground component of the fifth pixel from the left of frame #n in FIG. 15 corresponding to the fourth portion of the shutter time/v from when the shutter has opened is F09/v.

Since the object corresponding to the background is stationary, the background component of the sixth pixel from the left of frame #n in FIG. 15 corresponding to the first portion of the shutter time/v from when the shutter has opened is B05/v. The background components of the seventh pixel from the left of frame #n in FIG. 15 corresponding to the first and second portions of the shutter time/v from when the shutter has opened are B06/v. The background components of the eighth pixel from the left of frame #n in FIG. 15 corresponding to the first through third portion of the shutter time/v from when the shutter has opened are B07/v.

In frame #n in FIG. 15, the sixth through eighth pixels from the left belong to the mixed area, which is a covered background area.

The ninth through twelfth pixels from the left of frame #n in FIG. 15 belong to the background area, and the pixel values thereof are B08 through B11, respectively.

The first through ninth pixels from the left in frame #n+1 in FIG. 15 belong to the foreground area. The foreground component in the shutter time/v in the foreground area of frame #n+1 is any one of F01/v through F12/v.

It can be assumed that the object corresponding to the foreground is a rigid body moving with constant velocity, and that it is moving such that the foreground image is displayed four pixels to the right in the subsequent frame. Accordingly, the foreground component of the ninth pixel from the left of frame #n+1 in FIG. 15 corresponding to the first portion of the shutter time/v from when the,shutter has opened is F12/v, and the foreground component of the tenth pixel from the left in FIG. 15 corresponding to the second portion of the shutter time/v from when the shutter has opened is also F12/v. The foreground component of the eleventh pixel from the left in FIG. 15 corresponding to the third portion of the shutter time/v from when the shutter has opened and the foreground component of the twelfth pixel from the left in FIG. 15 corresponding to the fourth portion of the shutter time/v from when the shutter has opened are F12/v.

The foreground component of the ninth pixel from the left of frame #n+1 in FIG. 15 corresponding to the second portion of the shutter time/v from when the shutter has opened is F11/v. The foreground component of the tenth pixel from the left in FIG. 15 corresponding to the third portion of the shutter time/v from when the shutter has opened is also F11/v. The foreground component of the eleventh pixel from the left in FIG. 15 corresponding to the fourth portion of the shutter time/v from when the shutter has opened is F11/v.

The foreground component of the ninth pixel from the left of frame #n+1 in FIG. 15 corresponding to the third portion of the shutter time/v from when the shutter has opened is F10/v. The foreground component of the tenth pixel from the left in FIG. 15 corresponding to the fourth portion of the shutter time/v from when the shutter has opened is also F10/v. The foreground component of the ninth pixel from the left of frame #n+1 in FIG. 15 corresponding to the fourth portion of the shutter time/v from when the shutter has opened is F09/v.

Since the object corresponding to the background is stationary, the background component of the tenth pixel from the left of frame #n+1 in FIG. 15 corresponding to the first portion of the shutter time/v from when the shutter has opened is B09/v. The background components of the eleventh pixel from the left of frame #n+1 in FIG. 15 corresponding to the first and second portions of the shutter time/v from when the shutter has opened are B10/v. The background components of the twelfth pixel from the left of frame #n+1 in FIG. 15 corresponding to the first through third portion of the shutter time/v from when the shutter has opened are B11/v.

In frame #n+1 in FIG. 15, the tenth through twelfth pixels from the left belong to the mixed area, which is a covered background area.

Figure 16:
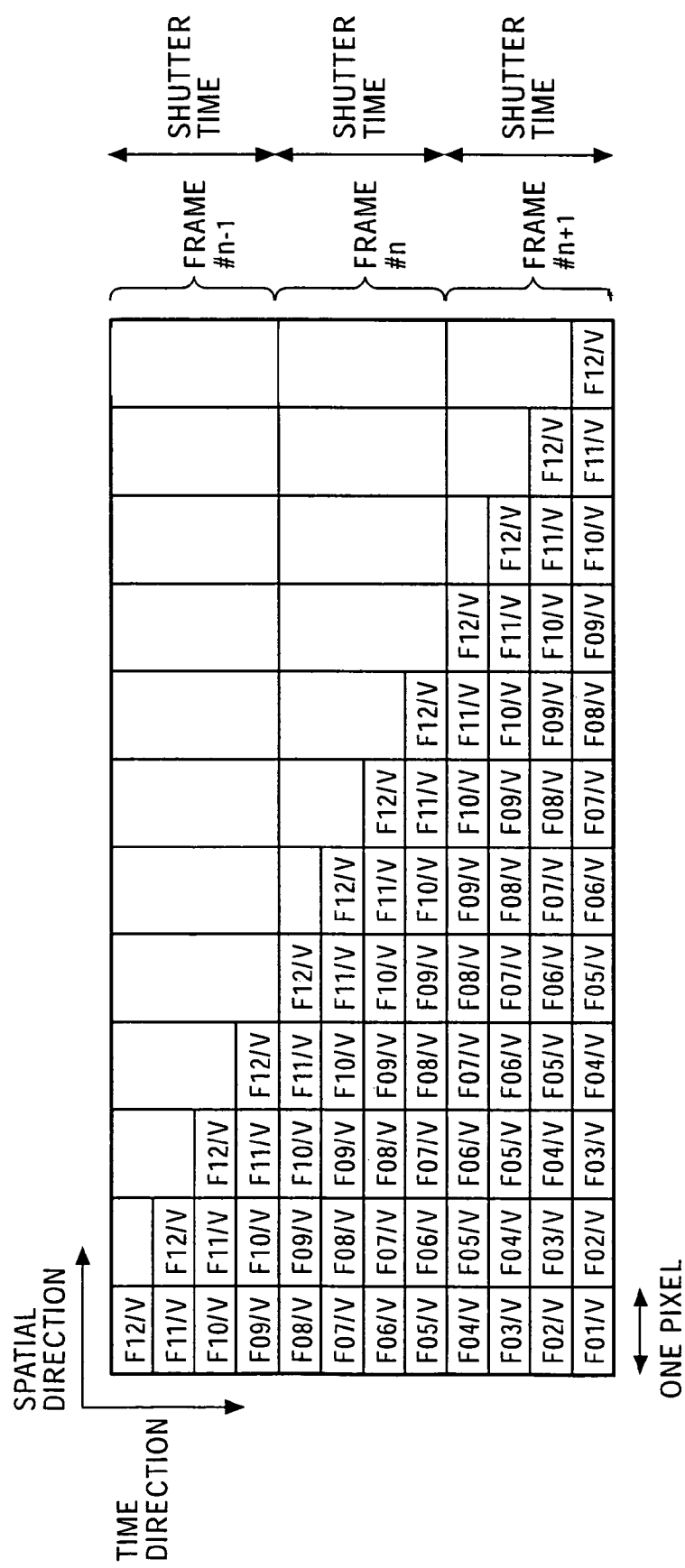
FIG. 16 illustrates a model in which pixel values are expanded in the time direction and the period corresponding to the shutter time is divided.

FIG. 16 is a model of an image obtained by extracting the foreground components from the pixel values shown in FIG. 15.

Figure 17:
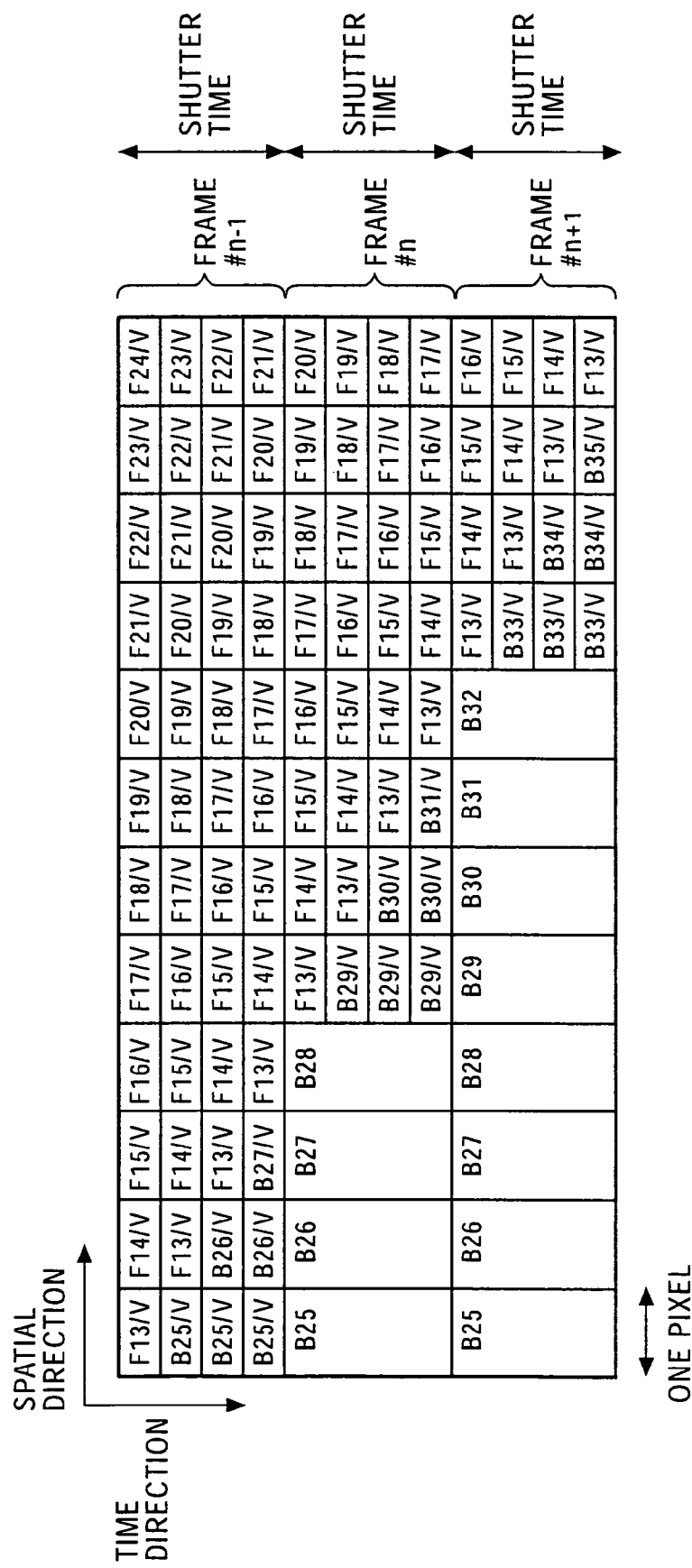
FIG. 17 illustrates a model in which pixel values are expanded in the time direction and the period corresponding to the shutter time is divided.

FIG. 17 illustrates a model obtained by expanding in the time direction the pixels which are aligned side-by-side in three frames of an image obtained by capturing an object corresponding to a foreground that is moving to the right in FIG. 17 together with an object corresponding to a stationary background and which are located at the same positions when the frames are overlapped. The model shown in FIG. 17 contains an uncovered background area.

In FIG. 17, it can be assumed that the object corresponding to the foreground is a rigid body moving with constant velocity, and that it is moving such that it is displayed four pixels to the right in the subsequent frame. Accordingly, the amount of movement v is 4.

For example, the foreground component of the leftmost pixel of frame #n−1 in FIG. 17 corresponding to the first portion of the shutter time/v from when the shutter has opened is F13/v, and the foreground component of the second pixel from the left in FIG. 17 corresponding to the second portion of the shutter time/v from when the shutter has opened is also F13/v. The foreground component of the third pixel from the left in FIG. 17 corresponding to the third portion of the shutter time/v from when the shutter has opened and the foreground component of the fourth pixel from the left in FIG. 17 corresponding to the fourth portion of the shutter time/v from when the shutter has opened are F13/v.

The foreground component of the second pixel, from the left of frame #n−1 in FIG. 17 corresponding to the first portion of the shutter time/v from when the shutter has opened is F14/v. The foreground component of the third pixel from the left in FIG. 17 corresponding to the second portion of the shutter time/v from when the shutter has opened is also F14/v. The foreground component of the third pixel from the left in FIG. 17 corresponding to the first portion of the shutter time/v from when the shutter has opened is F15/v.

Since the object corresponding to the background is stationary, the background components of the leftmost pixel of frame #n−1 in FIG. 17 corresponding to the second through fourth portions of the shutter time/v from when the shutter has opened are B25/v. The background components of the second pixel from the left of frame #n−1 in FIG. 17 corresponding to the third and fourth portions of the shutter time/v from when the shutter has opened are B26/v. The background component of the third pixel from the left of frame #n−1 in FIG. 17 corresponding to the fourth portion of the shutter time/v from when the shutter has opened is B27/v.

In frame #n−1 in FIG. 17, the leftmost pixel through the third pixel belong to the mixed area, which is an uncovered background area.

The fourth through twelfth pixels from the left of frame #n−1 in FIG. 17 belong to the foreground area. The foreground component of the frame is any one of F13/v through F24/v.

The leftmost pixel through the fourth pixel from the left of frame #n in FIG. 17 belong to the background area, and the pixel values thereof are B25 through B28, respectively.

It can be assumed that the object corresponding to the foreground is a rigid body moving with constant velocity, and that it is moving such that it is displayed four pixels to the right in the subsequent frame. Accordingly, the foreground component of the fifth pixel from the left of frame #n in FIG. 17 corresponding to the first portion of the shutter time/v from when the shutter has opened is F13/v, and the foreground component of the sixth pixel from the left in FIG. 17 corresponding to the second portion of the shutter time/v from when the shutter has opened is also F13/v. The foreground component of the seventh pixel from the left in FIG. 17 corresponding to the third portion of the shutter time/v from when the shutter has opened and the foreground component of the eighth pixel from the left in FIG. 17 corresponding to the fourth portion of the shutter time/v from when the shutter has opened are F13/v.

The foreground component of the sixth pixel from the left of frame #n in FIG. 17 corresponding to the first portion of the shutter time/v from when the shutter has opened is F14/v. The foreground component of the seventh pixel from the left in FIG. 17 corresponding to the second portion of the shutter time/v from when the shutter has opened is also F14/v. The foreground component of the eighth pixel from the left in FIG. 17 corresponding to the first portion of the shutter time/v from when the shutter has opened is F15/v.

Since the object corresponding to the background is stationary, the background components of the fifth pixel from the left of frame #n in FIG. 17 corresponding to the second through fourth portions of the shutter time/v from when the shutter has opened are B29/v. The background components of the sixth pixel from the left of frame #n in FIG. 17 corresponding to the third and fourth portions of the shutter time/v from when the shutter has opened are B30/v. The background component of the seventh pixel from the left of frame #n in FIG. 17 corresponding to the fourth portion of the shutter time/v from when the shutter has opened is B31/v.

In frame #n in FIG. 17, the fifth pixel through the seventh pixel from the left belong to the mixed area, which is an uncovered background area.

The eighth through twelfth pixels from the left of frame #n in FIG. 17 belong to the foreground area. The value in the foreground area of frame #n corresponding to the period of the shutter time/v is any one of F13/v through F20/v.

The leftmost pixel through the eighth pixel from the left of frame #n+1 in FIG. 17 belong to the background area, and the pixel values thereof are B25 through B32, respectively.

It can be assumed that the object corresponding to the foreground is a rigid body moving with constant velocity, and that it is moving such that it is displayed four pixels to the right in the subsequent frame. Accordingly, the foreground component of the ninth pixel from the left of frame #n+1 in FIG. 17 corresponding to the first portion of the shutter time/v from when the shutter has opened is F13/v, and the foreground component of the tenth pixel from the left in FIG. 17 corresponding to the second portion of the shutter time/v from when the shutter has opened is also F13/v. The foreground component of the eleventh pixel from the left in FIG. 17 corresponding to the third portion of the shutter time/v from when the shutter has opened and the foreground component of the twelfth pixel from the left in FIG. 17 corresponding to the fourth portion of the shutter time/v from when the shutter has opened are F13/v.

The foreground component of the tenth pixel from the left of frame #n+1 in FIG. 17 corresponding to the first portion of the shutter time/v from when the shutter has opened is F14/v. The foreground component of the eleventh pixel from the left in FIG. 17 corresponding to the second portion of the shutter time/v from when the shutter has opened is also F14/v. The foreground component of the twelfth pixel from the left in FIG. 17 corresponding to the first portion of the shutter time/v from when the shutter has opened is F15/v.

Since the object corresponding to the background is stationary, the background components of the ninth pixel from the left of frame #n+1 in FIG. 17 corresponding to the second through fourth portions of the shutter time/v from when the shutter has opened are B33/v. The background components of the tenth pixel from the left of frame #n+1 in FIG. 17 corresponding to the third and fourth portions of the shutter time/v from when the shutter has opened are B34/v. The background component of the eleventh pixel from the left of frame #n+1 in FIG. 17 corresponding to the fourth portion of the shutter time/v from when the shutter has opened is B35/v.

In frame #n+1 in FIG. 17, the ninth through eleventh pixels from the left in FIG. 17 belong to the mixed area, which is an uncovered background area.

The twelfth pixel from the left of frame #n+1 in FIG. 17 belongs to the foreground area. The foreground component in the shutter time/v in the foreground area of frame #n+1 is any one of F13 through F16, respectively.

Figure 18:
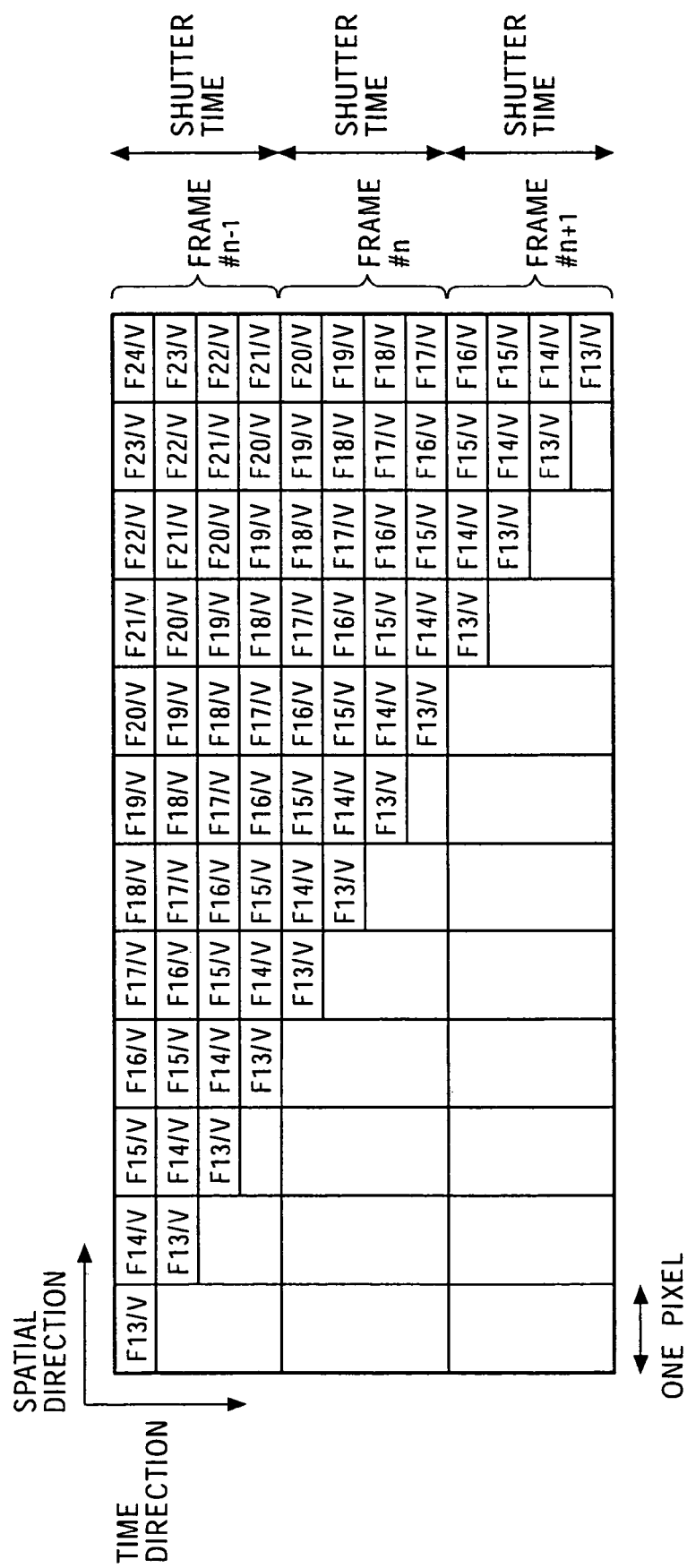
FIG. 18 illustrates a model in which pixel values are expanded in the time direction and the period corresponding to the shutter time is divided.

FIG. 18 illustrates a model of an image obtained by extracting the foreground components from the pixel values shown in FIG. 17.

Referring back to FIG. 2, the area specifying unit 103 specifies flags indicating to which of a foreground area, a background area, a covered background area, or an uncovered background area the individual pixels of the input image belong by using the pixel values of a plurality of frames, and supplies the flags to the mixture-ratio calculator 104 and the motion-blur adjusting unit 106 as the area information.

The mixture-ratio calculator 104 calculates the mixture ratio α for each pixel contained in the mixed area based on the pixel values of a plurality of frames and the area information, and supplies the calculated mixture ratio α to the foreground/background separator 105.

The foreground/background separator 105 extracts the foreground component image consisting of only the foreground components based on the pixel values of a plurality of frames, the area information, and the mixture ratio α, and supplies the foreground component image to the motion-blur adjusting unit 106.

The motion-blur adjusting unit 106 adjusts the amount of motion blur contained in the foreground component image based on the foreground component image supplied from the foreground/background separator 105, the motion vector supplied from the motion detector 102, and the area information supplied from the area specifying unit 103, and then outputs the foreground component image in which motion blur is adjusted.

Figure 19:
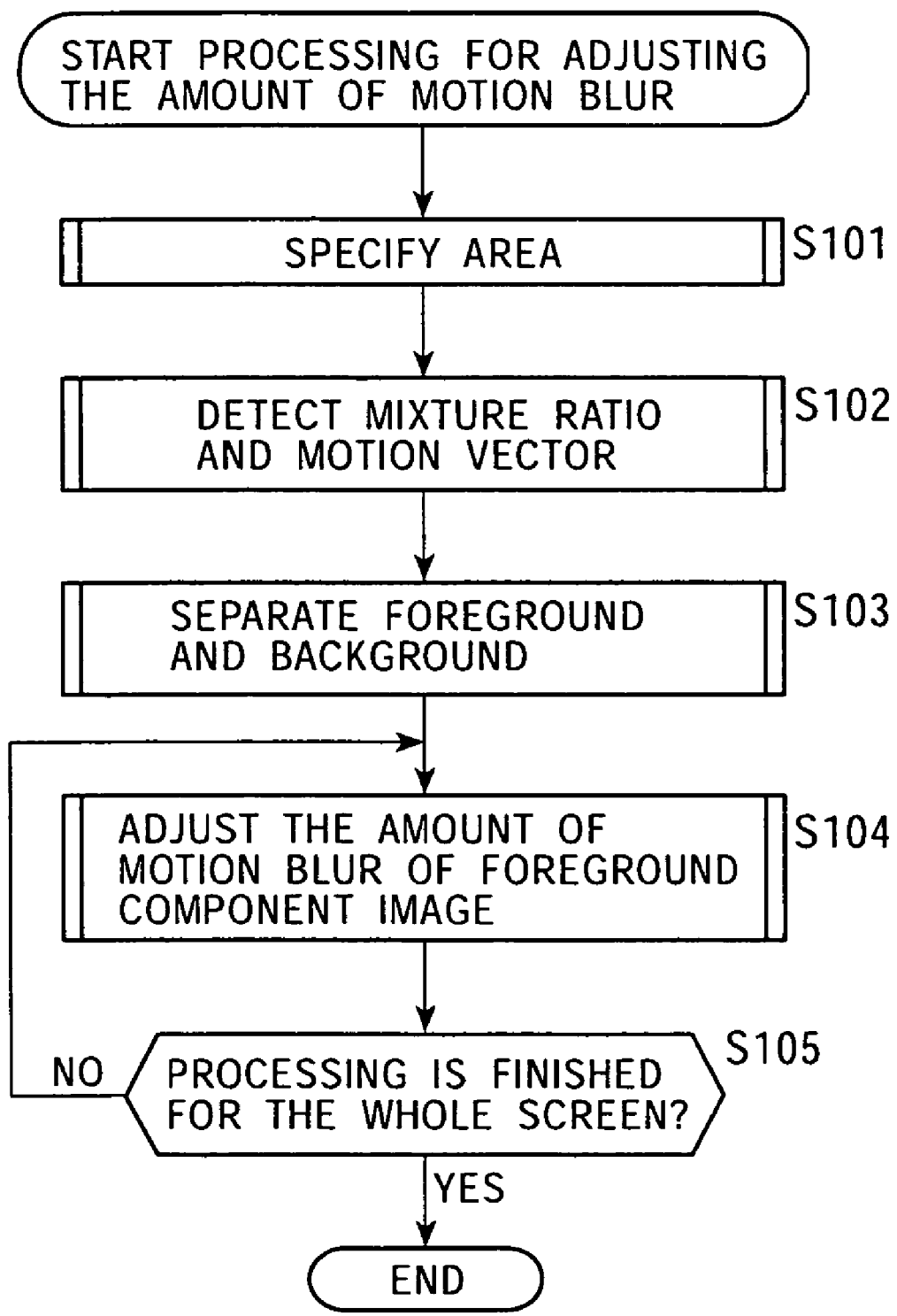
FIG. 19 is a flowchart illustrating the processing for adjusting the amount of motion blur.

The processing for adjusting the amount of motion blur performed by the signal processing apparatus is described below with reference to the flowchart of FIG. 19. In step S11, the area specifying unit 103 executes area specifying processing, based on an input image, for generating area information indicating to which of a foreground area, a background area, a covered background area, or an uncovered background area each pixel of the input image belongs. Details of the area specifying processing are given below. The area specifying unit 103 supplies the generated area information to the mixture-ratio calculator 104.

In step S11, the area specifying unit 103 may generate, based on the input image, area information indicating to which of the foreground area, the background area, or the mixed area (regardless of whether each pixel belongs to a covered background area or an uncovered background area) each pixel of the input image belongs. In this case, the foreground/background separator 105 and the motion-blur adjusting unit 106 determine based on the direction of the motion vector whether the mixed area is a covered background area or an uncovered background area. For example, if the input image is disposed in the order of the foreground area, the mixed area, and the background area in the direction of the motion vector, it is determined that the mixed area is a covered background area. If the input image is disposed in the order of the background area, the mixed area, and the foreground area in the direction of the motion vector, it is determined that the mixed area is an uncovered background area.

In step S12, the mixture-ratio calculator 104 calculates the mixture ratio α for each pixel contained in the mixed area based on the input image and the area information. Details of the mixture ratio calculating processing are given below. The mixture-ratio calculator 104 supplies the calculated mixture ratio α to the foreground/background separator 105.

In step S13, the foreground/background separator 105 extracts the foreground components from the input image based on the area information and the mixture ratio α, and supplies the foreground components to the motion-blur adjusting unit 106 as the foreground component image.

In step S14, the motion-blur adjusting unit 106 generates, based on the motion vector and the area information, the unit of processing that indicates the positions of consecutive pixels disposed in the moving direction and belonging to any of the uncovered background area, the foreground area, and the covered background area, and adjusts the amount of motion blur contained in the foreground components corresponding to the unit of processing. Details of the processing for adjusting the amount of motion blur are given below.

In step S15, the signal processing apparatus determines whether the processing is finished for the whole screen. If it is determined that the processing is not finished for the whole screen, the process proceeds to step S14, and the processing for adjusting the amount of motion blur for the foreground components corresponding to the unit of processing is repeated.

If it is determined in step S15 that the processing is finished for the whole screen, the processing is completed.

In this manner, the signal processing apparatus is capable of adjusting the amount of motion blur contained in the foreground by separating the foreground and the background. That is, the signal processing apparatus is capable of adjusting the amount of motion blur contained in sampled data indicating the pixel values of the foreground pixels.

The configuration of each of the area specifying unit 103, the mixture-ratio calculator 104, the foreground/background separator 105, and the motion-blur adjusting unit 106 is described below.

Figure 20:
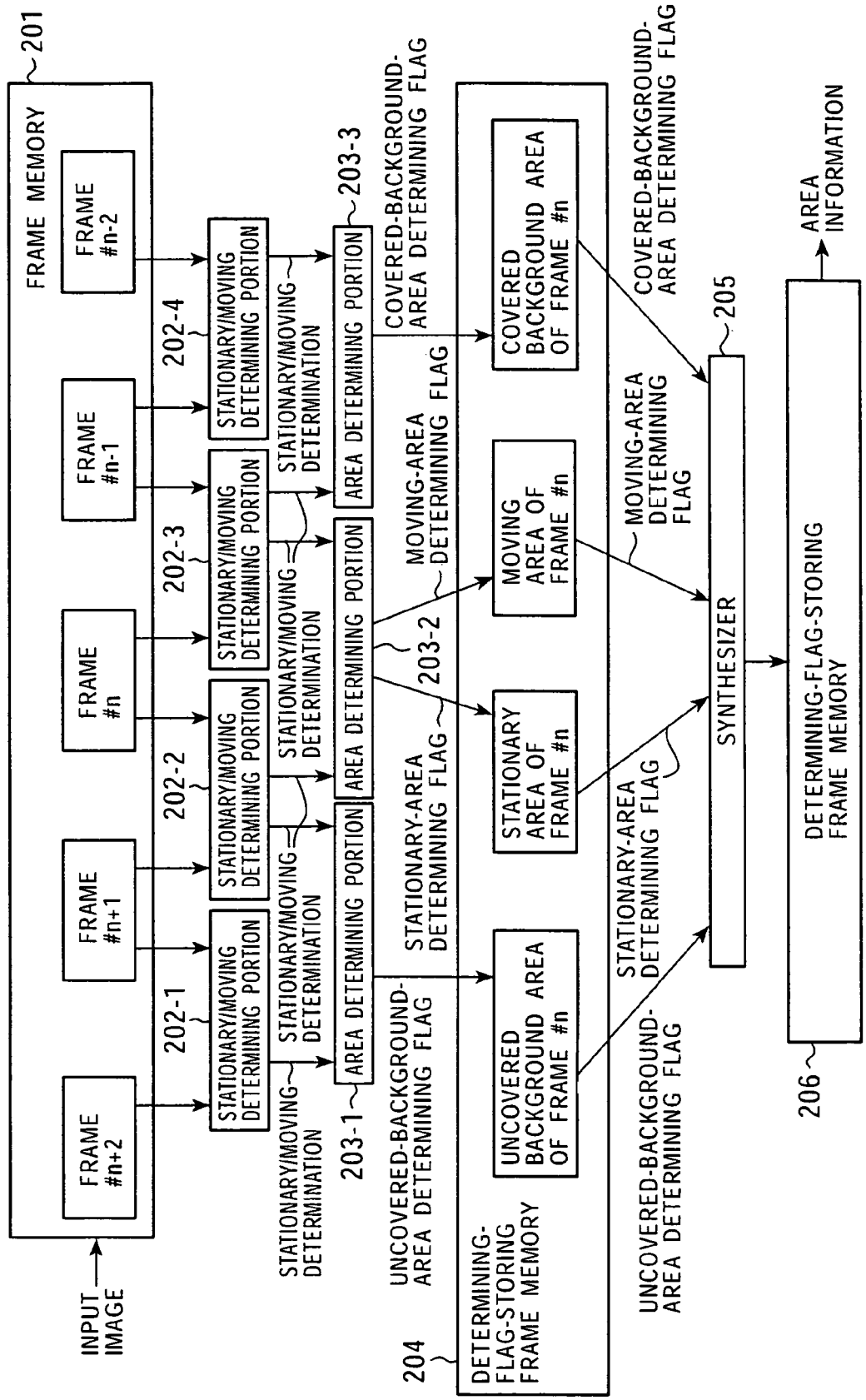
FIG. 20 is a block diagram illustrating an example of the configuration of an area specifying unit 103.

FIG. 20 is a block diagram illustrating an example of the configuration of the area specifying unit 103. The area specifying unit 103 shown in FIG. 20 does not use a motion vector. A frame memory 201 stores an input image in units of frames. When the image to be processed is frame #n, the frame memory 201 stores frame #n−2, which is the frame two frames before frame #n, frame #n−1, which is the frame one frame before frame #n, frame #n, frame #n+1, which is the frame one frame after frame #n, frame #n+2, which is the frame two frames after frame #n.

A stationary/moving determining portion 202-1 reads the pixel value of the pixel of frame #n+2 located at the same position as a designated pixel of frame #n in which the area to which the pixel belongs is determined, and reads the pixel value of the pixel of frame #n+1 located at the same position of the designated pixel of frame #n from the frame memory 201, and calculates the absolute value of the difference between the read pixel values. The stationary/moving determining portion 202-1 determines whether the absolute value of the difference between the pixel value of frame #n+2 and the pixel value of frame #n+1 is greater than a preset threshold Th. If it is determined that the difference is greater than the threshold Th, a stationary/moving determination indicating "moving" is supplied to an area determining portion 203-1. If it is determined that the absolute value of the difference between the pixel value of the pixel of frame #n+2 and the pixel value of the pixel of frame #n+1 is smaller than or equal to the threshold Th, the stationary/moving determining portion 202-1 supplies a stationary/moving determination indicating stationary to the area determining portion 203-1.

A stationary/moving determining portion 202-2 reads the pixel value of a designated pixel of frame #n in which the area to which the pixel belongs is determined, and reads the pixel value of the pixel of frame #n+1 located at the same position as the designated pixel of frame #n from the frame memory 201, and calculates the absolute value of the difference between the pixel values. The stationary/moving determining portion 202-2 determines whether the absolute value of the difference between the pixel value of frame #n+1 and the pixel value of frame #n is greater than a preset threshold Th. If it is determined that the absolute value of the difference between the pixel values is greater than the threshold Th, a stationary/moving determination indicating "moving" is supplied to the area determining portion 203-1 and an area determining portion 203-2. If it is determined that the absolute value of the difference between the pixel value of the pixel of frame #n+1 and the pixel value of the pixel of frame #n is smaller than or equal to the threshold Th, the stationary/moving determining portion 202-2 supplies a stationary/moving determination indicating "stationary" to the area determining portion 203-1 and the area determining portion 203-2.

A stationary/moving determining portion 202-3 reads the pixel value of a designated pixel of frame #n in which the area to which the pixel belongs is determined, and reads the pixel value of the pixel of frame #n−1 located at the same position as the designated pixel of frame #n from the frame memory 201, and calculates the absolute value of the difference between the pixel values. The stationary/moving determining portion 202-3 determines whether the absolute value of the difference between the pixel value of frame #n and the pixel value of frame #n−1 is greater than a preset threshold Th. If it is determined that the absolute value of the difference between the pixel values is greater than the threshold Th, a stationary/moving determination indicating "moving" is supplied to the area determining portion 203-2 and an area determining portion 203-3. If it is determined that the absolute value of the difference between the pixel value of the pixel of frame #n and the pixel value of the pixel of frame #n−1 is smaller than or equal to the threshold Th, the stationary/moving determining portion 202-3 supplies a stationary/moving determination indicating "stationary" to the area determining portion 203-2 and the area determining portion 203-3.

A stationary/moving determining portion 202-4 reads the pixel value of the pixel of frame #n−1 located at the same position as a designated pixel of frame #n in which the area to which the pixel belongs is determined, and reads the pixel value of the pixel of frame #n−2 located at the same position as the designated pixel of frame #n from the frame memory 201, and calculates the absolute value of the difference between the pixel values. The stationary/moving determining portion 202-4 determines whether the absolute value of the difference between the pixel value of frame #n−1 and the pixel value of frame #n−2 is greater than a preset threshold Th. If it is determined that the absolute value of the difference between the pixel values is greater than the threshold Th, a stationary/moving determination indicating "moving" is supplied to the area determining portion 203-3. If it is determined that the absolute value of the difference between the pixel value of the pixel of frame #n−1 and the pixel value of the pixel of frame #n−2 is smaller than or equal to the threshold Th, the stationary/moving determining portion 202-4 supplies a stationary/moving determination indicating "stationary" to the area determining portion 203-3.

When the stationary/moving determination supplied from the stationary/moving determining portion 202-1 indicates "stationary" and when the stationary/moving determination supplied from the stationary/moving determining portion 202-2 indicates "moving", the area determining portion 203-1 determines that the designated pixel of frame #n belongs to an uncovered background area, and sets "1", which indicates that the designated pixel belongs to an uncovered background area, in an uncovered-background-area determining flag associated with the designated pixel.

When the stationary/moving determination supplied from the stationary/moving determining portion 202-1 indicates "moving" or when the stationary/moving determination supplied from the stationary/moving determining portion 202-2 indicates "stationary", the area specifying unit 203-1 determines that the designated pixel of frame #n does not belong to an uncovered background area, and sets "0", which indicates that the designated pixel does not belong to an uncovered background area, in the uncovered-background-area determining flag associated with the designated pixel.

The area determining portion 203-1 supplies the uncovered-background-area determining flag in which "1" or "0" is set as discussed above to a determining-flag-storing frame memory 204.

When the stationary/moving determination supplied from the stationary/moving determining portion 202-2 indicates "stationary" and when the stationary/moving determination supplied from the stationary/moving determining portion 202-3 indicate "stationary", the area determining portion 203-2 determines that the designated pixel of frame #n belongs to the stationary area, and sets "1", which indicates that the pixel belongs to the stationary area, in a stationary-area determining flag associated with the designated pixel.

When the stationary/moving determination supplied from the stationary/moving determining portion 202-2 indicates "moving" or when the stationary/moving determination supplied from the stationary/moving determining portion 202-3 indicate "moving", the area determining portion 203-2 determines that the designated pixel of frame #n does not belong to the stationary area, and sets "0", which indicates that the pixel does not belong to the stationary area, in the stationary-area determining flag associated with the designated pixel.

The area determining portion 203-2 supplies the stationary-area determining flag in which "1" or "0" is set as discussed above to the determining-flag-storing frame memory 204.

When the stationary/moving determination supplied from the stationary/moving determining portion 202-2 indicates "moving" and when the stationary/moving determination supplied from the stationary/moving determining portion 202-3 indicate "moving", the area determining portion 203-2 determines that the designated pixel of frame #n belongs to the moving area, and sets "1", which indicates that the designated pixel belongs to the moving area, in a moving-area determining flag associated with the designated pixel.

When the stationary/moving determination supplied from the stationary/moving determining portion 202-2 indicates "stationary" or when the stationary/moving determination supplied from the stationary/moving determining portion 202-3 indicate "stationary", the area determining portion 203-2 determines that the designated pixel of frame #n does not belong to the moving area, and sets "0", which indicates that the pixel does not belong to the moving area, in the moving-area determining flag associated with the designated pixel.

The area determining portion 203-2 supplies the moving-area determining flag in which "1" or "0" is set as discussed above to the determining-flag-storing frame memory 204.

When the stationary/moving determination supplied from the stationary/moving determining portion 202-3 indicates "moving" and when the stationary/moving determination supplied from the stationary/moving determining portion 202-4 indicate "stationary", the area determining portion 203-3 determines that the designated pixel of frame #n belongs to a covered background area, and sets "1", which indicates that the designated pixel belongs to the covered background area, in a covered-background-area determining flag associated with the designated pixel.

When the stationary/moving determination supplied from the stationary/moving determining portion 202-3 indicates "stationary" or when the stationary/moving determination supplied from the stationary/moving determining portion 202-4 indicate "moving", the area determining portion 203-3 determines that the designated pixel of frame #n does not belong to a covered background area, and sets "0", which indicates that the designated pixel does not belong to a covered background area, in the covered-background-area determining flag associated with the designated pixel.

The area determining portion 203-3 supplies the covered-background-area determining flag in which "1" or "0" is set as discussed above to the determining-flag-storing frame memory 204.

The determining-flag-storing frame memory 204 thus stores the uncovered-background-area determining flag supplied from the area determining portion 203-1, the stationary-area determining flag supplied from the area determining portion 203-2, the moving-area determining flag supplied from the area determining portion 203-2, and the covered-background-area determining flag supplied from the area determining portion 203-3.

The determining-flag-storing frame memory 204 supplies the uncovered-background-area determining flag, the stationary-area determining flag, the moving-area determining flag, and the covered-background-area determining flag stored therein to a synthesizer 205. The synthesizer 205 generates area information indicating to which of the uncovered background area, the stationary area, the moving area, or the covered background area each pixel belongs based on the uncovered-background-area determining flag, the stationary-area determining flag, the moving-area determining flag, and the covered-background-area determining flag supplied from the determining-flag-storing frame memory 204, and supplies the area information to a determining-flag-storing frame memory 206.

The determining-flag-storing frame memory 206 stores the area information supplied from the synthesizer 205, and also outputs the area information stored therein.

An example of the processing performed by the area specifying unit 103 is described below with reference to FIGS. 21 through 25.

Figure 21:
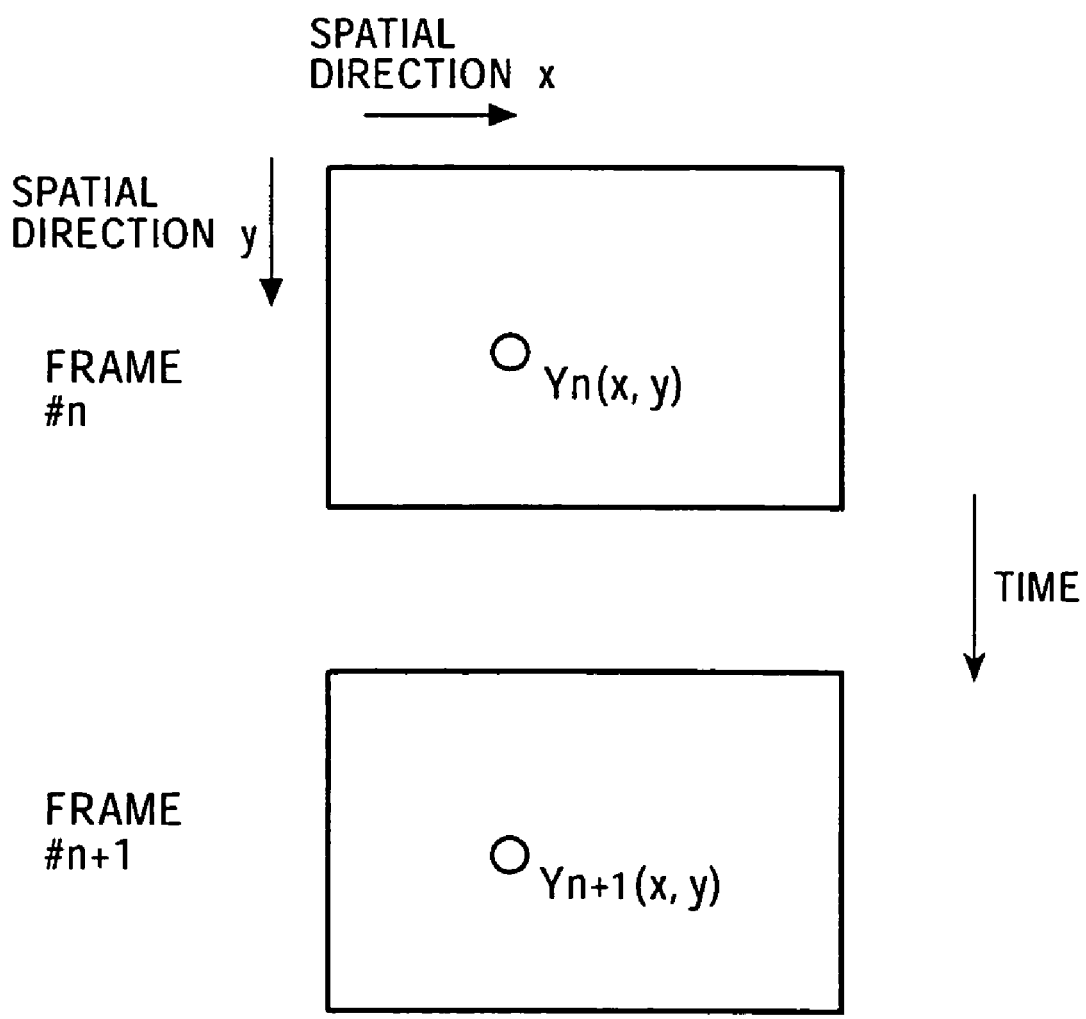
FIG. 21 illustrates an image when an object corresponding to a foreground is moving.

When the object corresponding to the foreground is moving, the position of the image corresponding to the object on the screen changes in every frame. As shown in FIG. 21, the image corresponding to the object located at the position indicated by Yn(x, y) in frame #n is positioned at Yn+1(x, y) in frame #n+1, which is subsequent to frame #n.

Figure 24:
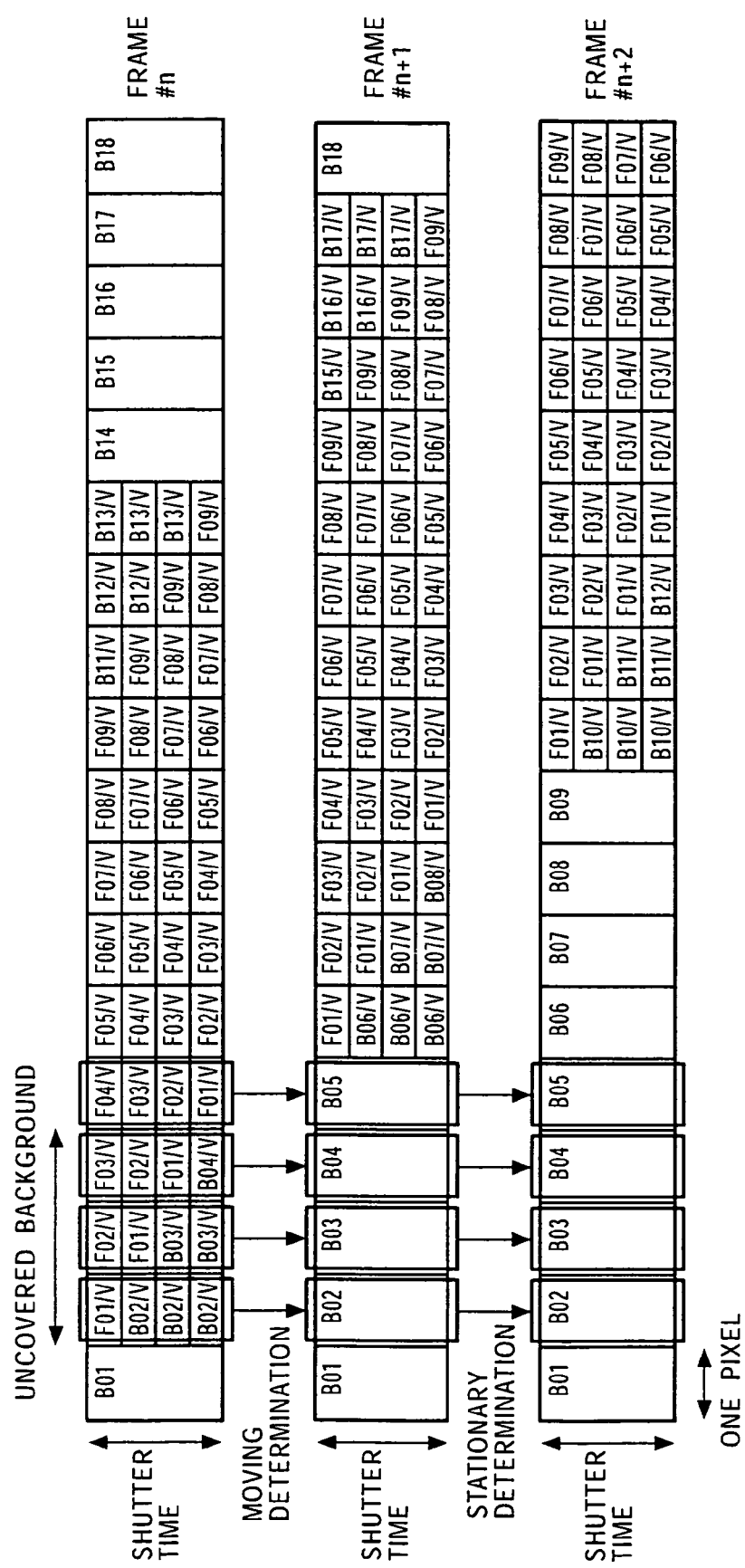
FIG. 24 illustrates a model in which pixel values are expanded in the time direction and the period corresponding to the shutter time is divided.

A model obtained by expanding in the time direction the pixel values of the pixels aligned side-by-side in the moving direction of the image corresponding to the foreground object is shown in FIG. 24. For example, if the moving direction of the image corresponding to the foreground object is horizontal with respect to the screen, the model shown in FIG. 22 is a model obtained by expanding in the time direction the pixel values of the pixels disposed on a line side-by-side.

Figure 22:
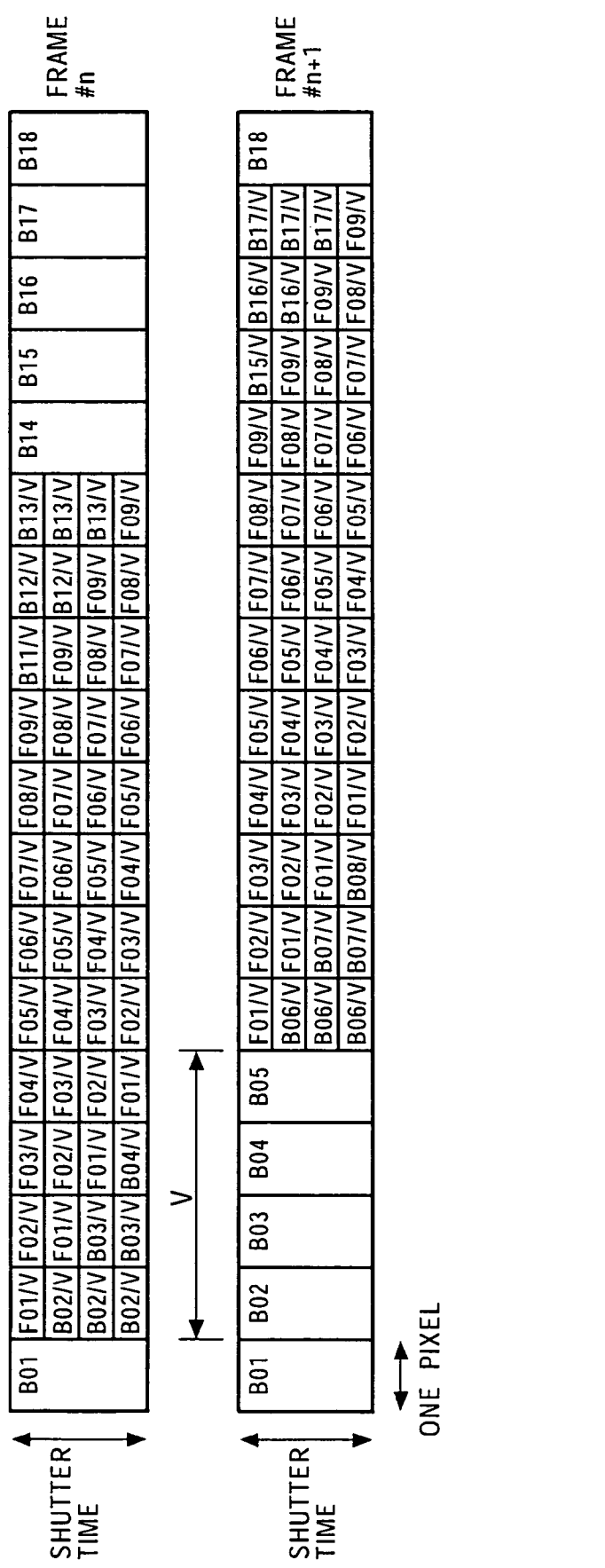
FIG. 22 illustrates a model in which pixel values are expanded in the time direction and the period corresponding to the shutter time is divided.

In FIG. 22, the line in frame #n is equal to the line in frame #n+1.

The foreground components corresponding to the object contained in the second pixel to the thirteenth pixel from the left in frame #n are contained in the sixth pixel through the seventeenth pixel from the left in frame #n+1.

In frame #n, the pixels belonging to the covered background area are the eleventh through thirteenth pixels from the left, and the pixels belonging to the uncovered background area are the second through fourth pixels from the left. In frame #n+1, the pixels belonging to the covered background area are the fifteenth through seventeenth pixels from the left, and the pixels belonging to the uncovered background area are the sixth through eighth pixels from the left.

In the example shown in FIG. 22, since the foreground components contained in frame #n are moved by four pixels in frame #n+1, the amount of movement v is 4. The number of virtual divided portions is 4 in accordance with the amount of movement v.

A description is now given of a change in pixel values of the pixels belonging to the mixed area in the frames before and after a designated frame.

Figure 23:
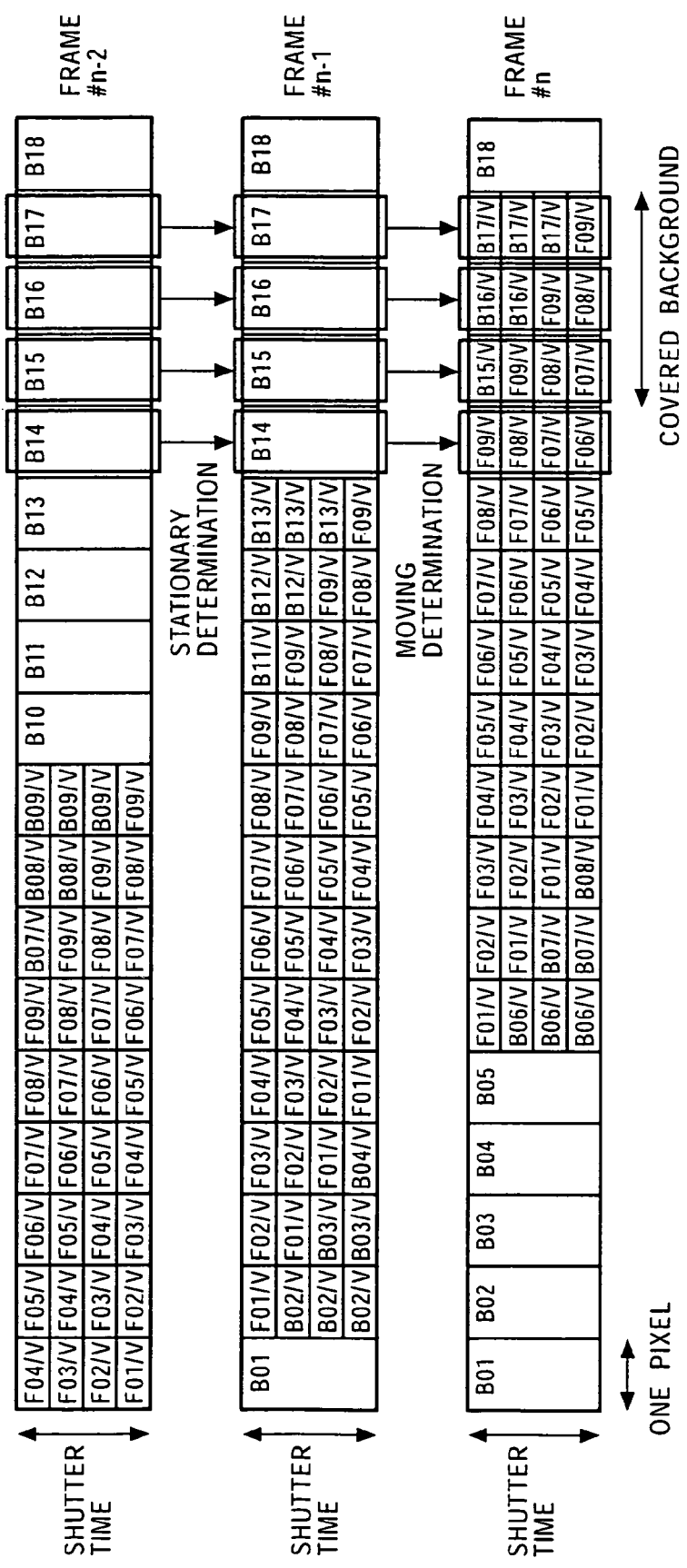
FIG. 23 illustrates a model in which pixel values are expanded in the time direction and the period corresponding to the shutter time is divided.

In FIG. 23, the pixels belonging to a covered background area in frame #n in which the background is stationary and the amount of movement v in the foreground is 4 are the fifteenth through seventeenth pixels from the left. Since the amount of movement v is 4, the fifteenth through seventeenth frames from the left in the previous frame #n−1 contain only background components and belong to the background area. The fifteenth through seventeenth pixels from the left in frame #n−2, which is one before frame #n−1, contain only background components and belong to the background area.

Since the object corresponding to the background is stationary, the pixel value of the fifteenth pixel from the left in frame #n−1 does not change from the pixel value of the fifteenth pixel from the left in frame #n−2. Similarly, the pixel value of the sixteenth pixel from the left in frame #n−1 does not change from the pixel value of the sixteenth pixel from the left in frame #n−2, and the pixel value of the seventeenth pixel from the left in frame #n−1 does not change from the pixel value of the seventeenth pixel from the left in frame #n−2.

That is, the pixels in frame #n−1 and frame #n−2 corresponding to the pixels belonging to the covered background area in frame #n consist of only background components, and the pixel values thereof do not change. Accordingly, the absolute value of the difference between the pixel values is almost 0. Thus, the stationary/moving determination made for the pixels in frame #n−1 and frame #n−2 corresponding to the pixels belonging to the mixed area in frame #n by the stationary/moving determining portion 202-4 is "stationary".

Since the pixels belonging to the covered background area in frame #n contain foreground components, the pixel values thereof are different from those of frame #n−1 consisting of only background components. Accordingly, the stationary/moving determination made for the pixels belonging to the mixed area in frame #n and the corresponding pixels in frame #n−1 by the stationary/moving determining portion 202-3 is "moving".

When the stationary/moving determination result indicating "moving" is supplied from the stationary/moving determining portion 202-3, and when the stationary/moving determination result indicating "stationary" is supplied from the stationary/moving determining portion 202-4, as discussed above, the area determining portion 203-3 determines that the corresponding pixels belong to a covered background area.

In FIG. 24, in frame #n in which the background is stationary and the amount of movement v in the foreground is 4, the pixels contained in an uncovered background area are the second through fourth pixels from the left. Since the amount of movement v is 4, the second through fourth pixels from the left in the subsequent frame #n+1 contain only background components and belong to the background area. In frame #n+2, which is subsequent to frame #n+1, the second through fourth pixels from the left contain only background components and belong to the background area.

Since the object corresponding to the background is stationary, the pixel value of the second pixel from the left in frame #n+2 does not change from the pixel value of the second pixel from the left in frame #n+1. Similarly, the pixel value of the third pixel from the left in frame #n+2 does not change from the pixel value of the third pixel from the left in frame #n+1, and the pixel value of the fourth pixel from the left in frame #n+2 does not change from the pixel value of the fourth pixel from the left in frame #n+1.

That is, the pixels in frame #n+1 and frame #n+2 corresponding to the pixels belonging to the uncovered background area in frame #n consist of only background components, and the pixel values thereof do not change. Accordingly, the absolute value of the difference between the pixel values is almost 0. Thus, the stationary/moving determination made for the pixels in frame #n+1 and frame #n+2 corresponding to the pixels belonging to the mixed area in frame #n by the stationary/moving determining portion 202-1 is "stationary".

Since the pixels belonging to the uncovered background area in frame #n contain foreground components, the pixel values thereof are different from those of frame #n+1 consisting of only background components. Accordingly, the stationary/moving determination made for the pixels belonging to the mixed area in frame #n and the corresponding pixels in frame #n+1 by the stationary/moving determining portion 202-2 is "moving".

When the stationary/moving determination result indicating "moving" is supplied from the stationary/moving determining portion 202-2, and when the stationary/moving determination result indicating "stationary" is supplied from the stationary/moving determining portion 202-1, as discussed above, the area determining portion 203-1 determines that the corresponding pixels belong to an uncovered background area.

FIG. 25 illustrates determination conditions in frame #n made by the area specifying unit 103. When the determination result for the pixel in frame #n−2 located at the same image position as a designated pixel in frame #n to be processed and for the pixel in frame #n−1 located at the same position as the designated pixel in frame #n is stationary, and when the determination result for the designated pixel in frame #n and the pixel in frame #n−1 located at the same image position as the designated pixel in frame #n is moving, the area specifying unit 103 determines that the pixel in frame #n+1 belongs to a covered background area.

When the determination result for the pixel in frame #n and the pixel in frame #n−1 located at the same image position as the designated pixel in frame #n is stationary, and when the determination result for the pixel in frame #n and the pixel in frame #n+1 located at the same image position as the designated pixel in frame #n is stationary, the area specifying unit 103 determines that the designated pixel in frame #n belongs to the stationary area.

When the determination result for the pixel in frame #n and the pixel in frame #n−1 located at the same image position as the designated pixel in frame #n is moving, and when the determination result for the pixel in frame #n and the pixel in frame #n+1 located at the same image position as the designated pixel in frame #n is moving, the area specifying unit 103 determines that the designated pixel in frame #n belongs to the moving area.

When the determination result for the pixel in frame #n and the pixel in frame #n+1 located at the same image position as the designated pixel in frame #n is moving, and when the determination result for the pixel in frame #n+1 located at the same image position as the designated pixel in frame #n and the pixel in frame #n+2 located at the same image position as the designated pixel in frame #n is stationary, the area specifying unit 103 determines that the designated pixel in frame #n belongs to an uncovered background area.

Figure 26A:
FIG. 26A illustrates an example of the result obtained by specifying the area by the area specifying unit 103.
Figure 26B:
FIG. 26B illustrates an example of the result obtained by specifying the area by the area specifying unit 103.

FIGS. 26A through 26D illustrate examples of the area determination results obtained by the area specifying unit 103. In FIG. 26A, the pixels which are determined to belong to a covered background area are indicated in white. In FIG. 26B, the pixels which are determined to belong to an uncovered background area are indicated in white.

Figure 26C:
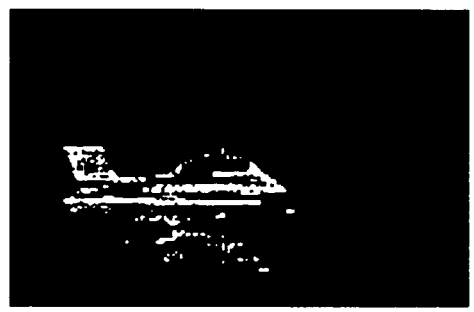
FIG. 26C illustrates an example of the result obtained by specifying the area by the area specifying unit 103.
Figure 26D:
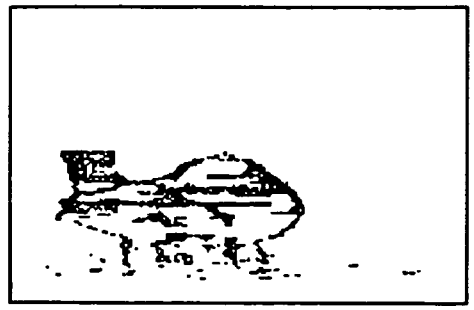
FIG. 26D illustrates an example of the result obtained by specifying the area by the area specifying unit 103.

In FIG. 26C, the pixels which are determined to belong to a moving area are indicated in white. In FIG. 26D, the pixels which are determined to belong to a stationary area are indicated in white.

Figure 27:
FIG. 27 illustrates an example of the result obtained by specifying the area by the area specifying unit 103.

FIG. 27 illustrates the area information indicating the mixed area, in the form of an image, selected from the area information output from the determining-flag-storing frame memory 206. In FIG. 27, the pixels which are determined to belong to the covered background area or the uncovered background area, i.e., the pixels which are determined to belong to the mixed area, are indicated in white. The area information indicating the mixed area output from the determining-flag-storing frame memory 206 designates the mixed area and the portions having a texture surrounded by the portions without a texture in the foreground area.

Figure 28:
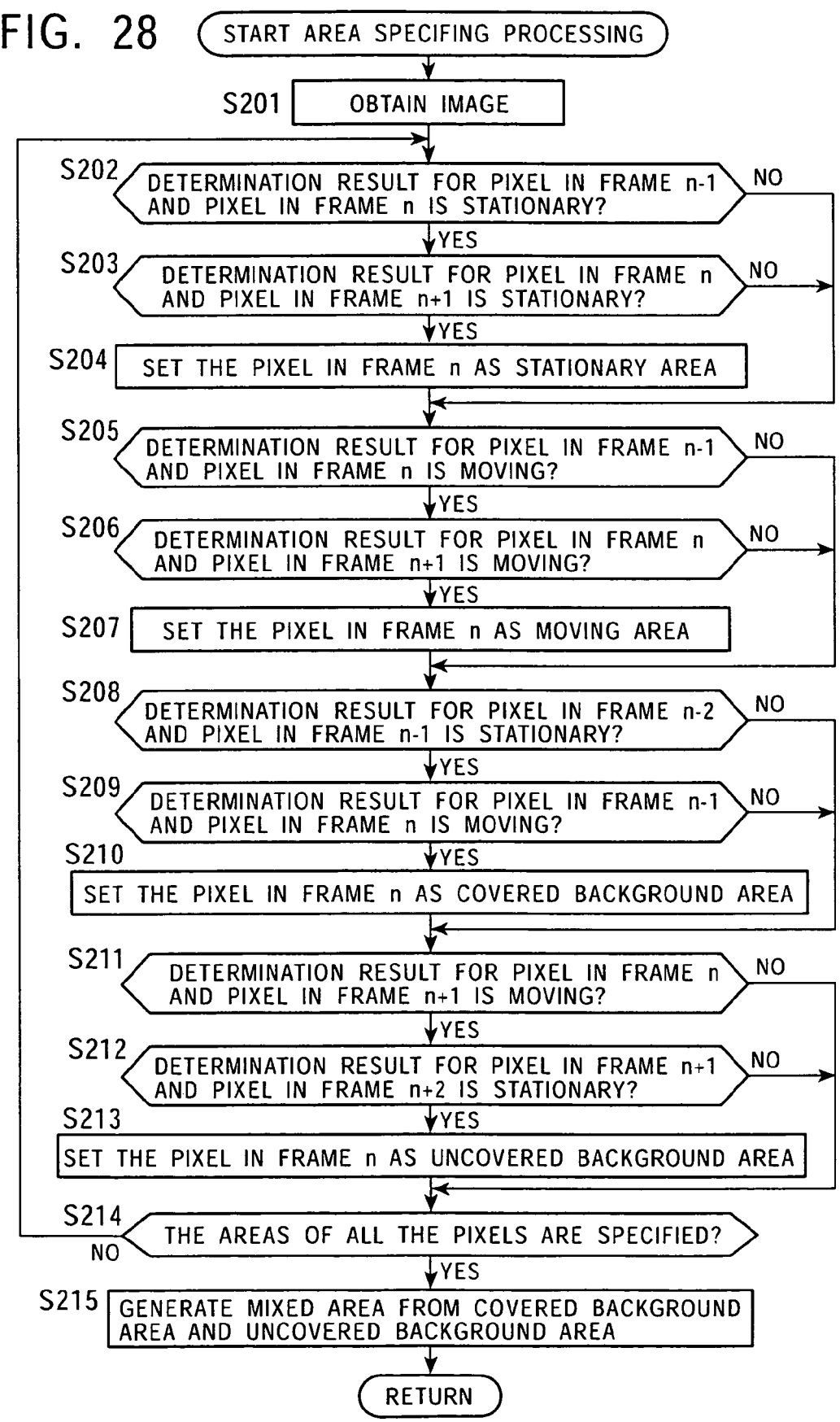
FIG. 28 is a flowchart illustrating the area specifying processing.

The area specifying processing performed by the area specifying unit 103 is described below with reference to the flowchart of FIG. 28. In step S201, the frame memory 201 obtains an image of frame #n−2 through frame #n+2 including frame #n.

In step S202, the stationary/moving determining portion 202-3 determines whether the determination result for the pixel in frame #n−1 and the pixel in frame #n located at the same position is stationary. If it is determined that the determination result is stationary, the process proceeds to step S203 in which the stationary/moving determining portion 202-2 determines whether the determination result for the pixel in frame #n and the pixel in frame #n+1 located at the same position is stationary.

If it is determined in step S203 that the determination result for the pixel in frame #n and the pixel in frame #n+1 located at the same position is stationary, the process proceeds to step S204. In step S204, the area determining portion 203-2 sets "1", which indicates that the pixel to be processed belongs to the stationary area, in the stationary-area determining flag associated with the pixel to be processed. The area determining portion 203-2 supplies the stationary-area determining flag to the determining-flag-storing frame memory 204, and the process proceeds to step S205.

If it is determined in step S202 that the determination result for the pixel in frame #n−1 and the pixel in frame #n located at the same position is moving, or if it is determined in step S203 that the determination result for the pixel in frame #n and the pixel in frame #n+1 located at the same position is moving, the pixel to be processed does not belong to a stationary area. Accordingly, the processing of step S204 is skipped, and the process proceeds to step S205.

In step S205, the stationary/moving determining portion 202-3 determines whether the determination result for the pixel in frame #n−1 and the pixel in frame #n located at the same position is moving. If it is determined that the determination result is moving, the process proceeds to step S206 in which the stationary/moving determining portion 202-2 determines whether the determination result for the pixel in frame #n and the pixel in frame #n+1 located at the same position is moving.

If it is determined in step S206 that the determination result for the pixel in frame #n and the pixel in frame #n+1 located at the same position is moving, the process proceeds to step S207. In step S207, the area determining portion 203-2 sets "1", which indicates that the pixel to be processed belongs to a moving area, in the moving-area determining flag associated with the pixel to be processed. The area determining area 203-2 supplies the moving-area determining flag to the determining-flag-storing frame memory 204, and the process proceeds to step S208.

If it is determined in step S205 that the determination result for the pixel in frame #n−1 and the pixel in frame #n located at the same position is stationary, or if it is determined in step S206 that the determination result for the pixel in frame #n and the pixel in frame #n+1 located at the same position is stationary, the pixel in frame #n does not belong to a moving area. Accordingly, the processing of step S207 is skipped, and the process proceeds to step S208.

In step S208, the stationary/moving determining portion 202-4 determines whether the determination result for the pixel in frame #n−2 and the pixel in frame #n−1 located at the same position is stationary. If it is determined that the determination result is stationary, the process proceeds to step S209 in which the stationary/moving determining portion 202-3 determines whether the determination result for the pixel in frame #n−1 and the pixel in frame #n located at the same position is moving.

If it is determined in step S209 that the determination result for the pixel in frame #n−1 and the pixel in frame #n located at the same position is moving, the process proceeds to step S210. In step S210, the area determining portion 203-3 sets "1", which indicates that the pixel to be processed belongs to a covered background area, in the covered-background-area determining flag associated with the pixel to be processed. The area determining portion 203-3 supplies the covered-background-area determining flag to the determining-flag-storing frame memory 204, and the process proceeds to step S211. The area determining portion 203-3 supplies the covered-background-area determining flag to the determining-flag-storing frame memory 204, and the process proceeds to step S211.

If it is determined in step S208 that the determination result for the pixel in frame #n−2 and the pixel in frame #n−1 located at the same position is moving, or if it is determined in step S209 that the pixel in frame #n−1 and the pixel in frame #n located at the same position is stationary, the pixel in frame #n does not belong to a covered background area. Accordingly, the processing of step S210 is skipped, and the process proceeds to step S211.

In step S211, the stationary/moving determining portion 202-2 determines whether the determination result for the pixel in frame #n and the pixel in frame #n+1 located at the same position is moving. If it is determined in step S211 that the determination result is moving, the process proceeds to step S212 in which the stationary/moving determining portion 202-1 determines whether the determination result for the pixel in frame #n+1 and the pixel in frame #n+2 located at the same position is stationary.

If it is determined in step S212 that the determination result for the pixel in frame #n+1 and the pixel in frame #n+2 located at the same position is stationary, the process proceeds to step S213. In step S213, the area determining portion 203-1 sets "1", which indicates that the pixel to be processed belongs to an uncovered background area, in the uncovered-background-area determining flag associated with the pixel to be processed. The area determining portion 203-1 supplies the uncovered-background-flag determining flag to the determining-flag-storing frame memory 204, and the process proceeds to step S214.

If it is determined in step S211 that the determination result for the pixel in frame #n and the pixel in frame #n+1 located at the same position is stationary, or if it is determined in step S212 that the determination result for the pixel in frame #n+1 and the pixel in frame #n+2 is moving, the pixel in frame #n does not belong to an uncovered background area. Accordingly, the processing of step S213 is skipped, and the process proceeds to step S214.

In step S214, the area specifying unit 103 determines whether the areas of all the pixels in frame #n are specified. If it is determined that the areas of all the pixels in frame #n are not yet specified, the process returns to step S202, and the area specifying processing is repeated for the remaining pixels.

If it is determined in step S214 that the areas of all the pixels in frame #n are specified, the process proceeds to step S215. In step S215, the synthesizer 215 generates area information indicating the mixed area based on the uncovered-background-area determining flag and the covered-background-area determining flag stored in the determining-flag-storing frame memory 204, and also generates area information indicating to which of the uncovered background area, the stationary area, the moving area, or the covered background area each pixel belongs, and sets the generated area information in the determining-flag-storing frame memory 206. The processing is then completed.

As discussed above, the area specifying unit 103 is capable of generating area information indicating to which of the moving area, the stationary area, the uncovered background area, or the covered background area each of the pixels contained in a frame belongs.

The area specifying unit 103 may apply logical OR to the area information corresponding to the uncovered background area and the area information corresponding to the covered background area so as to generate area information corresponding to the mixed area, and then may generate area information consisting of flags indicating to which of the moving area, the stationary area, or the mixed area the individual pixels contained in the frame belong.

When the object corresponding to the foreground has a texture, the area specifying unit 103 is able to specify the moving area more precisely.

The area specifying unit 103 is able to output the area information indicating the moving area as the area information indicating the foreground area, and outputs the area information indicating the stationary area as the area information indicating the background area.

The embodiment has been described, assuming that the object corresponding to the background is stationary. However, the above-described area specifying processing can be applied even if the image corresponding to the background area contains motion. For example, if the image corresponding to the background area is uniformly moving, the area specifying unit 103 shifts the overall image in accordance with this motion, and performs processing in a manner similar to the case in which the object corresponding to the background is stationary. If the image corresponding to the background area contains locally different motions, the area specifying unit 103 selects the pixels corresponding to the motions, and executes the above-described processing.

Figure 29:
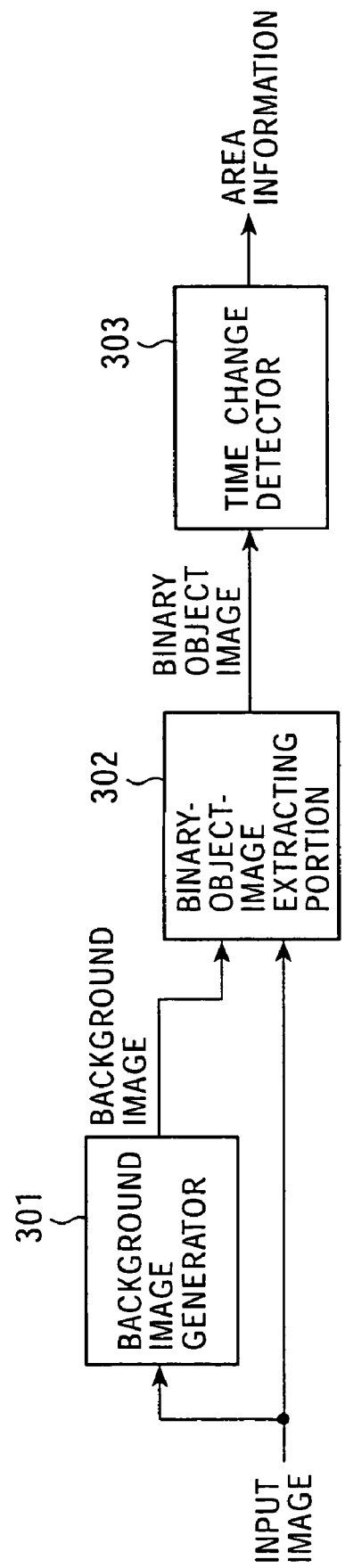
FIG. 29 is a block diagram illustrating another configuration of the area specifying unit 103.

FIG. 29 is a block diagram illustrating an example of the configuration of the area specifying unit 103. The area specifying unit 103 shown in FIG. 29 does not use a motion vector. A background image generator 301 generates a background image corresponding to an input image, and supplies the generated background image to a binary-object-image extracting portion 302. The background image generator 301 extracts, for example, an image object corresponding to a background object contained in the input image, and generates the background image.

Figure 30:
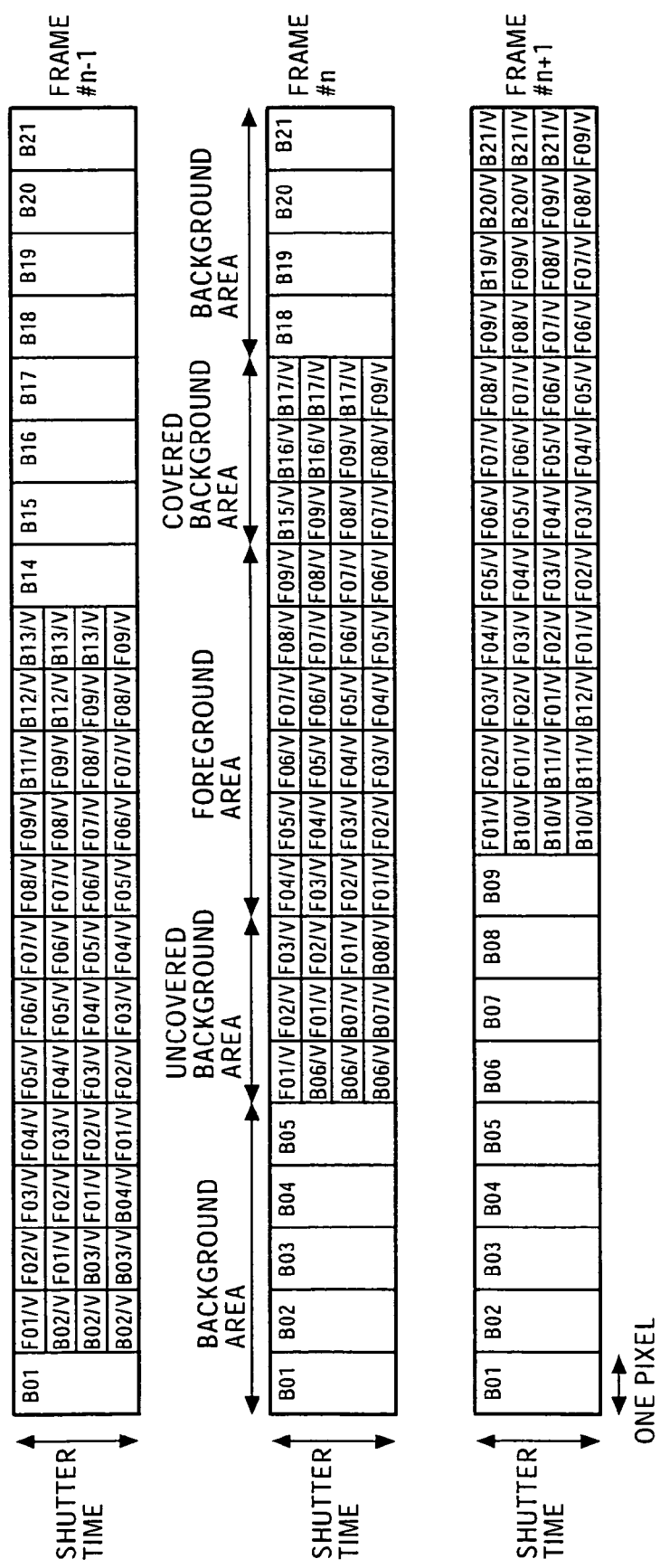
FIG. 30 illustrates a model in which pixel values are expanded in the time direction and the period corresponding to the shutter time is divided.

An example of a model obtained by expanding in the time direction the pixel values of pixels aligned side-by-side in the moving direction of an image corresponding to a foreground object is shown in FIG. 30. For example, if the moving direction of the image corresponding to the foreground object is horizontal with respect to the screen, the model shown in FIG. 30 is a model obtained by expanding the pixel values of pixels disposed side-by-side on a single line in the time domain.

In FIG. 30, the line in frame #n is the same as the line in frame #n−1 and the line in frame #n+1.

In frame #n, the foreground components corresponding to the object contained in the sixth through seventeenth pixels from the left are contained in the second through thirteenth pixels from the left in frame #n−1 and are also contained in the tenth through twenty-first pixel from the left in frame #n+1.

In frame #n−1, the pixels belonging to the covered background area are the eleventh through thirteenth pixels from the left, and the pixels belonging to the uncovered background area are the second through fourth pixels from the left. In frame #n, the pixels belonging to the covered background area are the fifteenth through seventeenth pixels from the left, and the pixels belonging to the uncovered background area are the sixth through eighth pixels from the left. In frame #n+1, the pixels belonging to the covered background area are the nineteenth through twenty-first pixels from the left, and the pixels belonging to the uncovered background area are the tenth through twelfth pixels from the left.

In frame #n−1, the pixels belonging to the background area are the first pixel from the left, and the fourteenth through twenty-first pixels from the left. In frame #n, the pixels belonging to the background area are the first through fifth pixels from the left, and the eighteenth through twenty-first pixels from the left. In frame #n+1, the pixels belonging to the background area are the first through ninth pixels from the left.

Figure 31:
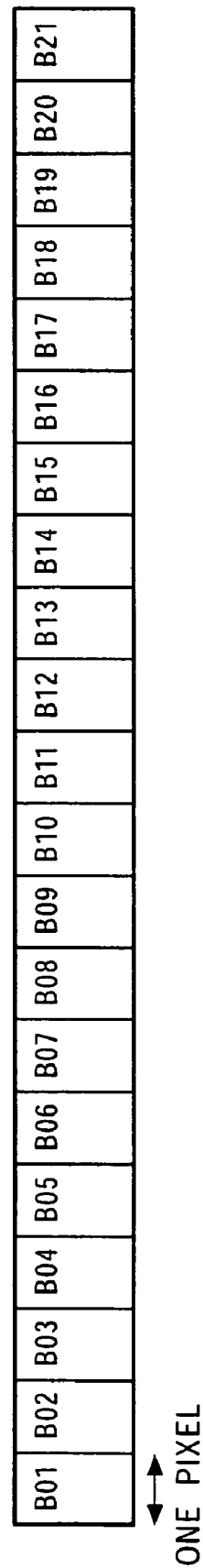
FIG. 31 illustrates an example of a background image.

An example of the background image corresponding to the example shown in FIG. 30 generated by the background image generator 301 is shown in FIG. 31. The background image consists of the pixels corresponding to the background object, and does not contain image components corresponding to the foreground object.

The binary-object-image extracting portion 302 generates a binary object image based on the correlation between the background image and the input image, and supplies the generated binary object image to a time change detector 303.

FIG. 32 is a block diagram illustrating the configuration of the binary-object-image extracting portion 302. A correlation-value calculator 321 calculates the correlation between the background image supplied from the background image generator 301 and the input image so as to generate a correlation value, and supplies the generated correlation value to a threshold-value processor 322.

The correlation-value calculator 321 applies equation (4) to, for example, 3×3-background image blocks having $X_4$ at the center, as shown in FIG. 33A, and to, for example, 3×3-background image blocks having $Y_4$ at the center which corresponds to the background image blocks, as shown in FIG. 33B, thereby calculating a correlation value corresponding to $Y_4$.

$$\text{Correlation value} = \frac{\sum_{i=0}^{8}(Xi - \overline{X})\sum_{i=0}^{8}(Yi - \overline{Y})}{\sqrt{\sum_{i=0}^{8}(Xi - \overline{X})^2 \cdot \sum_{i=0}^{8}(Yi - \overline{Y})^2}} \quad (4)$$

$$\overline{X} = \frac{\sum_{i=0}^{8} Xi}{9} \quad (5)$$

$$\overline{Y} = \frac{\sum_{i=0}^{8} Yi}{9} \quad (6)$$

The correlation-value calculator 321 supplies the correlation value calculated for each pixel as discussed above to the threshold-value processor 322.

Alternatively, the correlation-value calculator 321 may apply equation (7) to, for example, 3×3-background image blocks having $X_4$ at the center, as shown in FIG. 34A, and to, for example, 3×3-background image blocks having $Y_4$ at the center which corresponds to the background image blocks, as shown in FIG. 34B, thereby calculating the sum of absolute values of differences corresponding to $Y_4$.

$$\text{Sum of absolute values of differences} = \sum_{i=0}^{8} |(Xi - Yi)| \quad (7)$$

The correlation-value calculator 321 supplies the sum of the absolute values of the differences calculated as described above to the threshold-value processor 322 as the correlation value.

The threshold-value processor 322 compares the pixel value of the correlation image with a threshold th0. If the correlation value is smaller than or equal to the threshold th0, 1 is set in the pixel value of the binary object image. If the correlation value is greater than the threshold th0, 0 is set in the pixel value of the binary object image. The threshold-value processor 322 then outputs the binary object image whose pixel value is set to 0 or 1. The threshold-value processor 322 may store the threshold th0 therein in advance, or may use the threshold th0 input from an external source.

FIG. 35 illustrates the binary object image corresponding to the model of the input image shown in FIG. 30. In the binary object image, 0 is set in the pixel values of the pixels having a higher correlation with the background image.

Figure 36:
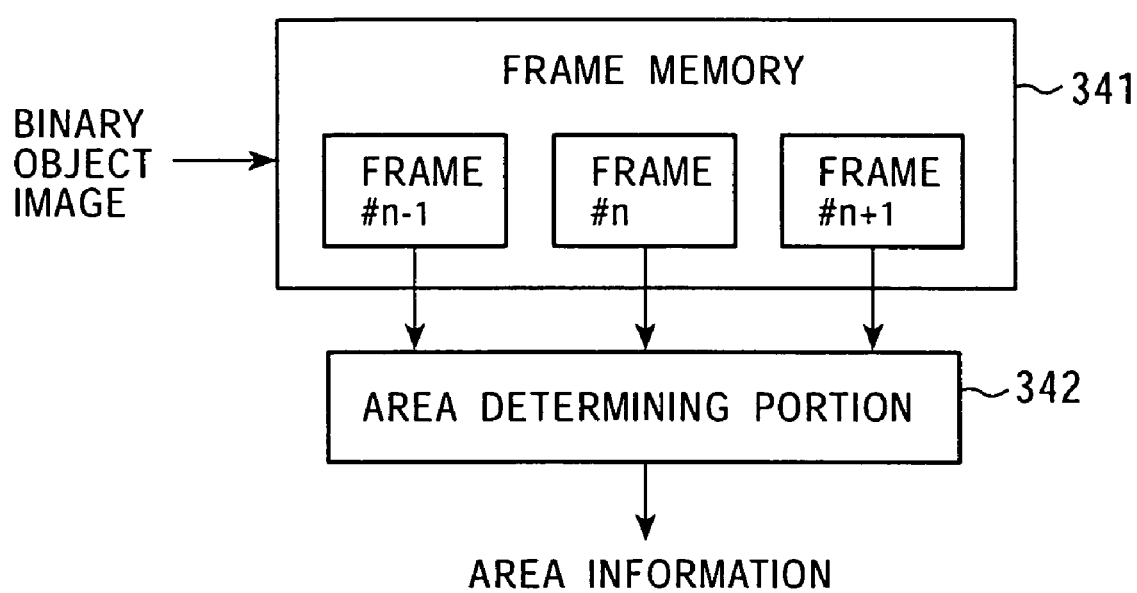
FIG. 36 is a block diagram illustrating the configuration of a time change detector 303.

FIG. 36 is a block diagram illustrating the configuration of the time change detector 303. When determining the area of a pixel in frame #n, a frame memory 341 stores a binary object image of frame #n−1, frame #n, and frame #n+1 supplied from the binary-object-image extracting portion 302.

An area determining portion 342 determines the area of each pixel of frame #n based on the binary object image of frame #n−1, frame #n, and frame #n+1 so as to generate area information, and outputs the generated area information.

FIG. 37 illustrates the determinations made by the area determining portion 342. When the designated pixel of the binary object image in frame #n is 0, the area determining portion 342 determines that the designated pixel in frame #n belongs to the background area.

When the designated pixel of the binary object image in frame #n is 1, and when the corresponding pixel of the binary object image in frame #n−1 is 1, and when the corresponding pixel of the binary object image in frame #n+1 is 1, the area determining portion 342 determines that the designated pixel in frame #n belongs to the foreground area.

When the designated pixel of the binary object image in frame #n is 1, and when the corresponding pixel of the binary object image in frame #n−1 is 0, the area determining portion 342 determines that the designated pixel in frame #n belongs to a covered background area.

When the designated pixel of the binary object image in frame #n is 1, and when the corresponding pixel of the binary object image in frame #n+1 is 0, the area determining portion 342 determines that the designated pixel in frame #n belongs to an uncovered background area.

Figure 38:
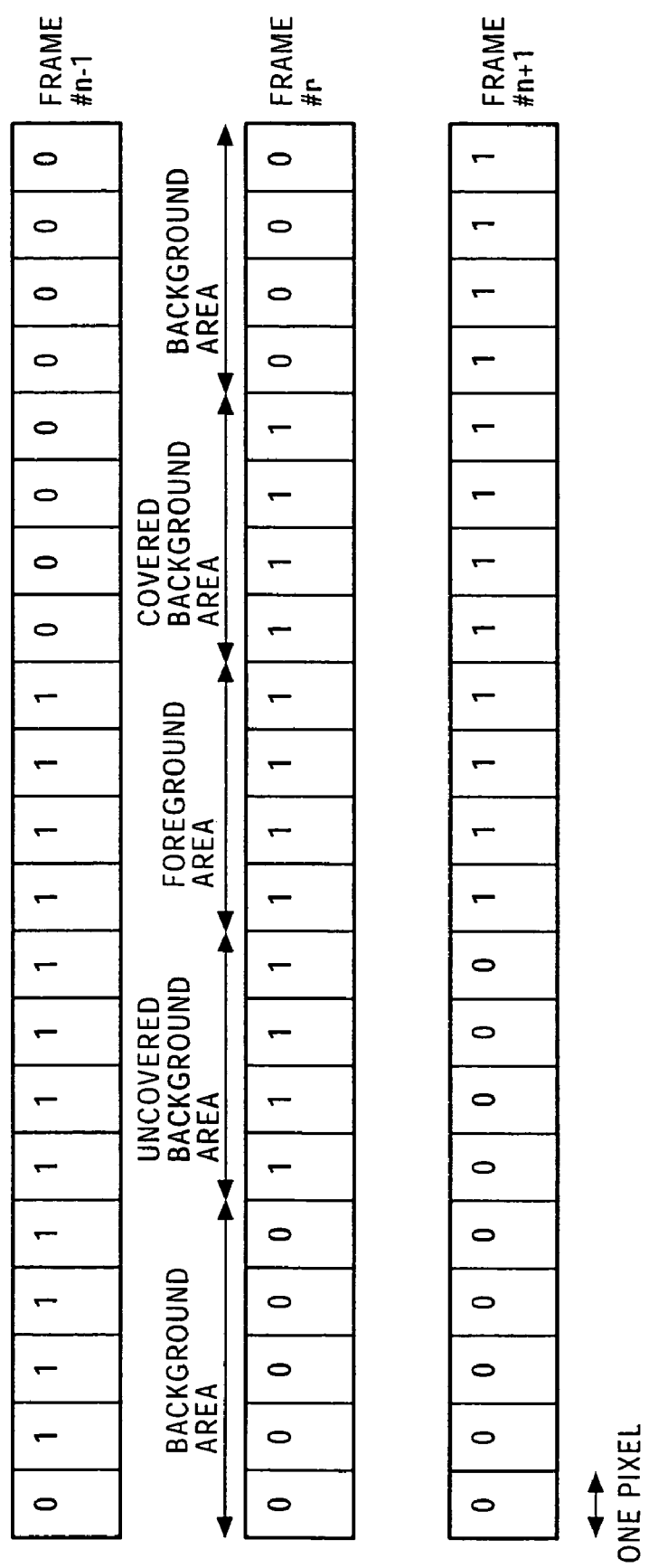
FIG. 38 illustrates an example of determinations made by the time change detector 303.

FIG. 38 illustrates an example of the determinations made by the time change detector 303 on the binary object image corresponding to the model of the input image shown in FIG. 30. The time change detector 303 determines that the first through fifth pixels from the left in frame #n belong to the background area since the corresponding pixels of the binary object image in frame #n are 0.

The time change detector 303 determines that the sixth through ninth pixels from the left belong to the uncovered background area since the pixels of the binary object image in frame #n are 1, and the corresponding pixels in frame #n+1 are 0.

The time change detector 303 determines that the tenth through thirteenth pixels from the left belong to the foreground area since the pixels of the binary object image in frame #n are 1, the corresponding pixels in frame #n−1 are 1, and the corresponding pixels in frame #n+1 are 1.

The time change detector 303 determines that the fourteenth through seventeenth pixels from the left belong to the covered background area since the pixels of the binary object image in frame #n are 1, and the corresponding pixels in frame #n−1 are 0.

The time change detector 303 determines that the eighteenth through twenty-first pixels from the left belong to the background area since the corresponding pixels of the binary object image in frame #n are 0.

Figure 39:
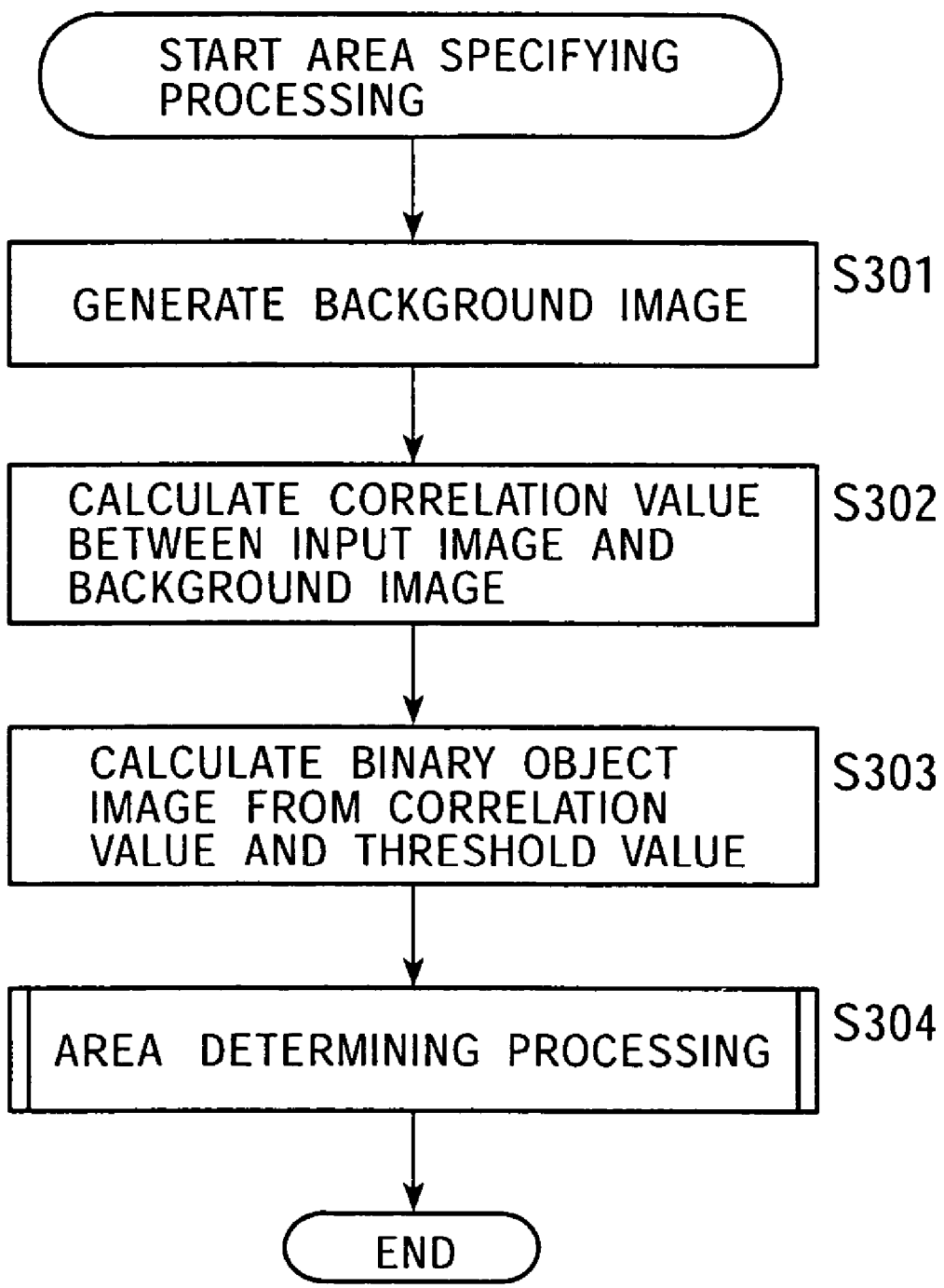
FIG. 39 is a flowchart illustrating the area specifying processing performed by the area specifying unit 103.

The area specifying processing performed by the area specifying unit 103 is described below with reference to the flowchart of FIG. 39. In step S301, the background image generator 301 of the area specifying unit 103 extracts, for example, an image object corresponding to a background object contained in an input image based on the input image so as to generate a background image, and supplies the generated background image to the binary-object-image extracting portion 302.

In step S302, the binary-object-image extracting portion 302 calculates a correlation value between the input image and the background image supplied from the background image generator 301 according to, for example, calculation discussed with reference to FIG. 33. In step S303, the binary-object-image extracting portion 302 computes a binary object image from the correlation value and the threshold th0 by, for example, comparing the correlation value with the threshold th0.

In step S304, the time change detector 303 executes the area determining processing, and the processing is completed.

Figure 40:
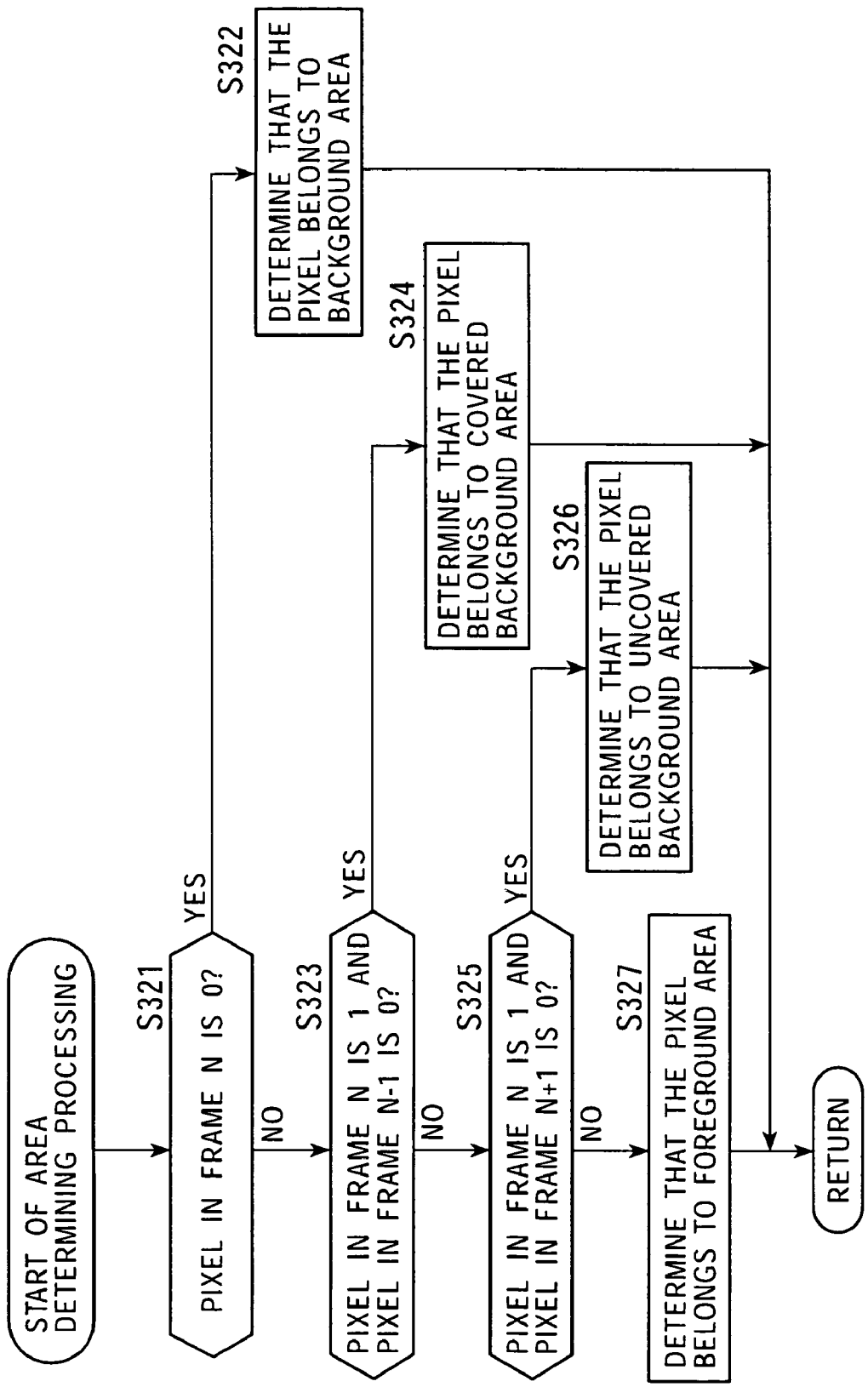
FIG. 40 is a flowchart illustrating details of the area specifying processing.

Details of the area determining processing in step S304 are described below with reference to the flowchart of FIG. 40. In step S321, the area determining portion 342 of the time change detector 303 determines whether the designated pixel in frame #n stored in the frame memory 341 is 0. If it is determined that the designated pixel in frame #n is 0, the process proceeds to step S322. In step S322, it is determined that the designated pixel in frame #n belongs to the background area, and the processing is completed.

If it is determined in step S321 that the designated pixel in frame #n is 1, the process proceeds to step S323. In step S323, the area determining portion 342 of the time change detector 303 determines whether the designated pixel in frame #n stored in the frame memory 341 is 1, and whether the corresponding pixel in frame #n−1 is 0. If it is determined that the designated pixel in frame #n is 1 and the corresponding pixel in frame #n−1 is 0, the process proceeds to step S324. In step S324, it is determined that the designated pixel in frame #n belongs to the covered background area, and the processing is completed.

If it is determined in step S323 that the designated pixel in frame #n is 0, or that the corresponding pixel in frame #n−1 is 1, the process proceeds to step S325. In step S325, the area determining portion 342 of the time change detector 303 determines whether the designated pixel in frame #n stored in the frame memory 341 is 1, and whether the corresponding pixel in frame #n+1 is 0. If it is determined that the designated pixel in frame #n is 1 and the corresponding pixel in frame #n+1 is 0, the process proceeds to step S326. In step S326, it is determined that the designated pixel in frame #n belongs to the uncovered background area, and the processing is completed.

If it is determined in step S325 that the designated pixel in frame #n is 0, or that the corresponding pixel in frame #n+1 is 1, the process proceeds to step S327. In step S327, the area determining portion 342 of the time change detector 303 determines that the designated pixel in frame #n belongs to the foreground area, and the processing is completed.

As discussed above, the area specifying unit 103 is able to specify, based on the correlation value between the input image and the corresponding background image, to which of the foreground area, the background area, the covered background area, or the uncovered background area each pixel of the input image belongs, and generates area information corresponding to the specified result.

Figure 41:
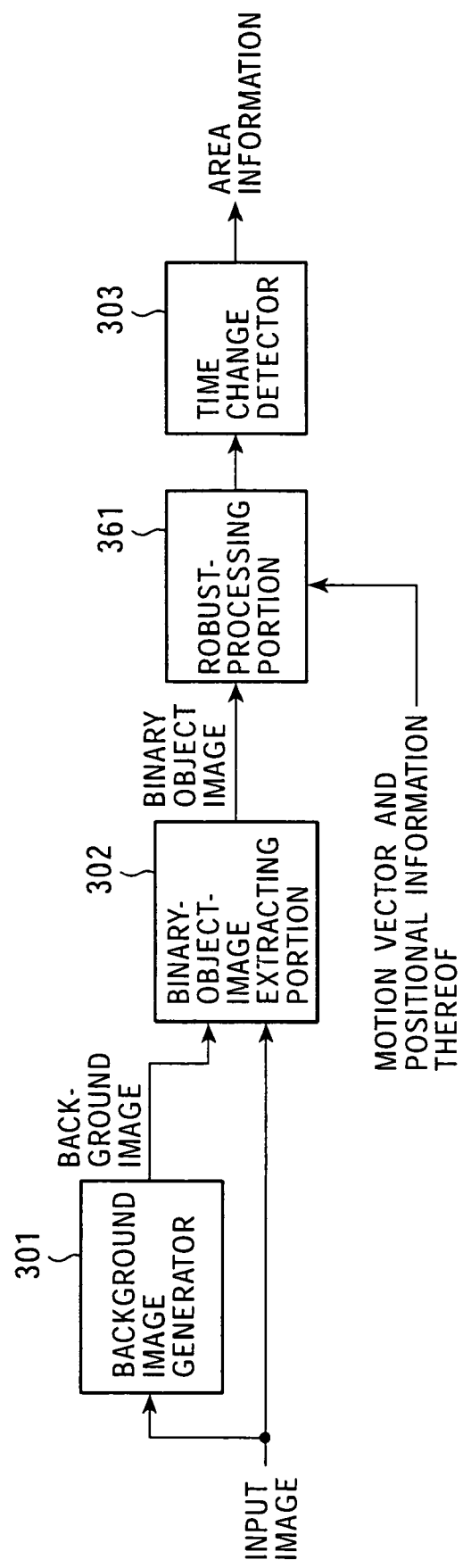
FIG. 41 is a block diagram illustrating still another configuration of the area specifying unit 103.

FIG. 41 is a block diagram illustrating another configuration of the area specifying unit 103. The area specifying unit 103 shown in FIG. 41 uses a motion vector and positional information thereof supplied from the motion detector 102. The same elements as those shown in FIG. 29 are designated with like reference numerals, and an explanation thereof is thus omitted.

A robust-processing portion 361 generates a robust binary object image based on binary object images of N frames supplied from the binary-object-image extracting portion 302, and outputs the robust binary object image to the time change detector 303.

Figure 42:
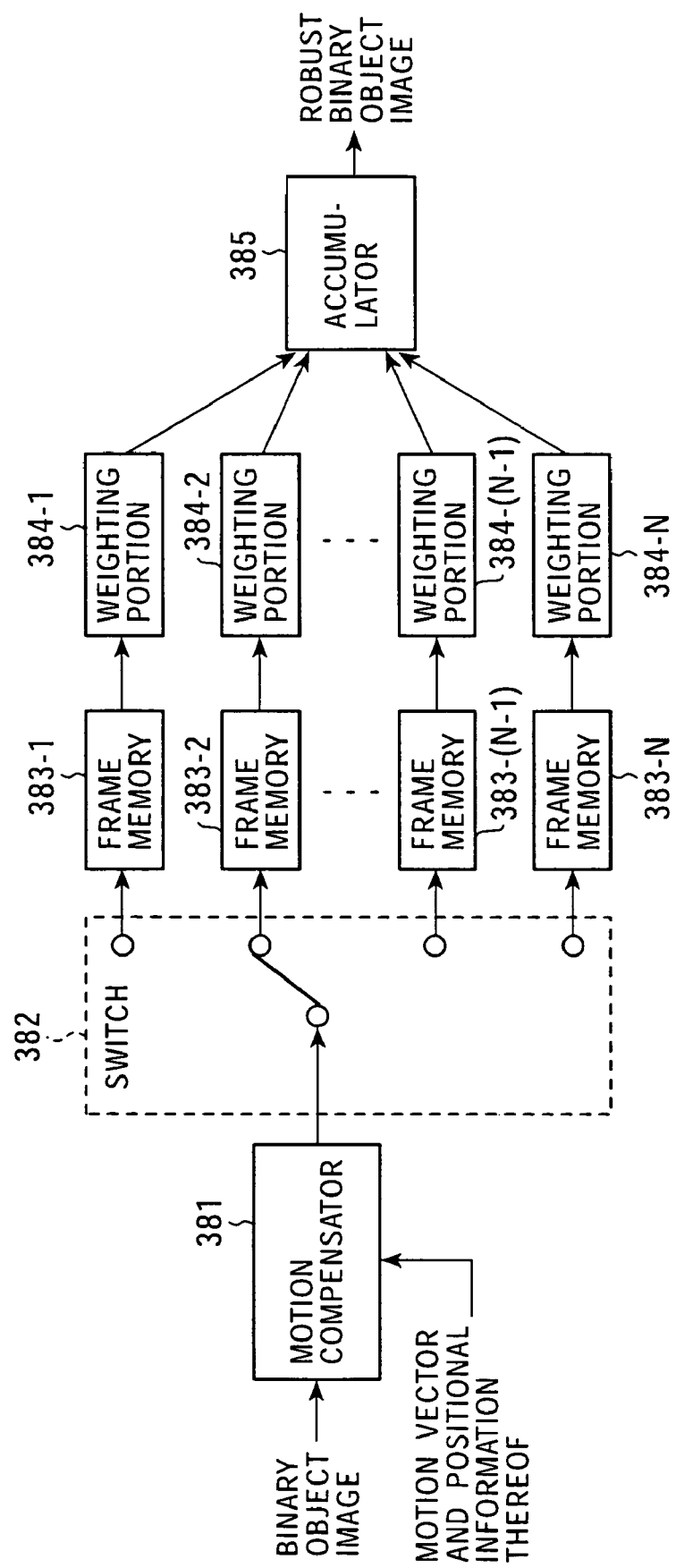
FIG. 42 is a block diagram illustrating the configuration of a robust-processing portion 361.

FIG. 42 is a block diagram illustrating the configuration of the robust-processing portion 361. A motion compensator 381 compensates for the motion of the binary object images of N frames based on the motion vector and the positional information thereof supplied from the motion detector 102, and outputs a motion-compensated binary object image to a switch 382.

Figure 43:
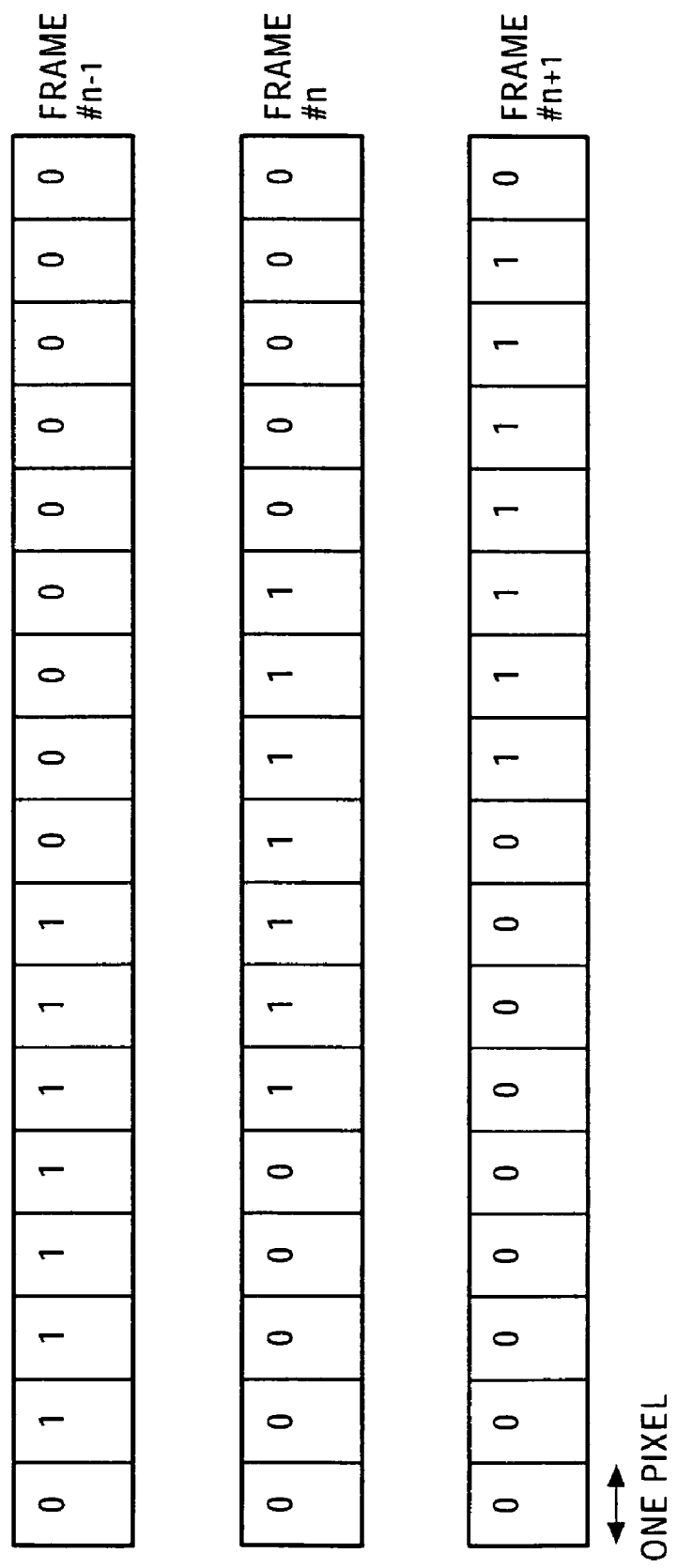
FIG. 43 illustrates motion compensation performed by a motion compensator 381.
Figure 44:
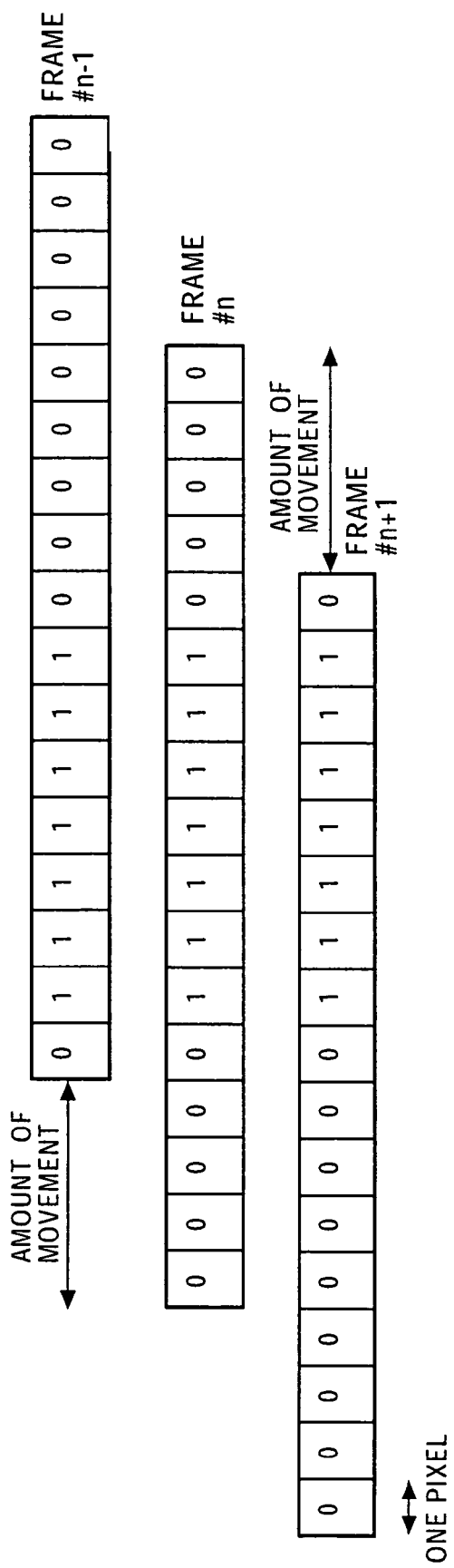
FIG. 44 illustrates motion compensation performed by the motion compensator 381.

The motion compensation performed by the motion compensator 381 is discussed below with reference to examples shown in FIGS. 43 and 44. It is now assumed, for example, that the area in frame #n is to be processed. When binary object images of frame #n−1, frame #n, and frame #n+1 shown in. FIG. 43 are input, the motion compensator 381 compensates for the motion of the binary object image of frame #n−1 and the binary object image of frame #n+1, as indicated by the example shown in FIG. 44, based on the motion vector supplied from the motion detector 102, and supplies the motion-compensated binary object images to the switch 382.

The switch 382 outputs the motion-compensated binary object image of the first frame to a frame memory 383-1, and outputs the motion-compensated binary object image of the second frame to a frame memory 383-2. Similarly, the switch 382 outputs the motion-compensated binary object images of the third through (N−1)-th frame to frame memories 383-3 through 383-(N−1), and outputs the motion-compensated binary object image of the N-th frame to a frame memory 383-N.

The frame memory 383-1 stores the motion-compensated binary object image of the first frame, and outputs the stored binary object image to a weighting portion 384-1. The frame memory 383-2 stores the motion-compensated binary object image of the second frame, and outputs the stored binary object image to a weighting portion 384-2.

Similarly, the frame memories 383-3 through 383-(N−1) stores-the motion-compensated binary object images of the third through (N−1)-th frames, and outputs the stored binary object images to weighting portions 384-3 through 384-(N−1). The frame memory 383-N stores the motion-compensated binary object image of the N-th frame, and outputs the stored binary object image to a weighting portion 384-N.

The weighting portion 384-1 multiplies the pixel value of the motion-compensated binary object image of the first frame supplied from the frame memory 383-1 by a predetermined weight w1, and supplies a weighted binary object image to an accumulator 385. The weighting portion 384-2 multiplies the pixel value of the motion-compensated binary object image of the second frame supplied from the frame memory 383-2 by a predetermined weight w2, and supplies the weighted binary object image to the accumulator 385.

Likewise, the weighting portions 384-3 through 384-(N−1) multiply the pixel values of the motion-compensated binary object images of the third through (N−1)-th frames supplied from the frame memories 383-3 through 383-(N−1) by predetermined weights w3 through w(N−1), and supplies the weighted binary object images to the accumulator 385. The weighting portion 384-N multiplies the pixel value of the motion-compensated binary object image of the N-th frame supplied from the frame memory 383-N by a predetermined weight wN, and supplies the weighted binary object image to the accumulator 385.

The accumulator 385 accumulates the pixel values of the motion-compensated binary object images multiplied by the weights w1 through wN of the first through N-th frames, and compares the accumulated pixel value with the predetermined threshold th0, thereby generating the binary object image.

As discussed above, the robust-processing portion 361 generates a robust binary object image from N binary object images, and supplies it to the time change detector 303. Accordingly, the area specifying unit 103 configured as shown in FIG. 41 is able to specify the area more precisely than that shown in FIG. 29 even if noise is contained in the input image.

The area specifying processing performed by the area specifying unit 103 configured as shown in FIG. 41 is described below with reference to the flowchart of FIG. 45. The processings of step S341 through step S343 are similar to those of step S301 through step S303 discussed with reference to the flowchart of FIG. 39, and an explanation thereof is thus omitted.

In step S344, the robust-processing portion 361 performs the robust processing.

In step S345, the time change detector 303 performs the area determining processing, and the processing is completed. Details of the processing of step S345 are similar to the processing discussed with reference to the flowchart of FIG. 40, and an explanation thereof is thus omitted.

Figure 45:
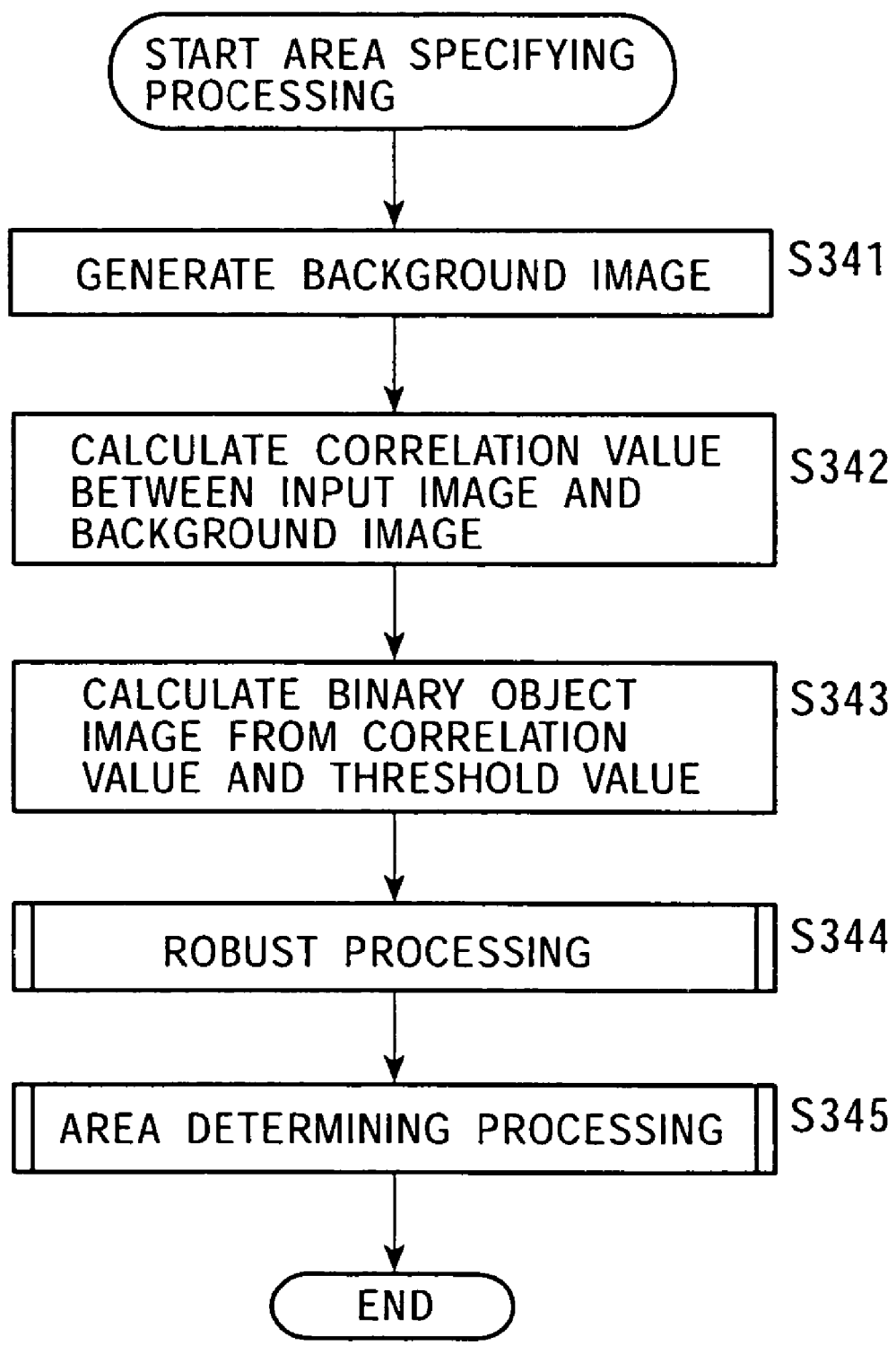
FIG. 45 is a flowchart illustrating the area specifying processing.
Figure 46:
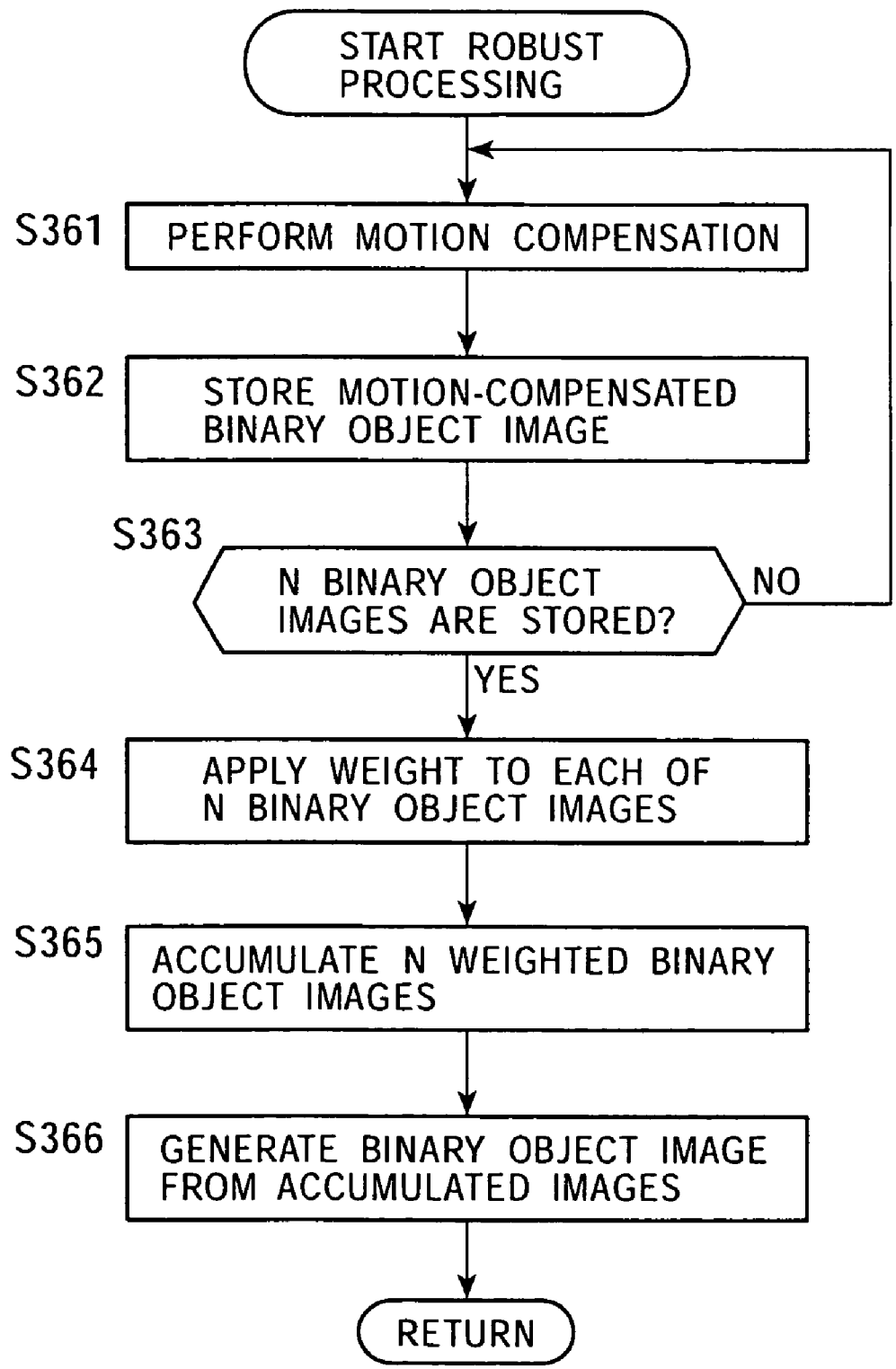
FIG. 46 is a flowchart illustrating details of the robust processing.

Details of the robust processing corresponding to the processing of step S344 in FIG. 45 are given below with reference to the flowchart of FIG. 46. In step S361, the motion compensator 381 performs the motion compensation of an input binary object image based on the motion vector and the positional information thereof supplied from the motion detector 102. In step S362, one of the frame memories 383-1 through 383-N stores the corresponding motion-compensated binary object image supplied via the switch 382.

In step S363, the robust-processing portion 361 determines whether N binary object images are stored. If it is determined that N binary object images are not stored, the process returns to step S361, and the processing for compensating for the motion of the binary object image and the processing for storing the binary object image are repeated.

If it is determined in step S363 that N binary object images are stored, the process proceeds to step S364 in which weighting is performed. In step S364, the weighting portions 384-1 through 384-N multiply the corresponding N binary object images by the weights w1 through wN.

In step S365, the accumulator 385 accumulates the N weighted binary object images.

In step S366, the accumulator 385 generates a binary object image from the accumulated images by, for example, comparing the accumulated value with a predetermined threshold th1, and the processing is completed.

As discussed above, the area specifying unit 103 configured as shown in FIG. 41 is able to generate area information based on the robust binary object image.

As is seen from the foregoing description, the area specifying unit 103 is able to generate area information indicating to which of the moving area, the stationary area, the uncovered background area, or the covered background area each pixel contained in a frame belongs.

Figure 47:
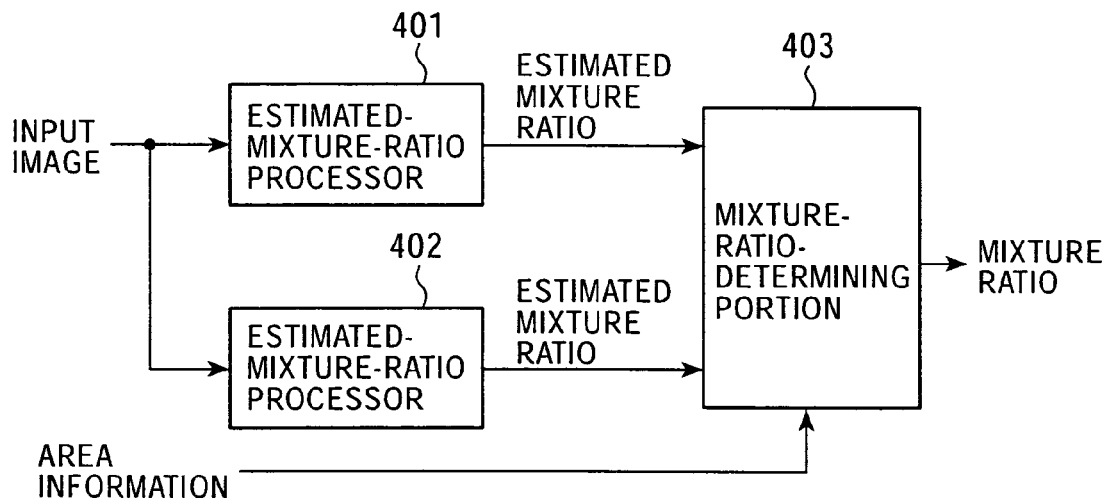
FIG. 47 is a block diagram illustrating an example of the configuration of a mixture-ratio calculator 104.

FIG. 47 is a block diagram illustrating an example of the configuration of the mixture-ratio calculator 104. An estimated-mixture-ratio processor 401 calculates an estimated mixture ratio for each pixel by calculating a model of a covered background area based on the input image, and supplies the calculated estimated mixture ratio to a mixture-ratio determining portion 403.

An estimated-mixture-ratio processor 402 calculates an estimated mixture ratio for each pixel by calculating a model of an uncovered background area based on the input image, and supplies the calculated estimated mixture ratio to the mixture-ratio determining portion 403.

Since it can be assumed that the object corresponding to the foreground is moving with constant velocity within the shutter time, the mixture ratio α of the pixels belonging to a mixed area exhibits the following characteristics. That is, the mixture ratio α linearly changes according to the positional change in the pixels. If the positional change in the pixels is one-dimensional, a change in the mixture ratio α can be represented linearly. If the positional change in the pixels is two-dimensional, a change in the mixture ratio α can be represented on a plane.

Since the period of one frame is short, it can be assumed that the object corresponding to the foreground is a rigid body moving with constant velocity.

The gradient of the mixture ratio α is inversely proportional to the amount of movement v within the shutter time of the foreground.

Figure 48:
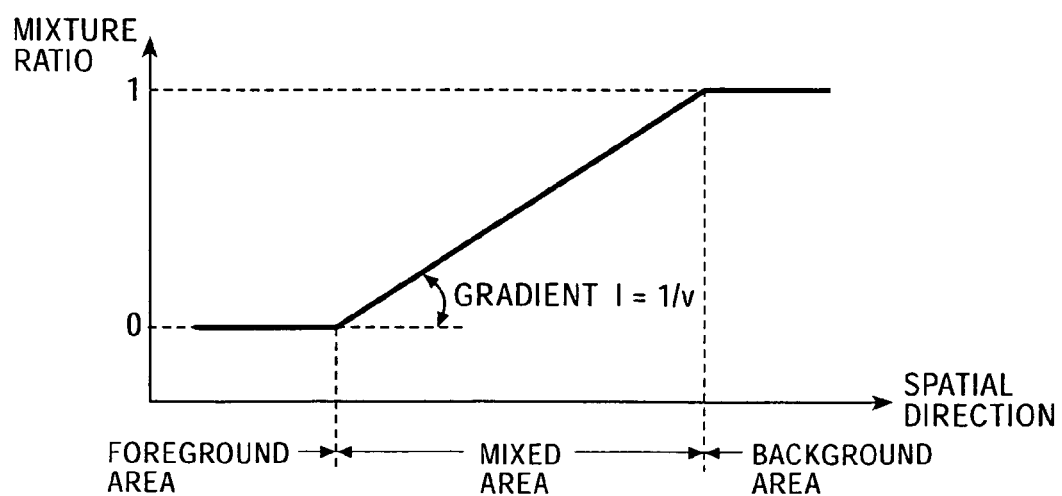
FIG. 48 illustrates an example of the ideal mixture ratio $\alpha$.

An example of the ideal mixture ratio α is shown in FIG. 48. The gradient 1 of the ideal mixture ratio α in the mixed area can be represented by the reciprocal of the amount of movement v.

As shown in FIG. 48, the ideal mixture ratio α has the value of 1 in the background area, the value of 0 in the foreground area, and the value of greater than 0 and smaller than 1 in the mixed area.

Figure 49:
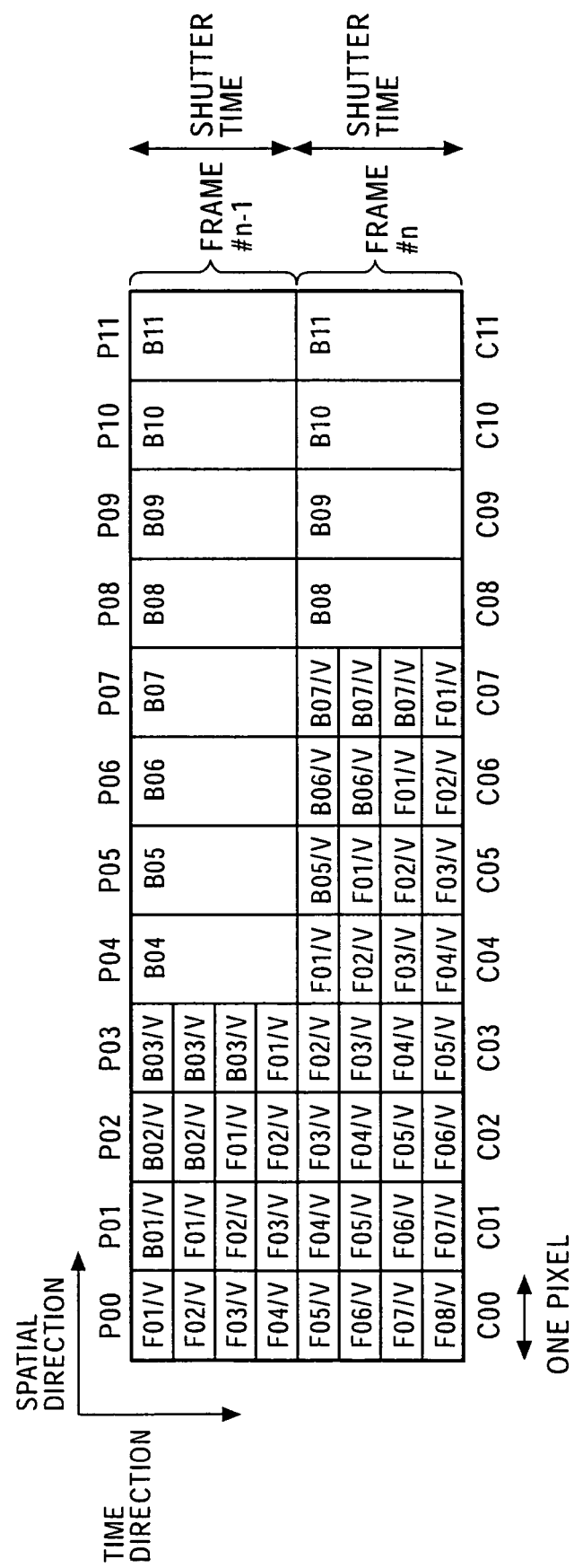
FIG. 49 illustrates a model in which pixel values are expanded in the time direction and the period corresponding to the shutter time is divided.

In the example shown in FIG. 49, the pixel value C06 of the seventh pixel from the left in frame #n can be indicated by equation (8) by using the pixel value P06 of the seventh pixel from the left in frame #n−1.

$$C06 = B06/v + B06/v + F01/v + F02/v \quad (8)$$
$$= P06/v + P06/v + F01/v + F02/v$$
$$= 2/v \cdot P06 + \sum_{i=1}^{2} Fi/v$$

In equation (8), the pixel value C06 is indicated by a pixel value M of the pixel in the mixed area, while the pixel value P06 is indicated by a pixel value B of the pixel in the background area. That is, the pixel value M of the pixel in the mixed area and the pixel value B of the pixel in the background area can be represented by equations (9) and (10), respectively.

$$M = C06 \quad (9)$$

$$B = P06 \quad (10)$$

In equation (8), 2/v corresponds to the mixture ratio α. Since the amount of movement v is 4, the mixture ratio α of the seventh pixel from the left in frame #n is 0.5.

As discussed above, the pixel value C in the designated frame #n is considered as the pixel value in the mixed area, while the pixel value P of frame #n−1 prior to frame #n is considered as the pixel value in the background area. Accordingly, equation (3) indicating the mixture ratio α can be represented by equation (11):

$$C = \alpha \cdot P + f \quad (11)$$

where f in equation (11) indicates the sum of the foreground components $\Sigma_i Fi/v$ contained in the designated pixel. The variables contained in equation (11) are two factors, i.e., the mixture ratio α and the sum f of the foreground components.

Figure 50:
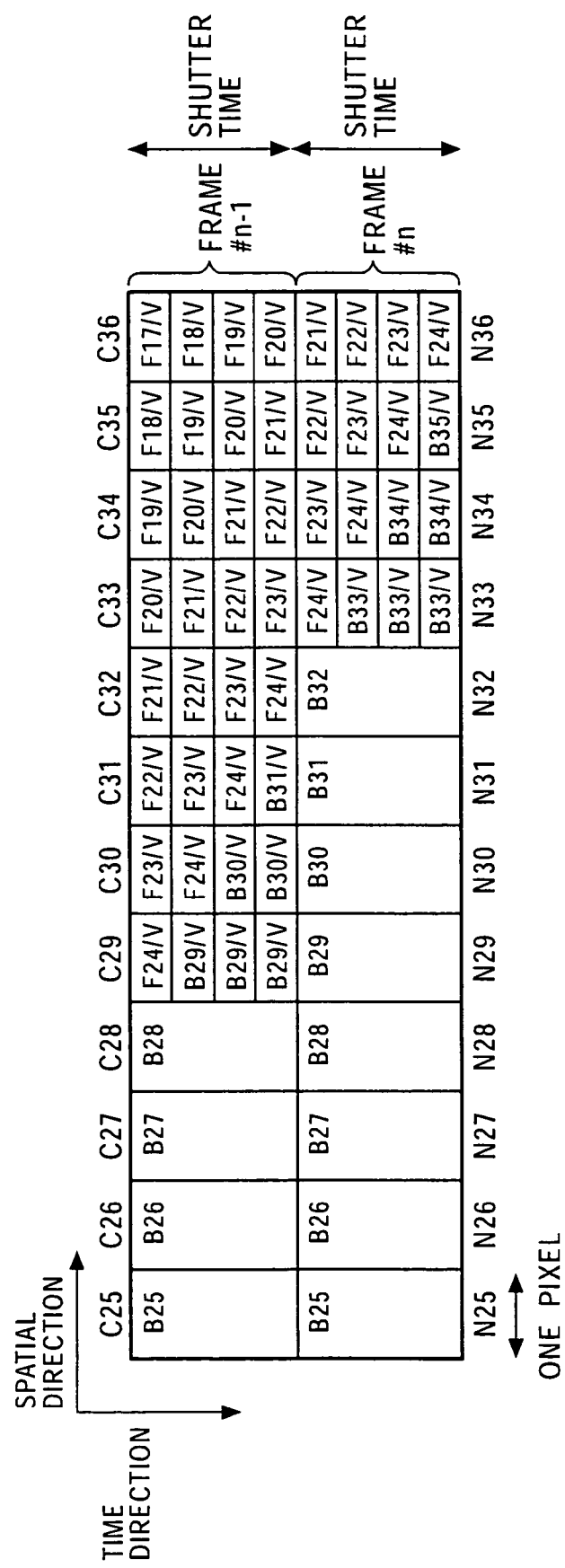
FIG. 50 illustrates a model in which pixel values are expanded in the time direction and the period corresponding to the shutter time is divided.

Similarly, a model obtained by expanding in the time direction the pixel values in which the amount of movement is 4 and the number of virtual divided portions is 4 in an uncovered background area is shown in FIG. 50.

As in the representation of the covered background area, in the uncovered background area, the pixel value C of the designated frame #n is considered as the pixel value in the mixed area, while the pixel value N of frame #n+1 subsequent to frame #n is considered as the background area. Accordingly, equation (3) indicating the mixture ratio α can be represented by equation (12).

$$C = \alpha \cdot N + f \quad (12)$$

The embodiment has been described, assuming that the background object is stationary. However, equations (8) through (12) can be applied to the case in which the background object is moving by using the pixel value of a pixel located corresponding to the amount of movement v of the background. It is now assumed, for example, in FIG. 49 that the amount of movement v of the object corresponding to the background is 2, and the number of virtual divided portions is 2. In this case, when the object corresponding to the background is moving to the right in FIG. 49, the pixel value B of the pixel in the background area in equation (10) is represented by a pixel value P04.

Since equations (11) and (12) each contain two variables, the mixture ratio α cannot be determined without modifying the equations. Generally, an image has a strong spatial correlation, and accordingly, pixels located in close proximity with each other have almost the same pixel values.

Since the foreground components have a spatially strong correlation, the equation is modified so that the sum f of the foreground components can be deduced from the previous or subsequent frame, thereby determining the mixture ratio α.

Figure 51:
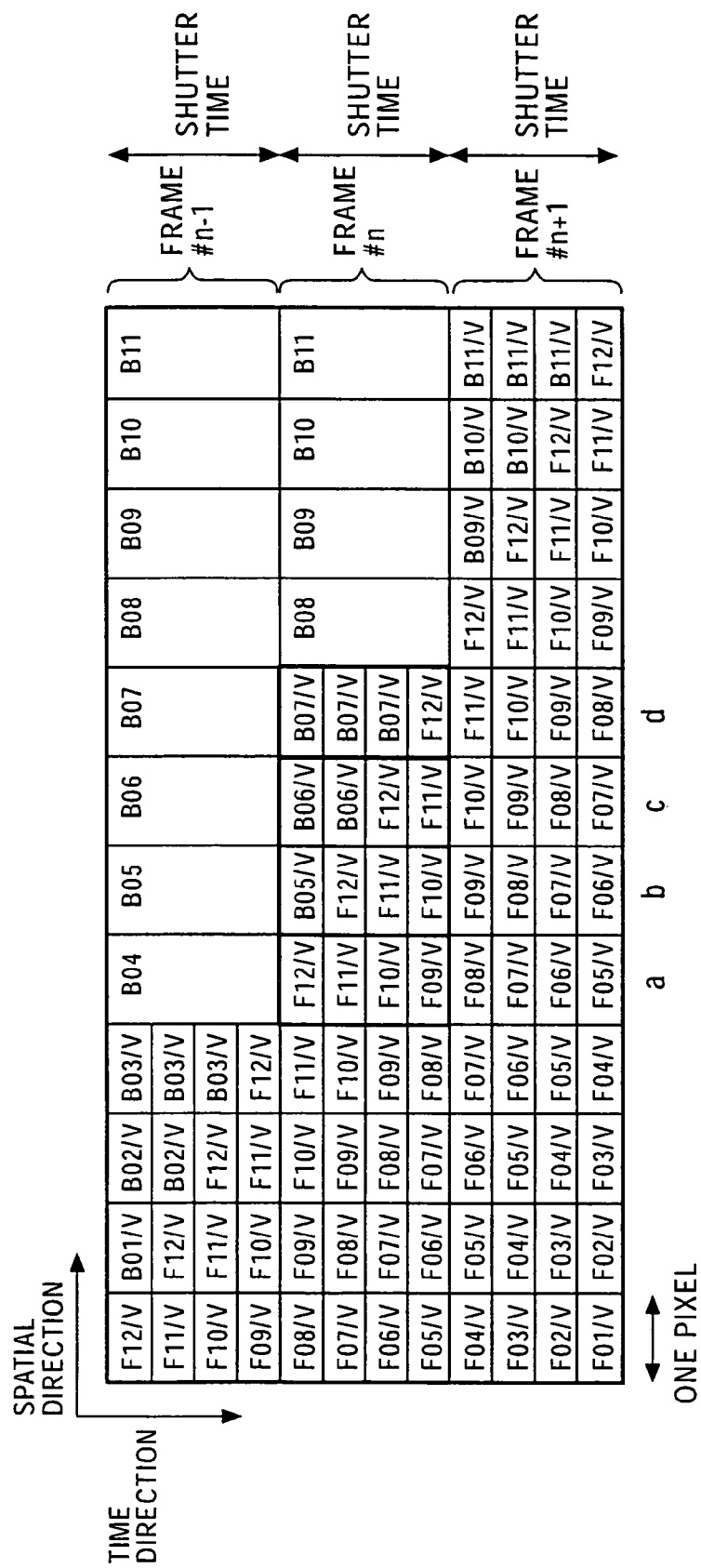
FIG. 51 illustrates the approximation using the correlation of foreground components.

The pixel value Mc of the seventh pixel from the left in frame #n in FIG. 51 can be expressed by equation (13).

$$Mc = \frac{2}{v} \cdot B06 + \sum_{i=11}^{12} Fi/v \quad (13)$$

The first term 2/v of the right side in equation (13) corresponds to the mixture ratio α. The second term of the right side in equation (13) can be expressed by equation (14) by utilizing the pixel value in the subsequent frame #n+1.

$$\sum_{i=11}^{12} Fi/v = \beta \cdot \sum_{i=7}^{10} Fi/v \qquad (14)$$

It is now assumed that equation (15) holds true by utilizing the spatial correlation of the foreground component.

$$F=F05=F06=F07=F08=F09=F10=F11=F12 \qquad (15)$$

Equation (14) can be modified into equation (16) by utilizing equation (15).

$$\sum_{i=11}^{12} Fi/v = \frac{2}{v} \cdot F \qquad (16)$$

$$= \beta \cdot \frac{4}{v} \cdot F$$

As a result, β can be expressed by equation (17).

$$\beta = 2/4 \qquad (17)$$

If it is assumed that the foreground components in the mixed area are equal, as indicated by equation (15), equation (18) can hold true for all the pixels in the mixed area because of the internal ratio.

$$\beta = 1 - \alpha \qquad (18)$$

If equation (18) holds true, equation (11) can be developed into equation (19).

$$C = \alpha \cdot P + f \qquad (19)$$

$$= \alpha \cdot P + (1-\alpha) \cdot \sum_{i=\gamma}^{\gamma+V-1} Fi/v$$

$$= \alpha \cdot P + (1-\alpha) \cdot N$$

Similarly, if equation (18) holds true, equation (12) can be developed into equation (20).

$$C = \alpha \cdot N + f \qquad (20)$$

$$= \alpha \cdot N + (1-\alpha) \cdot \sum_{i=\gamma}^{\gamma+V-1} Fi/v$$

$$= \alpha \cdot N + (1-\alpha) \cdot P$$

Figure 52:
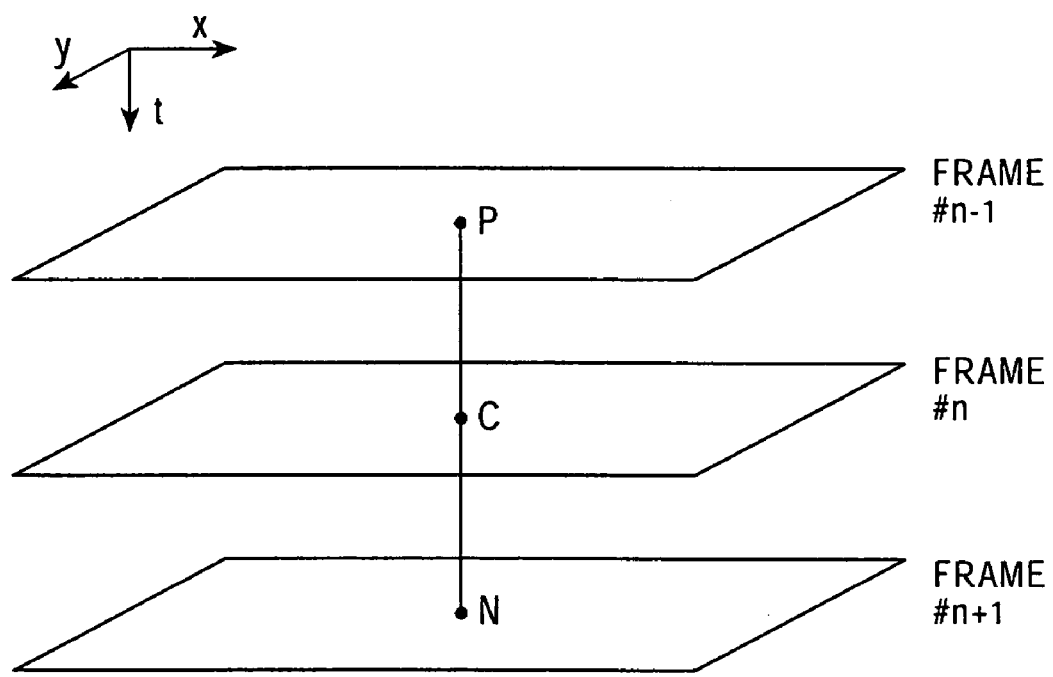
FIG. 52 illustrates the relationship among C, N, and P.

In equations (19) and (20), since C, N, and P are known pixel values, the variable contained in equations (19) and (20) is only the mixture ratio α. The relationship among C, N, and P in equations (19) and (20) is shown in FIG. 52. C is the pixel value of the designated pixel in frame #n for which the mixture ratio α is calculated. N is the pixel value of the pixel in frame #n+1 located at the position spatially corresponding to the designated pixel. P is the pixel value of the pixel in frame #n−1 located at the position spatially corresponding to the designated pixel.

Accordingly, since one variable is contained in each of equations (19) and (20), the mixture ratio α is calculated by utilizing the pixels in the three frames. The condition for solving the correct mixture ratio α by solving equations (19) and (20) is as follows. In the image object having the same foreground components in the mixed area, i.e., in the image object of the foreground which is captured when the foreground object is stationary, the pixel values of the consecutive pixels positioned at the boundary of the image object corresponding to the moving direction of the foreground object, the number of pixels being two times the amount of movement v, must be uniform.

As discussed above, the mixture ratio α of the pixels belonging to the covered background area is calculated by equation (21), and the mixture ratio α of the pixels belonging to the uncovered background area is calculated by equation (22)

$$\alpha = (C-N)/(P-N) \qquad (21)$$

$$\alpha = (C-P)/(N-P) \qquad (22)$$

Figure 53:
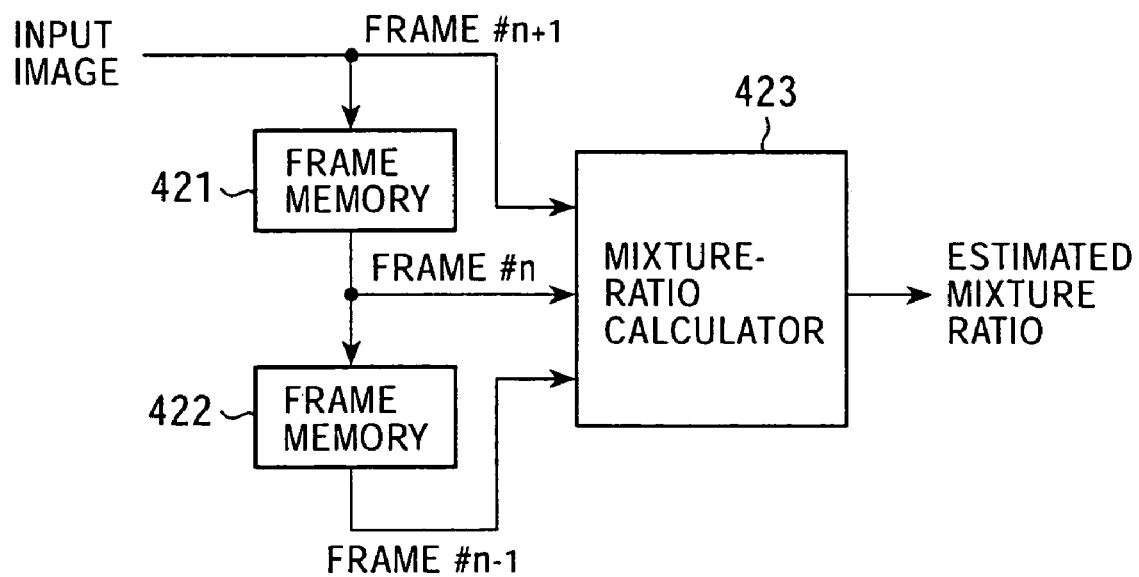
FIG. 53 is a block diagram illustrating the configuration of an estimated-mixture-ratio processor 401.

FIG. 53 is a block diagram illustrating the configuration of the estimated-mixture-ratio processor 401. A frame memory 421 stores an input image in the units of frames, and supplies the frame subsequent to the frame which is input as the input image to a frame memory 422 and a mixture-ratio calculator 423.

A frame memory 422 stores an input image in the units of frames, and supplies the frame subsequent to the frame supplied from the frame memory 421 to the mixture-ratio calculator 423.

Accordingly, when frame #n+1 is input into the mixture-ratio calculator 423 as the input image, the frame memory 421 supplies frame #n to the mixture-ratio calculator 423, and the frame memory 422 supplies frame #n−1 to the mixture-ratio calculator 423.

The mixture-ratio calculator 423 calculates the estimated mixture ratio of the designated pixel by solving equation (21) based on the pixel value C of the designated pixel in frame #n, the pixel value N of the pixel in frame #n+1 located at the position corresponding to the position of the designated pixel, and the pixel value P of the pixel #n−1 located at the position corresponding to the position of the designated pixel, and outputs the calculated estimated mixture ratio. For example, when the background is stationary, the mixture-ratio calculator 423 calculates the estimated mixture ratio of the designated pixel based on the pixel value C of the designated pixel in frame #n, the pixel value N of the pixel in frame #n+1 located at the same position as the designated pixel, and the pixel value P of the pixel in frame #n−1 located at the same position as the designated pixel, and outputs the calculated estimated mixture ratio.

In this manner, the estimated-mixture-ratio calculator 401 calculates the estimated mixture ratio based on the input image, and supplies it to the mixture-ratio determining portion 403.

The estimated-mixture-ratio calculator 401 calculates the estimated mixture ratio of the designated pixel by solving equation (21). The operation of the estimated-mixture-ratio calculator 402 is similar to that of the estimated-mixture-ratio calculator 401, except that the estimated-mixture-ratio calculator 402 calculates a different estimated mixture ratio of the designated pixel by solving equation (22). Thus, an explanation of the estimated-mixture-ratio calculator 402 is omitted.

Figure 54:
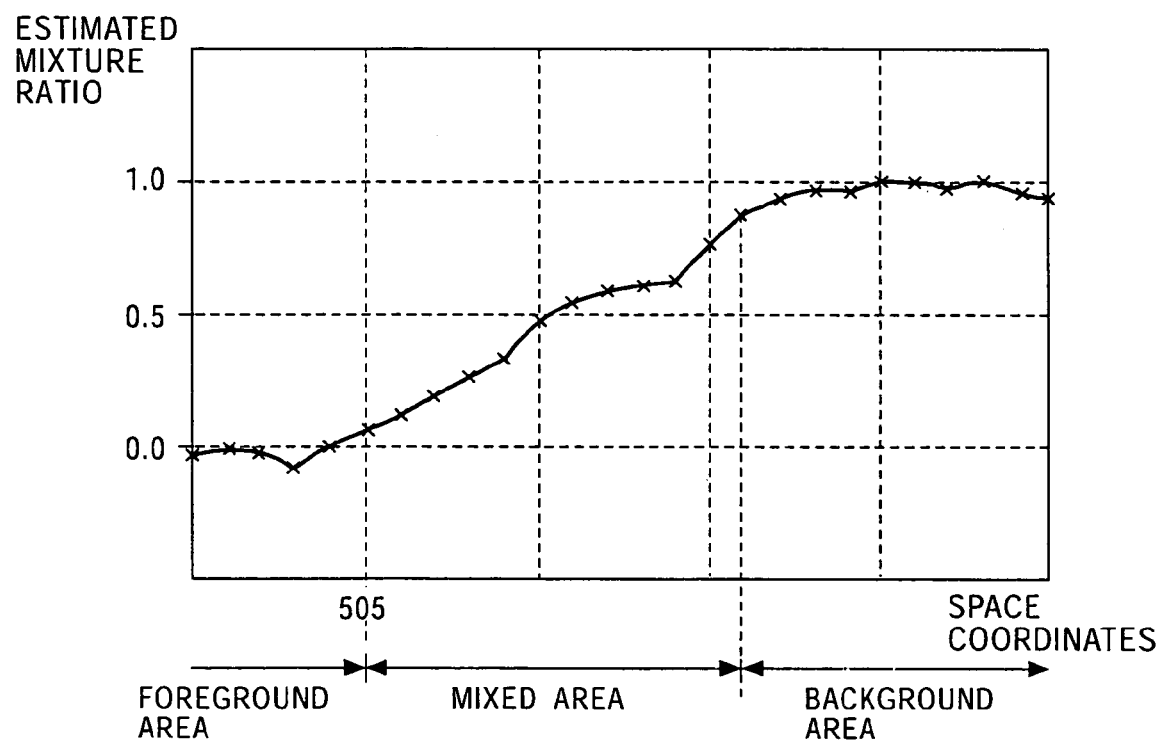
FIG. 54 illustrates an example of the estimated mixture ratio.

FIG. 54 illustrates an example of the estimated mixture ratio calculated by the estimated-mixture-ratio processor 401. The estimated mixture ratio shown in FIG. 54 is the result represented by one line when the amount of movement v of the foreground object moving with constant velocity is 11.

It is seen, as shown in FIG. 48, that the estimated mixture ratio changes almost linearly in the mixed area.

Referring back to FIG. 47, the mixture-ratio determining portion 403 sets the mixture ratio α based on the area information supplied from the area specifying unit 103 and indicating to which of the foreground area, the background area, the covered background area, or the uncovered background area the pixel for which the mixture ratio α is to be calculated belongs. The mixture-ratio determining portion 403 sets the mixture ratio α to 0 when the corresponding pixel belongs to the foreground area, and sets the mixture ratio α to 1 when the corresponding pixel belongs to the background area. When the corresponding pixel belongs to the covered background area, the mixture-ratio determining portion 403 sets the mixture ratio α to the estimated mixture ratio supplied from the estimated-mixture-ratio processor 401. When the corresponding pixel belongs to the uncovered background area, the mixture-ratio determining portion 403 sets the mixture ratio α to the estimated mixture ratio supplied from the estimated-mixture-ratio processor 402. The mixture-ratio determining portion 403 outputs the mixture ratio α which has been set based on the area information.

Figure 55:
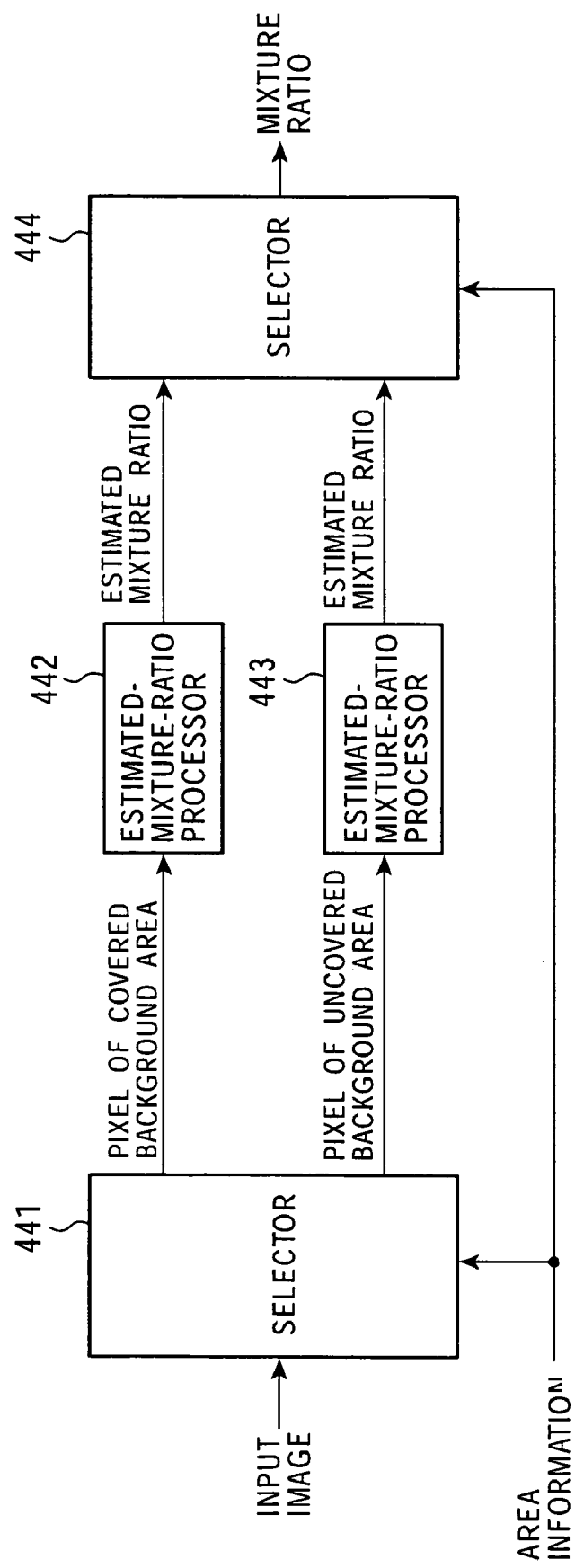
FIG. 55 is a block diagram illustrating another configuration of the mixture-ratio calculator 104.

FIG. 55 is a block diagram illustrating another configuration of the mixture-ratio calculator 104. A selector 441 supplies a pixel belonging to the covered background area and the corresponding pixels in the previous and subsequent frames to an estimated-mixture-ratio processor 442 based on the area information supplied from the area specifying unit 103. The selector 441 supplies a pixel belonging to the uncovered background area and the corresponding pixels in the previous and subsequent frames to an estimated-mixture-ratio processor 443 based on the area information supplied from the area specifying unit 103.

The estimated-mixture-ratio processor 442 calculates the estimated mixture ratio of the designated pixel belonging to the covered background area by the calculation expressed in equation (21) based on the pixel values input from the selector 441, and supplies the calculated estimated mixture ratio to a selector 444.

The estimated-mixture-ratio processor 443 calculates the estimated mixture ratio of the designated pixel belonging to the uncovered background area by the calculation expressed in equation (22) based on the pixel values input from the selector 441, and supplies the calculated estimated mixture ratio to the selector 444.

Based on the area information supplied from the area specifying unit 103, the selector 444 selects the estimated mixture ratio 0 and sets it as the mixture ratio α when the designated pixel belongs to the foreground area, and selects the estimated mixture ratio 1 and sets it as the mixture ratio α when the designated pixel belongs to the background area. When the designated pixel belongs to the covered background area, the selector 444 selects the estimated mixture ratio supplied from the estimated-mixture-ratio processor 442 and sets it as the mixture ratio α. When the designated pixel belongs to the uncovered background area, the selector 444 selects the estimated mixture ratio supplied from the estimated-mixture-ratio processor 443 and sets it as the mixture ratio α. The selector 444 then outputs the mixture ratio α which has been selected and set based on the area information.

As discussed above, the mixture-ratio calculator 104 configured as shown in FIG. 55 is able to calculate the mixture ratio α for each pixel contained in the image, and outputs the calculated mixture ratio α.

The calculation processing for the mixture ratio α performed by the mixture-ratio calculator 104 configured as shown in FIG. 47 is discussed below with reference to the flowchart of FIG. 56. In step S401, the mixture-ratio calculator 104 obtains area information supplied from the area specifying unit 103. In step S402, the estimated-mixture-ratio processor 401 executes the processing for estimating the mixture ratio by using a model corresponding to a covered background area, and supplies the estimated mixture ratio to the mixture-ratio determining portion 403. Details of the processing for estimating the mixture ratio are discussed below with reference to the flowchart of FIG.

In step S403, the estimated-mixture-ratio processor 402 executes the processing for estimating the mixture ratio by using a model corresponding to an uncovered background area, and supplies the estimated mixture ratio to the mixture-ratio determining portion 403.

In step S404, the mixture-ratio calculator 104 determines whether the mixture ratios have been estimated for the whole frame. If it is determined that the mixture ratios have not yet been estimated for the whole frame, the process returns to step S402, and the processing for estimating the mixture ratio for the subsequent pixel is executed.

If it is determined in step S404 that the mixture ratios have been estimated for the whole frame, the process proceeds to step S405. In step S405, the mixture-ratio determining portion 403 sets the mixture ratio based on the area information supplied from the area specifying unit 103 and indicating to which of the foreground area, the background area, the covered background area, or the uncovered background area the pixel for which the mixture ratio α is to be calculated belongs. The mixture-ratio determining portion 403 sets the mixture ratio α to 0 when the corresponding pixel belongs to the foreground area, and sets the mixture ratio α to 1 when the corresponding pixel belongs to the background area. When the corresponding pixel belongs to the covered background area, the mixture-ratio determining portion 403 sets the estimated mixture ratio supplied from the estimated-mixture-ratio processor 401 as the mixture ratio α. When the corresponding pixel belongs to the uncovered background area, the mixture-ratio determining portion 403 sets the estimated mixture ratio supplied from the estimated-mixture-ratio processor 402 as the mixture ratio α. The processing is then completed.

As discussed above, the mixture-ratio calculator 104 is able to calculate the mixture ratio α, which indicates a feature quantity corresponding to each pixel, based on the area information supplied from the area specifying unit 103, and the input image.

The processing for calculating the mixture ratio α performed by the mixture-ratio calculator 104 configured as shown in FIG. 55 is similar to that discussed with reference to the flowchart of FIG. 56, and an explanation thereof is thus omitted.

Figure 56:
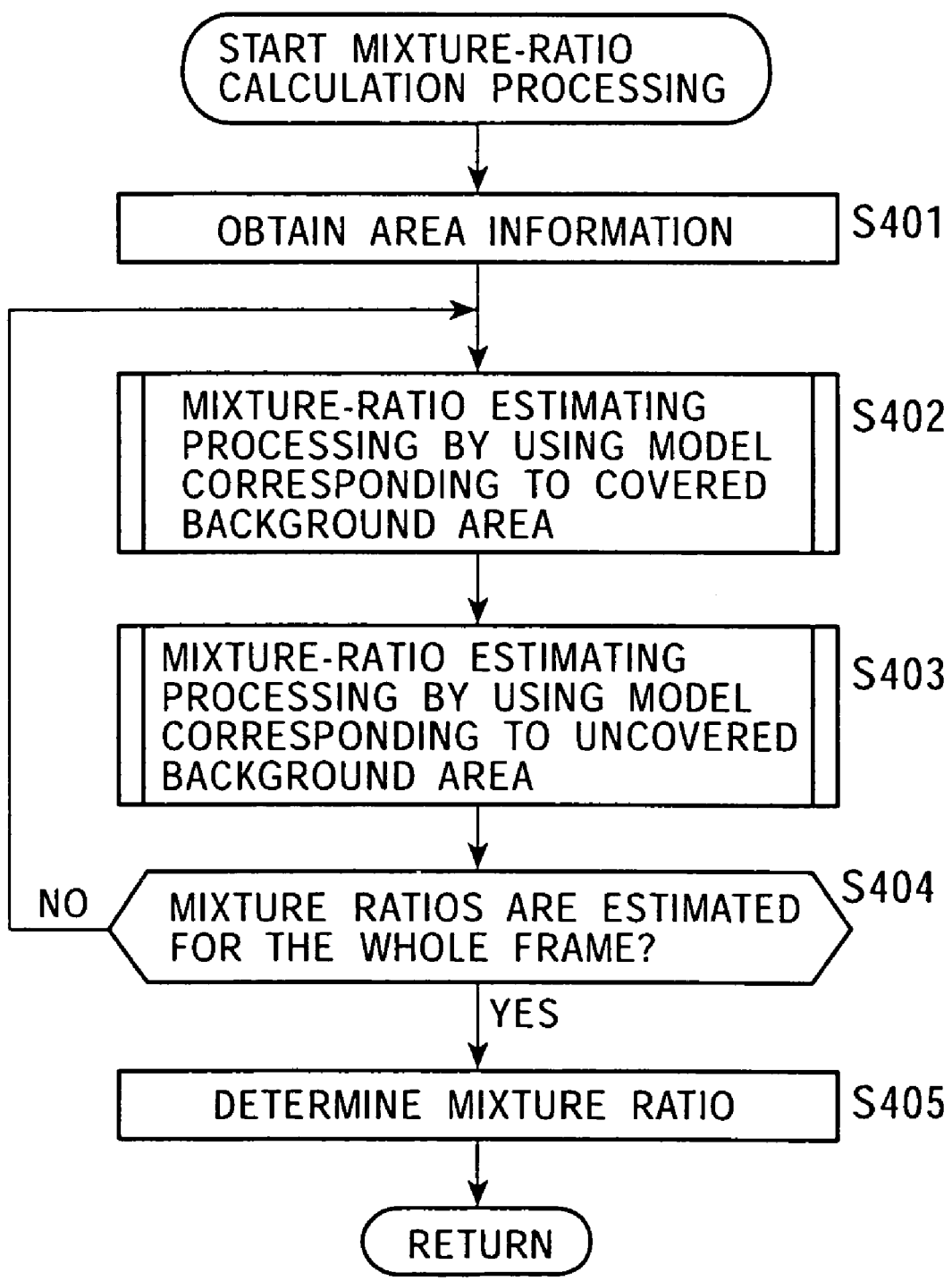
FIG. 56 is a flowchart illustrating the processing for calculating the mixture ratio.
Figure 57:
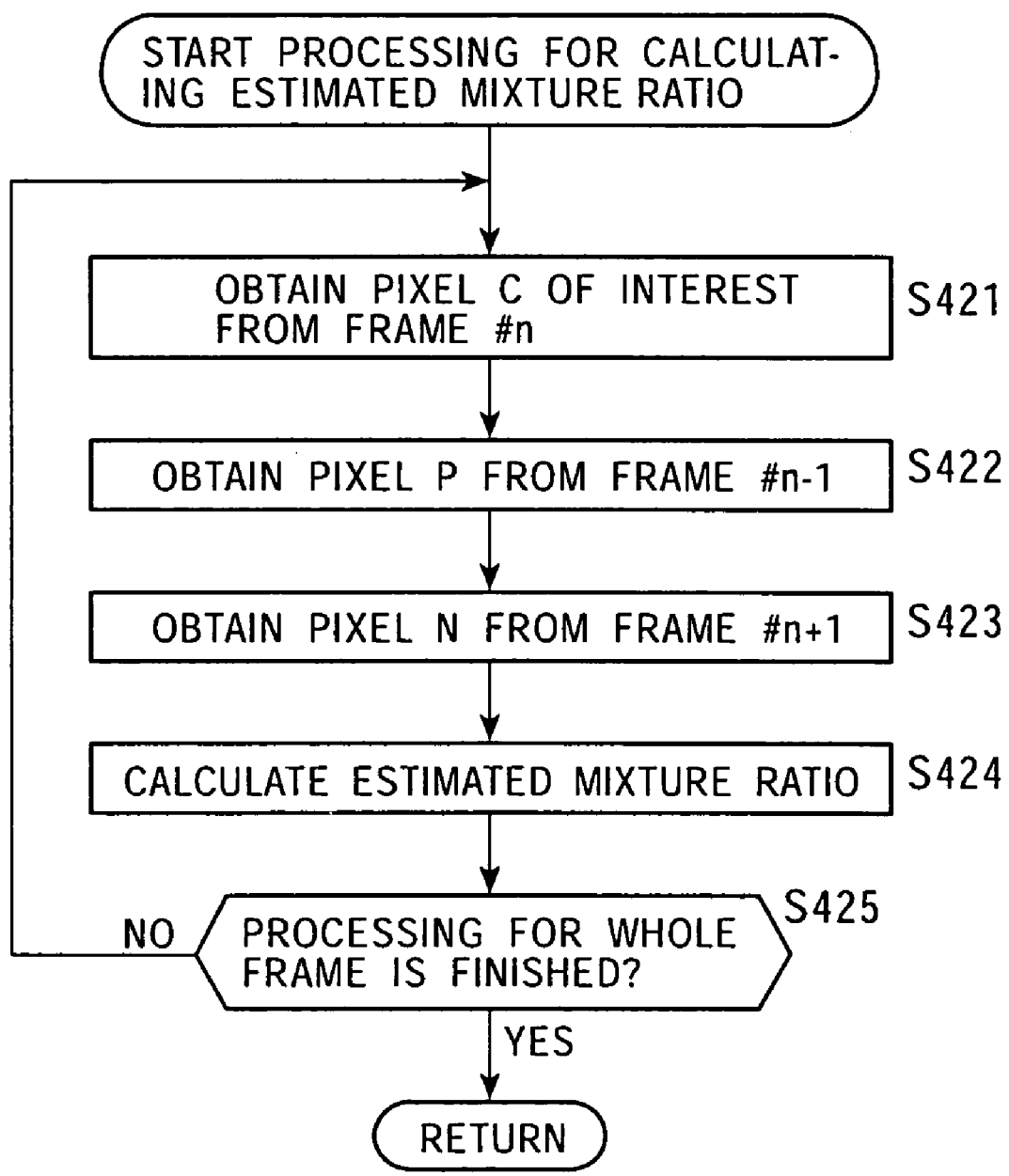
FIG. 57 is a flowchart illustrating the processing for calculating the estimated mixture ratio.

A description is now given of, with reference to the flowchart of FIG. 57, the mixture-ratio estimating processing by using a model corresponding to the covered background area in step S402 of FIG. 56.

In step S421, the mixture-ratio calculator 423 obtains the pixel value C-of the designated pixel in frame #n from the frame memory 421.

In step S422, the mixture-ratio calculator 423 obtains from the frame memory 422 the pixel value P of the pixel in frame #n−1 corresponding to the designated pixel contained in the input image.

In step S423, the mixture-ratio calculator 423 obtains the pixel value N of the pixel in frame #n+1 corresponding to the designated pixel contained in the input image.

In step S424, the mixture-ratio calculator 423 calculates the estimated mixture ratio based on the pixel value C of the designated pixel in frame #n, the pixel value P of the pixel in frame #n−1, and the pixel value N of the pixel in frame #n+1.

In step S425, the mixture-ratio calculator 423 determines whether the processing for-calculating the estimated mixture ratio is finished for the whole frame. If it is determined that the processing for calculating the estimated mixture ratio is not finished for the whole frame, the process returns to step S421, the processing for calculating the estimated mixture ratio for the subsequent pixel is repeated.

If it is determined in step S425 that the processing for calculating the estimated mixture ratio for the whole frame is finished, the processing is completed.

As discussed above, the estimated-mixture-ratio processor 401 is able to calculate the estimated mixture ratio based on the input image.

The mixture-ratio estimating processing performed by using a model corresponding to the uncovered background area in step S403 of FIG. 56 is similar to the processing indicated by the flowchart of FIG. 57 performed by using a model corresponding to the uncovered background area, and an explanation thereof is thus omitted.

The estimated-mixture-ratio processor 442 and the estimated-mixture-ratio processor 443 shown in FIG. 55 calculate the estimated mixture ratios by performing processing similar to that of the flowchart of FIG. 57, and an explanation thereof is thus omitted.

The embodiment has been described, assuming that the object corresponding to the background is stationary. However, the above-described processing for determining the mixture ratio α can be applied even if the image corresponding to the background area contains motion. For example, if the image corresponding to the background area is uniformly moving, the estimated-mixture-ratio processor 401 shifts the overall image in accordance with the motion of the background, and performs processing in a manner similar to the case in which the object corresponding to the background is stationary. If the image corresponding to the background area contains locally different motions, the estimated-mixture-ratio processor 401 selects the pixels corresponding to the motions as the corresponding pixels belonging to the mixed area, and executes the above-described processing.

The estimated-mixture ratio calculator 104 may execute only the mixture-ratio estimating processing for all the pixels by using a model corresponding to the covered background area so as to output the calculated estimated mixture ratio as the mixture ratio α. In this case, the mixture ratio α indicates the ratio of the background components for the background components of the pixels belonging to the covered background area, and indicates the ratio of the foreground components for the pixels belonging to the uncovered background area. For the pixels belonging to the uncovered background area, the absolute value of the difference between the mixture ratio α and 1 is calculated, and the calculated absolute value is set as the mixture ratio α. Then, the signal processing apparatus is able to determine the mixture ratio α indicating the ratio of the background components for the pixels belonging to the uncovered background area.

Similarly, the mixture-ratio calculator 104 may execute only the mixture-ratio estimating processing for all the pixels by using a model corresponding to the uncovered background area so as to output the calculated estimated mixture ratio as the mixture ratio α.

Another processing performed by the mixture-ratio calculator 104 is discussed below.

The mixture ratio α linearly changes in accordance with a change in the position of the pixels because the object corresponding to the foreground is moving with constant velocity. By utilizing this characteristic, an equation in which the mixture ratio α and the sum f of the foreground components are approximated in the spatial direction can hold true. By utilizing a plurality of sets of the pixel values of the pixels belonging to the mixed area and the pixel values of the pixels belonging to the background area, the equations in which the mixture ratio α and the sum f of the foreground components are approximated are solved, thereby calculating the mixture ratio α.

When a change in the mixture ratio α is approximated as a straight line, the mixture ratio α can be expressed by equation (23).

$$\alpha = il + p \tag{23}$$

In equation (23), i indicates the spatial index when the position of the designated pixel is set to 0, l designates the gradient of the straight line of the mixture ratio α, and p designates the intercept of the straight line of the mixture ratio α and also indicates the mixture ratio α of the designated pixel. In equation (23), the index i is known, and the gradient l and the intercept p are unknown.

Figure 58:
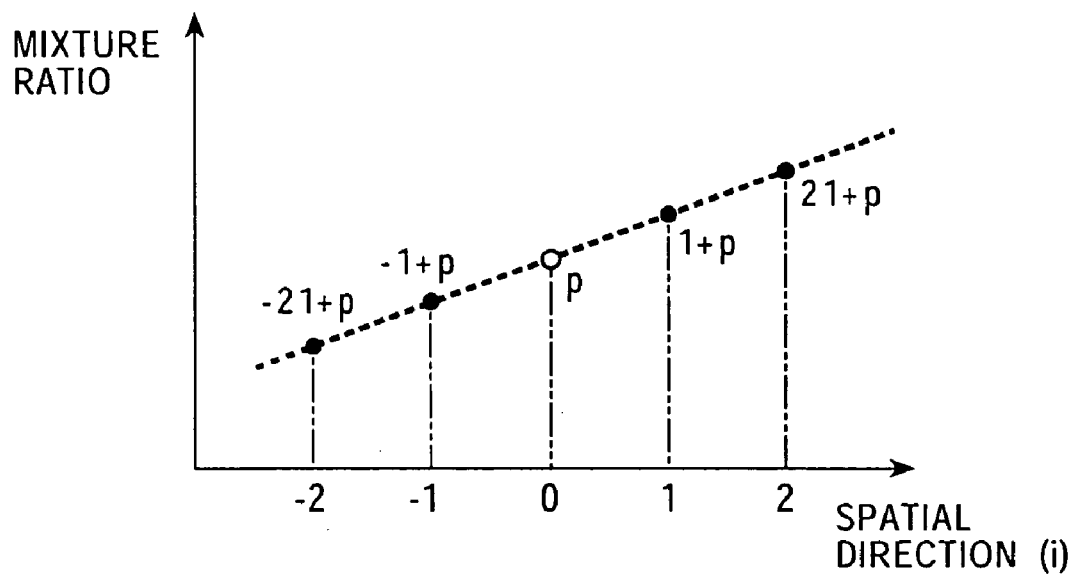
FIG. 58 illustrates a straight line for approximating the mixture ratio α.

The relationship among the index i, the gradient l, and the intercept p is shown in FIG. 58.

By approximating the mixture ratio α as equation (23), a plurality of different mixture ratios α for a plurality of pixels can be expressed by two variables. In the example shown in FIG. 58, the five mixture ratios for five pixels are expressed by the two variables, i.e., the gradient l and the intercept p.

Figure 59:
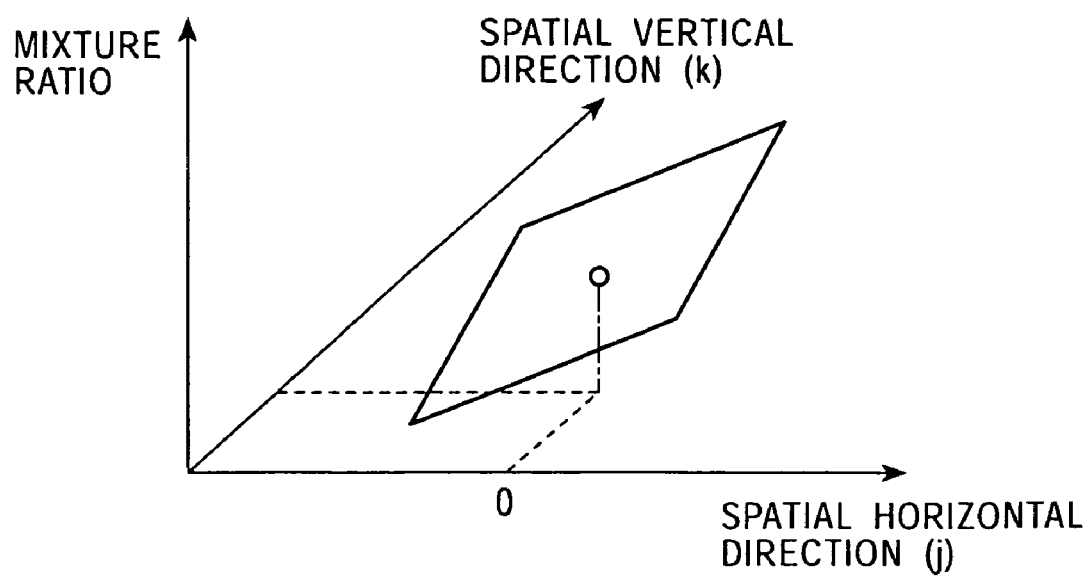
FIG. 59 illustrates a plane for approximating the mixture ratio α.

When the mixture ratio α is approximated in the plane shown in FIG. 59, equation (23) is expanded into the plane by considering the movement v corresponding to the two directions, i.e., the horizontal direction and the vertical direction of the image, and the mixture ratio α can be expressed by equation (24).

$$\alpha = jm + kq + p \tag{24}$$

In equation (24), j is the index in the horizontal direction and k is the index in the vertical direction when the position of the designated pixel is 0. In equation (24), m designates the horizontal gradient of the mixture ratio α in the plane, and q indicates the vertical gradient of the mixture ratio α in the plane. In equation (24), p indicates the intercept of the mixture ratio α in the plane.

For example, in frame #n shown in FIG. 49, equations (25) through (27) can hold true for C05 through C07, respectively.

$$C05 = \alpha 05 \cdot B05/v + f05 \tag{25}$$

$$C06 = \alpha 06 \cdot B06/v + f06 \tag{26}$$

$$C07 = \alpha 07 \cdot B07/v + f07 \tag{27}$$

Assuming that the foreground components positioned in close proximity with each other are equal to each other, i.e., that F01 through F03 are equal, equation (28) holds true by replacing F01 through F03 by fc.

$$f(x) = (1 - \alpha(x)) \cdot Fc \tag{28}$$

In equation (28), x indicates the position in the spatial direction.

When α(x) is replaced by equation (24), equation (28) can be expressed by equation (29).

$$f(x) = (1-(jm+kq+p)) \cdot Fc \quad (29)$$
$$= j \cdot (-m \cdot Fc) + k \cdot (-q \cdot Fc) + ((1-p) \cdot Fc)$$
$$= js + kt + u$$

In equation (29), (−m·Fc), (−q·Fc), and (1−p)·Fc are replaced, as expressed by equations (30) through (32), respectively.

$$s = -m \cdot Fc \quad (30)$$

$$t = -q \cdot Fc \quad (31)$$

$$u = (1-p) \cdot Fc \quad (32)$$

In equation (29), j is the index in the horizontal direction and k is the index in the vertical direction when the position of the designated pixel is 0.

As discussed above, since it can be assumed that the object corresponding to the foreground is moving with constant velocity within the shutter time, and that the foreground components positioned in close proximity with each other are uniform, the sum of the foreground components can be approximated by equation (29).

When the mixture ratio α is approximated by a straight line, the sum of the foreground components can be expressed by equation (33).

$$f(x) = is + u \quad (33)$$

By replacing the mixture ratio α and the sum of the foreground components in equation (13) by using equations (24) and (29), the pixel value M can be expressed by equation (34).

$$M = (jm + kq + p) \cdot B + js + kt + u \quad (34)$$
$$= jB \cdot m + kB \cdot q + B \cdot p + j \cdot s + k \cdot t + u$$

In equation (34), unknown variables are six factors, such as the horizontal gradient m of the mixture ratio α in the plane, the vertical gradient q of the mixture ratio α in the plane, and the intercepts of the mixture ratio α in the plane, p, s, t, and u.

The pixel value M and the pixel value B are set in equation (34) in accordance with the pixels close to the designated pixel, and then, a plurality of equations in which the pixel value M and the pixel value B are set are solved by the method of least squares, thereby calculating the mixture ratio α.

It is now assumed, for example, that the horizontal index j of the designated pixel is set to 0, and the vertical index k of the designated pixel is set to 0. In this case, when the pixel value M or the pixel value B is set in the normal equation expressed by equation (34) for 3×3 pixels located in the proximity with the designated pixel, equations (35) through (43) are obtained.

$$M_{-1,-1} = (-1) \cdot B_{-1,-1} \cdot m + (-1) \cdot B_{-1,-1} \cdot q + B_{-1,-1} \cdot p + (-1) \cdot s + (-1) \cdot t + u \quad (35)$$

$$M_{0,-1} = (0) \cdot B_{0,-1} \cdot m + (-1) \cdot B_{0,-1} \cdot q + B_{0,-1} \cdot p + (0) \cdot s + (-1) \cdot t + u \quad (36)$$

$$M_{+1,-1} = (+1) \cdot B_{+1,-1} \cdot m + (-1) \cdot B_{+1,-1} \cdot q + B_{+1,-1} \cdot p + (+1) \cdot s + (-1) \cdot t + u \quad (37)$$

$$M_{-1,0} = (-1) \cdot B_{-1,0} \cdot m + (0) \cdot B_{-1,0} \cdot q + B_{-1,0} \cdot p + (-1) \cdot s + (0) \cdot t + u \quad (38)$$

$$M_{0,0} 32\ (0) \cdot B_{0,0} \cdot m + (0) \cdot B_{0,0} \cdot q + B_{0,0} \cdot p + (0) \cdot s + (0) \cdot t + u \quad (39)$$

$$M_{+1,0} = (+1) \cdot B_{+1,0} \cdot m + (0) \cdot B_{+1,0} \cdot q + B_{+1,0} \cdot p + (+1) \cdot s + (0) \cdot t + u \quad (40)$$

$$M_{-1,+1} = (-1) \cdot B_{-1,+1} \cdot m + (+1) \cdot B_{-,+1} \cdot q + B_{-1,+1} \cdot p + (-1) \cdot s + (+1) \cdot t + u \quad (41)$$

$$M_{0,+1} = (0) \cdot B_{0,+1} \cdot m + (1) \cdot B_{0,+1} \cdot q + B_{0,+1} \cdot p + (0) \cdot s + (+1) \cdot t + u \quad (42)$$

$$M_{+1,+1} = (+1) \cdot B_{+1,+1} \cdot m + (+1) \cdot B_{+1,+1} \cdot q + B_{+1,+1} \cdot p + (+1) \cdot s + (+1) \cdot t + u \quad (43)$$

Since the horizontal index j of the designated pixel is 0, and the vertical index k of the designated pixel is 0, the mixture ratio α of the designated pixel is equal to the value when j is 0 and k is 0 in equation (24), i.e., the mixture ratio α is equal to the intercept p in equation (24)

Accordingly, based on the nine equations, i.e., equations (35) through (43), the horizontal gradient m, the vertical gradient q, and the intercepts p, s, t, and u are calculated by the method of least squares, and the intercept p is output as the mixture ratio α.

A specific process for calculating the mixture ratio α by applying the method of least squares is as follows.

When the index i and the index k are expressed by a single index x, the relationship among the index i, the index k, and the index x can be expressed by equation (44).

$$x = (j+1) \cdot 3 + (k+1) \quad (44)$$

It is now assumed that the horizontal gradient m, the vertical gradient q, and the intercepts p, s, t, and u are expressed by variables w0, w1, w2, w3, w4, and w5, respectively, and jB, kB, B, j, k and 1 are expressed by a0, a1, a2, a3, a4, and a5, respectively. In consideration of the error ex, equations (35) through (43) can be modified into equation (45).

$$Mx = \sum_{y=0}^{5} ay \cdot wy + ex \quad (45)$$

In equation (45), x is any one of the integers from 0 to 8.
Equation (46) can be found from equation (45).

$$ex = Mx - \sum_{y=0}^{5} ay \cdot wy \quad (46)$$

Since the method of least squares is applied, the square sum E of the error is defined as follows, as expressed by equation (47).

$$E = \sum_{x=0}^{8} ex^2 \quad (47)$$

In order to minimize the error, the partial differential value of the variable Wv with respect to the square sum E of the error should be 0. v is any one of the integers from 0 to 5. Thus, wy is determined so that equation (48) is satisfied.

$$\frac{\partial E}{\partial Wv} = 2 \cdot \sum_{x=0}^{8} ex \cdot \frac{\partial ex}{\partial Wv} \quad (48)$$

$$= 2 \cdot \sum_{x=0}^{8} ex \cdot av = 0$$

By substituting equation (46) into equation (48), equation (49) is obtained.

$$\sum_{x=0}^{8} \left( av \cdot \sum_{y=0}^{5} ay \cdot Wy \right) = \sum_{x=0}^{8} av \cdot Mx \quad (49)$$

For example, the sweep-out method (Gauss-Jordan elimination) is applied to the normal equations consisting of six equations obtained by substituting one of the integers from 0 to 5 into v in equation (49), thereby obtaining wy. As stated above, w0 is the horizontal gradient m, w1 is the vertical gradient q, w2 is the intercept p, w3 is s, w4 is t, and w5 is u.

As discussed above, by applying the method of least squares to the equations in which the pixel value M and the pixel value B are set, the horizontal gradient m, the vertical gradient q, and the intercepts p, s, t, and u can be determined.

Since the intercept p is positioned at the point when the indexes i and k are 0, i.e., the mixture ratio α at the central position, it is output.

A description has been given with reference to equations (35) through (43), by assuming that the pixel value of the pixel contained in the mixed area is M, and the pixel value of the pixel contained in the background area is B. In this case, it is necessary to set normal equations for each of the cases where the designated pixel is contained in the covered background area, or the designated pixel is contained in the uncovered background area.

For example, if the mixture ratio α of the pixel contained in the covered background area in frame #n shown in FIG. 49 is determined, C04 through C08 of the pixels in frame #n and the pixel values P04 through P08 of the pixels in frame #n−1 are set in the normal equations.

If the mixture ratio α of the pixels contained in the uncovered background area in frame #n shown in FIG. 50 is determined, C28 through C32 of the pixels in frame #n and the pixel values N28 through N32 of the pixels in frame #n+1 are set in the normal equations.

Figure 60:
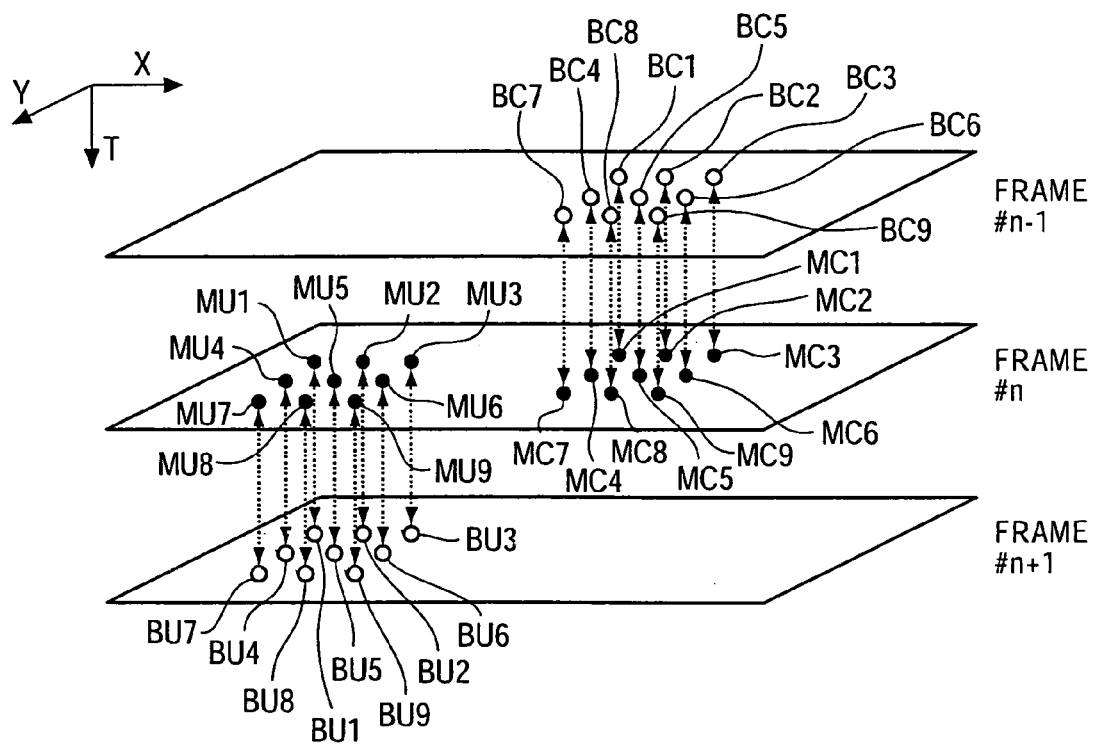
FIG. 60 illustrates the relationships of the pixels in a plurality of frames when the mixture ratio α is calculated.

Moreover, if, for example, the mixture ratio α of the pixel contained in the covered background area shown in FIG. 60 is calculated, the following equations (50) through (58) are set. The pixel value of the pixel for which the mixture ratio α is calculated is Mc5.

$Mc1=(-1) \cdot Bc1 \cdot m+(-1) \cdot Bc1 \cdot q+Bc1 \cdot p+(-1) \cdot s+(-1) \cdot t+u$ (50)

$Mc2=(0) \cdot Bc2 \cdot m+(-1) \cdot Bc2 \cdot q+Bc2 \cdot p+(0) \cdot s+(-1) \cdot t+u$ (51)

$Mc3=(+1) \cdot Bc3 \cdot m+(-1) \cdot Bc3 \cdot q+Bc3 \cdot p+(+1) \cdot s+(-1) \cdot t+u$ (52)

$Mc4=(-1) \cdot Bc4 \cdot m+(0) \cdot Bc4 \cdot q+Bc4 \cdot p+(-1) \cdot s+(0) \cdot t+u$ (53)

$Mc5=(0) \cdot Bc5 \cdot m+(0) \cdot Bc5 \cdot q+Bc5 \cdot p+(0) \cdot s+(0) \cdot t+u$ (54)

$Mc6=(+1) \cdot Bc6 \cdot m+(0) \cdot Bc6 \cdot q+Bc6 \cdot p+(+1) \cdot s+(0) \cdot t+u$ (55)

$Mc7=(-1) \cdot Bc7 \cdot m+(+1) \cdot Bc7 \cdot q+Bc7 \cdot p+(-1) \cdot s+(+1) \cdot t+u$ (56)

$Mc8=(0) \cdot Bc8 \cdot m+(+1) \cdot Bc8 \cdot q+Bc8 \cdot p+(0) \cdot s+(+1) \cdot t+u$ (57)

$Mc9=(+1) \cdot Bc9 \cdot m+(+1) \cdot Bc9 \cdot q+Bc9 \cdot p+(+1) \cdot s+(+1) \cdot t+u$ (58)

When the mixture ratio α of the pixel contained in the covered background area in frame #n is calculated, the pixel values Bc1 through Bc9 of the pixels of the background area in frame #n−1 in equations (50) through (58), respectively, corresponding to the pixels in frame #n are used.

If, for example, the mixture ratio α of the pixel contained in the uncovered background area shown in FIG. 60 is calculated, the following equations (59) through (67) are set. The pixel value of the pixel for which the mixture ratio α is calculated is Mu5.

$Mu1=(-1) \cdot Bu1 \cdot m+(-1) \cdot Bu1 \cdot q+Bu1 \cdot p+(-1) \cdot s+(-1) \cdot t+u$ (59)

$Mu2=(0) \cdot Bu2 \cdot m+(-1) \cdot Bu2 \cdot q+Bu2 \cdot p+(0) \cdot s+(-1) \cdot t+u$ (60)

$Mu3=(+1) \cdot Bu3 \cdot m+(-1) \cdot Bu3 \cdot q+Bu3 \cdot p+(+1) \cdot s+(-1) \cdot t+u$ (61)

$Mu4=(-1) \cdot Bu4 \cdot m+(0) \cdot Bu4 \cdot q+Bu4 \cdot p+(-1) \cdot s+(0) \cdot t+u$ (62)

$Mu5=(0) \cdot Bu5 \cdot m+(0) \cdot Bu5 \cdot q+Bu5\, p+(0) \cdot s+(0) \cdot t+u$ (63)

$Mu6=(+1) \cdot Bu6 \cdot m+(0) \cdot Bu6 \cdot q+Bu6 \cdot p+(+1) \cdot s+(0) \cdot t+u$ (64)

$Mu7=(-1)\, Bu7 \cdot m+(+1)\, Bu7 \cdot q+Bu7 \cdot p+(-1) \cdot s+(+1) \cdot t+u$ (65)

$Mu8=(0) \cdot Bu8 \cdot m+(+1) \cdot Bu8 \cdot q+Bu8 \cdot p+(0) \cdot s+(+1) \cdot t+u$ (66)

$Mu9=(+1)\, Bu9 \cdot m+(+1) \cdot Bu9 \cdot q+Bu9 \cdot p+(+1) \cdot s+(+1) \cdot t+u$ (67)

When the mixture ratio α of the pixel contained in the uncovered background area in frame #n is calculated, the pixel values Bu1 through Bu9 of the pixels of the background area in frame #n+1 in equations (59) through (67), respectively, corresponding to the pixels in frame #n are used.

Figure 61:
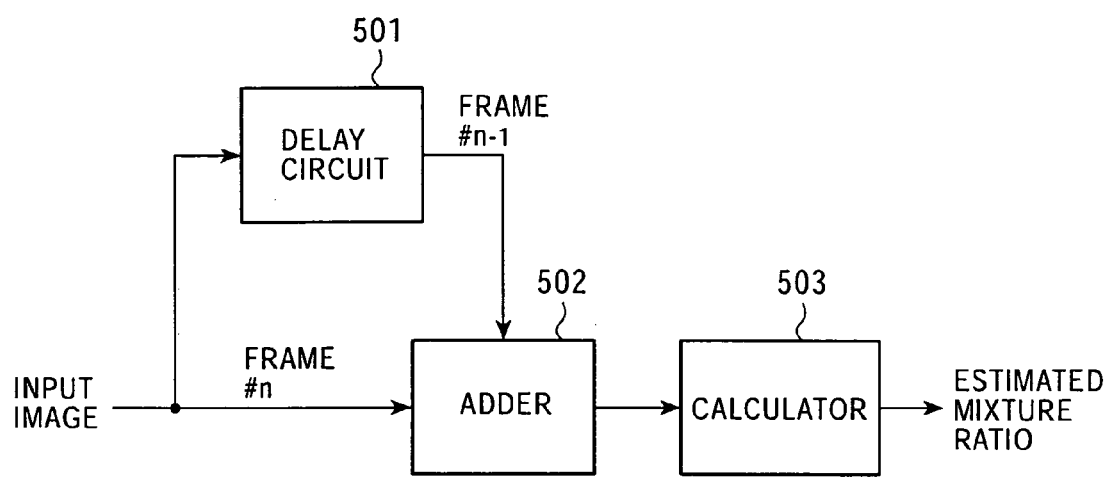
FIG. 61 is a block diagram illustrating another configuration of the mixture-ratio estimation processor 401.

FIG. 61 is a block diagram illustrating the configuration of the estimated-mixture-ratio processor 401. An image input into the estimated-mixture-ratio processor 401 is supplied to a delay portion 501 and an adder 502.

A delay circuit 221 delays the input image for one frame, and supplies the image to the adder 502. When frame #n is supplied as the input image to the adder 502, the delay circuit 221 supplies frame #n−1 to the adder 502.

The adder 502 sets the pixel value of the pixel adjacent to the pixel for which the mixture ratio α is calculated, and the pixel value of frame #n−1 in the normal equation. For example, the adder 502 sets the pixel values Mc1 through Mc9 and the pixel values Bc1 through Bc9 in the normal equations based on equations (50) through (58), respectively. The adder 502 supplies the normal equations in which the pixel values are set to a calculator 503.

The calculator 503 determines the estimated mixture ratio by solving the normal equations supplied from the adder 502 by, for example, a sweep-out method, and outputs the determined estimated mixture ratio.

In this manner, the estimated-mixture-ratio processor 401 is able to calculate the estimated mixture ratio based on the input image, and supplies it to the mixture-ratio determining portion 403.

The estimated-mixture-ratio processor 402 is configured similar to the estimated-mixture-ratio processor 401, and an explanation thereof is thus omitted.

Figure 62:
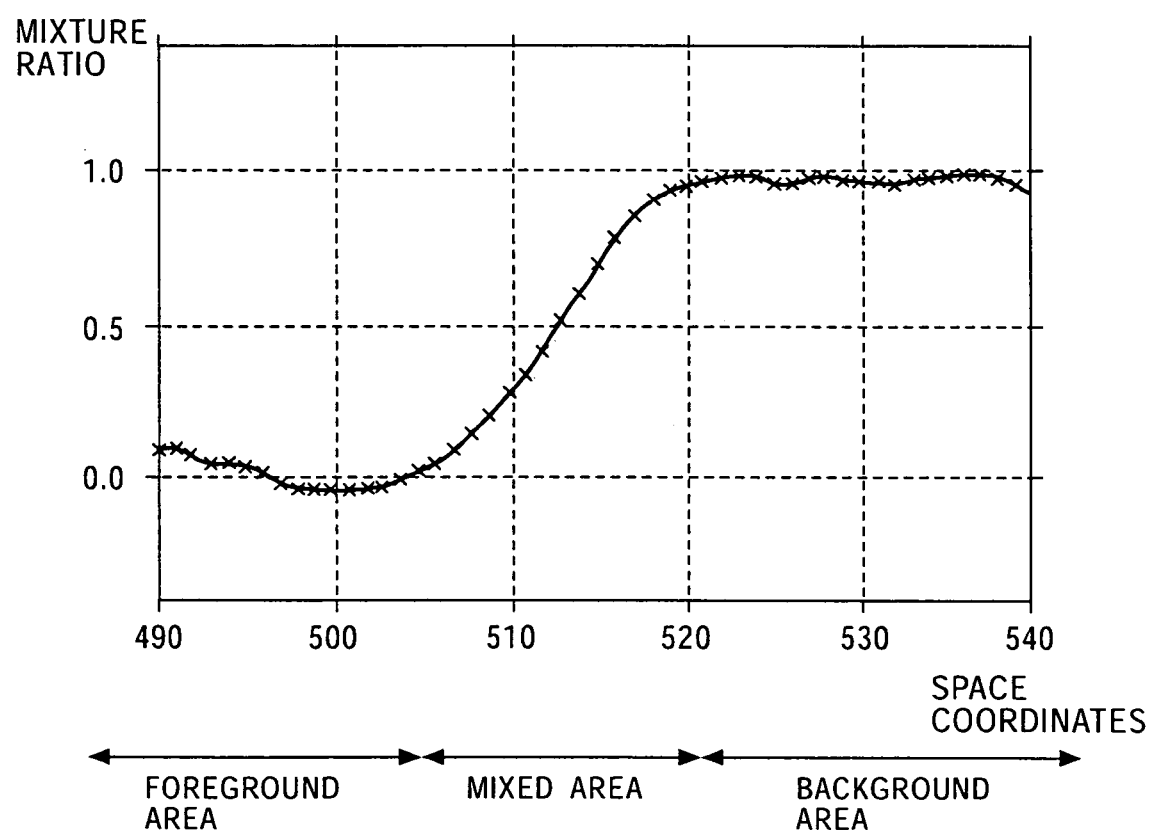
FIG. 62 illustrates an example of the estimated mixture ratio.

FIG. 62 illustrates an example of the estimated mixture ratio calculated by the estimated-mixture-ratio processor 401. The estimated mixture ratio shown in FIG. 62 is the result represented by one line and obtained by performing the calculation by generating equations in units of 7×7-pixel blocks when the movement v of the foreground corresponding to the object moving with constant velocity is 11.

The estimated mixture ratio changes almost linearly in the mixed area, as shown in FIG. 48.

The mixture-ratio determining portion 403 sets the mixture ratio based on the area information supplied from the area specifying unit 101 and indicating to which of the foreground area, the background area, the covered background area, or the uncovered background area the pixel for which the mixture ratio α is to be calculated belongs. The mixture-ratio determining portion 403 sets the mixture ratio to 0 when the corresponding pixel belongs to the foreground area, and sets the mixture ratio to 1 when the corresponding pixel belongs to the background area. When the corresponding pixel belongs to the covered background area, the mixture-ratio determining portion 403 sets the mixture ratio to the estimated mixture ratio supplied from the estimated-mixture-ratio processor 401. When the corresponding pixel belongs to the uncovered background area, the mixture-ratio determining portion 403 sets the mixture ratio to the estimated mixture ratio supplied from the estimated-mixture-ratio processor 402. The mixture-ratio determining portion 403 outputs the mixture ratio which has been set based on the area information.

The calculation processing for the mixture ratio performed by the mixture-ratio calculator 102 when the estimated-mixture-ratio processor 401 is configured as shown in FIG. 61 is discussed below with reference to the flowchart of FIG. 63. In step S501, the mixture-ratio calculator 102 obtains area information supplied from the area specifying unit 101. In step S502, the estimated-mixture-ratio processor 401 executes the processing for estimating the mixture ratio by using a model corresponding to a covered background area, and supplies the estimated mixture ratio to the mixture-ratio determining portion 403. Details of the processing for estimating the mixture ratio are discussed below with reference to the flowchart of FIG. 64.

In step S503, the estimated-mixture-ratio processor 402 executes the processing for estimating the mixture ratio by using a model corresponding to an uncovered background area, and supplies the estimated mixture ratio to the mixture-ratio determining portion 403.

In step S504, the mixture-ratio calculator 102 determines whether the mixture ratios have been estimated for the whole frame. If it is determined that the mixture ratios have not yet been estimated for the whole frame, the process returns to step S502, and the processing for estimating the mixture ratio for the subsequent pixel is executed.

If it is determined in step S504 that the mixture ratios have been estimated for the whole frame, the process proceeds to step S505. In step S505, the mixture-ratio determining portion 403 sets the mixture ratio based on the area information supplied from the area specifying unit 101 and indicating to which of the foreground area, the background area, the covered background area, or the uncovered background area the pixel for which the mixture ratio is to be calculated belongs. The mixture-ratio determining portion 403 sets the mixture ratio to 0 when the corresponding pixel belongs to the foreground area, and sets the mixture ratio to 1 when the corresponding pixel belongs to the background area. When the corresponding pixel belongs to the covered background area, the mixture-ratio determining portion 403 sets the estimated mixture ratio supplied from the estimated-mixture-ratio processor 401 as the mixture ratio. When the corresponding pixel belongs to the uncovered background area, the mixture-ratio determining portion 403 sets the estimated mixture ratio supplied from the estimated-mixture-ratio processor 402 as the mixture ratio. The processing is then completed.

As discussed above, the mixture-ratio calculator 102 is able to calculate the mixture ratio α, which indicates a feature quantity corresponding to each pixel, based on the area information supplied from the area specifying unit 101, and the input image.

By using the mixture ratio α, it is possible to separate the foreground components and the background components contained in the pixel value while maintaining the information of the motion blur contained in the image corresponding to the moving object.

If the image is synthesized based on the mixture ratio α, it is possible to create an image containing motion blur that matches the speed of the moving object which faithfully reflects the real world.

Figure 63:
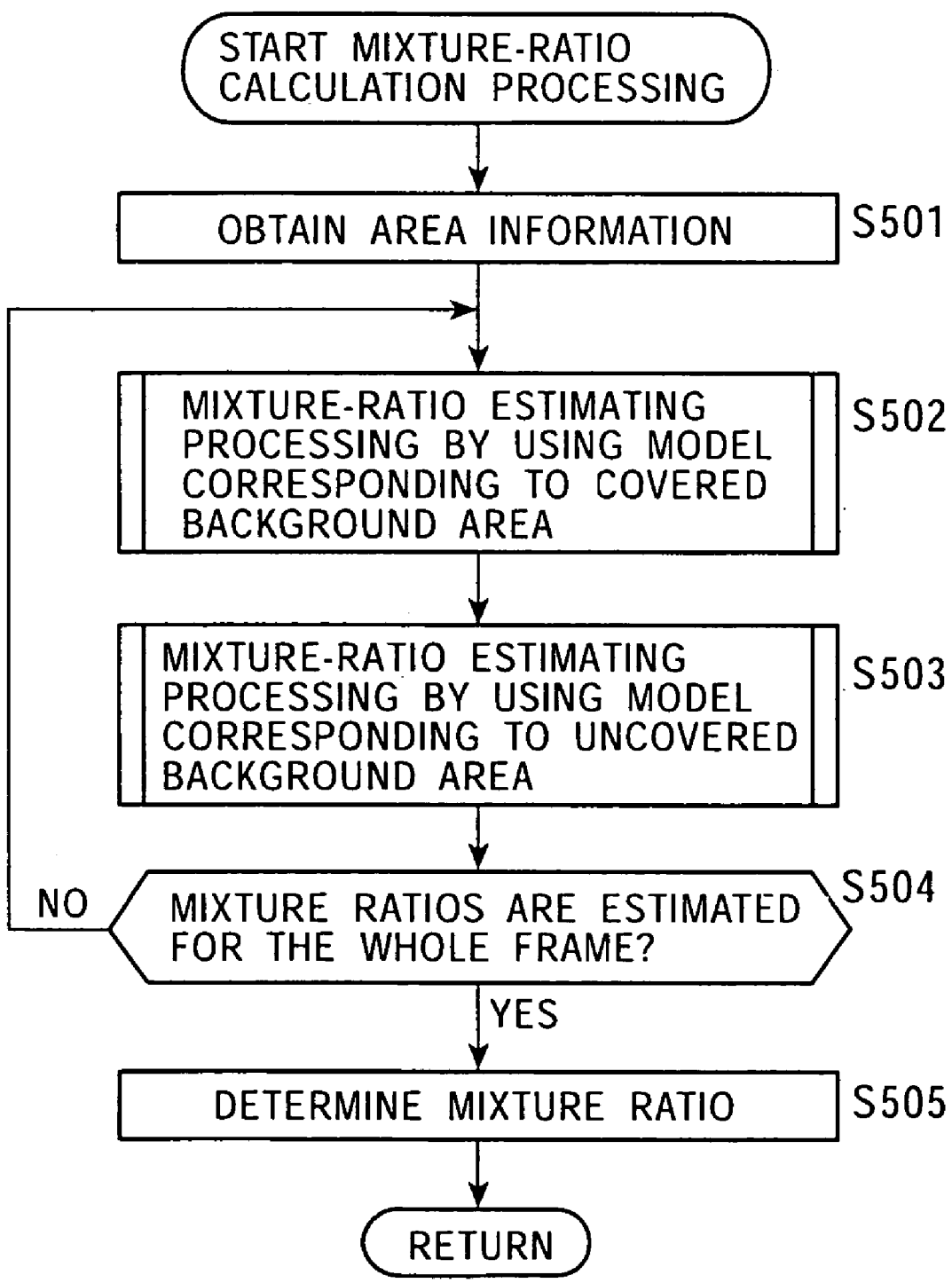
FIG. 63 is a flowchart illustrating the mixture-ratio calculating processing.
Figure 64:
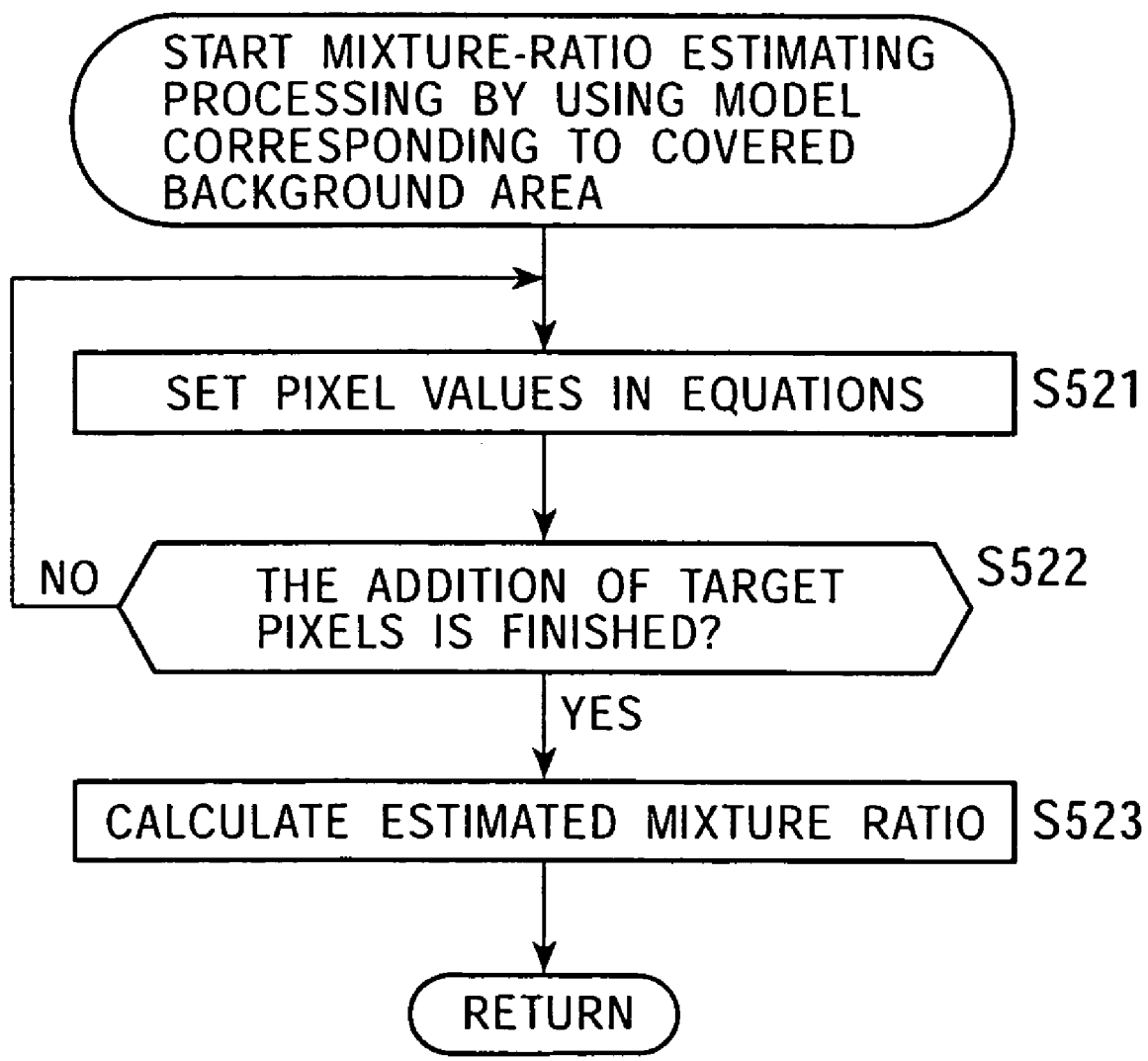
FIG. 64 is a flowchart illustrating the processing for estimating the mixture ratio by using a model corresponding to a covered background area.

A description is now given of, with reference to the flowchart of FIG. 64, the mixture-ratio estimating processing by using a model corresponding to the covered background area in step S502 of FIG. 63.

In step S521, the adder 502 sets the pixel value contained in the input image and the pixel value contained in the image supplied from the delay circuit 221 in a normal equation corresponding to a model of the covered background area.

In step S522, the estimated-mixture-ratio processor 401 determines whether the setting of the target pixels is finished. If it is determined that the setting of the target pixels is not finished, the process returns to step S521, and the processing for setting the pixel values in the normal equation is repeated.

If it is determined in step S522 that the setting for the target pixels is finished, the process proceeds to step S523. In step S523, a calculator 173 calculates the estimated mixture ratio based on the normal equations in which the pixels values are set, and outputs the calculated mixture ratio.

As discussed above, the estimated-mixture-ratio processor 401 is able to calculate the estimated mixture ratio based on the input image.

The mixture-ratio estimating processing by using a model corresponding to the uncovered background area in step S153 of FIG. 63 is similar to the processing indicated by the flowchart of FIG. 64 by using the normal equations corresponding to a model of the uncovered background area, and an explanation thereof is thus omitted.

The embodiment has been described, assuming that the object corresponding to the background is stationary. However, the above-described mixture-ratio calculation processing can be applied even if the image corresponding to the background area contains motion. For example, if the image corresponding to the background area is uniformly moving, the estimated-mixture-ratio processor 401 shifts the overall image in accordance with this motion, and performs processing in a manner similar to the case in which the object corresponding to the background is stationary. If the image corresponding to the background area contains locally different motions, the estimated-mixture-ratio processor 401 selects the pixels corresponding to the motions as the pixels belonging to the mixed area, and executes the above-described processing.

Figure 65:
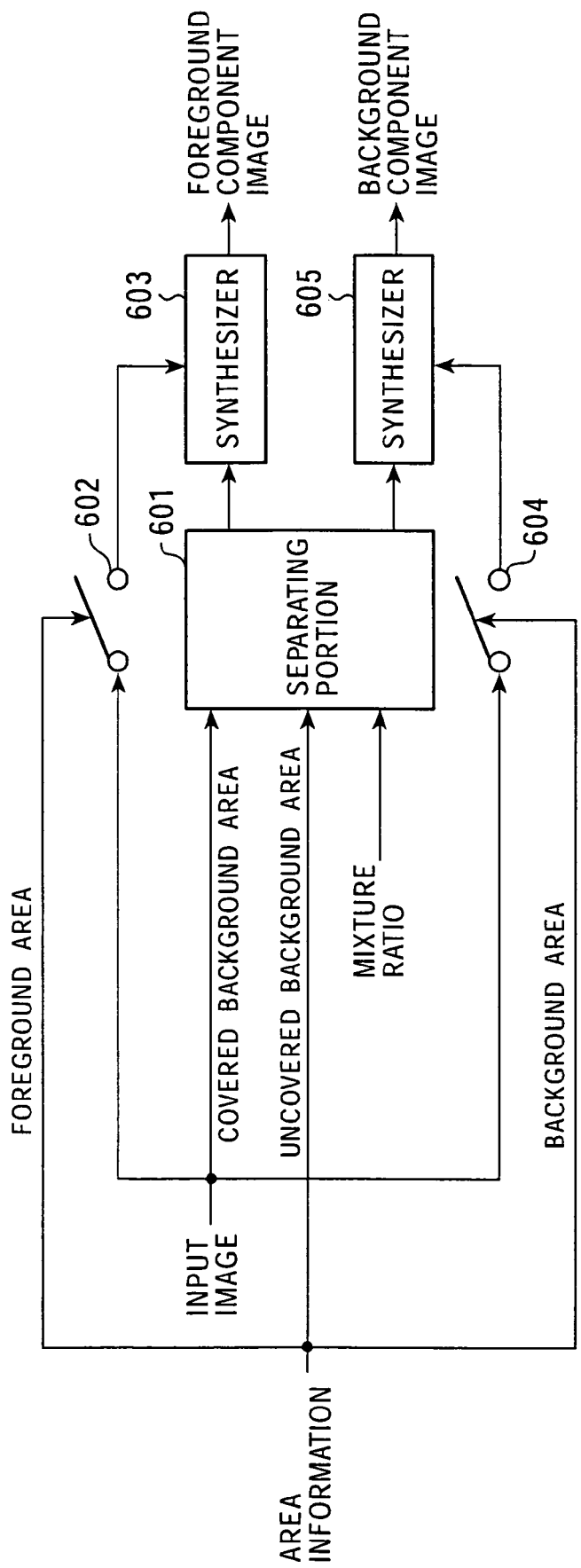
FIG. 65 is a block diagram illustrating an example of the configuration of a background/foreground separator 105.

The foreground/background separator 105 is discussed below. FIG. 65 is a block diagram illustrating an example of the configuration of the foreground/background separator 105. The input image supplied to the foreground/background separator 105 is supplied to a separating portion 601, a switch 602, and a switch 604. The area information supplied from the area specifying unit 103 and indicating the information of the covered background area and the uncovered background area is supplied to the separating portion 601. The area information indicating the foreground area is supplied to the switch 602. The area information indicating the background area supplied to the switch 604.

The mixture ratio α supplied from the mixture-ratio calculator 104 is supplied to the separating portion 601.

The separating portion 601 separates the foreground components from the input image based on the area information indicating the covered background area, the area information indicating the uncovered background area, and the mixture ratio α, and supplies the separated foreground components to a synthesizer 603. The separating portion 601 also separates the background components from the input image, and supplies the separated background components to a synthesizer 605.

The switch 602 is closed when a pixel corresponding to the foreground is input based on the area information indicating the foreground area, and supplies only the pixels corresponding to the foreground contained in the input image to the synthesizer 603.

The switch 604 is closed when a pixel corresponding to the background is input based on the area information indicating the background area, and supplies only the pixels corresponding to the background contained in the input image to the synthesizer 605.

The synthesizer 603 synthesizes a foreground component image based on the foreground components supplied from the separating portion 601 and the pixels corresponding to the foreground supplied from the switch 602, and outputs the synthesized foreground component image. Since the foreground area and the mixed area do not overlap, the synthesizer 603 applies, for example, logical OR to the foreground components and the foreground pixels, thereby synthesizing the foreground component image.

In the initializing processing executed at the start of the synthesizing processing for the foreground component image, the synthesizer 603 stores an image whose pixel values are all 0 in a built-in frame memory. Then, in the synthesizing processing for the foreground component image, the synthesizer 603 stores the foreground component image (overwrites the previous image by the foreground component image). Accordingly, 0 is stored in the pixels corresponding to the background area in the foreground component image output from the synthesizer 603.

The synthesizer 605 synthesizes a background component image based on the background components supplied from the separating portion 601 and the pixels corresponding to the background supplied from the switch 604, and outputs the synthesized background component image. Since the background area and the mixed area do not overlap, the synthesizer 605 applies, for example, logical OR to the background components and the background pixels, thereby synthesizing the background component image.

In the initializing processing executed at the start of the synthesizing processing for the background component image, the synthesizer 605 stores an image whose pixel values are all 0 in a built-in frame memory. Then, in the synthesizing processing for the background component image, the synthesizer 605 stores the background component image (overwrites the previous image by the background component image). Accordingly, 0 is stored in the pixels corresponding to the foreground area in the background component image output from the synthesizer 605.

Figure 66B:
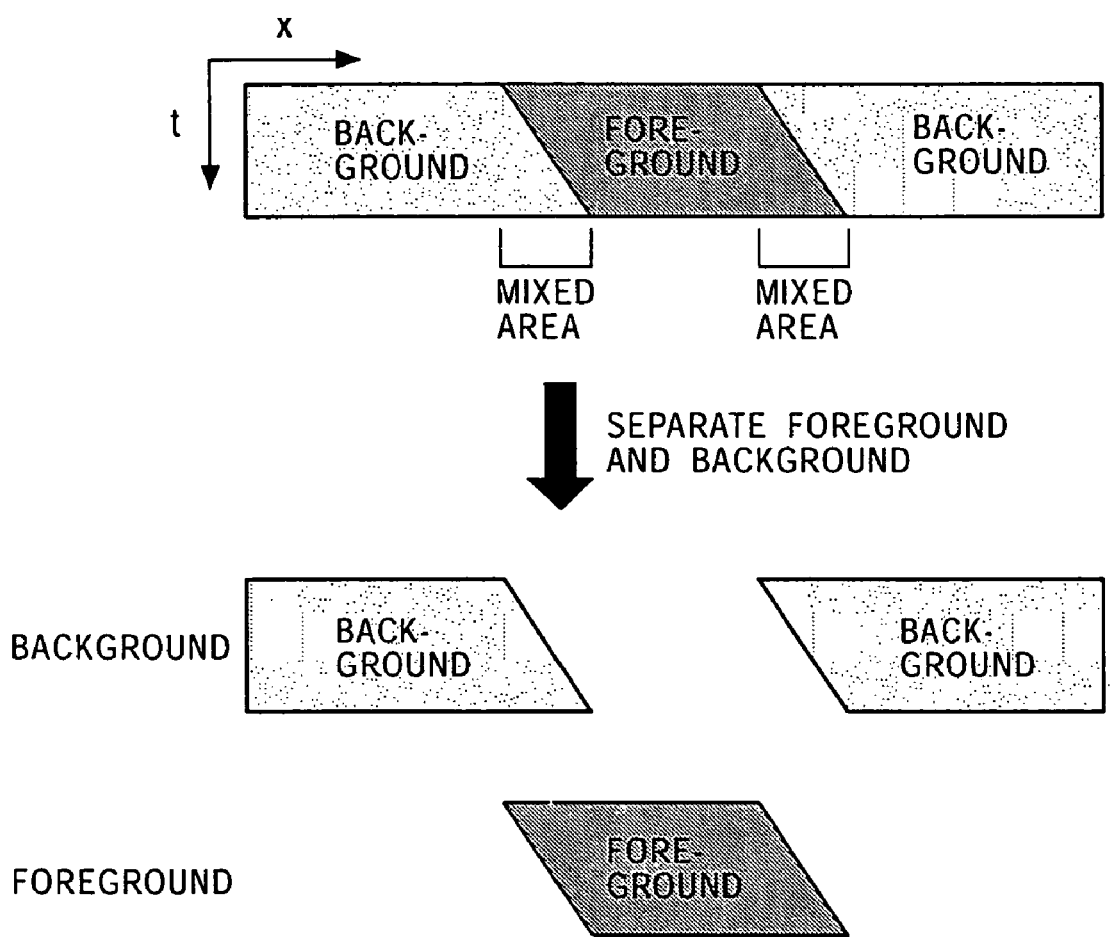
FIG. 66B illustrates a model obtained by expanding pixels of one line in the time direction.

FIGS. 66A and 66B illustrate the input image input into the foreground/background separator 105 and the foreground component image and the background component image output from the foreground/background separator 105.

FIG. 66A is a schematic diagram of an image to be displayed, and FIG. 66B is a model in which pixels for one line corresponding to the image shown in FIG. 66A and containing pixels belonging to the foreground area, pixels belonging to the background area, and pixels belonging to the mixed area are expanded in the time direction.

As shown in FIGS. 66A and 66B, the background component image output from the foreground/background separator 105 consists of the pixels belonging to the background area and the background components contained in the pixels of the mixed area.

As shown in FIGS. 66A and 66B, the foreground component image output from the foreground/background separator 105 consists of the pixel belonging to the foreground area and the foreground components contained in the pixels of the mixed area.

The pixel values of the pixels in the mixed area are separated into the background components and the foreground components by the foreground/background separator 105. The separated background components form the background component image together with the pixels belonging to the background area. The separated foreground components form the foreground component image together with the pixels belonging to the foreground area.

As discussed above, in the foreground component image, the pixel values of the pixels corresponding to the background area are set to 0, and significant pixel values are set in the pixels corresponding to the foreground area and the pixels corresponding to the mixed area. Similarly, in the background component image, the pixel values of the pixels corresponding to the foreground area are set to 0, and significant pixel values are set in the pixels corresponding to the background area and the pixels corresponding to the mixed area.

A description is given below of the processing executed by the separating portion 601 for separating the foreground components and the background components from the pixels belonging to the mixed area.

Figure 67:
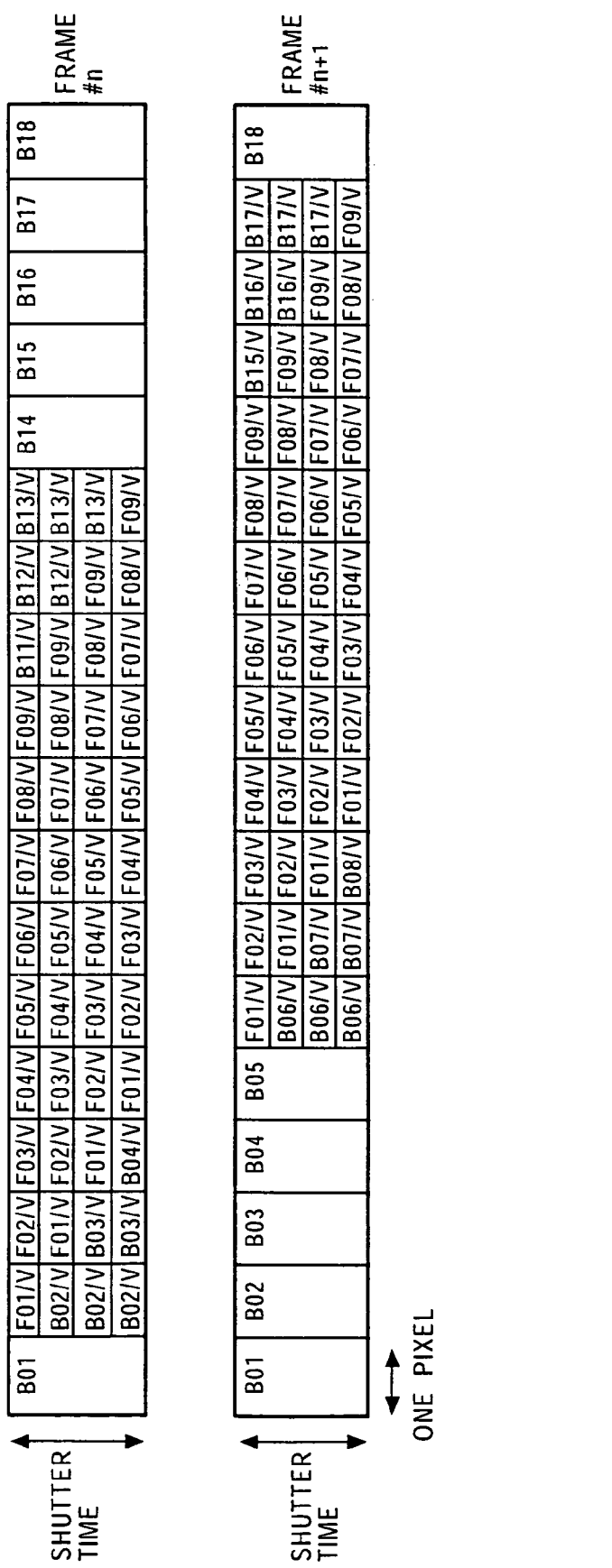
FIG. 67 illustrates a model in which pixel values are expanded in the time direction and the period corresponding to the shutter time is divided.

FIG. 67 illustrates a model of an image indicating foreground components and background components in two frames including a foreground object moving from the left to the right in FIG. 67. In the model of the image shown in FIG. 67, the amount of movement v is 4, and the number of virtual divided portions is 4.

In frame #n, the leftmost pixel and the fourteenth through eighteenth pixels from the left consist of only the background components and belong to the background area. In frame #n, the second through fourth pixels from the left contain the background components and the foreground components, and belong to the uncovered background area. In frame #n, the eleventh through thirteenth pixels from the left contain background components and foreground components, and belong to the covered background area. In frame #n, the fifth through tenth pixels from the left consist of only the foreground components, and belong to the foreground area.

In frame #n+1, the first through fifth pixels from the left and the eighteenth pixel from the left consist of only the background components, and belong to the background area. In frame #n+1, the sixth through eighth pixels from the left contain background components and foreground components, and belong to the uncovered background area. In frame #n+1, the fifteenth through seventeenth pixels from the left contain background components and foreground components, and belong to the covered background area. In frame #n+1, the ninth through fourteenth pixels from the left consist of only the foreground components, and belong to the foreground area.

Figure 68:
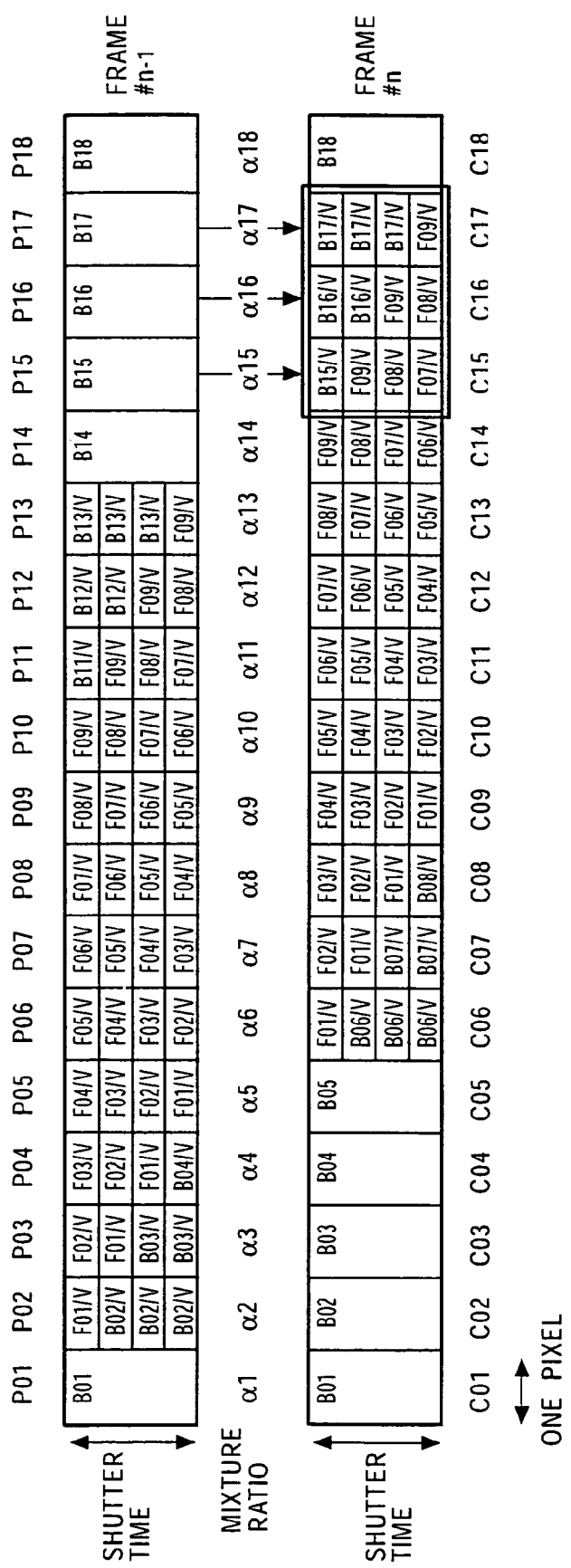
FIG. 68 illustrates a model in which pixel values are expanded in the time direction and the period corresponding to the shutter time is divided.

FIG. 68 illustrates the processing for separating the foreground components from the pixels belonging to the covered background area. In FIG. 68, $\alpha 1$ through $\alpha 18$ indicate mixture ratios of the individual pixels of frame #n. In FIG. 68, the fifteenth through seventeenth pixels from the left belong to the covered background area.

The pixel value C15 of the fifteenth pixel from the left in frame #n can be expressed by equation (68):

$$C15 = B15/v + F09/v + F08/v + F07/v \quad (68)$$
$$= \alpha 15 \cdot B15 + F09/v + F08/v + F07/v$$
$$= \alpha 15 \cdot P15 + F09/v + F08/v + F07/v$$

where α15 indicates the mixture ratio of the fifteenth pixel from the left in frame #n, and P15 designates the pixel value of the fifteenth pixel from the left in frame #n−1.

The sum f15 of the foreground components of the fifteenth pixel from the left in frame #n can be expressed by equation (69) based on equation (68).

$$f15 = F09/v + F08/v + F07/v \quad (69)$$
$$= C15 - \alpha 15 \cdot P15$$

Similarly, the sum f16 of the foreground components of the sixteenth pixel from the left in frame #n can be expressed by equation (70), and the sum f17 of the foreground components of the seventeenth pixel from the left in frame #n can be expressed by equation (71).

$$f16 = C16 - \alpha 16 \cdot P16 \quad (70)$$

$$f17 = C17 - \alpha 17 \cdot P17 \quad (71)$$

In this manner, the foreground components fc contained in the pixel value C of the pixel belonging to the covered background area can be expressed by equation (72):

$$fc = C - \alpha \cdot P \quad (72)$$

where P designates the pixel value of the corresponding pixel in the previous frame.

Figure 69:
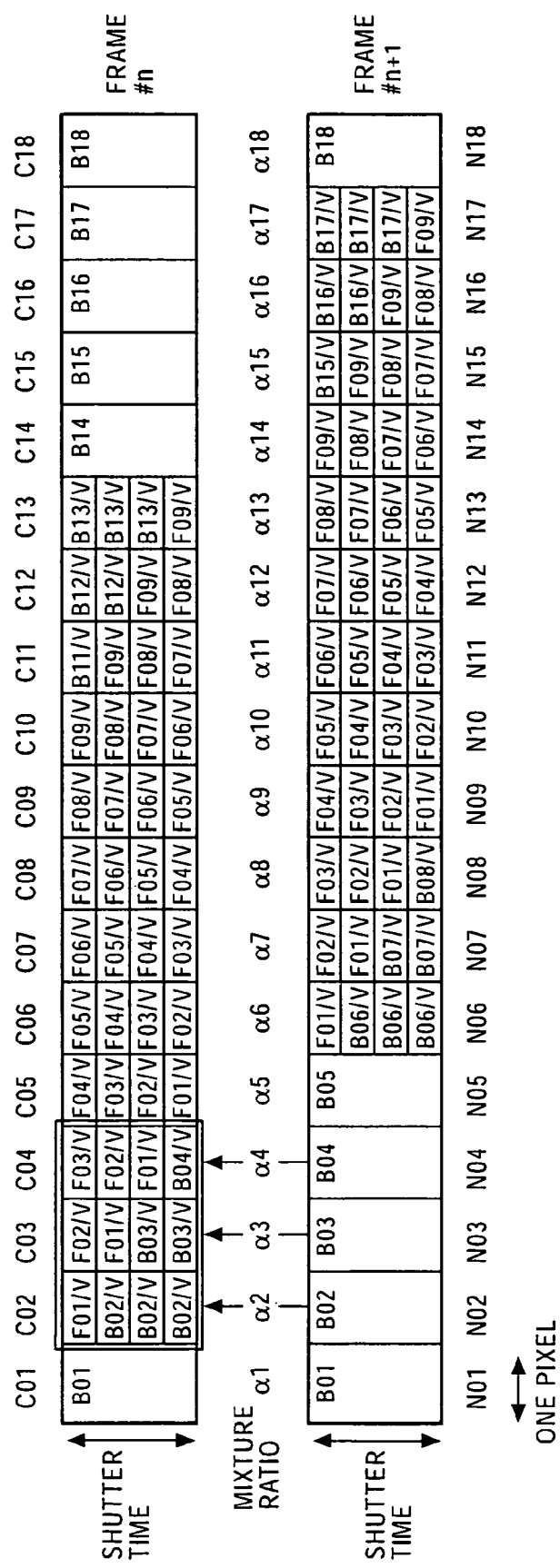
FIG. 69 illustrates a model in which pixel values are expanded in the time direction and the period corresponding to the shutter time is divided.

FIG. 69 illustrates the processing for separating the foreground components from the pixels belonging to the uncovered background area. In FIG. 69, α1 through α18 indicate mixture ratios of the individual pixels of frame #n. In FIG. 69, the second through fourth pixels from the left belong to the uncovered background area.

The pixel value C02 of the second pixel from the left in frame #n can be expressed by equation (73):

$$C02 = B02/v + B02/v + B02/v + F01/v \quad (73)$$
$$= \alpha 2 \cdot B02 + F01/v$$
$$= \alpha 2 \cdot N02 + F01/v$$

where α2 indicates the mixture ratio of the second pixel from the left in frame #n, and N02 designates the pixel value of the second pixel from the left in frame #n+1.

The sum f02 of the foreground components of the second pixel from the left in frame #n can be expressed by equation (74) based on equation (73).

$$f02 = F01/v \quad (74)$$
$$= C02 - \alpha 2 \cdot N02$$

Similarly, the sum f03 of the foreground components of the third pixel from the left in frame #n can be expressed by equation (75), and the sum f04 of the foreground components of the fourth pixel from the left in frame #n can be expressed by equation (76).

$$f03 = C03 - \alpha 3 \cdot N03 \quad (75)$$

$$f04 = C04 - \alpha 4 \cdot N04 \quad (76)$$

In this manner, the foreground components fu contained in the pixel value C of the pixel belonging to the uncovered background area can be expressed by equation (77):

$$fu = C - \alpha \cdot N \quad (77)$$

where N designates the pixel value of the corresponding pixel in the subsequent frame.

As discussed above, the separating portion 601 is able to separate the foreground components from the pixels belonging to the mixed area and the background components from the pixels belonging to the mixed area based on the information indicating the covered background area and the information indicating the uncovered background area contained in the area information, and the mixture ratio α for each pixel.

Figure 70:
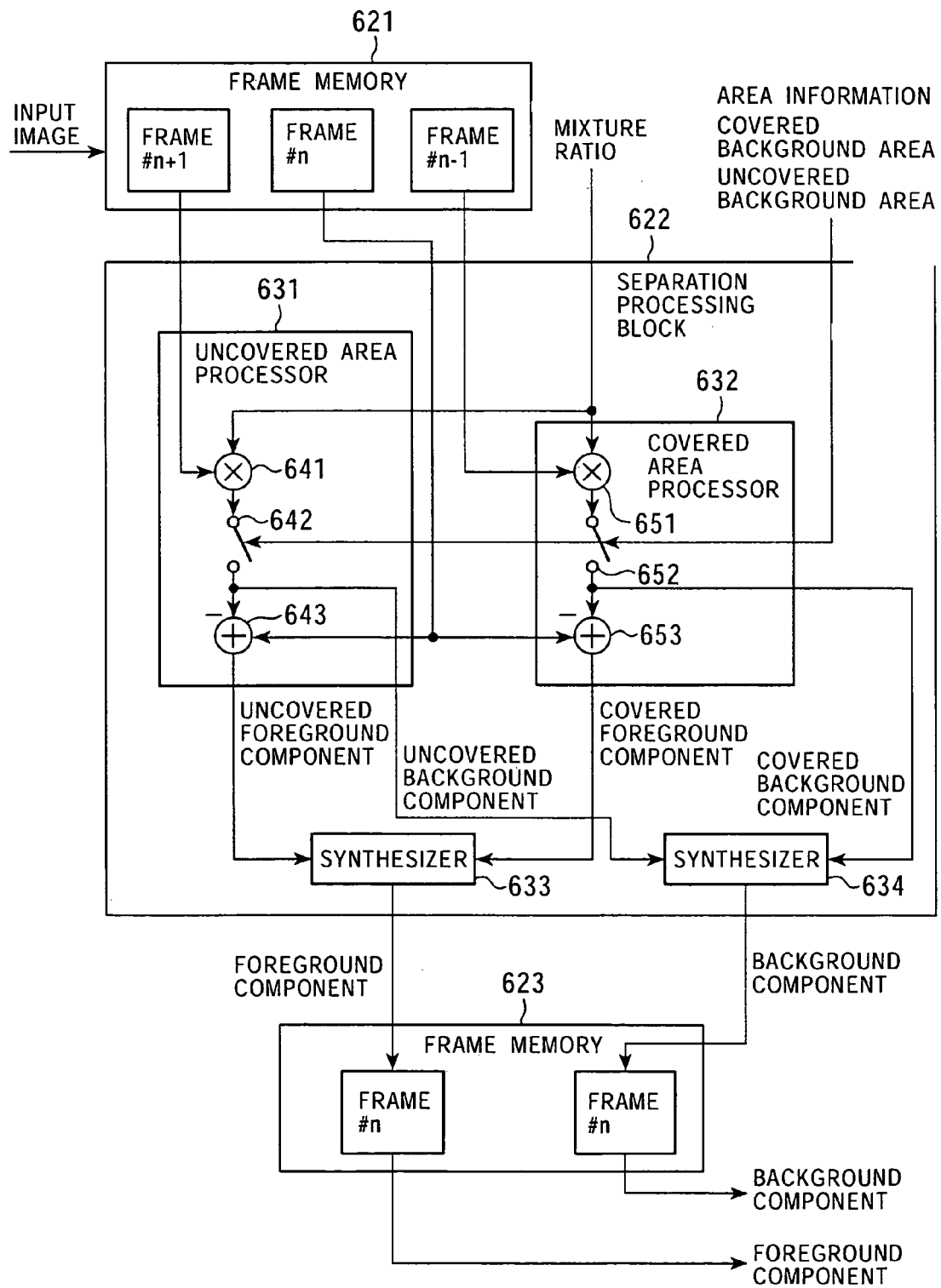
FIG. 70 is a block diagram illustrating an example of the configuration of a separating portion 601.

FIG. 70 is a block diagram illustrating an example of the configuration of the separating portion 601 for executing the above-described processing. An image input into the separating portion 601 is supplied to a frame memory 621, and the area information indicating the covered background area and the uncovered background area supplied from the mixture-ratio calculator 104 and the mixture ratio α are supplied to a separation processing block 622.

The frame memory 621 stores the input images in units of frames. When a frame to be processed is frame #n, the frame memory 621 stores frame #n−1, which is the frame one frame before frame #n, frame #n, and frame #n+1, which is the frame one frame after frame #n.

The frame memory 621 supplies the corresponding pixels in frame #n−1, frame #n, and frame #n+1 to the separation processing block 622.

The separation processing block 622 applies the calculations discussed with reference to FIGS. 68 and 69 to the pixel values of the corresponding pixels in frame #n−1, frame #n, and frame #n+1 supplied from the frame memory 621 based on the area information indicating the covered background area and the uncovered background area and the mixture ratio α so as to separate the foreground components and the background components from the pixels belonging to the mixed area in frame #n, and supplies them to a frame memory 623.

The separation processing block 622 is formed of an uncovered area processor 631, a covered area processor 632, a synthesizer 633, and a synthesizer 634.

A multiplier 641 of the uncovered area processor 631 multiplies the pixel value of the pixel in frame #n+1 supplied from the frame memory 621 by the mixture ratio α, and outputs the resulting pixel value to a switch 642. The switch 642 is closed when the pixel of frame #n (corresponding to the pixel in frame #n+1) supplied from the frame memory 621 belongs to the uncovered background area, and supplies the pixel value multiplied by the mixture ratio α supplied from the multiplier 641 to a calculator 643 and the synthesizer 634. The value obtained by multiplying the pixel value of the pixel in frame #n+1 by the mixture ratio α output from the switch 642 is equivalent to the background components of the pixel value of the corresponding pixel in frame #n.

The calculator 643 subtracts the background components supplied from the switch 642 from the pixel value of the pixel in frame #n supplied from the frame memory 621 so as to obtain the foreground components. The calculator 643 supplies the foreground components of the pixel in frame #n belonging to the uncovered background area to the synthesizer 633.

A multiplier 651 of the covered area processor 632 multiplies the pixel value of the pixel in frame #n−1 supplied from the frame memory 621 by the mixture ratio α, and outputs the resulting pixel value to a switch 652. The switch 652 is closed when the pixel of frame #n (corresponding to the pixel in frame #n−1) supplied from the frame memory 621 belongs to the covered background area, and supplies the pixel value multiplied by the mixture ratio α supplied from the multiplier 651 to a calculator 653 and the synthesizer 634. The value obtained by multiplying the pixel value of the pixel in frame #n−1 by the mixture ratio α output from the switch 652 is equivalent to the background components of the pixel value of the corresponding pixel in frame #n.

The calculator 653 subtracts the background components supplied from the switch 652 from the pixel value of the pixel in frame #n supplied from the frame memory 621 so as to obtain the foreground components. The calculator 653 supplies the foreground components of the pixel in frame #n belonging to the covered background area to the synthesizer 633.

The synthesizer 633 combines the foreground components of the pixels belonging to the uncovered background area and supplied from the calculator 643 with the foreground components of the pixels belonging to the covered background area and supplied from the calculator 653, and supplies the synthesized foreground components to the frame memory 623.

The synthesizer 634 combines the background components of the pixels belonging to the uncovered background area and supplied from the switch 642 with the background components of the pixels belonging to the covered background area and supplied from the switch 652, and supplies the synthesized background components to the frame memory 623.

The frame memory 623 stores the foreground components and the background components of the pixels in the mixed area of frame #n supplied from the separation processing block 622.

The frame memory 623 outputs the stored foreground components of the pixels in the mixed area in frame #n and the stored background components of the pixels in the mixed area in frame #n.

By utilizing the mixture ratio α, which indicates the feature quantity, the foreground components and the background components contained in the pixel values can be completely separated.

The synthesizer 603 combines the foreground components of the pixels in the mixed area in frame #n output from the separating portion 601 with the pixels belonging to the foreground area so as to generate a foreground component image. The synthesizer 605 combines the background components of the pixels in the mixed area in frame #n output from the separating portion 601 with the pixels belonging to the background area so as to generate a background component image.

Figure 71A:
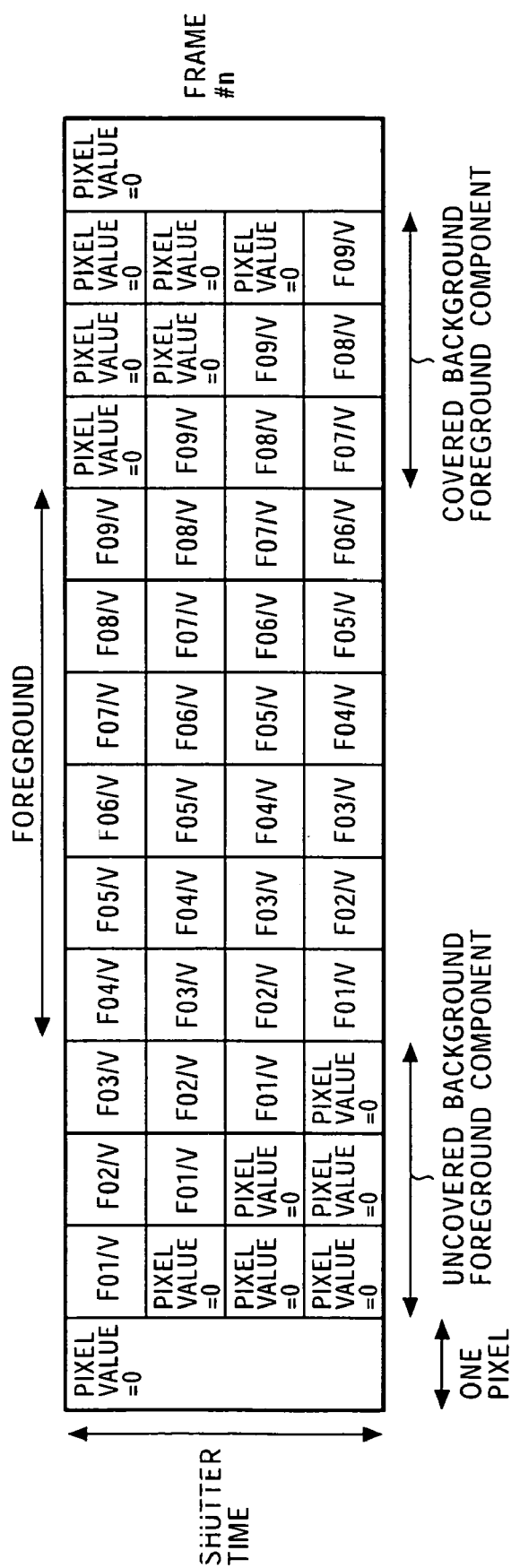
FIG. 71A illustrates an example of a separated foreground component image.

FIG. 71A is a diagram illustrating an example of the foreground component image corresponding to frame #n in FIG. 67. The leftmost pixel and the fourteenth pixel from the left consist of only the background components before the foreground and the background are separated, and thus, the pixel values are set to 0.

The second and fourth pixels from the left belong to the uncovered background area before the foreground and the background are separated. Accordingly, the background components are set to 0, and the foreground components are maintained. The eleventh through thirteenth pixels from the left belong to the covered background area before the foreground and the background are separated. Accordingly, the background components are set to 0, and the foreground components are maintained. The fifth through tenth pixels from the left consist of only the foreground components, which are thus maintained.

Figure 71B:
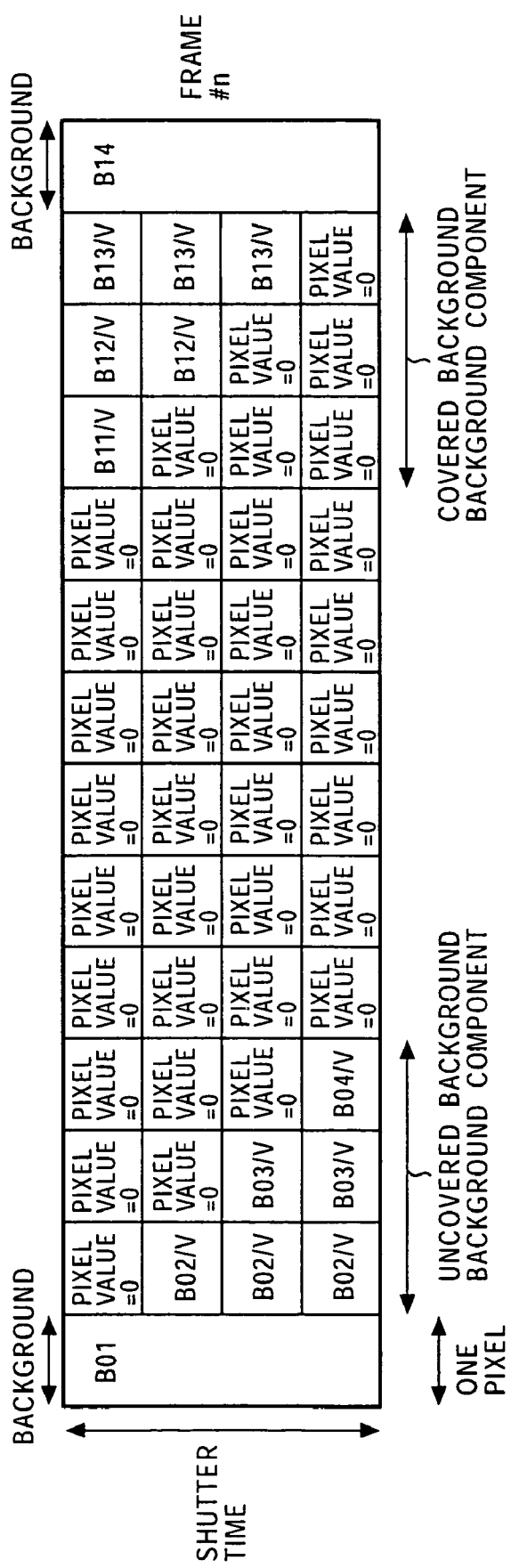
FIG. 71B illustrates an example of a separated background component image.

FIG. 71B is a diagram illustrating an example of the background component image corresponding to frame #n in FIG. 67. The leftmost pixel and the fourteenth pixel from the left consist of only the background components before the foreground and the background are separated, and thus, the background components are maintained.

The second through fourth pixels from the left belong to the uncovered background area before the foreground and the background are separated. Accordingly, the foreground components are set to 0, and the background components are maintained. The eleventh through thirteenth pixels from the left belong to the covered background area before the foreground and the background are separated. Accordingly, the foreground components are set to 0, and the background components are maintained. The fifth through tenth pixels from the left consist of only the foreground components, and thus, the pixel values are set to 0.

Figure 72:
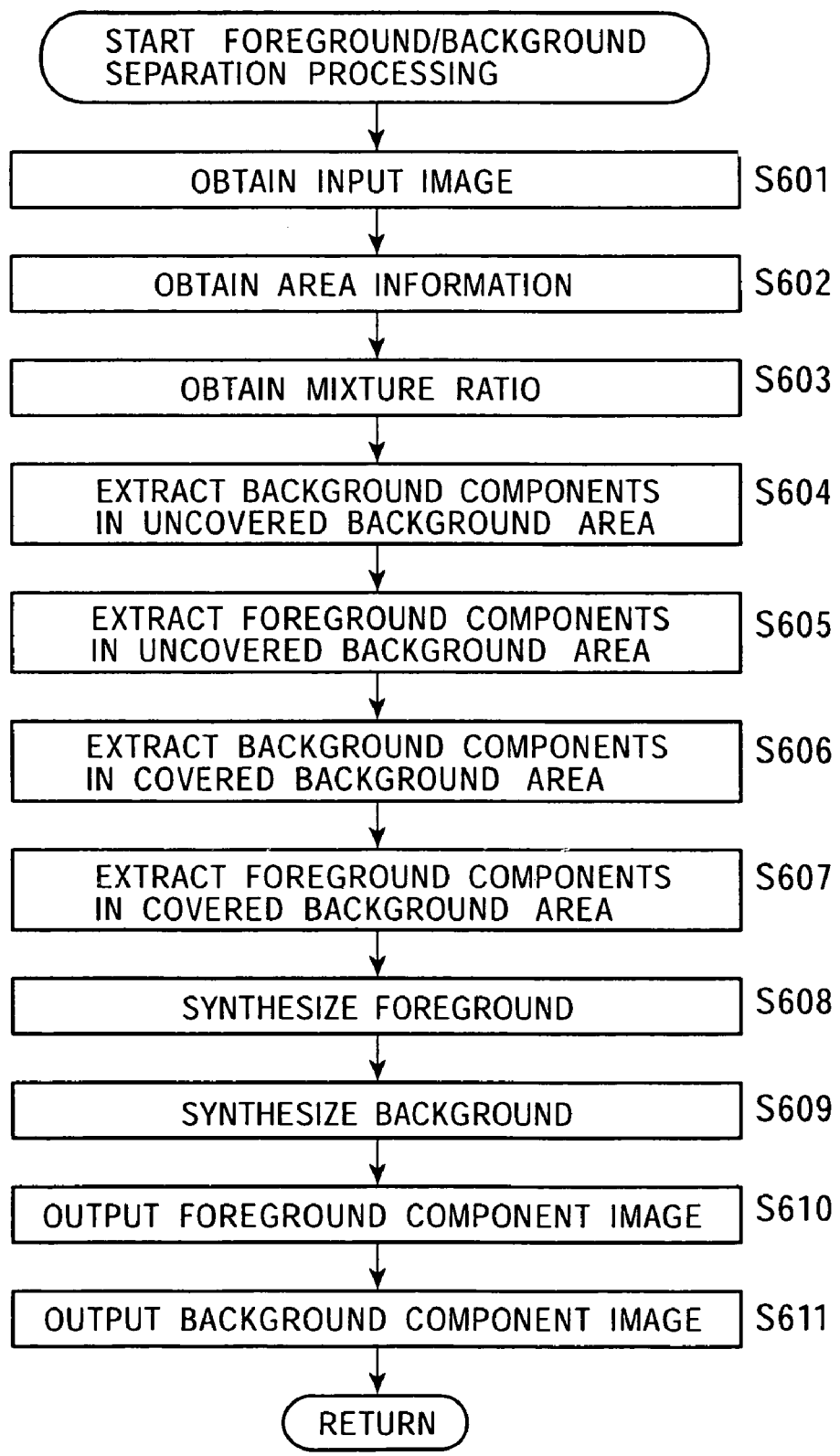
FIG. 72 is a flowchart illustrating the processing for separating a foreground and a background.

The processing for separating the foreground and the background executed by the foreground/background separator 105 is described below with reference to the flowchart of FIG. 72. In step S601, the frame memory 621 of the separating portion 601 obtains an input image, and stores frame #n for which the foreground and the background are separated together with the previous frame #n−1 and the subsequent frame #n+1.

In step S602, the separation processing block 622 of the separating portion 601 obtains area information supplied from the mixture-ratio calculator 104. In step S603, the separation processing block 622 of the separating portion 601 obtains the mixture ratio α supplied from the mixture-ratio calculator 104.

In step S604, the uncovered area processor 631 extracts the background components from the pixel values of the pixels belonging to the uncovered background area supplied from the frame memory 621 based on the area information and the mixture ratio α.

In step S605, the uncovered area processor 631 extracts the foreground components from the pixel values of the pixels belonging to the uncovered background area supplied from the frame memory 621 based on the area information and the mixture ratio α.

In step S606, the covered area processor 632 extracts the background components from the pixel values of the pixels belonging to the covered background area supplied from the frame memory 621 based on the area information and the mixture ratio α.

In step S607, the covered area processor 632 extracts the foreground components from the pixel values of the pixels belonging to the covered background area supplied from the frame memory 621 based on the area information and the mixture ratio α.

In step S608, the synthesizer 633 combines the foreground components of the pixels belonging to the uncovered background area extracted in the processing of step S605 with the foreground components of the pixels belonging to the covered background area extracted in the processing of step S607. The synthesized foreground components are supplied to the synthesizer 603. The synthesizer 603 further combines the pixels belonging to the foreground area supplied via the switch 602 with the foreground components supplied from the separating portion 601 so as to generate a foreground component image.

In step S609, the synthesizer 634 combines the background components of the pixels belonging to the uncovered background area extracted in the processing of step S604 with the background components of the pixels belonging to the covered background area extracted in the processing of step S606. The synthesized background components are supplied to the synthesizer 605. The synthesizer 605 further combines the pixels belonging to the background area supplied via the switch 604 with the background components supplied from the separating portion 601 so as to generate a background component image.

In step S610, the synthesizer 603 outputs the foreground component image. In step S611, the synthesizer 605 outputs the background component image. The processing is then completed.

As discussed above, the foreground/background separator 105 is able to separate the foreground components and the background components from the input image based on the area information and the mixture ratio α, and outputs the foreground component image consisting of only the foreground components and the background component image consisting of only the background components.

Figure 73:
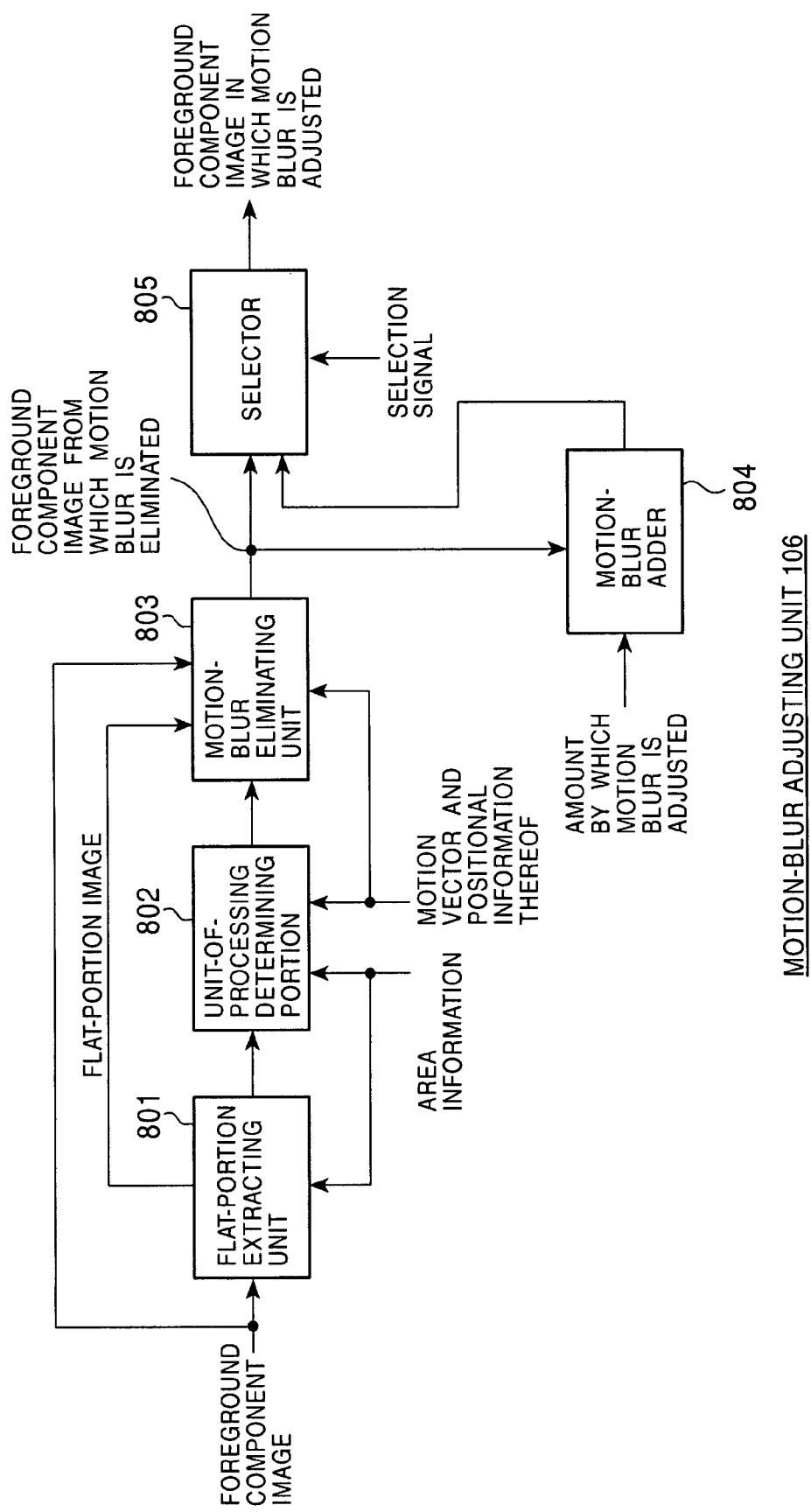
FIG. 73 is a block diagram illustrating an example of the configuration of a motion-blur adjusting unit 106.

FIG. 73 is a block diagram illustrating the configuration of the motion-blur adjusting unit 106.

A flat-portion extracting unit 801 extracts, from the foreground component image supplied from the foreground/background separator 105 based on the area information supplied from the area specifying unit 103, a flat portion in which the amount by which the pixel values of adjacent pixels change is small. The flat portion extracted by the flat-portion extracting unit 801 consists of pixels having equal pixel values. The flat portion is also referred to as the "equal portion".

For example, the flat-portion extracting unit 801 extracts, from the foreground component image supplied from the foreground/background separator 105 based on the area information supplied from the area specifying unit 103, a flat portion in which the amount by which the pixel values of adjacent pixels change is smaller than a prestored threshold Thf.

The flat-portion extracting unit 801 also extracts, for example, a flat portion in which the amount by which the pixel values of adjacent pixels of the foreground component image change is within 1%. The ratio of the amount by which the pixel values change, which is a reference for extracting a flat portion, may be set to a desired value.

The flat-portion extracting unit 801 also extracts a flat portion in which the standard deviation of the pixel values of adjacent pixels of the foreground component image is smaller than the prestored threshold Thf.

Moreover, the flat-portion extracting unit 801 extracts, for example, based on the regression line corresponding to the pixel values of adjacent pixels of the foreground component image, a flat portion in which the sum of the errors of the regression line and the individual pixel values is smaller than the prestored threshold Thf.

The reference value for extracting the flat portions, such as the threshold Thf or the ratio of the amount by which pixel values change, may be set to a desired value, and the present invention is not restricted by the reference value for extracting the flat portions. The reference value for extracting the flat portions may adaptively be changed.

Concerning the pixels belonging to the extracted flat portions, the flat-portion extracting unit 801 sets a flat-portion flag indicating that a pixel belongs to a flat portion, and supplies the foreground component image and the flat-portion flag to a unit-of-processing determining unit 802. The flat-portion extracting unit 801 also generates a flat-portion image consisting of only the pixels belonging to flat portions, and supplies it to a motion-blur eliminating unit 803.

The unit-of-processing determining unit 802 generates the unit of processing, which is data indicating the pixels of the foreground component image without the flat portions based on the foreground component image and the flat-portion flag supplied from the flat-portion extracting unit 801 and the area information supplied from the area specifying unit 103, and supplies the generated unit of processing to the motion-blur eliminating unit 803 together with the flat-portion flag.

The motion-blur eliminating unit 803 calculates the foreground components contained in the pixels belonging to the flat portions from the foreground component image supplied from the foreground/background separator 105 based on the flat-portion flag supplied from the unit-of-processing determining unit 802.

The motion-blur eliminating unit 803 eliminates the foreground components corresponding to the flat portions from the foreground component image supplied from the foreground/background separator 105 based on the area information supplied from the area specifying unit 103 and the unit of processing supplied from the unit-of-processing determining unit 802. The motion-blur eliminating unit 803 calculates the remaining foreground components contained in the pixels, which are specified by the unit of processing, based on the area information supplied from the area specifying unit 103 and the unit of processing supplied from the unit-of-processing determining unit 802.

The motion-blur eliminating unit 803 combines the pixels, which are generated based on the calculated foreground components contained in the pixels specified by the unit of processing and the pixels of the flat-portion image supplied from the flat-portion extracting unit 801, thereby generating a foreground component image from which motion blur is eliminated.

The motion-blur eliminating unit 803 supplies the foreground component image without motion blur to a motion-blur adder 804 and a selector 805.

Figure 74:
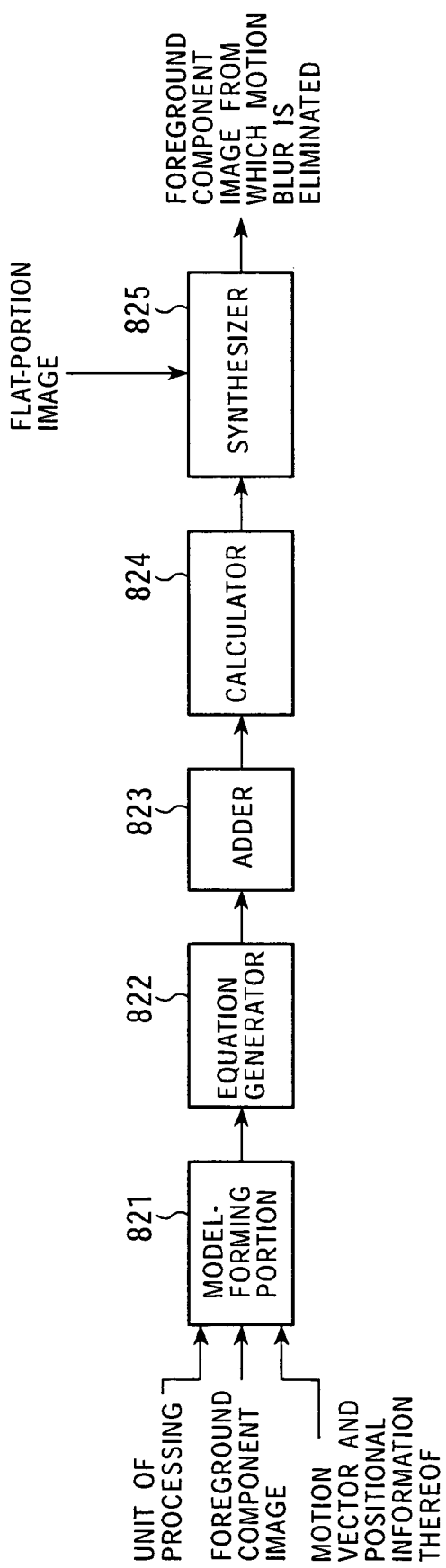
FIG. 74 is a block diagram illustrating an example of the configuration of a motion-blur eliminating unit 108.

FIG. 74 is a block diagram illustrating the configuration of the motion-blur eliminating unit 803. The foreground component image supplied from the foreground/background separator 105, the unit of processing supplied from the unit-of-processing determining unit 802, and the motion vector and the positional information thereof supplied from the motion detector 102 are supplied to a model-forming portion 821.

The model-forming portion 821 performs model forming based on the amount of movement v and the unit of processing. More specifically, the model-forming portion 821 determines the number of divided portions of the pixel values in the time direction and the number of foreground components of each pixel based on the amount of movement v and the unit of processing, and generates a model in which the correlation between the pixel values and the foreground components is designated. The model-forming portion 821 may select a model corresponding to the amount of movement v and the unit of processing among a plurality of prestored models. The model-forming portion 821 supplies the generated model to an equation generator 822 together with the foreground component image.

The equation generator 822 generates an equation based on the model supplied from the model-forming portion 821, and supplies the generated equation to an adder 823 together with the foreground component image.

The adder 823 adds the equation supplied from the equation generator 822 to the equations of the method of least squares. The adder 823 supplies the resulting normal equation to a calculator 824. The pixels specified by the unit of processing do not contain the pixels corresponding to the flat portions.

The calculator 824 solves the equation in which the pixel values are set by the adder 823 so as to calculate the foreground components. The calculator 824 generates the pixels from which motion blur is eliminated corresponding to the unit of processing based on the calculated foreground components, and outputs the generated pixels corresponding to the unit of processing to a synthesizer 825.

The synthesizer 825 generates the foreground component image from which motion blur is eliminated based on the pixels corresponding to the unit of processing supplied from the calculator 824 and the pixels of the flat-portion image supplied from the flat-portion extracting unit 801, and outputs the generated foreground component image.

The operation of the motion-blur adjusting unit 106 is described below with reference to FIGS. 75 through 80.

Figure 75:
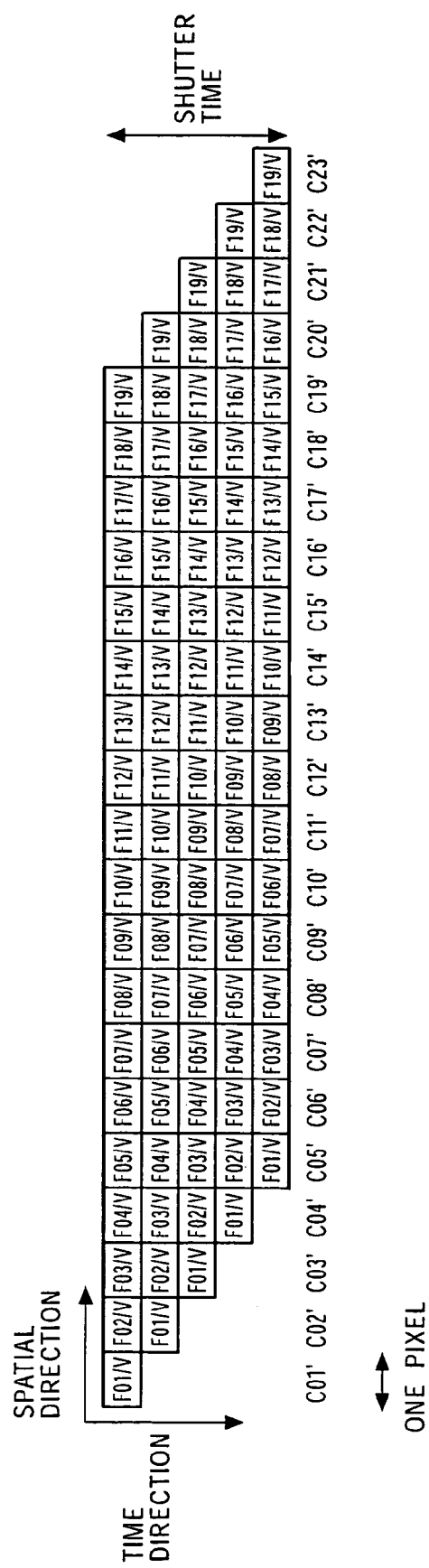
FIG. 75 illustrates a model in which the pixel values are expanded in the time direction and the period corresponding to the shutter time is divided.

FIG. 75 illustrates a model obtained by expanding in the time direction the pixel values of the pixels on a straight line corresponding to the motion vector of the foreground component image output from the foreground/background separator 105 and input into the flat-portion extracting unit 801. C$01'$ through C$23'$ indicate the pixel values of the individual pixels of the foreground component image. The foreground component image consists of only the foreground components.

The flat-portion extracting unit 801 extracts, among the pixels contained in the foreground component image supplied from the foreground/background separator 105 based on the threshold Thf, consecutive pixels whose amount by which the pixel values change is smaller than the threshold Thf. The threshold Thf is a sufficiently small value. The number of consecutive pixels extracted by the flat-portion extracting unit 801 must be greater than the amount of movement v of the foreground object within one frame. For example, if the amount of movement v of the foreground object is 5 within one frame, the flat-portion extracting unit 801 extracts five or more consecutive pixels in which there is almost no change in the pixel values, i.e., a flat portion.

Figure 76:
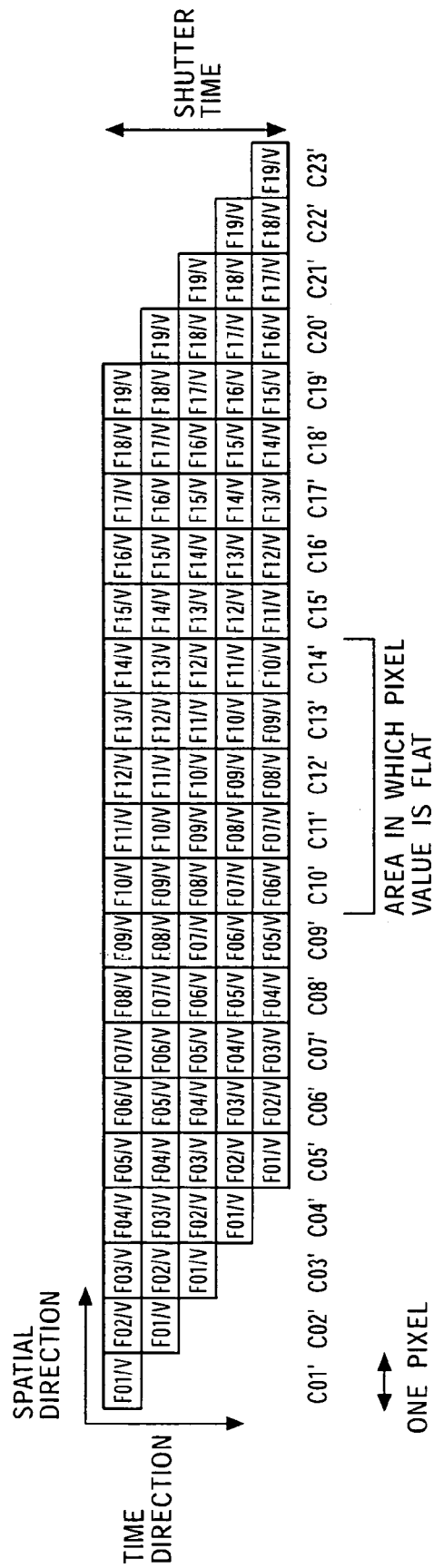
FIG. 76 illustrates a model in which the pixel values are expanded in the time direction and the period corresponding to the shutter time is divided.

For example, in the example shown in FIG. 76, when equation (78) holds true, the foreground components F06/v through F14/v are found to be equal from the relationships of equation (79) through equation (83).

$$C10'=C11'=C12'=C13'=C14' \tag{78}$$

$$C10'=F06/v+F07/v+F08/v+F09/v+F10/v \tag{79}$$

$$C11'=F07/v+F08/v+F09/v+F10/v+F11/v \tag{80}$$

$$C12'=F08/v+F09/v+F10/v+F11/v+F12/v \tag{81}$$

$$C13'=F09/v+F10/v+F11/v+F12/v+F13/v \tag{82}$$

$$C14'=F10/v+F11/v+F12/v+F13/v+F14/v \tag{83}$$

That is, the relationship of the foreground components F06/v through F14/v indicated by equation (84) holds true.

$$F06/v=F07/v=F08/v=F09/v=F10/v=F11/v=F12/v=F13/v=F14/v \tag{84}$$

Figure 77:
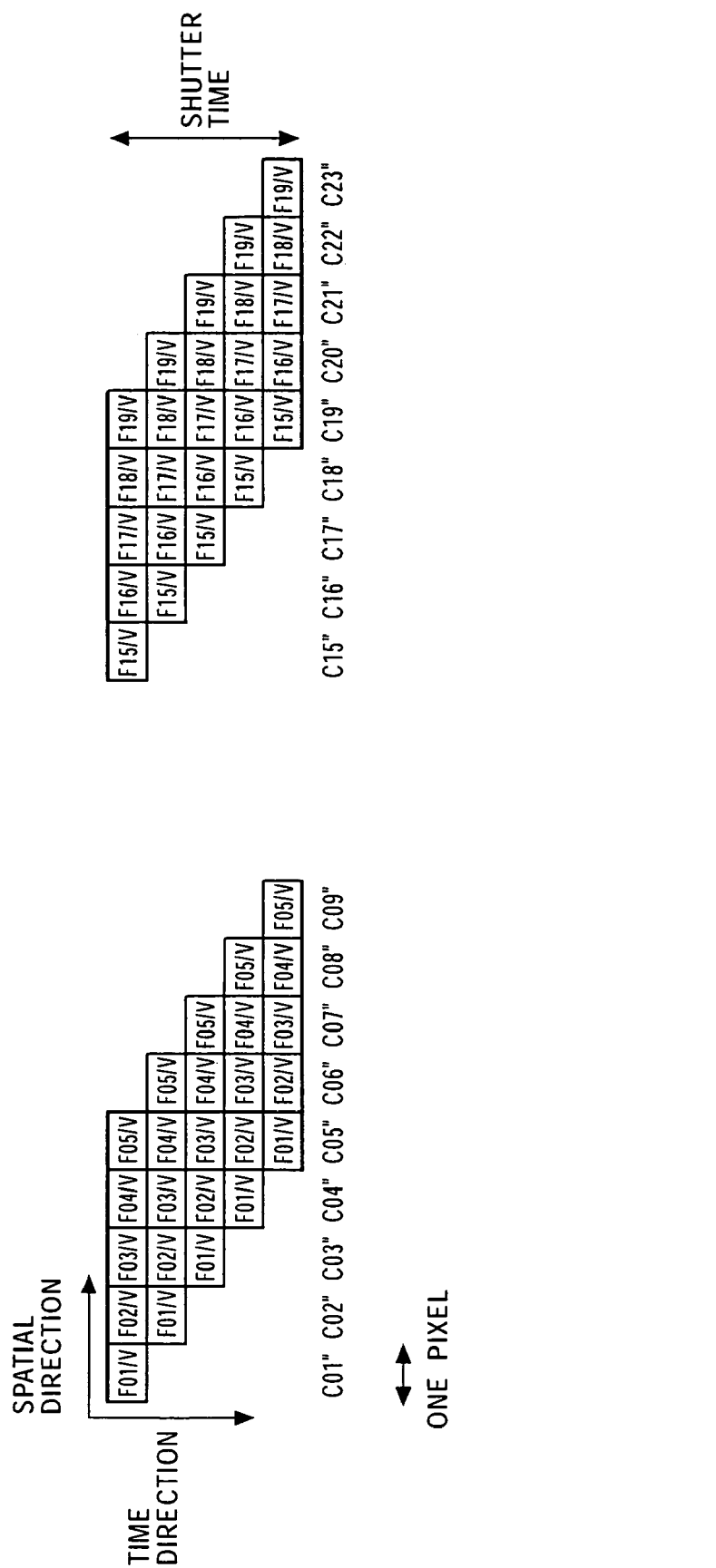
FIG. 77 illustrates a model in which the pixel values are expanded in the time direction and the period corresponding to the shutter time is divided.

Accordingly, in the subsequent processing for calculating the foreground components, as shown in FIG. 77, it is only necessary to calculate the foreground components F01/v through F05/v and the foreground components F15/v through F19/v other than the foreground components F06/v through F14/v.

The flat-portion extracting unit 801 extracts a flat portion having equal pixel values required for the above-described processing, generates a flat-portion flag indicating whether the pixel belongs to a flat portion according to the extraction of the flat portion, and supplies the flag to the unit-of-processing determining unit 802. The flat-portion extracting unit 801 also supplies the flat-portion image consisting of only the pixels belonging to the flat portion to the motion-blur eliminating unit 803.

The unit-of-processing determining unit 802 generates the unit of processing, which is data indicating the pixels obtained by eliminating the flat portion from the pixels on a straight line contained in the foreground component image, and supplies the unit of processing to the motion-blur eliminating unit 803 together with the flat-portion flag.

The motion-blur eliminating unit 803 calculates the foreground components contained in the pixels belonging to the flat portion based on the flat-portion flag supplied from the unit-of-processing determining unit 802. The motion-blur eliminating unit 803 eliminates the foreground components contained in the pixels belonging to the flat portion from the foreground component image based on the flat-portion flag.

The motion-blur eliminating unit 803 generates, based on the unit of processing supplied from the unit-of-processing determining unit 802, an equation for calculating the remaining foreground components from the pixel value of the pixel from which the flat portion is removed among the pixels on the straight line contained in the foreground component image.

For example, as shown in FIG. 76, among the 23 pixels on the straight line of the foreground component image, when the tenth through fourteenth pixels from the left belong to the flat portion, the foreground components belonging to the tenth through fourteenth pixels from the left can be removed from the foreground component image. Accordingly, equations (85) through (102) are generated for the remaining foreground components, i.e., the foreground components F01/v through F05/v and the foreground components F15/v through F19/v.

$$C01''=F01/v \tag{85}$$

$$C02''=F01/v+F02/v \tag{86}$$

$$C03''=F01/v+F02/v+F03/v \tag{87}$$

$$C04''=F01/v+F02/v+F03/v+F04/v \tag{88}$$

$$C05''=F01/v+F02/v+F03/v+F04/v+F05/v \tag{89}$$

$$C06''=F02/v+F03/v+F04/v+F05/v \tag{90}$$

$$C07''=F03/v+F04/v+F05/v \tag{91}$$

$$C08''=F04/v+F05/v \tag{92}$$

$$C09''=F05/v \tag{93}$$

$$C15''=F15/v \qquad (94)$$

$$C16''=F15/v+F16/v \qquad (95)$$

$$C17''=F15/v+F16/v+F17/v \qquad (96)$$

$$C18''=F15/v+F16/v+F17/v+F18/v \qquad (97)$$

$$C19''=F15/v+F16/v+F17/v+F18/v+F19/v \qquad (98)$$

$$C20''=F16/v+F17/v+F18/v+F19/v \qquad (99)$$

$$C21''=F17/v+F18/v+F19/v \qquad (100)$$

$$C22''=F18/v+F19/v \qquad (101)$$

$$C23''=F19/v \qquad (102)$$

By applying the above-described method of least squares to equations (85) through (102), equations (101) and (104) are found.

$$\begin{bmatrix} 5 & 4 & 3 & 2 & 1 \\ 4 & 5 & 4 & 3 & 2 \\ 3 & 4 & 5 & 4 & 3 \\ 2 & 3 & 4 & 5 & 4 \\ 1 & 2 & 3 & 4 & 5 \end{bmatrix} \begin{bmatrix} F01 \\ F02 \\ F03 \\ F04 \\ F05 \end{bmatrix} = \qquad (103)$$

$$v \cdot \begin{bmatrix} C01'' + C02'' + C03'' + C04'' + C05'' \\ C02'' + C03'' + C04'' + C05'' + C06'' \\ C03'' + C04'' + C05'' + C06'' + C07'' \\ C04'' + C05'' + C06'' + C07'' + C08'' \\ C05'' + C06'' + C07'' + C08'' + C09'' \end{bmatrix}$$

$$\begin{bmatrix} 5 & 4 & 3 & 2 & 1 \\ 4 & 5 & 4 & 3 & 2 \\ 3 & 4 & 5 & 4 & 3 \\ 2 & 3 & 4 & 5 & 4 \\ 1 & 2 & 3 & 4 & 5 \end{bmatrix} \begin{bmatrix} F15 \\ F16 \\ F17 \\ F18 \\ F19 \end{bmatrix} = \qquad (104)$$

$$v \cdot \begin{bmatrix} C15'' + C16'' + C17'' + C18'' + C19'' \\ C16'' + C17'' + C18'' + C19'' + C20'' \\ C17'' + C18'' + C19'' + C20'' + C21'' \\ C18'' + C19'' + C20'' + C21'' + C22'' \\ C19'' + C20'' + C21'' + C22'' + C23'' \end{bmatrix}$$

The equation generator 822 of the motion-blur eliminating unit 803 generates the equations corresponding to the unit of processing, for example, indicated by equations (103) and (104). The adder 823 of the motion-blur eliminating unit 803 sets the pixel values contained in the foreground component image from which the foreground components contained in the pixels belonging to the flat portion are eliminated in the equations generated by the equation generator 822. The calculator 824 of the motion-blur eliminating unit 803 calculates the foreground components contained in the foreground component image other than the foreground components contained in the pixels belonging to the flat portion by applying a solution, such as the Cholesky decomposition to the equations in which the pixel values are set.

Figure 78:
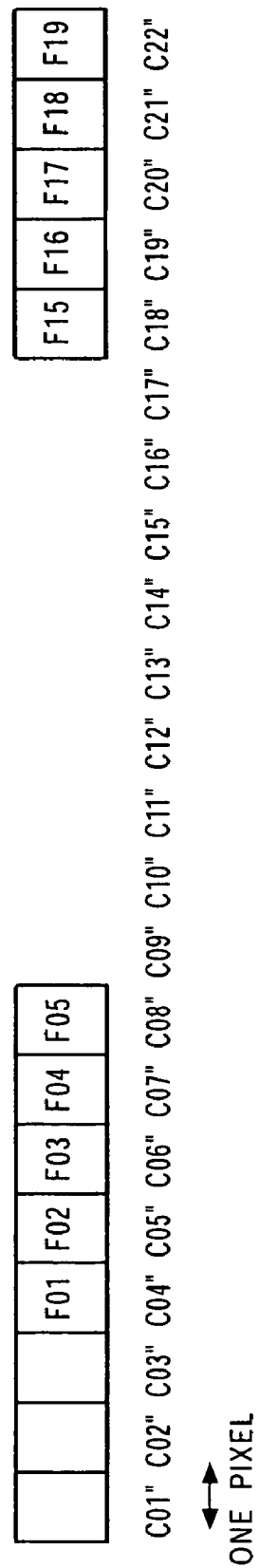
FIG. 78 illustrates an example of the pixels from which motion blur is eliminated.

The calculator 824 generates a foreground component image without motion blur, as shown in the example of FIG. 78, consisting of the pixel value Fi from which motion blur is eliminated.

In the foreground component image from which motion blur is eliminated as shown in FIG. 78, F01 through F05 are set in C04" and C05", and F15 through F19 are set in C18" and C19". The reason for this is not to change the position of the foreground component image with respect to the screen. The foreground component image may be set in desired positions.

Figure 79:
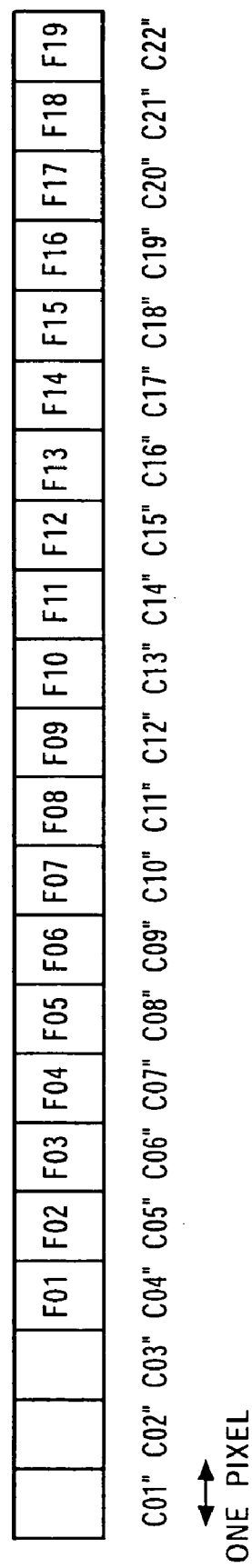
FIG. 79 illustrates an example of the pixels from which motion blur is eliminated.

The calculator 824 generates pixels corresponding to the foreground components, which have been eliminated by the unit of processing, based on the flat-portion image supplied from the flat-portion extracting unit 801, and combines the generated pixels with the foreground component image without motion blur shown in FIG. 78, thereby generating a foreground component image, such as that shown in FIG. 79.

The motion-blur eliminating unit 803 may generate the pixels corresponding to the flat portion based on the foreground components F06/v through F14/v calculated by equation (84).

Figure 80:
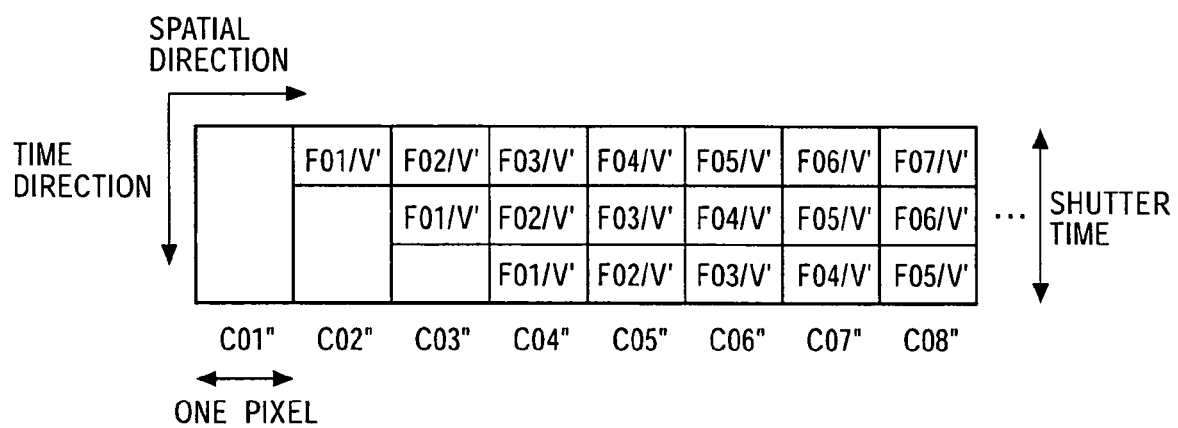
FIG. 80 illustrates an example of the pixels to which motion blur is added.

The motion-blur adder 804 is able to adjust the amount of motion blur by adding the amount v' by which motion blur is adjusted, which is different from the amount of movement v, for example, the amount v' by which motion blur is adjusted, which is one half the value of the amount of movement v, or the amount v' by which motion blur is adjusted, which is irrelevant to the amount of movement v. For example, as shown in FIG. 80, the motion-blur adder 804 divides the foreground pixel value Fi without motion blur by the amount v' by which motion blur is adjusted so as to obtain the foreground component Fi/v'. The motion-blur adder 804 then calculates the sum of the foreground components Fi/v', thereby generating the pixel value in which the amount of motion blur is adjusted. For example, when the amount v' by which motion blur is adjusted is 3, the pixel value C02" is set to (F01)/v', the pixel value C3" is set to (F01+F02)/v', the pixel value C04" is set to (F01+F02+F03)/v', and the pixel value C05" is set to (F02+F03+F04)/v'.

The motion-blur adder 804 supplies the foreground component image in which the amount of motion blur is adjusted to a selector 805.

The selector 805 selects one of the foreground component image without motion blur supplied from the calculator 805 and the foreground component image in which the amount of motion blur is adjusted supplied from the motion-blur adder 804 based on, for example, a selection signal reflecting a user's selection, and outputs the selected foreground component image.

As discussed above, the motion-blur adjusting unit 106 is able to adjust the amount of motion blur based on the selection signal and the amount v' by which motion blur is adjusted.

The motion-blur adjusting unit 106 may obtain the background component image from the foreground/background separator 105 so as to adjust the background components corresponding to the pixels belonging to the mixed area.

FIG. 81 illustrates the processing for correcting the background components performed by the motion-blur adjusting unit 106. Among the pixels contained in the background component image, concerning the pixels belonging to the mixed area before being separated, the foreground components are eliminated by the foreground/background separator 105.

The motion-blur adjusting unit 106 makes the following correction based on the area information and the amount of movement v. Among the pixels contained in the background component image, concerning the pixels belonging to the mixed area, the corresponding background components are added.

For example, when the pixel value C02'" contains four background components B02/v, the motion-blur adjusting unit 106 adds one background component (B02/V)' (the same value as the background component B02/v) to the pixel value C02'". When the pixel value C02'" contains three background components B03/v, the motion-blur adjusting unit 106 adds two background components (B03/V)' (the same value as the background component B03/v) to the pixel value C03'".

When the pixel value C23'" contains three background components B23/v, the motion-blur adjusting unit 106 adds two background components (B23/v)' (the same value as the background component B23/v) to the pixel value C23'". When the pixel value C24'" contains four background components B24/v, the motion-blur adjusting unit 106 adds one background component (B24/v)' (the same value as the background component B24/v) to the pixel value C24'".

A description is given below of an example of the result of the processing performed by the motion-blur adjusting unit 106 having the configuration shown in FIG. 73.

Figure 82:
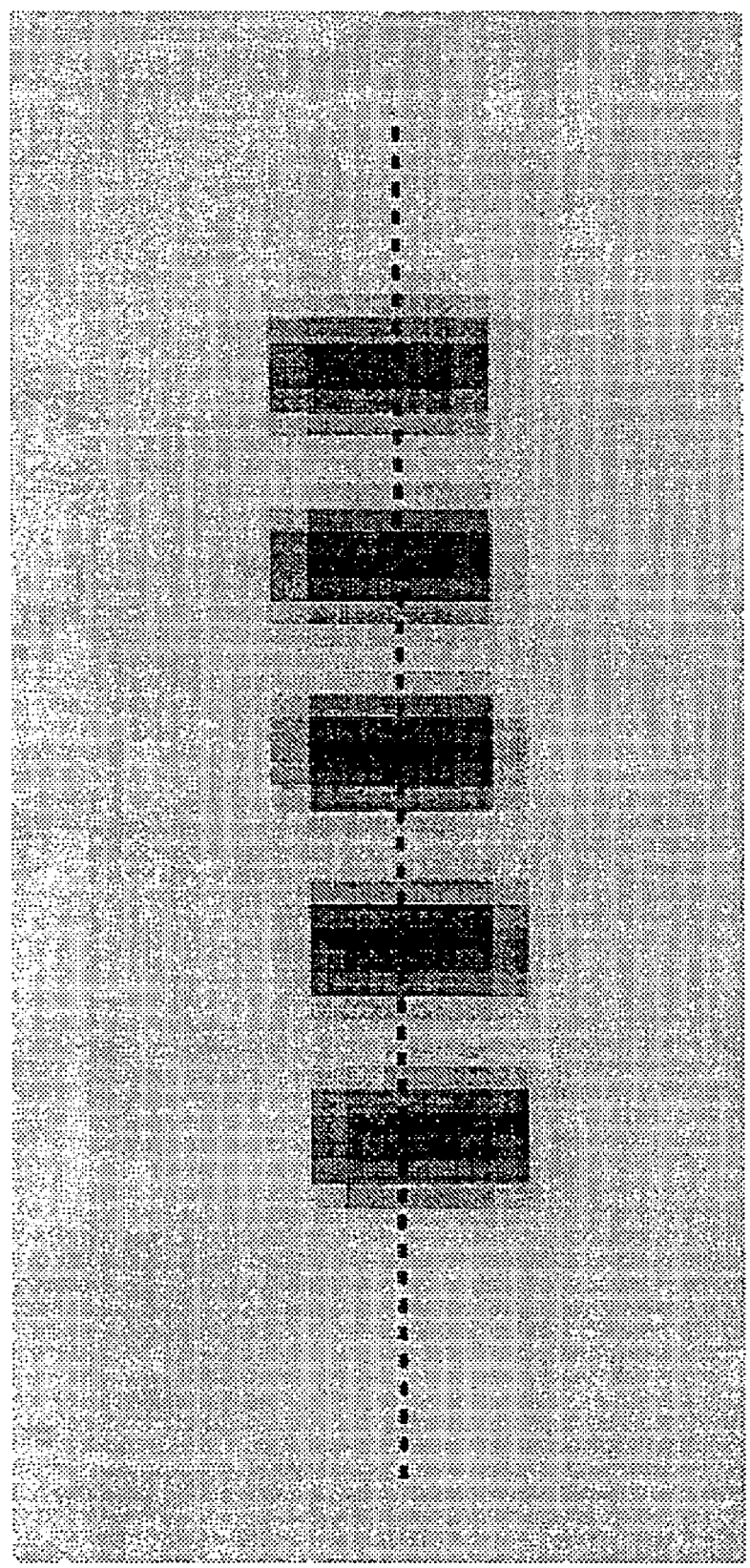
FIG. 82 illustrates an image obtained by capturing stationary black quadrilaterals.
Figure 83:
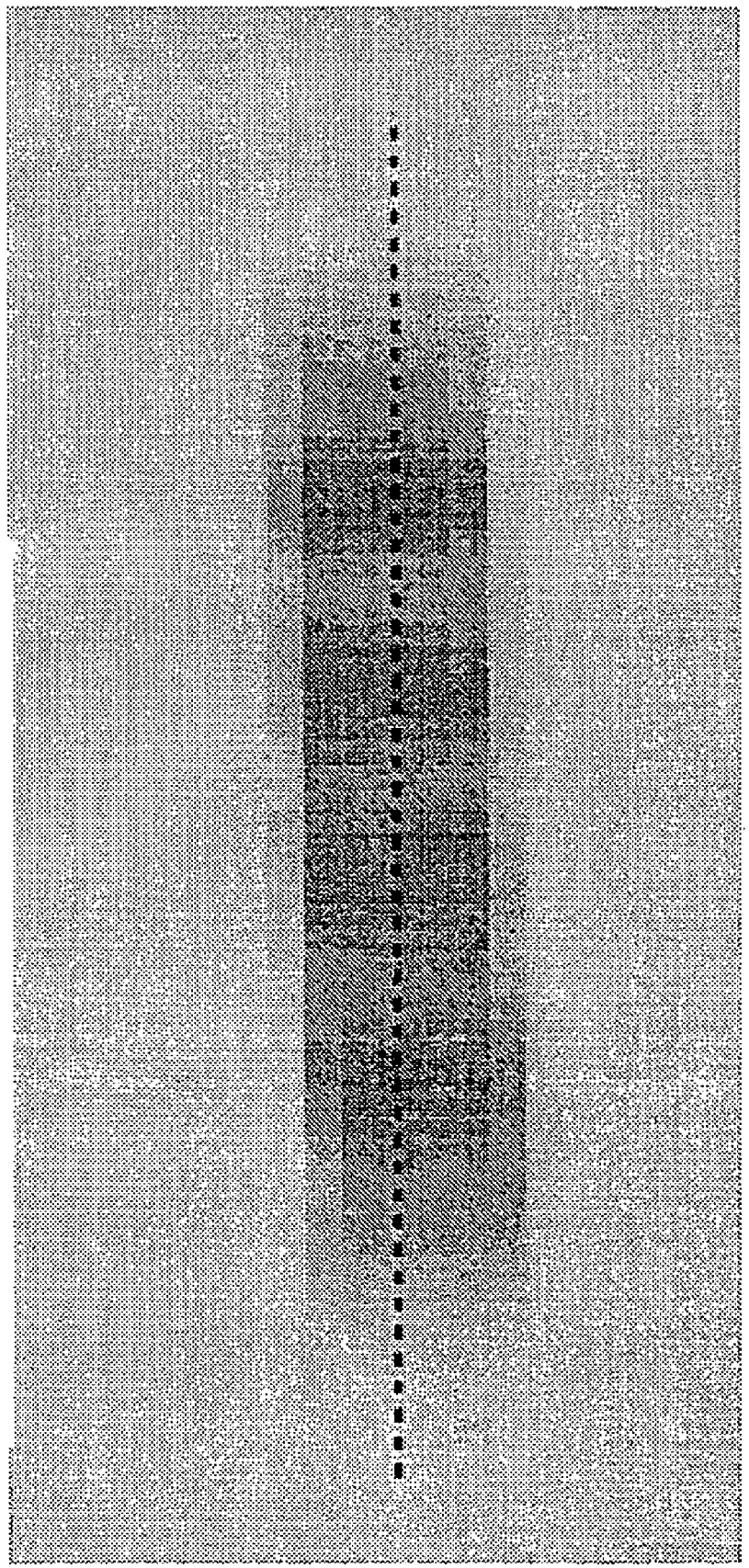
FIG. 83 illustrates an image obtained by capturing the moving black quadrilaterals.

FIG. 82 illustrates an image obtained by capturing stationary black quadrilaterals. In contrast, FIG. 83 illustrates an image obtained by capturing the moving black quadrilaterals shown in FIG. 82. In the image shown in FIG. 83, the black quadrilaterals interfere with each other by motion blur.

Figure 84:
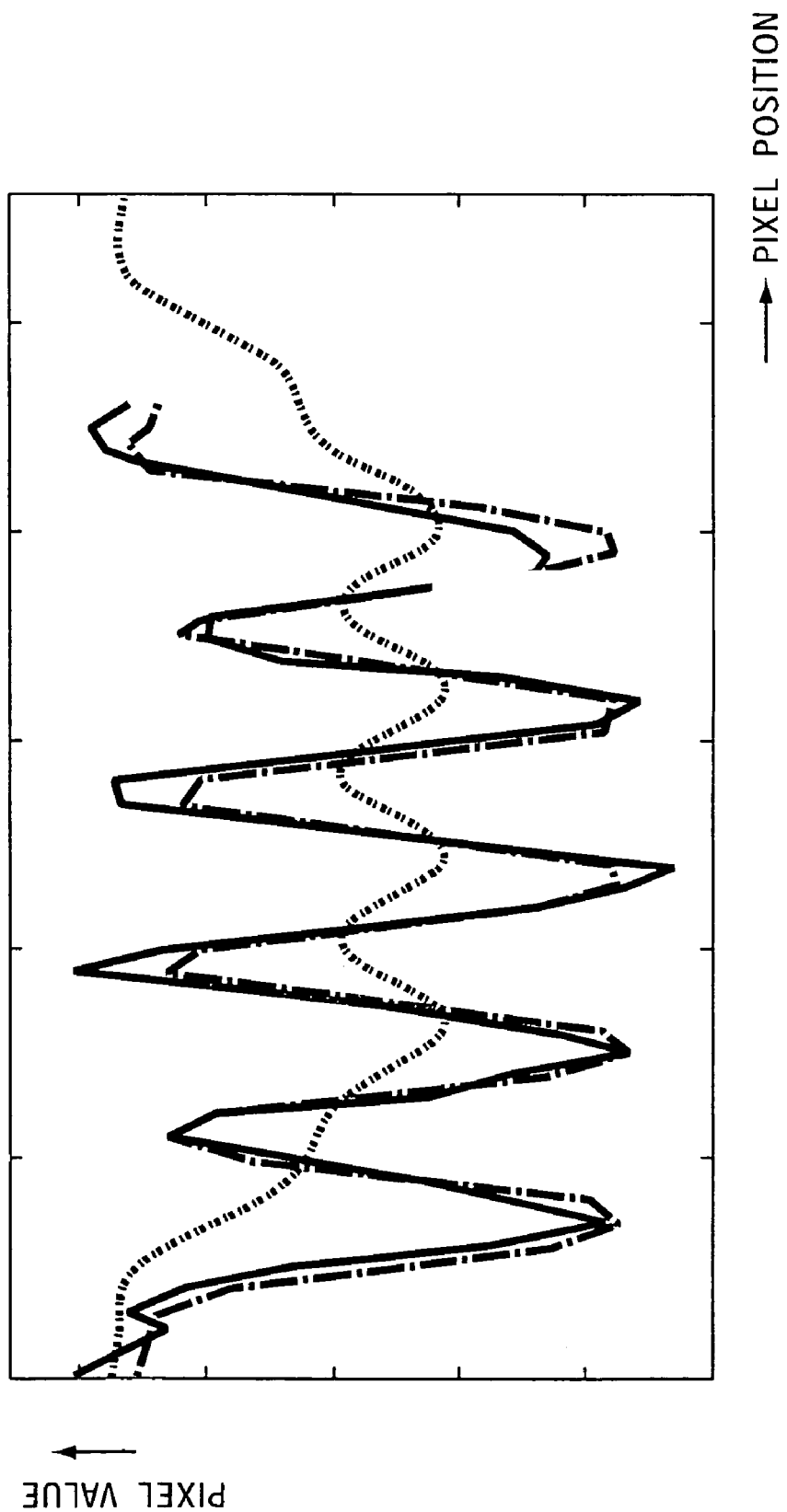
FIG. 84 illustrates an example of a result obtained by executing the processing by the motion-blur adjusting unit 106.

An example of the result of the processing performed by the motion-blur adjusting unit 106 having the configuration shown in FIG. 73 on the pixels on the straight line indicated by the broken line in FIG. 83 is shown in FIG. 84.

In FIG. 84, the solid line indicates the pixel values obtained by performing the processing by the motion-blur adjusting unit 106 having the configuration shown in FIG. 73, the broken line indicates the pixel values on the straight line shown in FIG. 83, and the one-dot-chain line indicates the pixel values on the straight line shown in FIG. 82.

In the broken line in FIG. 84, since the pixel values located at both ends in FIG. 84 are almost flat (equal), the motion-blur adjusting unit 106 removes the pixel values by assuming that they are flat portions, and performs the above-described processing on the remaining pixel values.

The result shown in FIG. 84 shows that the motion-blur adjusting unit 106 generates the pixel values that are almost equal to the pixel values of the stationary black quadrilaterals from the image having incorrect pixel values due to interference, caused by moving the black quadrilaterals.

The result shown in FIG. 84 is obtained by applying the present invention to an image captured by a CCD and having a linear relationship between the amount of incident light and the pixel values, though the image is not subjected to gamma correction. Similarly, the effectiveness of the present invention for an image subjected to gamma correction has been proved by an experiment.

Figure 85:
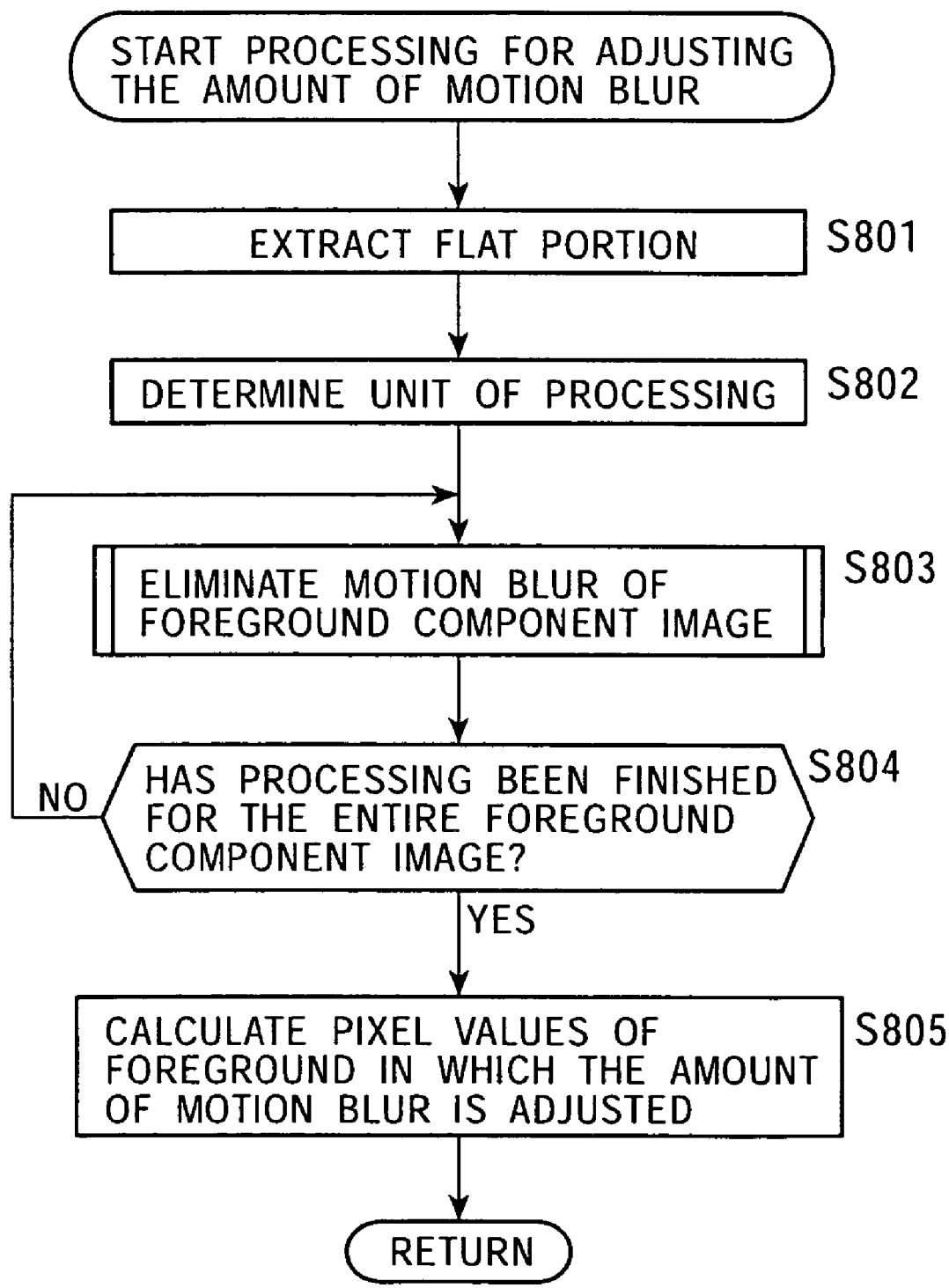
FIG. 85 is a flowchart illustrating the processing for adjusting the amount of motion blur.

The processing for adjusting the amount of motion blur performed by the motion-blur adjusting unit 106 having the configuration shown in FIG. 73 is described below with reference to the flowchart of FIG. 85.

In step S801, the flat-portion extracting unit 801 extracts, from the foreground component image supplied from the foreground/background separator 105, a flat portion in which the pixel values of adjacent pixels are equal. The flat-portion extracting unit 801 then supplies a flat-portion flag corresponding to the extracted flat portion to the unit-of-processing determining unit 802, and also supplies the flat-portion image consisting of only the pixels belonging to the flat portion to the motion-blur eliminating unit 803.

In step S802, the unit-of-processing determining unit 802 generates, based on the flat-portion flag, the unit of processing indicating the positions of the adjacent pixels on the straight line contained in the foreground component image other than the pixels belonging to the flat portion, and supplies the unit of processing to the motion-blur eliminating unit 803.

In step S803, the motion-blur eliminating unit 803 calculates the foreground components corresponding to the pixels of the flat portion based on the foreground component image supplied from the foreground/background separator 105 and the unit of processing supplied from the unit-of-processing determining unit 802, and also calculates the foreground components corresponding to the unit of processing, thereby eliminating motion blur from the foreground components. The motion-blur eliminating unit 803 outputs the foreground components without motion blur to the motion-blur adder 804 and the selector 805. Details of the processing for eliminating motion blur in step S803 are described below with reference to the flowchart of FIG. 86.

In step S804, the motion-blur adjusting unit 806 determines whether the processing has been finished for the entire foreground component image. If it is determined that the processing has not been finished for the entire foreground component image, the process returns to step S803, and the motion-blur eliminating processing on the foreground components corresponding to the subsequent unit of processing is repeated.

If it is determined in step S804 that the processing has been finished for the entire foreground component image, the process proceeds to step S805. In step S805, the motion-blur adder 804 and the selector 805 of the motion-blur adjusting unit 106 calculate the background component image in which the amount of motion blur is adjusted, select the foreground component image from which motion blur is eliminated or the foreground component image to which motion blur is added, and output the selected image. The processing is then completed.

As discussed above, the motion-blur adjusting unit 106 is able to adjust the amount of motion blur of the input foreground component image.

Figure 86:
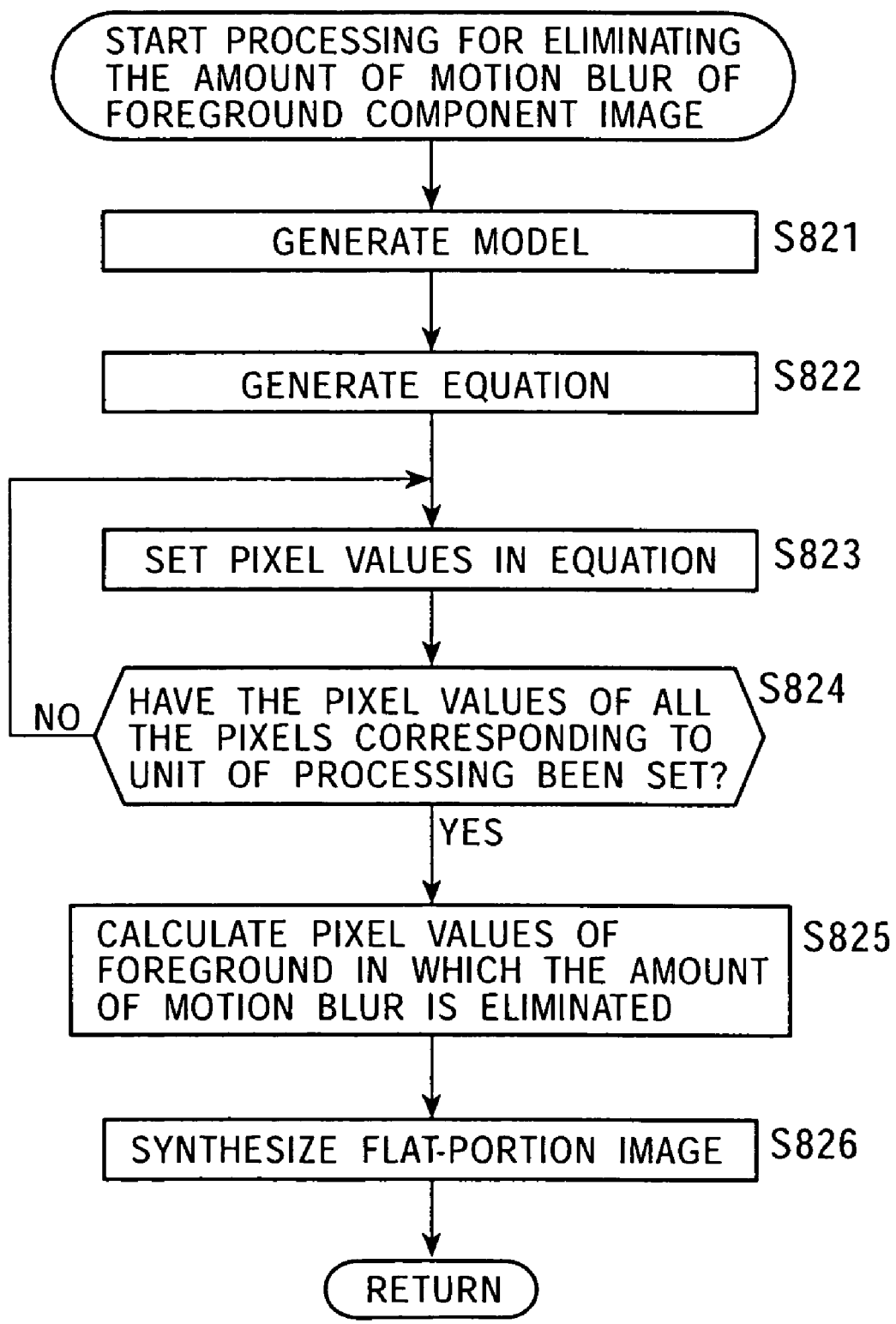
FIG. 86 is a flowchart illustrating the processing for eliminating motion blur of a foreground component image.

A description is given below, with reference to the flowchart of FIG. 86, of the processing in step S803 of FIG. 85 for eliminating motion blur of the foreground component image corresponding to the unit of processing performed by the motion-blur eliminating unit 803.

In step S821, the model-forming portion 821 of the motion-blur eliminating unit 803 generates a model corresponding to the amount of movement v and the unit of processing. In step S822, the equation generator 822 generates equations based on the generated model.

In step S823, the adder 823 sets the pixel values of the foreground component image from which the foreground components corresponding to the flat portion are removed in the generated equations. In step S824, the adder 823 determines whether the pixel values of all the pixels corresponding to the unit of processing have been set. If it is determined that the pixels have not been set in all the equations, the process returns to step S823, and the processing for setting the pixel values in the equations is repeated.

If it is determined in step S824 that the pixels have not been set in all the equations, the process proceeds to step S825. The calculator 824 calculates the pixel values of the foreground without motion blur based on the equations in which the pixel values are set supplied from the adder 823.

In step S826, the calculator 824 combines the flat-portion image supplied to the flat-portion extracting unit 801 with the pixels in which the pixel values of the foreground without motion blur calculated in the processing of step S825 are set, thereby generating the foreground component image without motion blur. The processing is then completed.

In this manner, the motion-blur eliminating unit 803 is able to eliminate motion blur from the foreground component image containing motion blur based on the amount of movement v and the unit of processing.

As described above, the motion-blur adjusting unit 106 having the configuration shown in FIG. 73 is able to adjust the amount of motion blur contained in the input foreground component image.

A known technique for partially eliminating motion blur, such as a Wiener filter, is effective when being used in the ideal state, but is not sufficient for an actual image quantized and containing noise. In contrast, it is proved that the motion-blur adjusting unit 106 configured as shown in FIG. 73 is sufficiently effective for an actual image quantized and containing noise. It is thus possible to eliminate motion blur with high precision.

Moreover, the flat portion is removed from the foreground component image, and the foreground components are calculated for the remaining pixels. Accordingly, the influence of quantizing or noise can be inhibited, and the motion-blur adjusting unit 106 having the configuration shown in FIG. 73 is able to obtain an image in which the amount of motion blur is adjusted with higher precision.

Figure 87:
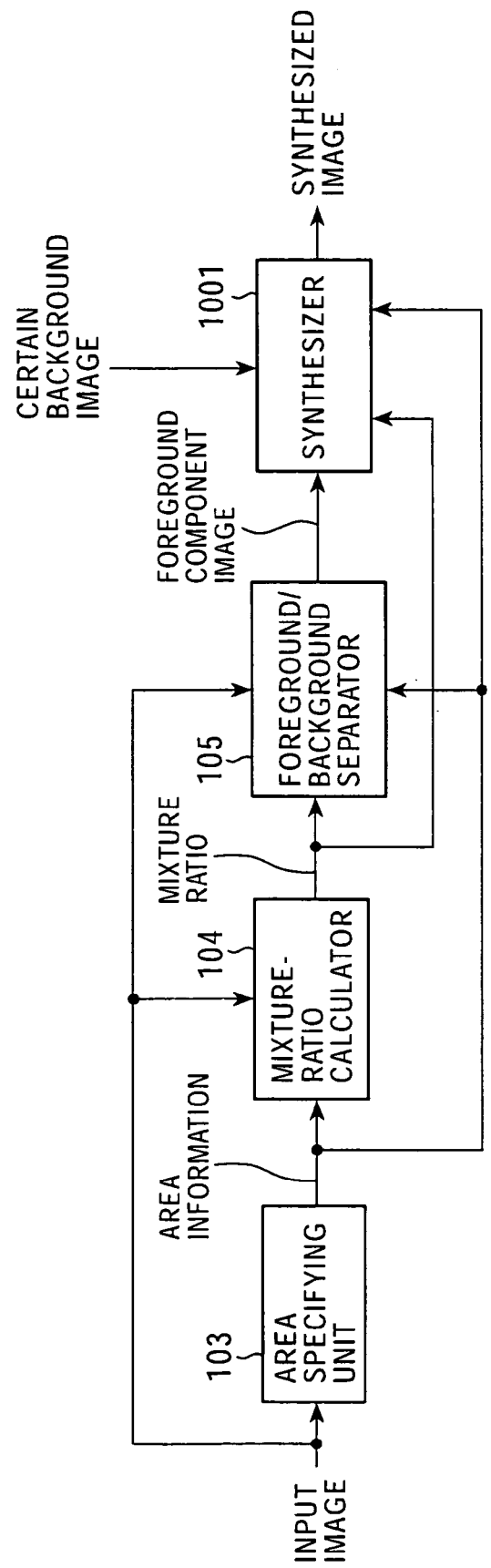
FIG. 87 is a block diagram illustrating another configuration of the function of a signal processing apparatus.

FIG. 87 is a block diagram illustrating another configuration of the function of the signal processing apparatus.

The elements similar to those shown in FIG. 2 are designated with like reference numerals, and an explanation thereof is thus omitted.

The area specifying unit 103 supplies area information to the mixture-ratio calculator 104 and a synthesizer 1001.

The mixture-ratio calculator 104 supplies the mixture ratio α to the foreground/background separator 105 and the synthesizer 1001.

The foreground/background separator 105 supplies the foreground component image to the synthesizer 1001.

The synthesizer 1001 combines a certain background image with the foreground component image supplied from the foreground/background separator 105 based on the mixture ratio α supplied from the mixture-ratio calculator 104 and the area information supplied from the area specifying unit 103, and outputs the synthesized image in which the certain background image and the foreground component image are combined.

Figure 88:
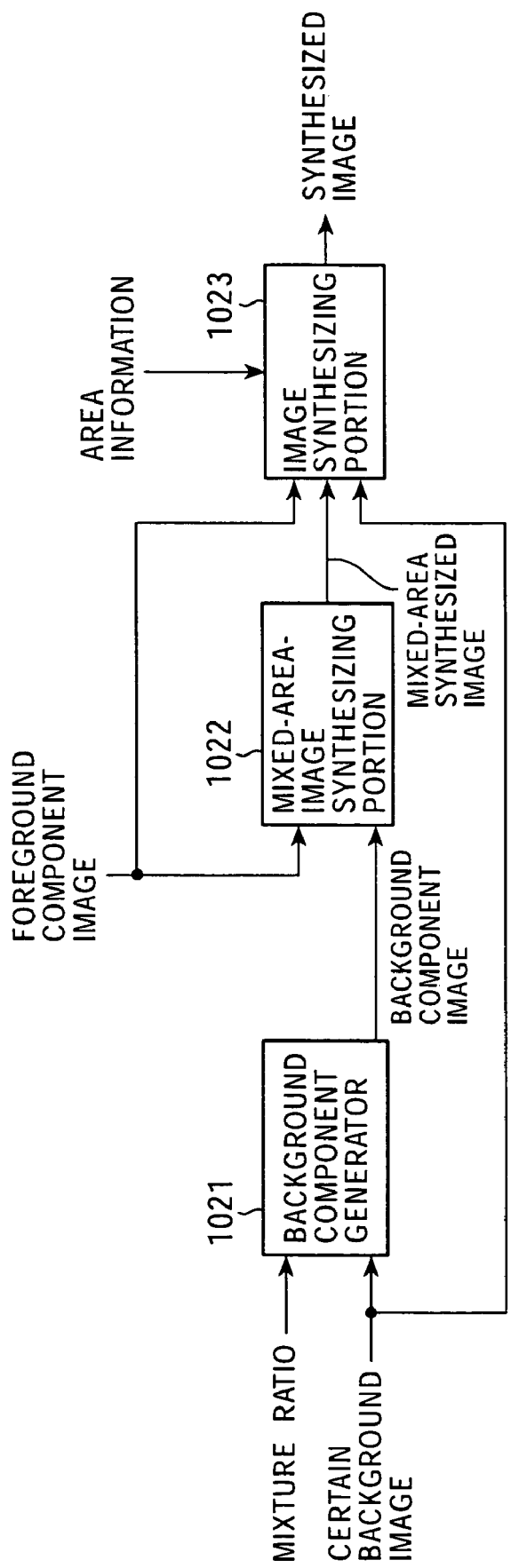
FIG. 88 illustrates the configuration of a synthesizer 1001.

FIG. 88 illustrates the configuration of the synthesizer 1001. A background component generator 1021 generates a background component image based on the mixture ratio α and a certain background image, and supplies the background component image to a mixed-area-image synthesizing portion 1022.

The mixed-area-image synthesizing portion 1022 combines the background component image supplied from the background component generator 1021 with the foreground component image so as to generate a mixed-area synthesized image, and supplies the generated mixture-area synthesized image to an image synthesizing portion 1023.

The image synthesizing portion 1023 combines the foreground component image, the mixed-area synthesized image supplied from the mixed-area-image synthesizing portion 1022, and the certain background image based on the area information so as to generate a synthesized image, and outputs it.

As discussed above, the synthesizer 1001 is able to combine the foreground component image with a certain background image.

The image obtained by combining a foreground component image with a certain background image based on the mixture ratio α, which is the feature quantity, appears more natural compared to an image obtained by simply combining pixels.

Figure 89:
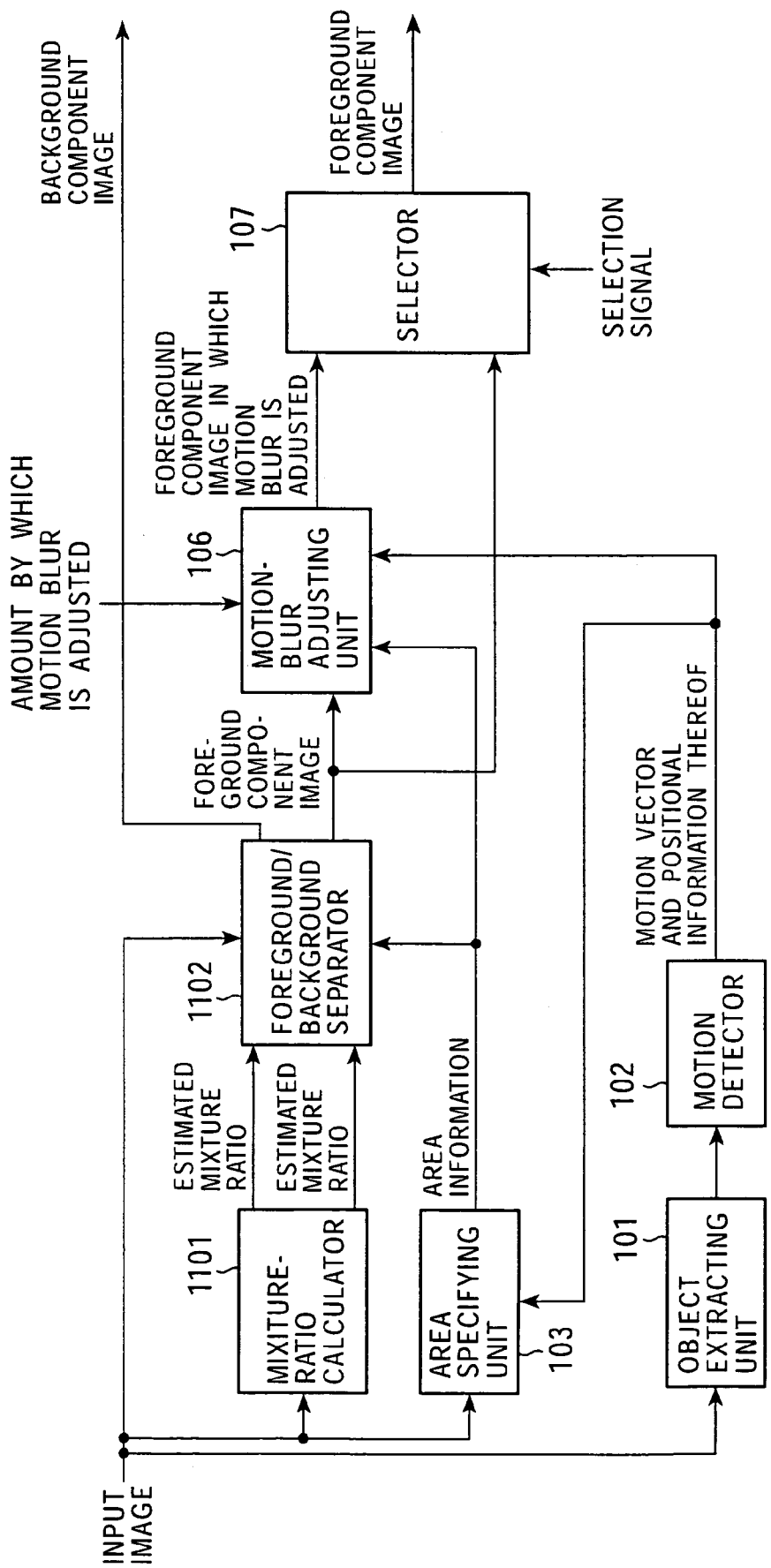
FIG. 89 is a block diagram illustrating still another configuration of the function of the signal processing apparatus.

FIG. 89 is a block diagram illustrating still another configuration of the function of the signal processing apparatus for adjusting the amount of motion blur. The signal processing apparatus shown in FIG. 2 sequentially performs the area-specifying operation and the calculation for the mixture ratio α. In contrast, the signal processing apparatus shown in FIG. 89 simultaneously performs the area-specifying operation and the calculation for the mixture ratio α.

The functional elements similar to those in the block diagram of FIG. 2 are designated with like reference numerals, and an explanation thereof is thus omitted.

An input image is supplied to a mixture-ratio calculator 1101, a foreground/background separator 1102, the area specifying unit 103, and the object extracting unit 101.

The mixture-ratio calculator 1101 calculates, based on the input image, the estimated mixture ratio when it is assumed that each pixel contained in the input image belongs to the covered background area, and the estimated mixture ratio when it is assumed that each pixel contained in the input image belongs to the uncovered background area, and supplies the estimated-mixture ratios calculated as described above to the foreground/background separator 1102.

Figure 90:
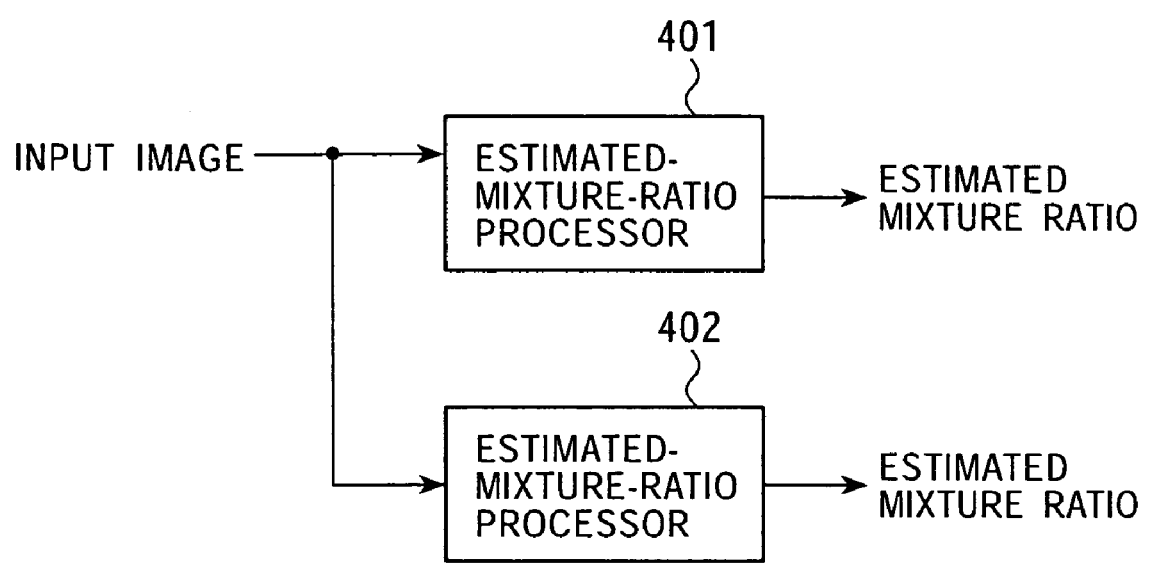
FIG. 90 is a block diagram illustrating the configuration of a mixture-ratio calculator 1101.

FIG. 90 is a block diagram illustrating an example of the configuration of the mixture-ratio calculator 1101.

An estimated-mixture-ratio processor 401 shown in FIG. 90 is the same as the estimated-mixture-ratio processor 401 shown in FIG. 47. An estimated-mixture-ratio processor 402 shown in FIG. 90 is the same as the estimated-mixture-ratio processor 402 shown in FIG. 47.

The estimated-mixture-ratio processor 401 calculates the estimated mixture ratio for each pixel by the computation corresponding to a model of the covered background area based on the input image, and outputs the calculated estimated mixture ratio.

The estimated-mixture-ratio processor 402 calculates the estimated mixture ratio for each pixel by the computation corresponding to a model of the uncovered background area based on the input image, and outputs the calculated estimated mixture ratio.

The foreground/background separator 1102 generates the foreground component image from the input image based on the estimated mixture ratio calculated when it is assumed that the pixel belongs to the covered background area supplied from the mixture-ratio calculator 1101, the estimated mixture ratio calculated when it is assumed that the pixel belongs to the uncovered background area supplied from the mixture-ratio calculator 1101, and the area information supplied from the area specifying unit 103, and supplies the generated foreground component image to the motion-blur adjusting unit 106 and the selector 107.

Figure 91:
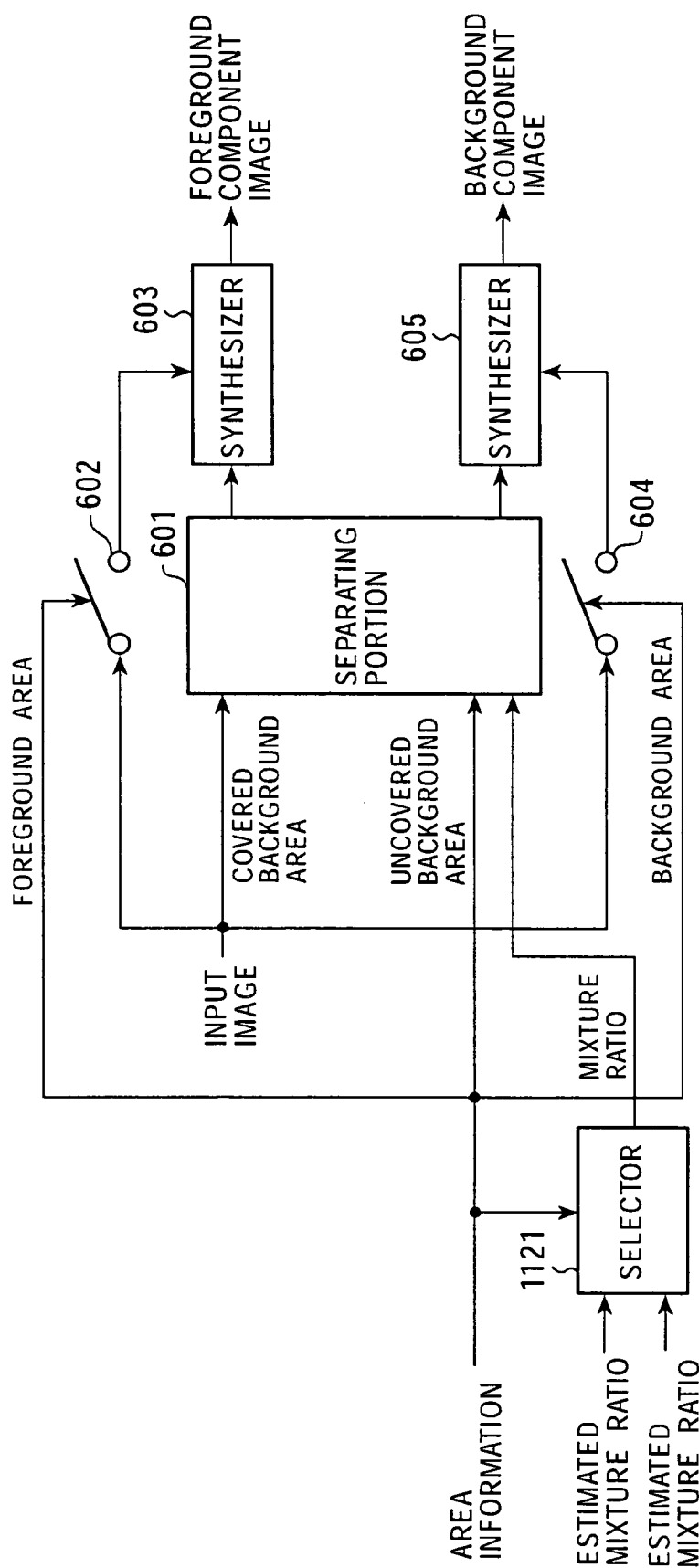
FIG. 91 is a block diagram illustrating the configuration of a foreground/background separator 1102.

FIG. 91 is a block diagram illustrating an example of the configuration of the foreground/background separator 1102.

The elements similar to those of the foreground/background separator 105 shown in FIG. 65 are indicated by like reference numerals, and an explanation thereof is thus omitted.

A selector 1121 selects, based on the area information supplied from the area specifying unit 103, either the estimated mixture ratio calculated when it is assumed that the pixel belongs to the covered background area supplied from the mixture-ratio calculator 1101 or the estimated mixture ratio calculated when it is assumed that the pixel belongs to the uncovered background area supplied from the mixture-ratio calculator 1101, and supplies the selected estimated mixture ratio to the separating portion 601 as the mixture ratio α.

The separating portion 601 extracts the foreground components and the background components from the pixel values of the pixels belonging to the mixed area based on the mixture ratio α supplied from the selector 1121 and the area information, and supplies the extracted foreground components to the synthesizer 603 and also supplies the background components to the synthesizer 605.

The separating portion 601 can be configured similarly to the counterpart shown in FIG. 70.

The synthesizer 603 synthesizes the foreground component image and outputs it. The synthesizer 605 synthesizes the background component image and outputs it.

The motion-blur adjusting unit 106 shown in FIG. 89 can be configured similarly to the counterpart shown in FIG. 2. The motion-blur adjusting unit 106 adjusts the amount of motion blur contained in the foreground component image supplied from the foreground/background separator 1102 based on the area information and the motion vector, and outputs the foreground component image in which the amount of motion blur is adjusted.

The selector 107 shown in FIG. 89 selects the foreground component image supplied from the foreground/background separator 1102 or the foreground component image in which the amount of motion blur is adjusted supplied from the motion-blur adjusting unit 106 based on, for example, a selection signal reflecting a user's selection, and outputs the selected foreground component image.

As discussed above, the signal processing apparatus shown in FIG. 89 is able to adjust the amount of motion blur contained in an image corresponding to a foreground object of the input image, and outputs the resulting foreground object image. As in the first embodiment, the signal processing apparatus shown in FIG. 89 is able to calculate the mixture ratio α, which is embedded information, and outputs the calculated mixture ratio α.

Figure 92:
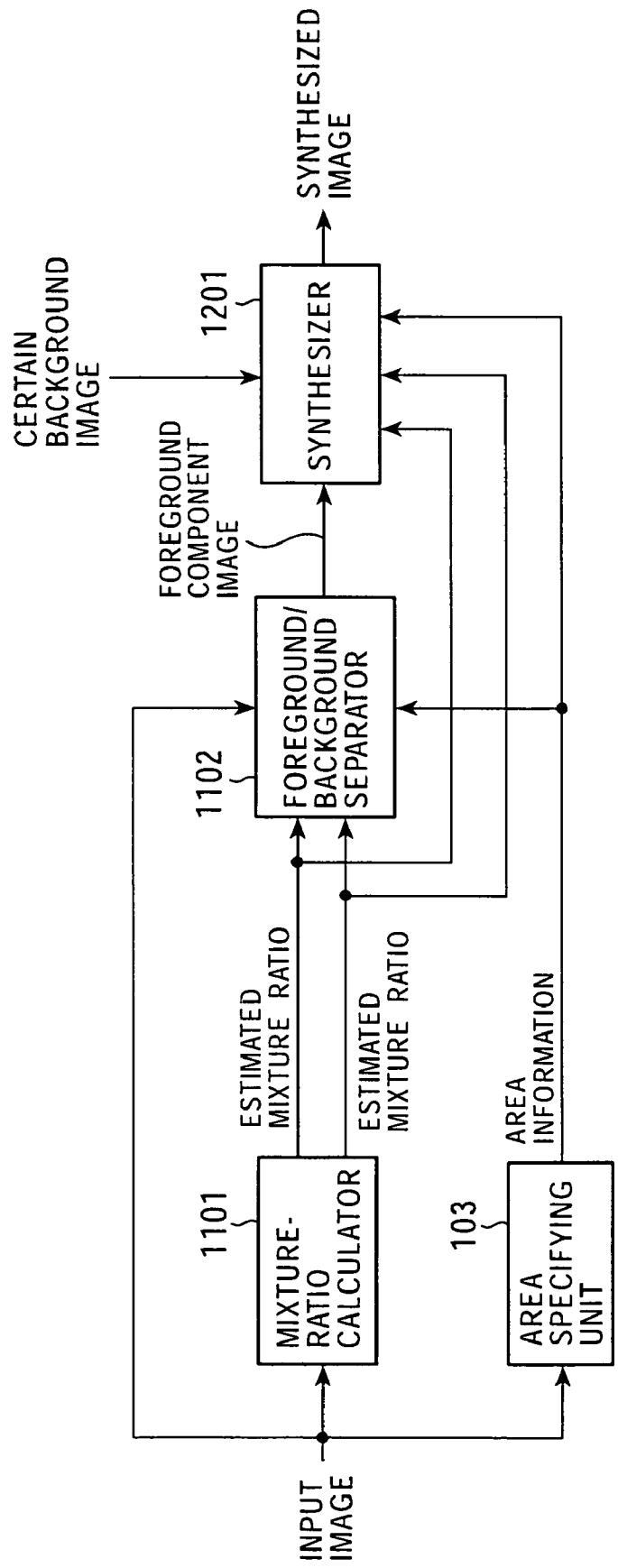
FIG. 92 is a block diagram illustrating still another configuration of the function of the signal processing apparatus.

FIG. 92 is a block diagram illustrating another configuration of the function of the signal processing apparatus for combining a foreground component image with a certain background image. The signal processing apparatus shown in FIG. 87 serially performs the area-specifying operation and the calculation for the mixture ratio α. In contrast, the signal processing apparatus shown in FIG. 92 performs the area-specifying operation and the calculation for the mixture ratio α in a parallel manner.

The functional elements similar to those indicated by the block of FIG. 89 are indicated by like reference numerals, and an explanation thereof is thus omitted.

The mixture-ratio calculator 1101 shown in FIG. 92 calculates, based on the input image, the estimated mixture ratio when it is assumed that each pixel contained in the input image belongs to the covered background area, and the estimated mixture ratio when it is assumed that each pixel contained in the input image belongs to the uncovered background area, and supplies the estimated mixture ratios calculated as described above to the foreground/background separator 1102 and a synthesizer 1201.

The foreground/background separator 1102 shown in FIG. 92 generates the foreground component image from the input image based on the estimated mixture ratio calculated when it is assumed that the pixel belongs to the covered background area supplied from the mixture-ratio calculator 1101, the estimated mixture ratio calculated when it is assumed that the pixel belongs to the uncovered background area supplied from the mixture-ratio calculator 1101, and the area information supplied from the area specifying unit 103, and supplies the generated foreground component image to the synthesizer 1201.

The synthesizer 1201 combines a certain background image with the foreground component image supplied from the foreground/background separator 1102 based on the estimated mixture ratio calculated when it is assumed that the pixel belongs to the covered background area supplied from the mixture-ratio calculator 1101, the estimated mixture ratio calculated when it is assumed that the pixel belongs to the uncovered background area supplied from the mixture-ratio calculator 1101, and the area information supplied from the area specifying unit 103, and outputs the synthesized image in which the background image and the foreground component image are combined.

Figure 93:
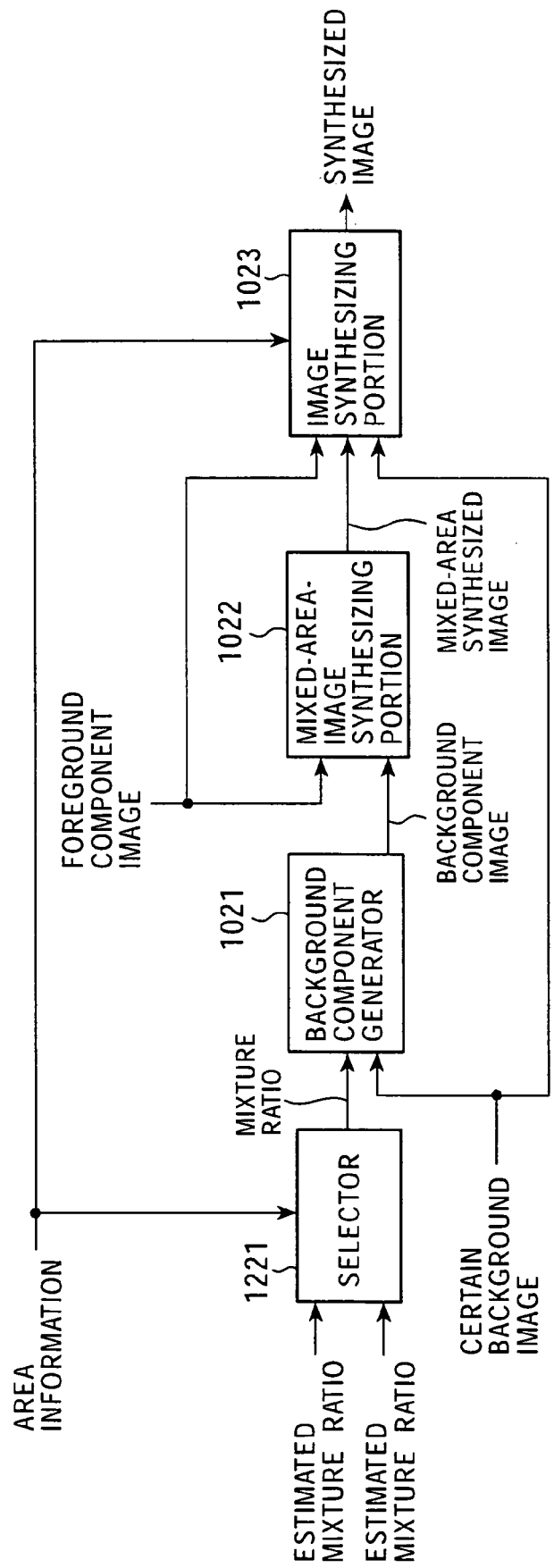
FIG. 93 illustrates the configuration of a synthesizer 1201.

FIG. 93 illustrates the configuration of the synthesizer 1201. The functional elements similar to those of the block diagram of FIG. 88 are designated with like reference numerals, and explanation thereof is thus omitted.

A selector 1221 selects, based on the area information supplied from the area specifying unit 103, either the estimated mixture ratio calculated when it is assumed that the pixel belongs to the covered background area supplied from the mixture-ratio calculator 1101 or the estimated mixture ratio calculated when it is assumed that the pixel belongs to the uncovered background area supplied from the mixture-ratio calculator 1101, and supplies the selected estimated mixture ratio to the background component generator 1021 as the mixture ratio α.

The background component generator 1021 shown in FIG. 93 generates a background component image based on the mixture ratio α supplied from the selector 1221 and a certain background image, and supplies the background component image to the mixed-area-image synthesizing portion 1022.

The mixed-area-image synthesizing portion 1022 shown in FIG. 93 combines the background component image supplied from the background component generator 1021 with the foreground component image so as to generate a mixed-area synthesized image, and supplies the generated mixed-area synthesized image to the image synthesizing portion 1023.

The image synthesizing portion 1023 combines the foreground component image, the mixed-area synthesized image supplied from the mixed-area-image synthesizing portion 1022, and the background image based on the area information so as to generate a synthesized image and outputs it.

In this manner, the synthesizer 1201 is able to combine the foreground component image with a certain background image.

Figure 94:
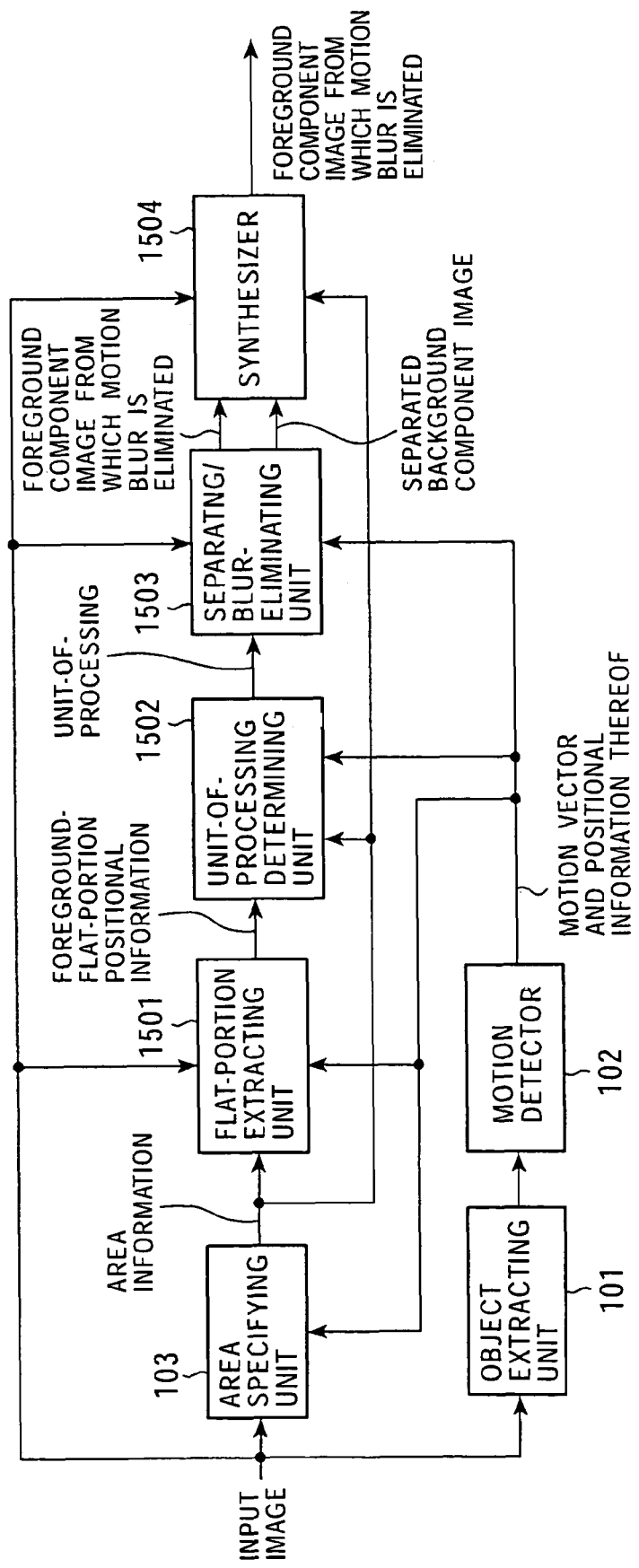
FIG. 94 is a block diagram illustrating still another configuration of the signal processing apparatus.

FIG. 94 is a block diagram illustrating still another configuration of the signal processing apparatus.

The elements similar to those shown in FIG. 2 are indicated by like reference numerals, and an explanation thereof is thus omitted.

The input image supplied to the signal processing apparatus is supplied to the object extracting unit 101, the area specifying unit 103, a flat-portion extracting unit 1501, a separating/blur-eliminating unit 1503, and a synthesizer 1504.

The object extracting unit 101 extracts a rough image object corresponding to the foreground object contained in the input image, and supplies the extracted image object to a motion detector 102. The object extracting unit 101 extracts a rough image object corresponding to the background object contained in the input image, and supplies the extracted image object to the motion detector 102.

The motion detector 102 calculates the motion vector of the rough image object corresponding to the foreground object, and supplies the calculated motion vector and the positional information of the motion vector to the area specifying unit 103, the flat-portion extracting unit 105, the unit-of-processing determining unit 1502, and the separating/blur-eliminating unit 1503.

The area specifying unit 103 specifies each pixel of the input image to one of the foreground area, the background area, or the mixed area, and supplies the information indicating to which of the foreground area, the background area, or the mixed area each pixel belongs (hereinafter referred to as the "area information") to the flat-portion extracting unit 1501, the unit-of-processing determining unit 1502, and the synthesizer 1504.

The flat-portion extracting unit 1501 extracts, based on the input image, the motion vector and the positional information thereof supplied from the motion detector 102, and the area information supplied from the area specifying unit 103, a flat portion in which the amount by which the pixel values of adjacent pixels belonging to the foreground area changes is small selected among the consecutive pixels arranged in the moving direction from the pixel belonging to the uncovered background area to the pixel belonging to the covered background area. The flat portion extracted by the flat-portion extracting unit 1501 consists of pixels having equal pixel values.

For example, the flat-portion extracting unit 1501 extracts, based on the input image, the motion vector and the positional information thereof supplied from the motion detector 102, and the area information supplied from the area specifying unit 103, a flat portion in which the amount by which the pixel values of adjacent pixels belonging to the foreground area is smaller than a prestored threshold Tfh1 selected among the consecutive pixels arranged in the moving direction from the pixel belonging to the uncovered background area to the pixel belonging to the covered background area.

The flat-portion extracting unit 1501 also extracts, for example, a flat portion in which the amount by which the pixel values of adjacent pixels of the foreground component image change is within 1%. The ratio of the amount by which the pixel values change, which is a reference value for extracting a flat portion, may be set to a desired value.

The flat-portion extracting unit 1501 also extracts a flat portion in which the standard deviation of the pixel values of adjacent pixels of the foreground component image is smaller than the prestored threshold Thf1.

Moreover, the flat-portion extracting unit 1501 extracts, for example, based on the regression line corresponding to the pixel values of adjacent pixels of the foreground component image, a flat portion in which the sum of the errors of the regression line and the individual pixel values is smaller than the prestored threshold Thf1.

The reference value for extracting the flat portions, such as the threshold Thf1 or the ratio of the amount by which pixel values change, may be set to a desired value, and the present invention is not restricted by the reference value for extracting the flat portions. The reference value for extracting the flat portions can be adaptively changed.

The flat-portion extracting unit 1501 generates the foreground-flat-portion positional information, which is the information indicating the position of the extracted flat portion, and supplies the generated foreground-flat-portion positional information to the unit-of-processing determining unit 1502.

The unit-of-processing determining unit 1502 determines the unit of processing indicating at least one pixel belonging to the foreground area or the mixed area based on the foreground-flat-portion positional information supplied from the flat-portion extracting unit 1501, the motion vector and the positional information thereof supplied from the motion vector 102, and the area information supplied from the area specifying unit 103.

The unit-of-processing determining unit 1502 supplies the generated unit of processing to the separating/blur-eliminating unit 1503.

The separating/blur-eliminating unit 1503 generates, based on the unit of processing supplied from the unit-of-processing determining unit 1502, and the motion vector and the positional information thereof supplied from the motion detector 102, the foreground component image without motion blur and the separated background component image from the pixels specified by the unit of processing among the pixels of the input image, and supplies the generated foreground component image and the background component image to the synthesizer 1504.

The synthesizer 1504 synthesizes, based on the area information supplied from the area specifying unit 103, an image from which motion blur of the foreground object is eliminated, from the foreground component image without motion blur, the separated background component image, and the input image supplied from the separating/blur-eliminating unit 1503, and outputs the synthesized image without motion blur.

Figure 95:
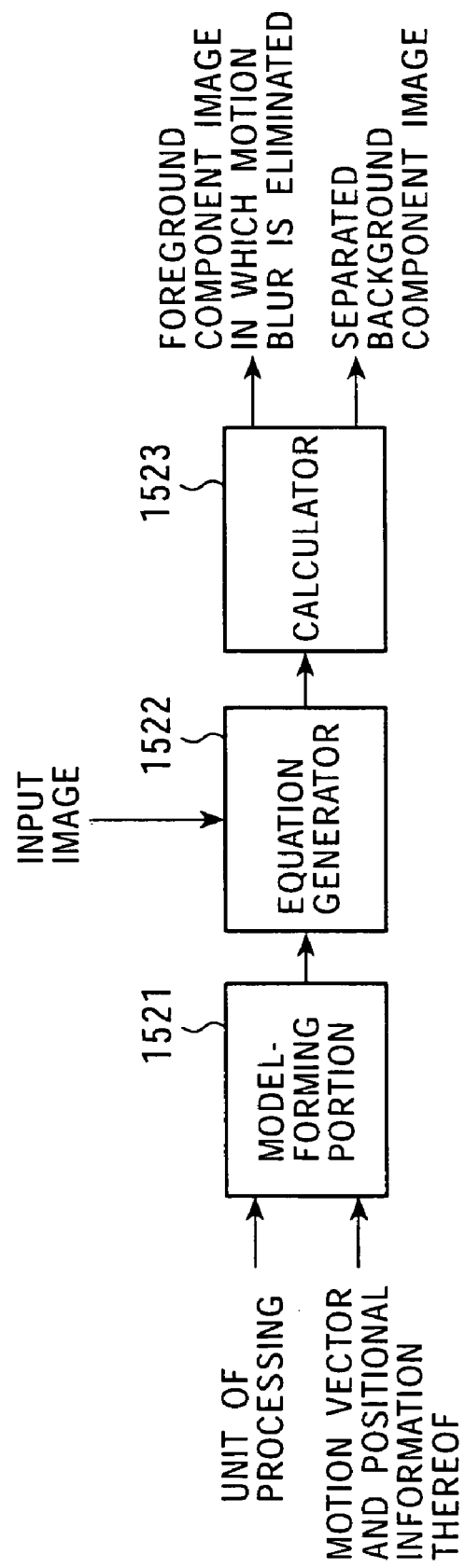
FIG. 95 is a block diagram illustrating the configuration of a separating/blur-eliminating unit 1503.

FIG. 95 is a block diagram illustrating the configuration of the separating/blur-eliminating unit 1503. The motion vector and the positional information thereof supplied from the motion detector 102 and the unit of processing supplied from the unit-of-processing determining unit 1502 are supplied to a model-forming portion 1521.

The model-forming portion 1521 generates a model based on the motion vector and the positional information thereof supplied from the motion detector 102, and the unit of processing supplied from the unit-of-processing determining unit 1502, and supplies the generated model to an equation generator 1522.

The unit of processing and a model corresponding to the unit of processing are described below with reference to FIGS. 96 through 99.

Figure 96:
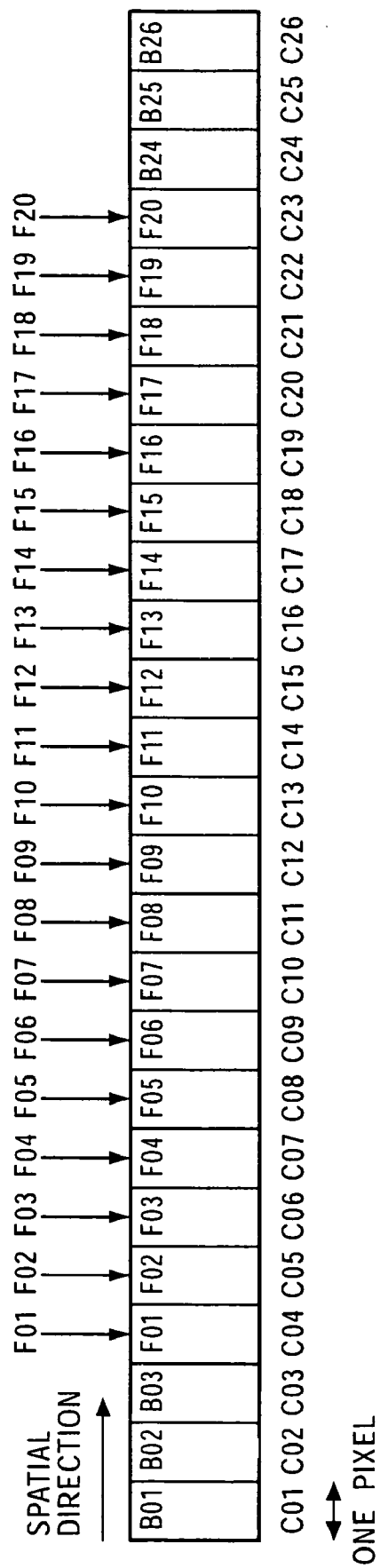
FIG. 96 illustrates the unit of processing and a model corresponding to the unit of processing.

FIG. 96 illustrates an example of pixels when the occurrence of motion blur is suppressed by sufficiently increasing the shutter speed of a sensor. F01 through F20 are image components corresponding to a foreground object.

The pixel value C04 corresponding to the foreground object is F01, the pixel value C05 corresponding to the foreground object is F02, and the pixel value C06 corresponding to the foreground object is F03. Each pixel value consists of a component of an image corresponding to the foreground object. Similarly, the pixel values C07 through C23 correspond to F04 through F20, respectively.

In the example shown in FIG. 96, since the background object is stationary, motion blur does not occur in the background.

The pixel value C01 corresponding to the background object is B01, the pixel value C02 corresponding to the background object is B02, and the pixel value C03 corresponding to the background object is B03. Similarly, the pixel value C24 corresponding to the background object is B24, the pixel value C25 corresponding to the background object is B25, and the pixel value C26 corresponding to the background object is B26.

Figure 97:
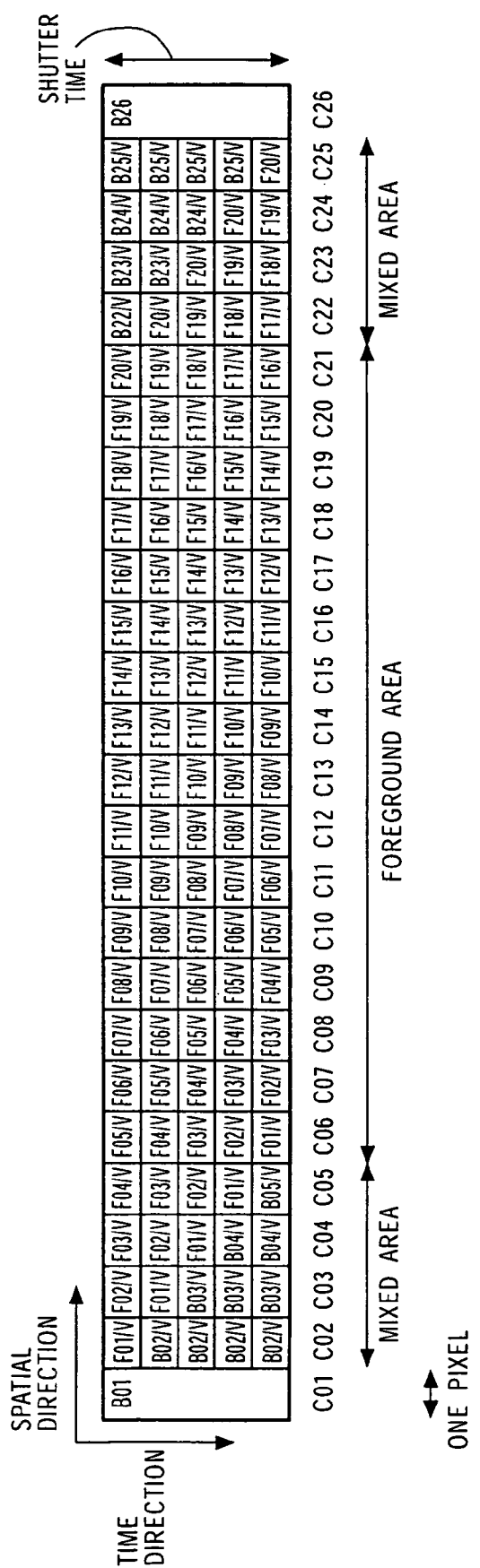
FIG. 97 illustrates the unit of processing and a model corresponding to the unit of processing.

FIG. 97 illustrates a model obtained by expanding the pixel values in the time direction when motion blur occurs.

In the example shown in FIG. 97, the amount of movement v is 5, and the foreground object is moving from the left to the right in FIG. 97.

In the example shown in FIG. 97, the second through fifth pixels from the left belong to the mixed area, and the twenty-second through twenty-fifth pixels from the left belong to the mixed area.

The sixth through twenty-first pixels from the left belong to the foreground area.

Based on the prestored threshold Thf1, the flat-portion extracting unit 1501 extracts, among the consecutive pixels arranged in the moving direction to the pixel belonging to the covered background area, the consecutive pixels belonging to the foreground area and whose amount of change is smaller than the threshold Thf1.

The threshold Thf1 is a sufficiently small value. The number of consecutive pixels extracted by the flat-portion extracting unit 1501 must be greater than the amount of movement v of the foreground object. For example, when the amount of movement v within one frame is 5, the flat-portion extracting unit 1501 extracts five or more pixels in which there is almost no change in the pixel values, i.e., a flat portion.

Figure 98:
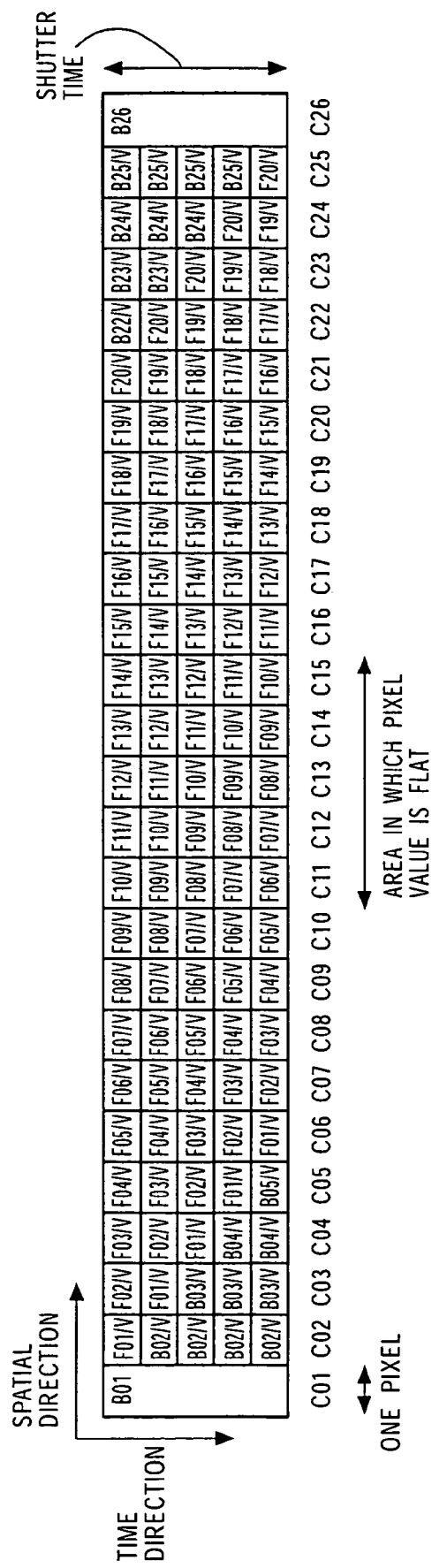
FIG. 98 illustrates the unit of processing and a model corresponding to the unit of processing.

For example, in the example shown in FIG. 98, when equation (105) holds true, the foreground components $F06/v$ through $F14/v$ are equal from the relationship of equations (106) through (110).

$$C11=C12=C13=C14=C15 \tag{105}$$

$$C11=F06/v+F07/v+F08/v+F09/v+F10/v \tag{106}$$

$$C12=F07/v+F08/v+F09/v+F10/v+F11/v \tag{107}$$

$$C13=F08/v+F09/v+F10/v+F11/v+F12/v \tag{108}$$

$$C14=F09/v+F10/v+F11/v+F12/v+F13/v \tag{109}$$

$$C15=F10/v+F11/v+F12/v+F13/v+F14/v \tag{110}$$

That is, the relationship of the foreground components $F06/v$ through $F14/v$ indicated by equation (111) can hold true.

$$F06/v=F07/v=F08/v=F09/v=F10/v=F11/v=F12/v=F13/v32F14/v \tag{111}$$

Figure 99:
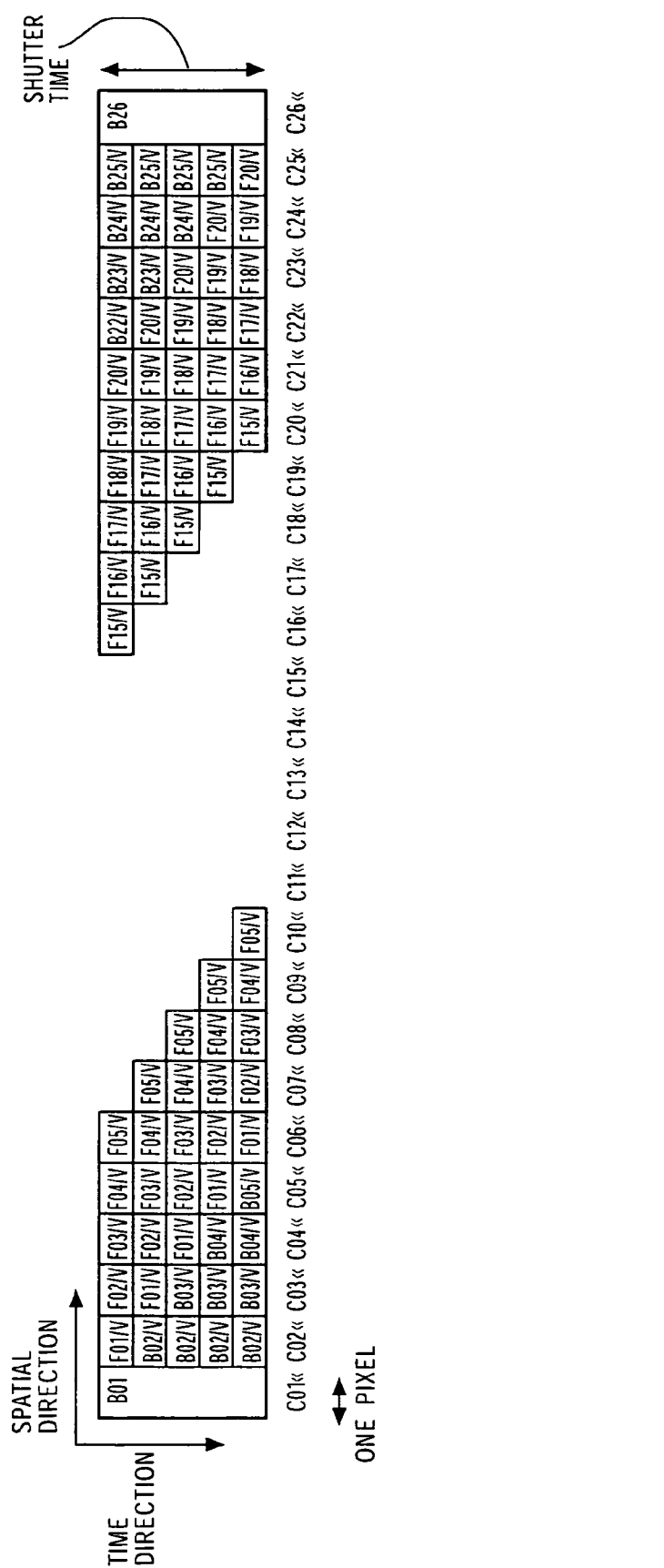
FIG. 99 illustrates the unit of processing and a model corresponding to the unit of processing.

Accordingly, in the subsequent processing for calculating the foreground components and the background components, as shown in FIG. 99, it is only necessary to calculate the foreground components $F01/v$ through $F05/v$ and the foreground components $F15/v$ through $F20/v$ and the background components $B02/v$ through $B05/v$ and the background components $B22/v$ through $B25/v$ other than the foreground components $F06/v$ through $F14/v$.

For example, as shown in FIG. 98, among the 24 pixels, i.e., the second through twenty-fifth pixels from the left in FIG. 98 on the straight line, which are consecutively arranged in the moving direction from the pixel belonging to the uncovered background area to the pixel belonging to the covered background area, if the eleventh through fifteenth pixels from the left belong to a flat portion, the foreground components contained in the eleventh through fifteenth pixels can be removed. Accordingly, as shown in FIG. 99, equations (112) through (120) are generated for the foreground components and the background components corresponding to the remaining consecutive pixels, i.e., the foreground components $F01/v$ through $F05/v$ and the background components $B02/v$ through $B05/v$.

$$C02'=4 \times B02/v+F01/v \tag{112}$$

$$C03'=3 \times B03/v+F01/v+F02/v \tag{113}$$

$$C04'=2 \times B04/v+F01/v+F02/v+F03/v \tag{114}$$

$$C05'=B05/v+F01/v+F02/v+F03/v+F04/v+F05/v \tag{115}$$

$$C06'=F01/v+F02/v+F03/v+F04/v+F05/v \tag{116}$$

$$C07'=F02/v+F03/v+F04/v+F05/v \tag{117}$$

$$C08'=F03/v+F04/v+F05/v \tag{118}$$

$$C09'=F04/v+F05/v \tag{119}$$

$$C10'F05/v \tag{120}$$

There are nine variables, i.e., the foreground components $F01/v$ through $F05/v$ and the background components $B02/v$ through $B05/v$, for the nine equations (112) through (120). Accordingly, by solving equations (112) through (120), the foreground components $F01/v$ through $F05/v$ and the background components $B02/v$ through $B05/v$ can be obtained.

Similarly, equations (121) through (130) are generated for the foreground components $F15/v$ through $F20/v$ and the background components $B22/v$ through $B25/v$.

$$C16'=F15/v \tag{121}$$

$$C17'=F15/v+F16/v \tag{122}$$

$$C18'=F15/v+F16/v+F17/v \tag{123}$$

$$C19'=F15/v+F16/v+F17/v+F18/v \tag{124}$$

$$C20'=F15/v+F16/v+F17/v+F18/v+F19/v \tag{125}$$

$$C21'=F16/v+F17/v+F18/v+F19/v+F20/v \tag{126}$$

$$C22'=F17/v+F18/v+F19/v+F20/v+F22/v \tag{127}$$

$$C23'=F18/v+F19/v+F20/v+2 \times B23/v \tag{128}$$

$$C24'=F19/v+F20/v+3 \times B24/v \tag{129}$$

$$C25'=F20/v+4 \times B25/v \tag{130}$$

There are ten variables, i.e., the foreground components $F15/v$ through $F20/v$ and the background components $B22/v$ through $B25/v$, for the ten equations (121) through (130). Accordingly, by solving equations (121) through (130), the foreground components $F15/v$ through $F20/v$ and the background components $B22/v$ through $B25/v$ can be obtained.

Referring back to FIG. 95, the model-forming portion 1522 determines the number of divided portions of the pixel values in the time direction, the number of foreground components of each pixel, and the number of background components of each pixel based on the motion vector and the positional information thereof supplied from the motion detector 102 and the unit of processing supplied from the unit-of-processing determining unit 1502. The model-forming portion 1522 then forms a model for generating equations for calculating the above-described foreground components and the background components, and supplies the generated model to the equation generator 1522.

The equation generator 1522 generates equations based on the model supplied from the model-forming portion 1521. The equation generator 1522 sets the pixel values belonging to the corresponding foreground or the background in the generated equations, and supplies the equations in which the pixel values are set to the calculator 1523.

The calculator 1523 solves the equations supplied from the equation generator 1522 so as to calculate the foreground components and the background components.

For example, when the equations corresponding to equations (112) through (120) are supplied, the calculator 1523 determines the inverse matrix of the matrix of the left side of the equation expressed by equation (131), and calculates the foreground components F01/v through F05/v and the background components B02/v through B05/v.

$$\begin{bmatrix} 1 & 0 & 0 & 0 & 0 & 4 & 0 & 0 & 0 \\ 1 & 1 & 0 & 0 & 0 & 0 & 3 & 0 & 0 \\ 1 & 1 & 1 & 0 & 0 & 0 & 0 & 2 & 0 \\ 1 & 1 & 1 & 1 & 0 & 0 & 0 & 0 & 1 \\ 1 & 1 & 1 & 1 & 1 & 0 & 0 & 0 & 0 \\ 0 & 1 & 1 & 1 & 1 & 0 & 0 & 0 & 0 \\ 0 & 0 & 1 & 1 & 1 & 0 & 0 & 0 & 0 \\ 0 & 0 & 0 & 1 & 1 & 0 & 0 & 0 & 0 \\ 0 & 0 & 0 & 0 & 1 & 0 & 0 & 0 & 0 \end{bmatrix} \begin{bmatrix} F01/v \\ F02/v \\ F03/v \\ F04/v \\ F05/v \\ B02/v \\ B03/v \\ B04/v \\ B05/v \end{bmatrix} = \begin{bmatrix} C02' \\ C03' \\ C04' \\ C05' \\ C06' \\ C07' \\ C08' \\ C09' \\ C10' \end{bmatrix} \quad (131)$$

Also, when the equations corresponding to equations (121) through (130) are supplied, the calculator 1523 determines the inverse matrix of the matrix of the left side of the equation expressed by equation (132), and calculates the foreground components F15/v through F20/v and the background components B22/v through B25/v.

$$\begin{bmatrix} 1 & 0 & 0 & 0 & 0 & 0 & 0 & 0 & 0 \\ 1 & 1 & 0 & 0 & 0 & 0 & 0 & 0 & 0 \\ 1 & 1 & 1 & 0 & 0 & 0 & 0 & 0 & 0 \\ 1 & 1 & 1 & 1 & 0 & 0 & 0 & 0 & 0 \\ 1 & 1 & 1 & 1 & 1 & 0 & 0 & 0 & 0 \\ 0 & 1 & 1 & 1 & 1 & 1 & 0 & 0 & 0 \\ 0 & 0 & 1 & 1 & 1 & 1 & 1 & 0 & 0 \\ 0 & 0 & 0 & 1 & 1 & 1 & 0 & 2 & 0 \\ 0 & 0 & 0 & 0 & 1 & 1 & 0 & 0 & 3 & 0 \\ 0 & 0 & 0 & 0 & 0 & 1 & 0 & 0 & 0 & 4 \end{bmatrix} \begin{bmatrix} F15/v \\ F16/v \\ F17/v \\ F18/v \\ F19/v \\ B20/v \\ B22/v \\ B23/v \\ B24/v \\ B25/v \end{bmatrix} = \begin{bmatrix} C16' \\ C17' \\ C18' \\ C19' \\ C20' \\ C21' \\ C22' \\ C23' \\ C24' \\ C25' \end{bmatrix} \quad (132)$$

The calculator 1523 generates a foreground component image from which motion blur is eliminated and a separated background component image based on the foreground components and the background components, and outputs the foreground component image without motion blur and the separated background component image.

Figure 100:
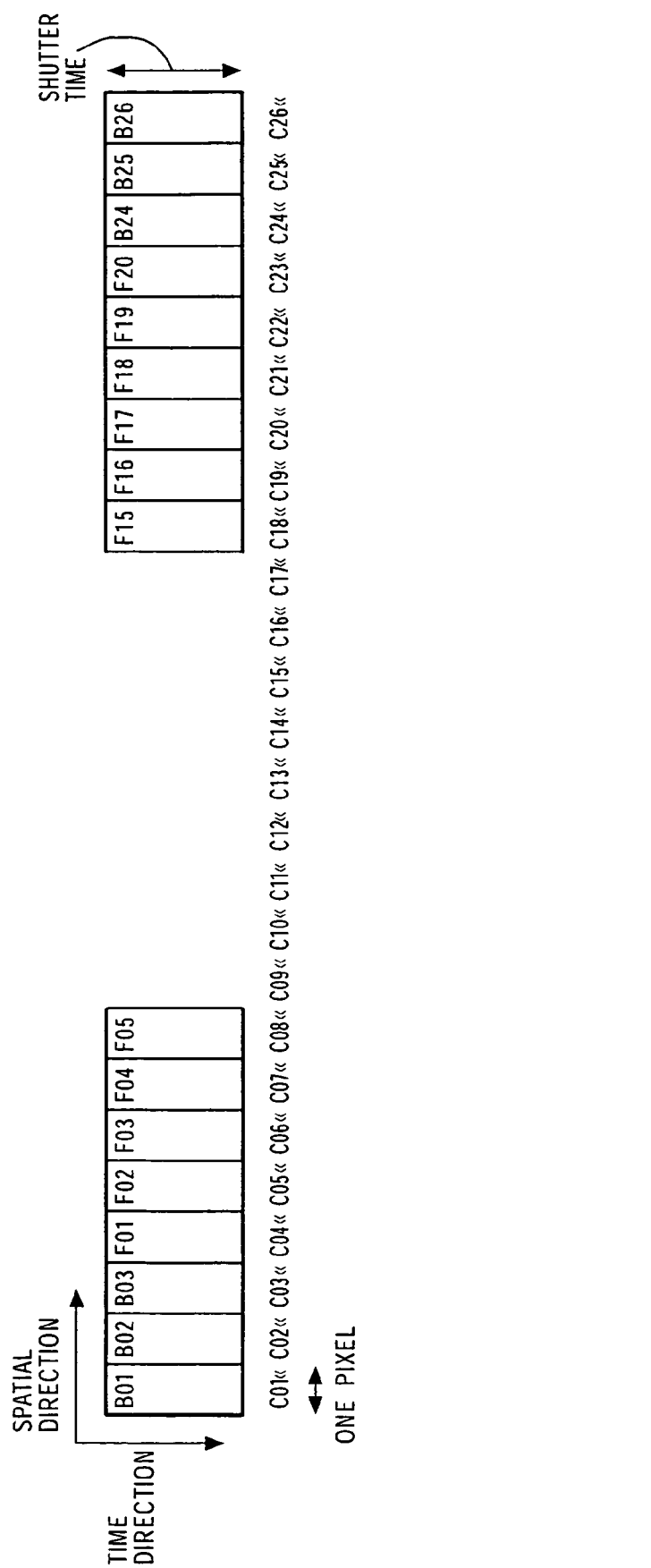
FIG. 100 illustrates the calculation of pixel values.

For example, when solving the equations to determine the foreground components F01/v through F05/v and the background components B02/v through B05/v, and the foreground components F15/v through F20/v and the background components B22/v through B25/v, as shown in FIG. 100, the calculator 1523 multiplies the foreground components F01/v through F05/v, the background components B02/v, the background component B03/v, the foreground components F15/v through F20/v, the background component B24/v, and the background component B25/v by the amount of movement v so as to calculate the pixel values F01 through F05, the pixel value B02, the pixel value B03, the pixel values F15 through F20, the pixel value B24, and the pixel value B25, respectively.

The calculator 1523 generates, for example, a foreground component image without motion blur, which consists of the pixel values F01 through F05 and the pixel values F15 through F20, and a separated background component image consisting of the pixel value B02, the pixel value B03, the pixel value B24, and the pixel value B25.

An example of the result of actual processing performed by the separating/blur-eliminating unit 1503 is described below with reference to FIGS. 101 and 102.

Figure 101:
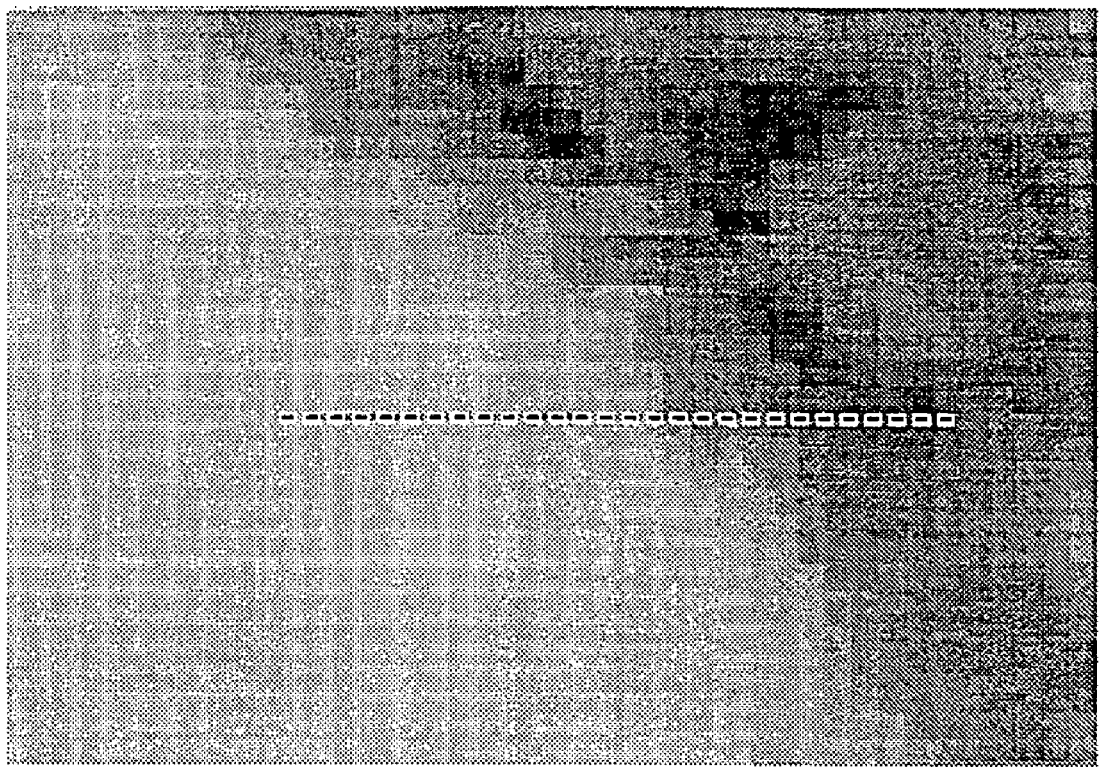
FIG. 101 illustrates an example of an input image.

FIG. 101 illustrates an example of an input image in which a foreground object and a background object are mixed. The image on the top right of FIG. 101 corresponds to the background object, and the image on the bottom left in FIG. 101 corresponds to the foreground object. The foreground object is moving from the left to the right. The band-like portion between the top left and the bottom left is the mixed area.

Figure 102:
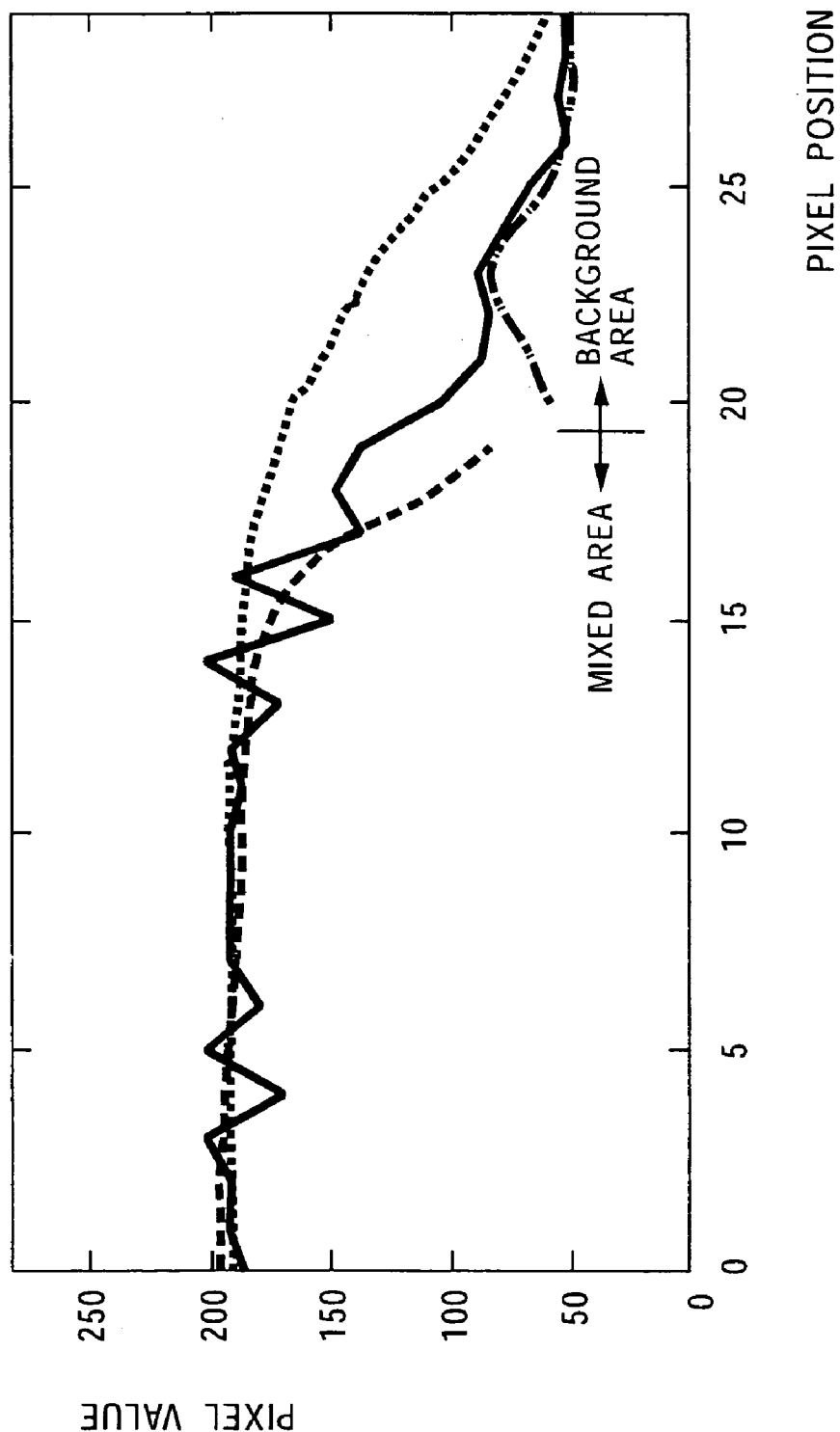
FIG. 102 illustrates an example of a processing result.

The result obtained by performing the above-described processing on the pixels on the central line in FIG. 101 is shown in FIG. 102. The fine-dot line in FIG. 102 indicates the pixel values of the input image.

The rough-dot line in FIG. 102 indicates the pixel values of the foreground object free from motion blur, and the one-dot-chain line designates the pixel values of the background object without the foreground object.

The solid line in FIG. 102 designates the pixel values of the foreground component image from which motion blur is eliminated and the separated background component image after performing the above-described processing on the input image.

As is seen from the above-described result, the information processing apparatus having the configuration shown in FIG. 94 is able to output the pixel values close to the pixel values of the foreground object free from motion blur and the pixel values of the background object without containing the foreground object.

The processing for eliminating motion blur performed by the signal processing apparatus having the configuration shown in FIG. 94 is described below with reference to the flowchart of FIG. 103. In step S1001, the area specifying unit 103 executes area specifying processing by generating, based on an input image, area information indicating to which of the foreground area, the background area, the covered background area, or the uncovered background area each pixel of the input image belongs. The area specifying unit 103 supplies the generated area information to the flat-portion extracting unit 1501.

In step S1002, the flat-portion extracting unit 1501 extracts, among pixels consecutively located in the moving direction from the pixel belonging to the uncovered background area to the pixel belonging to the covered background area, a flat portion in which the amount by which the pixel values of pixels belonging to the foreground area change is smaller than the threshold Thf1, based on the motion vector and the positional information thereof, and the area information. The flat-portion extracting unit 1501 generates the foreground-flat-portion positional information indicating the position of the extracted flat portion, and supplies the generated foreground-flat-portion positional information to the unit-of-processing determining unit 1502.

In step S1003, the unit-of-processing determining unit 1502 determines the unit of processing indicating at least one pixel contained in the object corresponding to the foreground based on the motion vector and the positional information thereof and the area information, and supplies the unit of processing to the separating/blur-eliminating unit 1503.

In step S1004, the separating/blur-eliminating unit 1503 performs, based on the unit of processing supplied from the unit-of-processing determining unit 1502, and the motion vector and the positional information thereof supplied from the motion detector 102, simultaneous processing for separating the foreground and the background and for eliminating motion blur on the pixels specified by the unit of processing among the pixels of the input image, thereby calculating the foreground components and the background components corresponding to the pixels specified by the unit of processing. Details of the simultaneous processing for separating the foreground and the background and for eliminating motion blur are described below with reference to the flowchart of FIG. 104.

In step S1005, the separating/blur-eliminating unit 1503 calculates the foreground components of the flat portion.

In step S1006, the separating/blur-eliminating unit 1503 calculates the pixel values of the foreground component image free from motion blur and the pixel values of the background component image based on the foreground components and the background components calculated in the processing of step S1004 and the foreground components of the flat portion calculated in the processing of step S1005. The separating/blur-eliminating unit 1503 supplies the foreground component image free from motion blur and the background component image to the synthesizer 1504.

In step S1007, the signal processing apparatus determines whether the processing for the entire screen has been finished. If it is determined that the processing for the entire screen has not been finished, the process returns to step S1004, and the processing for separating the foreground and the background and for eliminating motion blur is repeated.

If it is determined in step S1007 that the processing for the entire screen has been finished, the process proceeds to step S1008 in which the synthesizer 1504 combines the background, the foreground component image free from motion blur, and the background component image. The processing is then completed.

As discussed above, the signal processing apparatus separates the foreground and the background so as to eliminate motion blur contained in the foreground.

Figure 104:
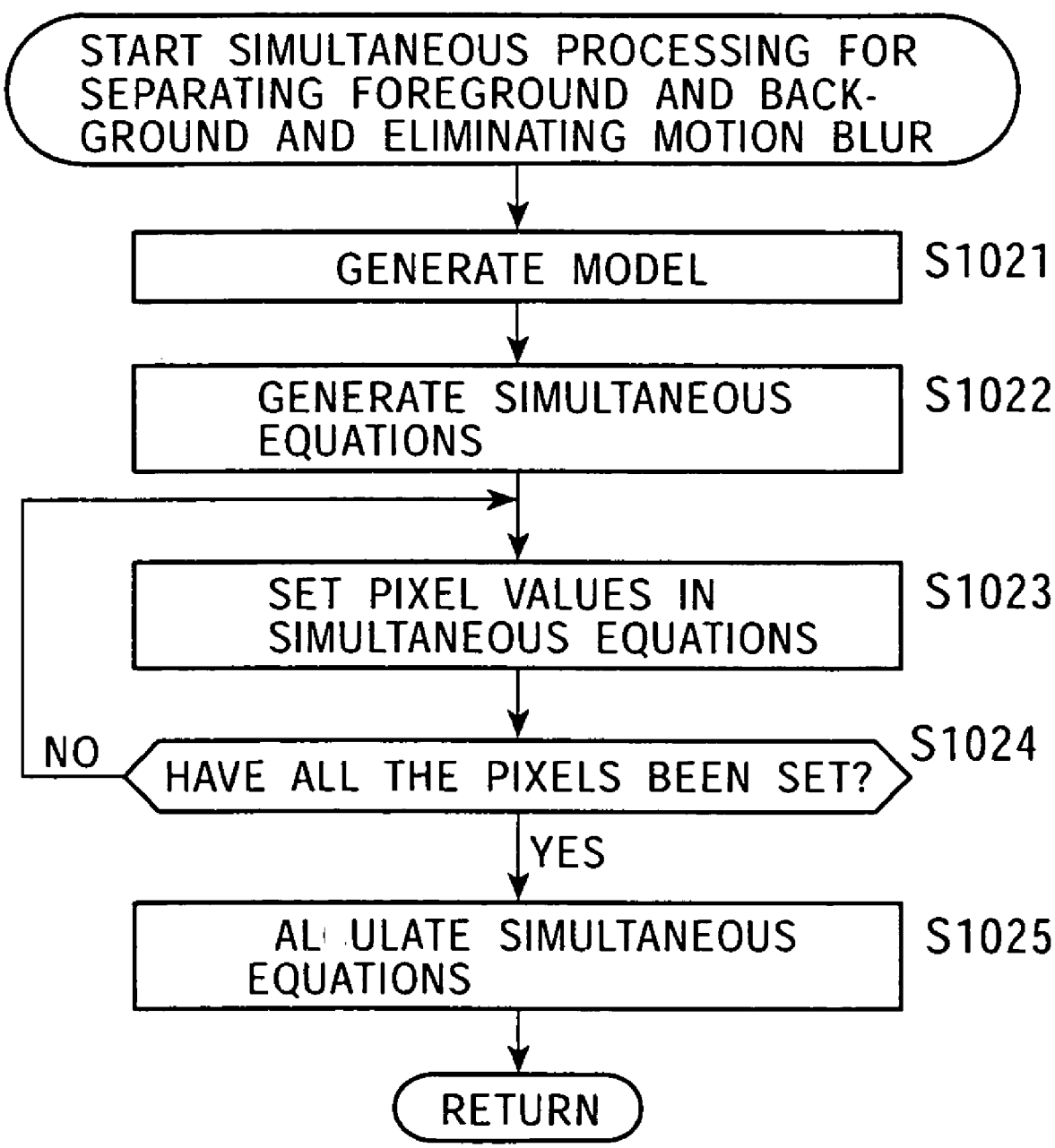
FIG. 104 is a flowchart illustrating simultaneous processing for separating a foreground and a background and for eliminating motion blur.

The simultaneous processing for separating the foreground and the background and for eliminating motion blur performed by the separating/blur-eliminating unit 1503 is described below with reference to the flowchart of FIG. 104.

In step S1201, the model-forming portion 1521 forms a model based on the unit of processing supplied from the unit-of-processing determining unit 1502 and the motion vector and the positional information thereof supplied from the motion detector 102. The model-forming portion 1521 supplies the generated model to the equation generator 1522.

In step S1022, the equation generator 1522 generates simultaneous equations corresponding to the relationship among the pixel values, the foreground components, and the background components based on the model supplied from the model-forming portion 1521.

In step S1023, the equation generator 1522 sets the pixel values corresponding to the input image in the generated simultaneous equations.

In step S1024, the equation generator 1522 determines whether all the pixel values have been set in the simultaneous equations. If it is determined that all the pixel values have not been set, the process returns to step S1023, and the processing for setting the pixel values is repeated.

If it is determined in step S1024 that all the pixel values have been set, the equation generator 1522 supplies the simultaneous equations in which the pixel values are set to the calculator 1523, and the calculator 1523 calculates the simultaneous equations in which the pixel values are set so as to calculate the foreground components and the background components. The processing is then completed.

As discussed above, the separating/blur-eliminating unit 1503 is able to generate the foreground component image free from motion blur and the separated background component image based on the calculated foreground components and the background components.

Figure 105:
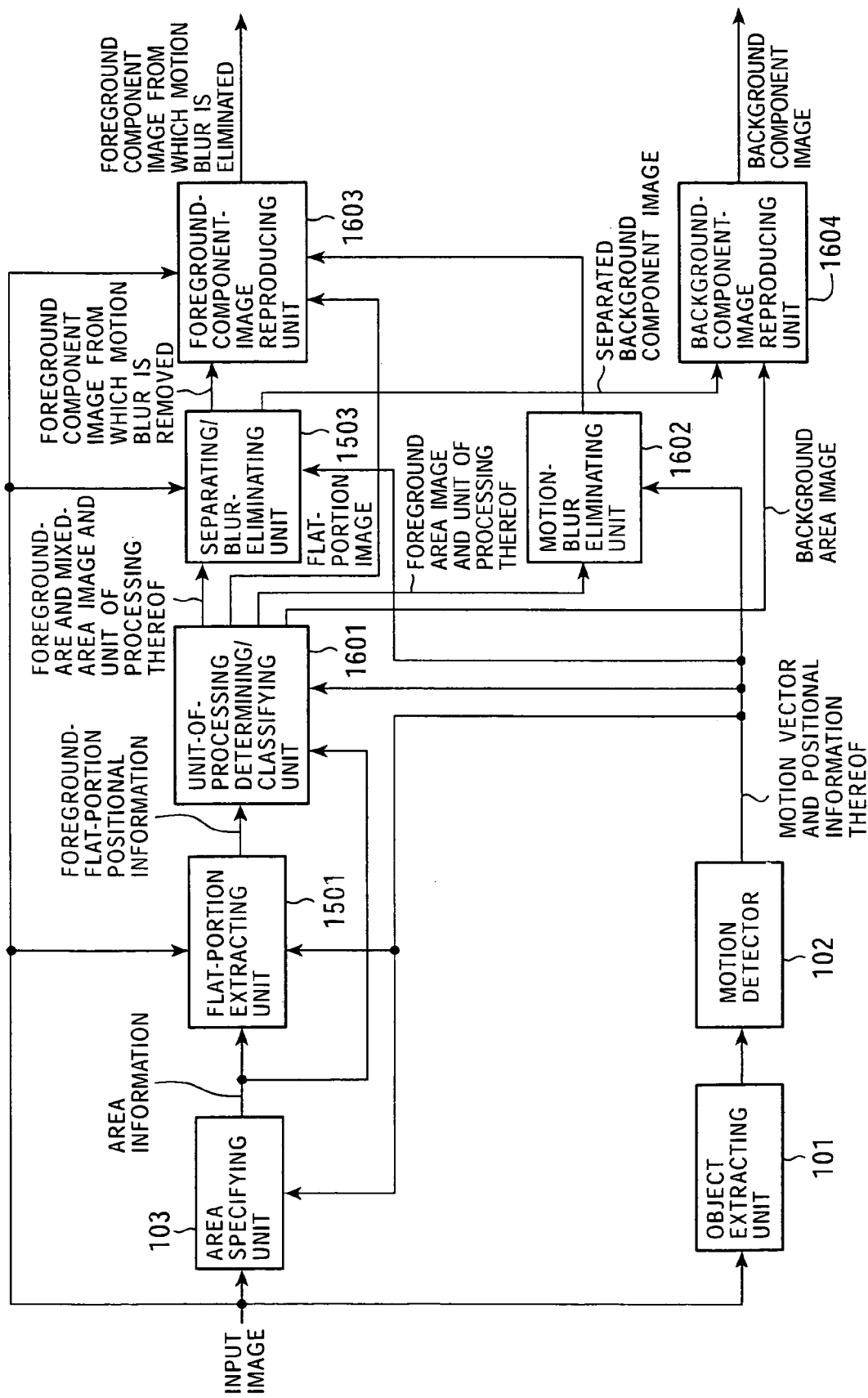
FIG. 105 is a block diagram illustrating still another configuration of the signal processing apparatus.

FIG. 105 is a block diagram illustrating still another configuration of the signal processing apparatus. The elements similar to those in FIG. 94 are indicated by like reference numerals, and an explanation thereof is thus omitted.

A unit-of-processing determining/classifying unit 1601 generates the unit of processing based on the motion vector and the positional information thereof supplied from the motion detector 102, the area information supplied from the area specifying unit 103, and the foreground-flat-portion positional information supplied from the flat-portion extracting unit 1501. The unit-of-processing determining/classifying unit 1601 also classifies the pixels of the input image, and supplies the classified pixels to one of the separating/blur-eliminating unit 1503, a motion-blur eliminating unit 1602, a foreground-component-image reproducing unit 1603, and a background-component-blur reproducing unit 1604.

The unit-of-processing determining/classifying unit 1601 removes, among the pixels consecutively arranged in the moving direction from the pixel belonging to the uncovered background area to the pixel belonging to the covered background area, the foreground components corresponding to the flat portion from the pixels belonging to the foreground area. The unit-of-processing determining/classifying unit 1601 supplies the pixels belonging to the mixed area from which the foreground components corresponding to the flat portion of the foreground area are removed, and the pixels belonging to the foreground area to the separating/blur-eliminating unit 1503 together with the corresponding unit of processing.

The unit-of-processing determining/classifying unit 1601 supplies the flat-portion image of the foreground area to the foreground-component-image reproducing unit 1603.

The unit-of-processing determining/classifying unit 1601 supplies the pixels belonging to the foreground area and sandwiched by the flat portions, from which the foreground components corresponding to the flat portion are removed, to the motion-blur eliminating unit 1602 together with the corresponding unit of processing.

The unit-of-processing determining/classifying unit 1601 supplies the pixels belonging to the background area to the background-component-image reproducing unit 1604.

The separating/blur-eliminating unit 1503 generates the foreground component image free from motion blur, which corresponds to the pixels belonging to the foreground area and the pixels belonging to the mixed area, and the separated background component image in a manner similar to the processing discussed with reference to the flowchart of FIG. 104. The separating/blur-eliminating unit 1503 supplies the foreground component image free from motion blur to the foreground-component-image reproducing unit 1603 and the separated background component image to the background-component-image reproducing unit 1604, The motion-blur eliminating unit 1602 calculates the foreground components corresponding to the pixels belonging to the foreground area and sandwiched by the flat portions based on the unit of processing supplied from the unit-of-processing determining/classifying unit 1601 so as to generate a foreground component image free from motion blur corresponding to the calculated foreground components. The motion-blur eliminating unit 1602 supplies the generated foreground component image to the foreground-component-image reproducing unit 1603.

Figure 106:
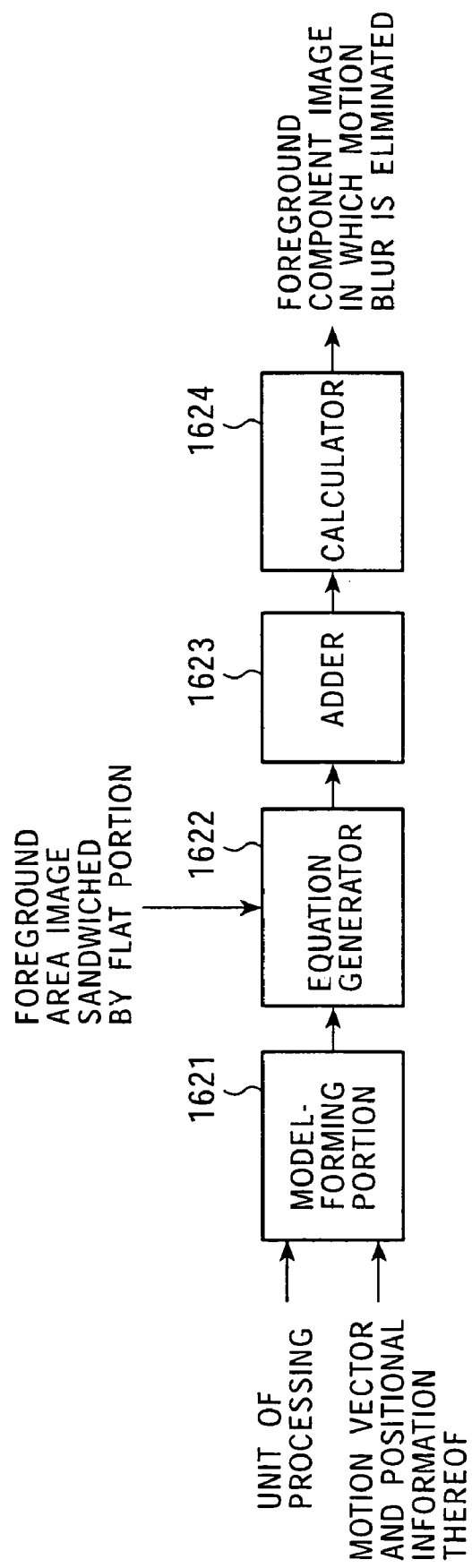
FIG. 106 is a block diagram illustrating the configuration of a motion-blur eliminating unit 106.

FIG. 106 is a block diagram illustrating the configuration of the motion-blur eliminating unit 1602.

The motion vector and the positional information thereof supplied from the motion detector 102 and the unit of processing supplied from the unit-of-processing determining/classifying unit 1601 are supplied to a model-forming portion 1621.

The model-forming portion 1621 generates a model based on the motion vector and the positional information thereof supplied from the motion detector 102 and the unit of processing supplied form the unit-of-processing determining/classifying unit 1601, and supplies the generated model to an equation generator 1622.

The model supplied to the equation generator 1622 is described below with reference to FIGS. 107 and 108.

Figure 107:
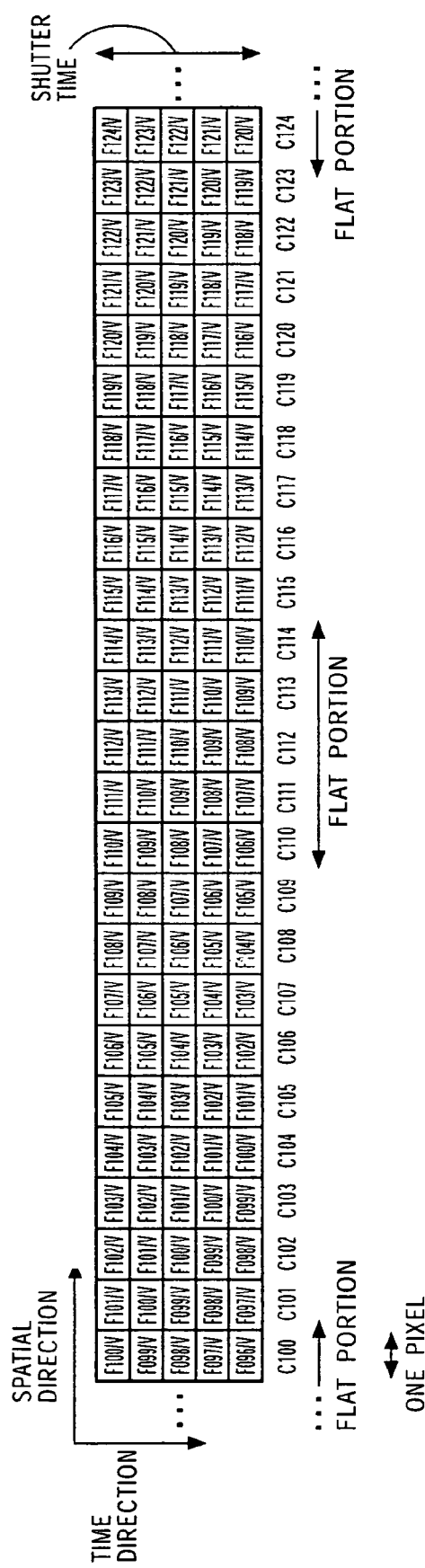
FIG. 107 illustrates a model supplied to an equation generator 1622.
Figure 108:
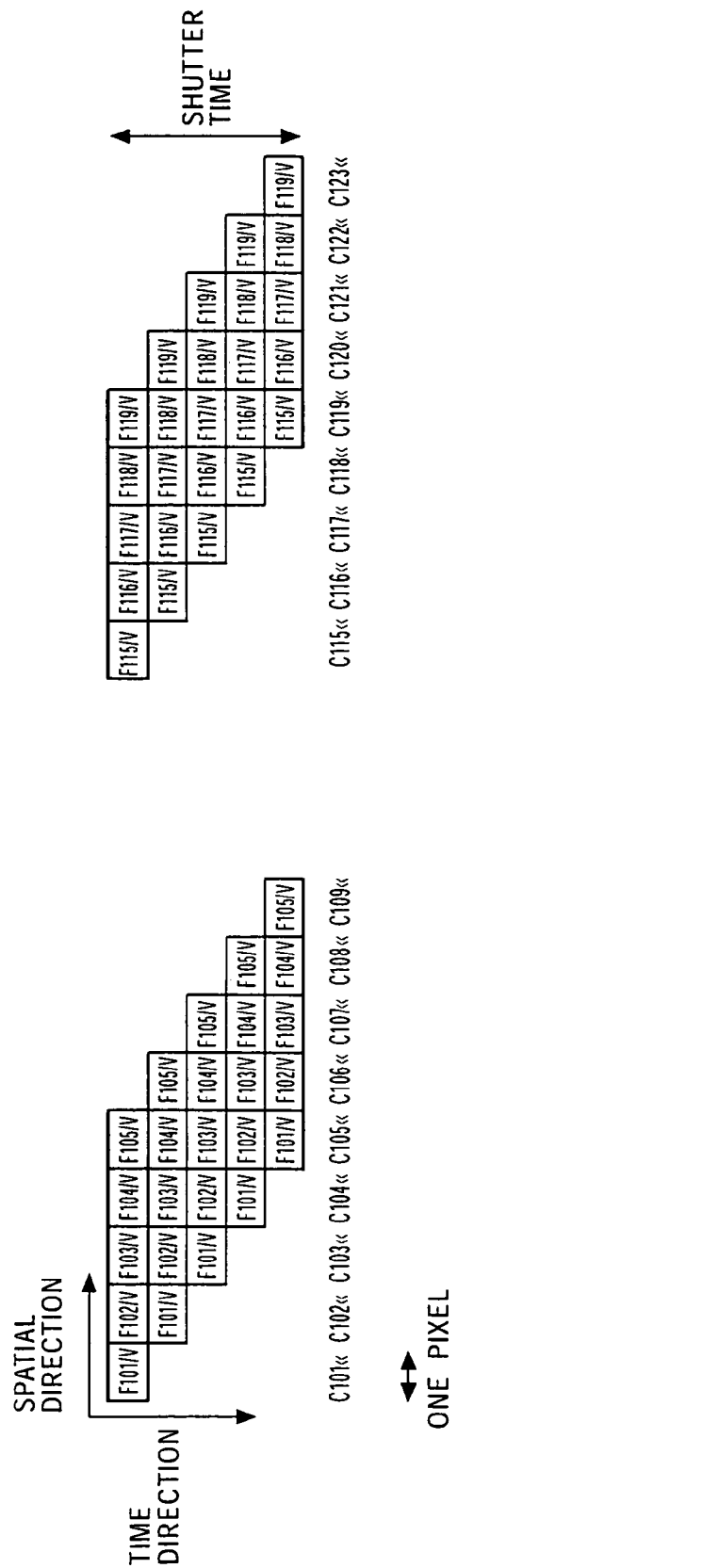
FIG. 108 illustrates a model supplied to the equation generator 1622.

FIG. 107 illustrates a model obtained by expanding the pixel values of the pixels belonging to the foreground area in the time direction.

The unit-of-processing determining/separating portion 601 removes the foreground components corresponding to a flat portion from the pixels belonging to the foreground area in a manner similar to the processing discussed with reference to FIG. 98.

For example, in the example shown in FIG. 107, when equation (133) holds true, it can be seen that the foreground components F106/v through F114/v are equal from the relationship of equations (134) through (138). Accordingly, as shown in FIG. 108, the foreground components F106/v through F114/v are removed from the pixels belonging to the foreground area.

$$C110 = C111 = C112 = C113 = C114 \tag{133}$$

$$C110 = F106/v + F107/v + F108/v + F109/v + F110/v \tag{134}$$

$$C111 = F107/v + F108/v + F109/v + F110/v + F111/v \tag{135}$$

$$C112 = F108/v + F109/v + F110/v + F111/v + F112/v \tag{136}$$

$$C113 = F109/v + F110/v + F111/v + F112/v + F113/v \tag{137}$$

$$C114 = F110/v + F111/v + F112/v + F113/v + F114/v \tag{138}$$

Similarly, the foreground component F096/v through F100/v and the foreground components F120/v through F124/v corresponding to another flat portion are removed from the pixels belonging to the foreground area.

In this manner, the pixels belonging to the foreground area and sandwiched by flat portions, from which the foreground components corresponding to the flat portions are removed, are supplied from the unit-of-processing determining/classifying unit 1601 to the motion-blur eliminating unit 1602 together with the corresponding unit of processing.

The model-forming portion 1621 of the motion-blur eliminating unit 1602 forms, based on the unit of processing, a model for generating equations corresponding to the relationship between the pixels belonging to the foreground area and sandwiched by the flat portions, from which the foreground components corresponding to the flat portions are removed, and the remaining foreground components.

The model-forming portion 1621 supplies the generated model to the equation generator 1622.

The equation generator 1622 generates, based on the model supplied from the model-forming portion 1621, equations corresponding to the relationship between the pixels belonging to the foreground area and sandwiched by the flat portions, from which the foreground components corresponding to the flat portions are removed, and the remaining foreground components.

For example, the relationships between the foreground components F101/v through F105/v and the pixel values are indicated by equations (139) through (147).

$$C101' = F101/v \tag{139}$$

$$C102' = F101/v + F102/v \tag{140}$$

$$C103' = F101/v + F102/v + F103/v \tag{141}$$

$$C104' = F101/v + F102/v + F103/v + F104/v \tag{142}$$

$$C105' = F101/v + F102/v + F103/v + F104/v + F105/v \tag{143}$$

$$C106' = F102/v + F103/v + F104/v + F105/v \tag{144}$$

$$C107' = F103/v + F104/v + F105/v \tag{145}$$

$$C108' = F104/v + F105/v \tag{146}$$

$$C109' = F105/v \tag{147}$$

The relationships between the foreground components F101/v through F105/v and the pixel values are indicated by equations (148) through (156).

$$C115' = F115/v \tag{148}$$

$$C116' = F115/v + F116/v \tag{149}$$

$$C117' = F115/v + F116/v + F117/v \tag{150}$$

$$C118' = F115/v + F116/v + F117/v + F118/v \tag{151}$$

$$C119' = F115/v + F116/v + F117/v + F118/v + F119/v \tag{152}$$

$$C120' = F116/v + F117/v + F118/v + F119/v \tag{153}$$

$$C121' = F117/v + F118/v + F119/v \tag{154}$$

$$C122' = F118/v + F119/v \tag{155}$$

$$C123' = F119/v \tag{156}$$

The equation generator 1622 solves equations (139) through (147) and equations (148) through (156) in which the pixel values are set according to the method of least squares so as to obtain normal equations, for example, equations (157) and (158).

$$\begin{bmatrix} 5 & 4 & 3 & 2 & 1 \\ 4 & 5 & 4 & 3 & 2 \\ 3 & 4 & 5 & 4 & 3 \\ 2 & 3 & 4 & 5 & 4 \\ 1 & 2 & 3 & 4 & 5 \end{bmatrix} \begin{bmatrix} F101 \\ F102 \\ F103 \\ F104 \\ F105 \end{bmatrix} = v \cdot \begin{bmatrix} C101' + C102' + C103' + C104' + C105' \\ C102' + C103' + C104' + C105' + C106' \\ C103' + C104' + C105' + C106' + C107' \\ C104' + C105' + C106' + C107' + C108' \\ C105' + C106' + C107' + C108' + C109' \end{bmatrix} \tag{157}$$

-continued $$\begin{bmatrix} 5 & 4 & 3 & 2 & 1 \\ 4 & 5 & 4 & 3 & 2 \\ 3 & 4 & 5 & 4 & 3 \\ 2 & 3 & 4 & 5 & 4 \\ 1 & 2 & 3 & 4 & 5 \end{bmatrix} \begin{bmatrix} F115 \\ F116 \\ F117 \\ F118 \\ F119 \end{bmatrix} = \quad (158)$$

$$v \cdot \begin{bmatrix} C115' + C116' + C117' + C118' + C119' \\ C116' + C117' + C118' + C119' + C120' \\ C117' + C118' + C119' + C120' + C121' \\ C118'' + C119' + C120' + C121' + C122' \\ C119' + C120' + C121' + C122' + C123' \end{bmatrix}$$

The equation generator 1622 generates equations based the model supplied from the model-forming portion 1621, supplies the generated equations to an adder 1623 together with the foreground component image.

The adder 1623 adds the equation supplied from the equation generator 1622 to the normal equations obtained by the method of least squares. The adder 1623 supplies the resulting normal equations to a calculator 1624.

The calculator 1624 calculates the foreground components contained in the foreground component image other than the foreground components contained in the pixels belonging to the flat portions by applying a solution, such as the Cholesky decomposition to the normal equations in which the pixel values are set. The calculator 1624 generates the foreground component image without motion blur based on the calculated foreground components, and outputs the foreground component image without motion blur.

Figure 109:
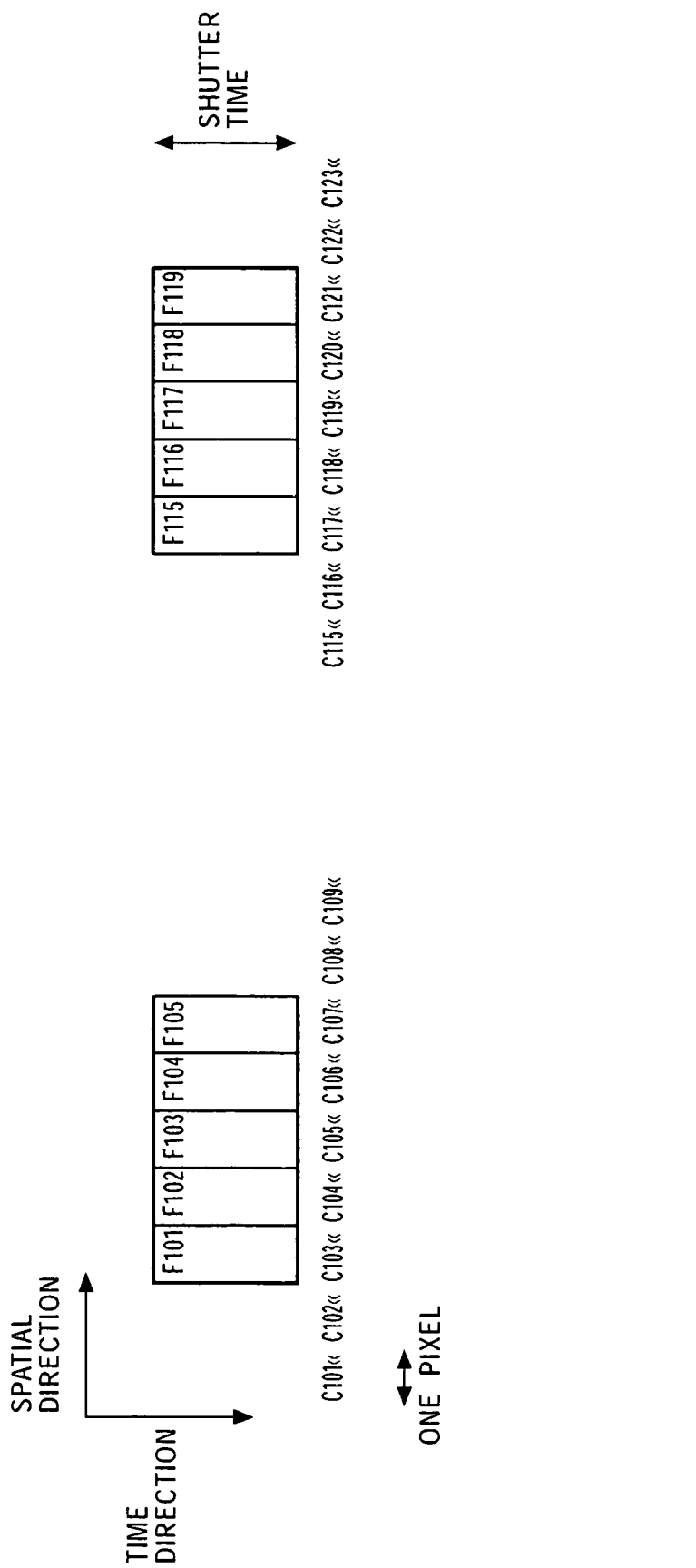
FIG. 109 illustrates the calculation of the pixel values.

For example, when the foreground components F101/v through F105/v and the foreground components F115/v through F119/v are determined, the calculator 1624 multiplies the foreground components F101/v through F105/v and the foreground components F115/v through F119/v by the amount of movement v, as shown in FIG. 109, thereby calculating the pixel values F101 through F105 and the pixel values F115 through F119, respectively.

The calculator 1624 generates a foreground component image without motion blur consisting of, for example, the pixel values F101 through F105 and the pixel values F115 through F119.

The processing for eliminating motion blur performed by the signal processing apparatus having the configuration shown in FIG. 94 is described below with reference to the flowchart of FIG. 110.

Figure 103:
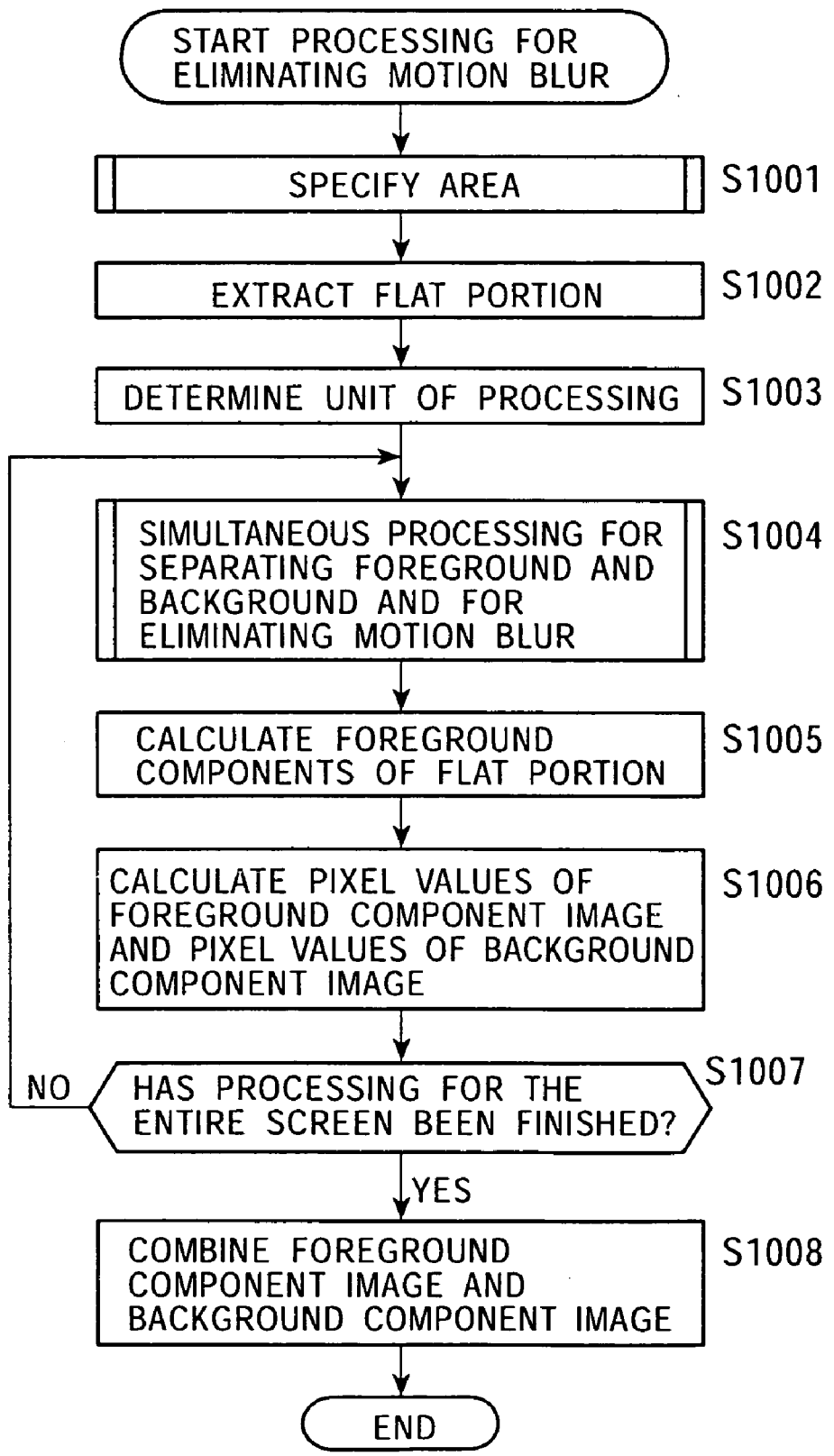
FIG. 103 is a flowchart illustrating the processing for eliminating motion blur.

The processing of step S1101 through step S1103 is similar to that of step S1001 through step S1003 in FIG. 103, and an explanation thereof is thus omitted.

In step S1104, the unit-of-processing determining/classifying unit 1601 classifies the pixels of an input image based on the motion vector and the positional information thereof supplied from the motion detector 102, the area information supplied from the area specifying unit 103, and the foreground-flat-portion positional information supplied from the flat-portion extracting unit 1501, and supplies the classified pixels to one of the separating/blur-eliminating unit 1503, the motion-blur eliminating unit 1602, the foreground-component-image reproducing unit 1603, and the background-component-image reproducing unit 1604.

In step S1105, the separating/blur-eliminating unit 1503 performs simultaneous processing for separating the foreground and the background and for eliminating motion blur on the pixels belonging to the mixed area from which the foreground components corresponding to the flat portions of the foreground area are removed, and the pixels belonging to the foreground area selected, among the pixels consecutively arranged in the moving direction from the pixel belonging to the uncovered background area to the pixel belonging to the covered background area. Details of the processing of step S1105 is similar to those of the processing of step S1004 of FIG. 103, and an explanation thereof is thus omitted.

In step S1106, the separating/blur-eliminating unit 1503 calculates the pixel values of the foreground component image without motion blur and the pixel values of the background component image based on the calculated foreground components and the background components. The separating/blur-eliminating unit 1503 supplies the foreground component image without motion blur to the foreground-component-image reproducing unit 1603, and also supplies the background component image to the background-component-image reproducing unit 1604.

In step S1107, the signal processing apparatus determines whether the processing for the mixed area and the foreground area has been finished. If it is determined that the processing for the mixed area and the foreground area has not been finished, the process returns to step S1105, and the processing for separating the foreground and the background and for eliminating motion blur is repeated.

If it is determined in step S1107 that the processing for the mixed area and the foreground area has been finished, the process proceeds to step S1108. In step S1108, the motion-blur eliminating unit 1602 performs processing for eliminating motion blur for the pixels belonging to the foreground area without the foreground components corresponding to flat portions and sandwiched by the flat portion selected among the pixels consecutively arranged in the moving direction. Details of the motion-blur eliminating processing are described below with reference to the flowchart of FIG. 111.

In step S1109, the motion-blur eliminating unit 1602 calculates the pixel values of the foreground component image without motion blur based on the calculated foreground components. The motion-blur eliminating unit 1602 supplies the foreground component image without motion blur to the foreground-component-image reproducing unit 1603.

In step S1110, the signal processing apparatus determines whether the processing for the foreground area has been finished. If it is determined that the processing of the foreground area has not been finished, the process returns to step S1108, and the motion-blur eliminating processing is repeated.

If it is determined in step S1110 that the processing has been finished for the foreground area, the process proceeds to step S1111.

It should be noted that the processing of step S1108 through S1110 is simultaneously executed with the processing of step S1105 through S1107.

In step S1111, the foreground-component-image reproducing unit 1603 reproduces the overall foreground component image without motion blur based on the flat-portion image supplied from the unit-of-processing determining/classifying unit 1601, the foreground component image without motion blur supplied from the separating/blur-eliminating unit 1503, and the foreground component image without motion blur supplied from the motion-blur eliminating unit 1602. The background-component-image reproducing unit 1604 reproduces the overall background component image based on the background area image supplied from the unit-of-processing determining/classifying unit 1601 and the background component image separated from the separating/blur-eliminating unit 1503. The processing is then completed.

As described above, the information processing apparatus having the configuration shown in FIG. 105 is able to eliminate motion blur from the foreground object.

Figure 110:
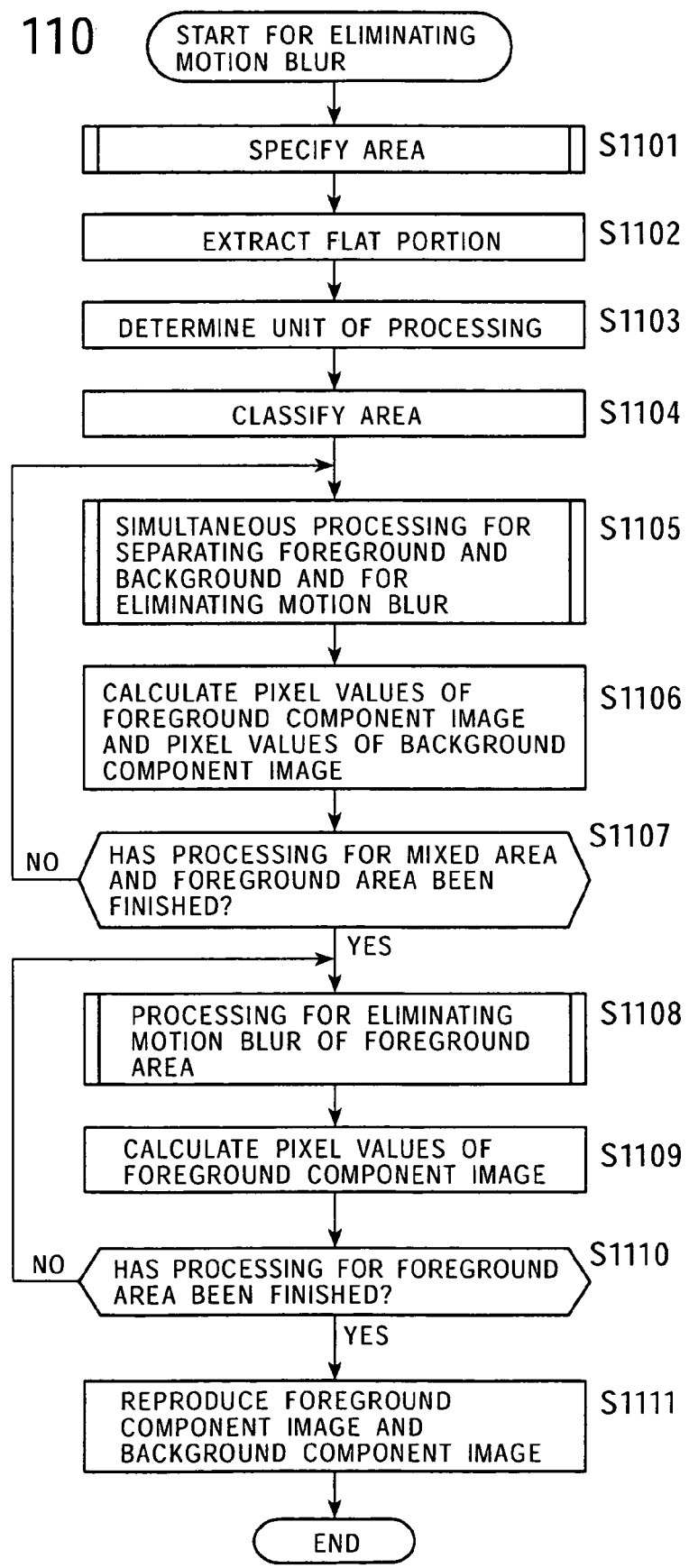
FIG. 110 is a flowchart illustrating the processing for eliminating motion blur.
Figure 111:
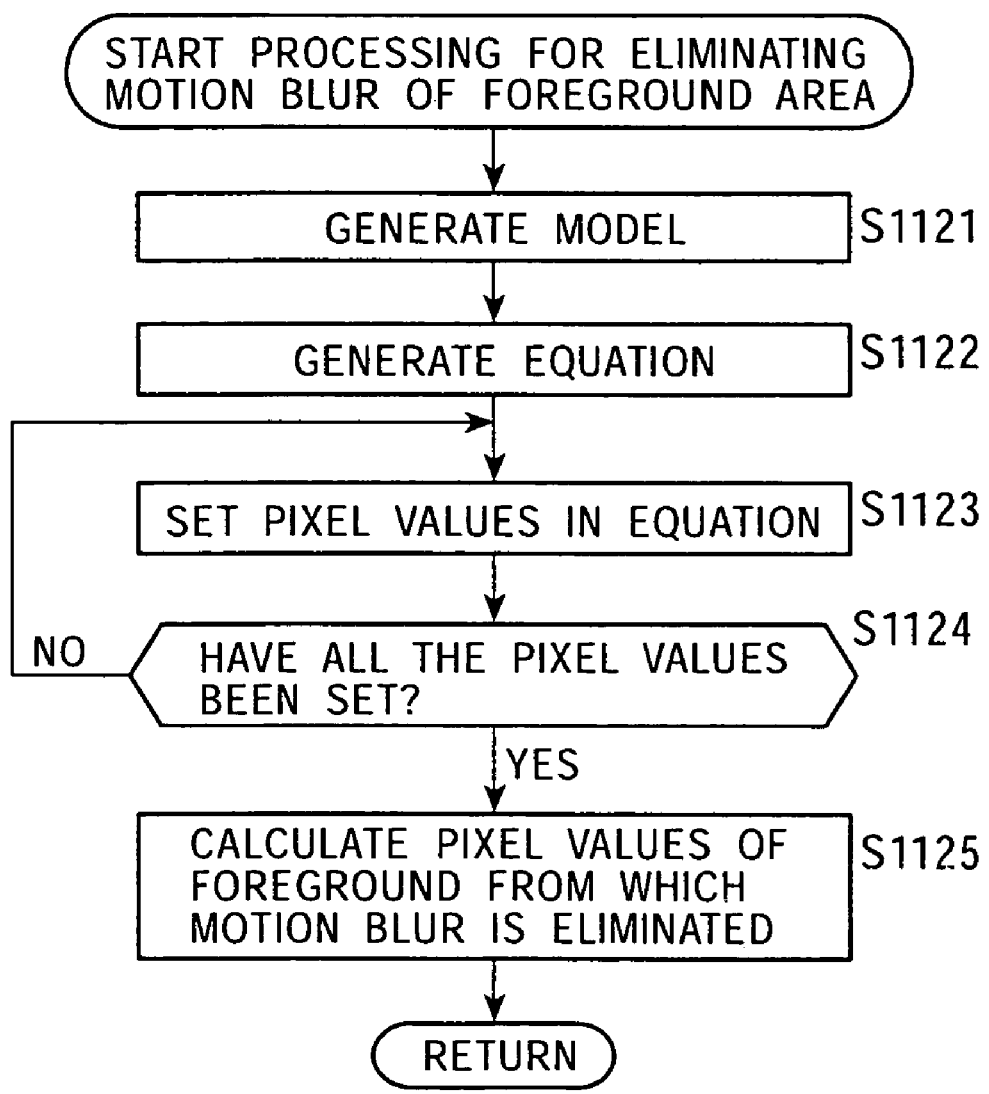
FIG. 111 is a flowchart illustrating the processing for eliminating motion blur of a foreground component image.

The processing for eliminating motion blur of the foreground component image, which corresponds to the unit of processing, performed by the motion-blur eliminating unit 1602 in step S1108 of FIG. 110 is described below with reference to the flowchart of FIG. 111.

In step S1121, the model-forming portion 1621 of the motion-blur eliminating unit 1602 forms a model corresponding to the amount of movement v and the unit of processing. In step S1122, the equation generator 1622 generates equations based on the generated model.

In step S1123, the adder 1623 sets the pixel values of the foreground component image from which the foreground components corresponding to the flat portions are removed in the generated equations. In step S1124, the adder 1123 determines whether the pixel values of all the pixels corresponding to the unit of processing have been set. If it is determined that the pixel values have not been set in all the equations, the process returns to step S1123, and the processing for setting the pixel values in the equations is repeated.

If it is determined in step S1124 that all the pixel values have been set in all the equations, the process proceeds to step S1125. In step S1125, the calculator 1624 calculates the pixel values of the foreground without motion blur based on the equations in which the pixel values are set supplied from the adder 1623.

As discussed above, the motion-blur eliminating unit 1602 is able to eliminate motion blur from the foreground component image containing motion blur based on the amount of movement v and the unit of processing.

The invention has been discussed above by setting the mixture ratio α to the ratio of the background components contained in the pixel values. However, the mixture ratio α may be set to the ratio of the foreground components contained in the pixel values.

The invention has been discussed above by setting the moving direction of the foreground object to the direction from the left to the right. However, the moving direction is not restricted to the above-described direction.

A non-mixed area formed of a foreground area consisting of foreground object components which form a foreground object of image data and a background area consisting of background object components which form a background object of the image data, or a mixed area in which the foreground object components and the background object components area mixed is specified. Based on a result obtained by specifying the area, processing for separating the foreground object components and the background object components from the pixel data of the mixed area, and processing for eliminating motion blur from the separated foreground object components are simultaneously performed. In this case, motion blur contained in a blurred image can be eliminated.

An equal portion consisting of adjacent pixel data of the foreground area whose values are substantially equal to each other is detected. At least the processing for separating the foreground object components and the background object components from the pixel data of the mixed area and the processing for eliminating motion blur from the separated foreground object components can be simultaneously performed based on the detected equal portion and the result obtained by specifying the area.

A unit of processing consisting of a plurality of the foreground object components and the background object components is determined based on a position of the equal portion. The processing for separating the foreground object components and the background object components and the processing for eliminating motion blur from the separated foreground object components can be simultaneously performed for each unit of processing.

The unit of processing corresponding to the pixel data belonging to the mixed area or the foreground area which is located on one straight line and which is other than the pixel data of the equal portion can be determined.

The equal portion can be detected by comparing a difference of the pixel data with a threshold.

The equal portion consisting of the adjacent pixel data having the number of pixels greater than or equal to the number of pixels corresponding to an amount of movement of the foreground object can be detected.

The processing for separating the foreground object components and the background object components and the processing for eliminating motion blur from the separated foreground object components can be simultaneously performed by applying a calculation corresponding to a motion vector.

A model corresponding to the unit of processing and a motion vector is acquired. Based on the acquired model, an equation corresponding to a relationship between the pixel data of the unit of processing and the foreground object components and the background object components contained in the unit of processing is generated. The foreground object components and the background object components contained in the unit of processing can be calculated based on the generated equation.

Image data having an object area consisting of object components which form an object is input. Motion blur occurring in an object area is eliminated by assuming that values of part of the pixel data in the object area of the image data input are substantially equal. In this case, motion blur contained in a blurred image can be eliminated.

The image data having a foreground area consisting of foreground object components which form the object, a background area consisting of background object components which form a background object, and a mixed area in which the foreground object components and the background object components are mixed is input. Motion blur occurring in the foreground area can be eliminated by assuming that values of part of the pixel data in the foreground area of the input image data are substantially equal.

An equal portion in which the values of the pixel data in the foreground area of the image data are substantially equal is detected. Motion blur occurring in the foreground area can be eliminated based on the detected equal portion.

A unit of processing consisting of a plurality of the foreground object components is determined based on a position of the equal portion. Motion blur of the foreground area can be eliminated for each unit of processing.

The unit of processing corresponding to the pixel data belonging to the mixed area or the foreground area which is located on one straight line and which is other than the pixel data of the equal portion can be determined.

The foreground area, the background area, or the mixed area can be specified.

The equal portion can be detected by comparing a difference of the pixel data with a threshold.

The equal portion consisting of the adjacent pixel data having the number of pixels greater than or equal to the number of pixels corresponding to an amount of movement of the foreground object can be detected.

Motion blur occurring in the foreground area can be eliminated by applying a calculation corresponding to a motion vector.

A model corresponding to the unit of processing and a motion vector is acquired. Based on the acquired model, an equation corresponding to a relationship between the pixel data of the unit of processing and the foreground object components contained in the unit of processing is generated. The foreground object components contained in the unit of processing can be calculated based on the generated equation.

Processing for separating the pixel data of the mixed area into the foreground object components and the background object components and processing for eliminating motion blur from the separated foreground object components can be simultaneously performed based on area information indicating a non-mixed area consisting of the foreground area and the background area or the mixed area and based on the equal portion.

A unit of processing consisting of a plurality of the foreground object components and the background object components is determined based on a position of the equal portion. The processing for separating the foreground object components and the background object components and the processing for eliminating motion blur from the separated foreground object components can be simultaneously performed for each unit of processing.

The unit of processing corresponding to the pixel data belonging to the mixed area or the foreground-area which is located on one straight line and which is other than the pixel data of the equal portion can be determined.

The foreground area, the background area, or the mixed area can be specified.

The equal portion can be detected by comparing a difference of the pixel data with a threshold.

The equal portion consisting of adjacent pixel data having the number of pixels greater than or equal to the number of pixels corresponding to an amount of movement of the foreground object can be detected.

The processing for separating the foreground object components and the background object components and the processing for eliminating motion blur from the separated foreground object components can be simultaneously performed by applying a calculation corresponding to a motion vector.

A model corresponding to the unit of processing and a motion vector is acquired. Based on the acquired model, an equation corresponding to a relationship between the pixel data of the unit of processing and the foreground object components and the background object components contained in the unit of processing is generated. The foreground object components and the background object components contained in the unit of processing can be calculated based on the generated equation.

A subject image captured by an image-capturing device including a predetermined number of pixels and having a time integrating function is output as image data formed of a predetermined number of pixel data. A non-mixed area formed of a foreground area consisting of foreground object components which form a foreground object of the image data and a background area consisting of background object components which form a background object of the image data, or a mixed area in which the foreground object components and the background object components area mixed is specified. Based on a result obtained by specifying the area, processing for separating the foreground object components and the background object components from the pixel data of the mixed area, and processing for eliminating motion blur from the separated foreground object components can be simultaneously performed. In this case, an image without motion blur can be captured.

An equal portion consisting of adjacent pixel data of the foreground area whose values are substantially equal to each other is detected. At least the processing for separating the foreground object components and the background object components from the pixel data of the mixed area and the processing for eliminating motion blur from the separated foreground object components can be simultaneously performed based on the detected equal portion and the result obtained by specifying the area.

A unit of processing consisting of a plurality of the foreground object components and the background object components is determined based on a position of the equal portion. For each unit of processing, the processing for separating the foreground object components and the background object components and the processing for eliminating motion blur from the separated foreground object components can be simultaneously performed.

The unit of processing corresponding to the pixel data belonging to the mixed area or the foreground area which is located on one straight line and which is other than the pixel data of the equal portion can be determined.

The equal portion can be detected by comparing a difference of the pixel data with a threshold.

The equal portion consisting of the adjacent pixel data having the number of pixels greater than or equal to the number of pixels corresponding to an amount of movement of the foreground object can be detected.

The processing for separating the foreground object components and the background object components and the processing for eliminating motion blur from the separated foreground object components can be simultaneously performed by applying a calculation corresponding to a motion vector.

A model corresponding to the unit of processing and a motion vector is acquired. Based on the acquired model, an equation corresponding to a relationship between the pixel data of the unit of processing and the foreground object components and the background object components contained in the unit of processing is generated. The foreground object components and the background object components contained in the unit of processing can be calculated based on the generated equation.

A subject image captured by an image-capturing device including a predetermined number of pixels and having a time integrating function is output as image data formed of a predetermined number of pixel data and having an object area consisting of object components which form an object. Motion blur occurring in the object area is eliminated by assuming that values of part of the pixel data in the object area of the image data are substantially equal. In this case, an image without motion blur can be captured.

The image data having a foreground area consisting of foreground object components which form the object, a background area consisting of background object components which form a background object, and a mixed area in which the foreground object components and the background object components are mixed is input. Motion blur occurring in the foreground area can be eliminated by assuming that values of part of the pixel data in the foreground area of the input image data are substantially equal.

An equal portion in which the values of the pixel data in the foreground area of the image data are substantially equal is detected. Motion blur occurring in the foreground area can be eliminated based on the detected equal portion.

A unit of processing consisting of a plurality of the foreground object components is determined based on a position of the equal portion. Motion blur of the foreground area can be eliminated for each unit of processing.

The unit of processing corresponding to the pixel data belonging to the mixed area or the foreground area which is located on one straight line and which is other than the pixel data of the equal portion can be determined.

The foreground area, the background area, or the mixed area can be specified.

The equal portion can be detected by comparing a difference of the pixel data with a threshold.

The equal portion consisting of the adjacent pixel data having the number of pixels greater than or equal to the number of pixels corresponding to an amount of movement of the foreground object can be detected.

Motion blur occurring in the foreground area can be eliminated by applying a calculation corresponding to a motion vector.

A model corresponding to the unit of processing and a motion vector is acquired. Based on the acquired model, an equation corresponding to a relationship between the pixel data of the unit of processing and the foreground object components contained in the unit of processing is generated. The foreground object components contained in the unit of processing can be calculated based on the generated equation.

Processing for separating the pixel data of the mixed area into the foreground object components and the background object components and processing for eliminating motion blur from the separated foreground object components can be simultaneously performed based on area information indicating a non-mixed area consisting of the foreground area and the background area or the mixed area and based on the equal portion.

A unit of processing consisting of a plurality of the foreground object components and the background object components is determined based on a position of the equal portion. For each unit of processing, the processing for separating the foreground object components and the background object components and the processing for eliminating motion blur from the separated foreground object components can be simultaneously performed.

The unit of processing corresponding to the pixel data belonging to the mixed area or the foreground area which is located on one straight line and which is other than the pixel data of the equal portion can be determined.

The foreground area, the background area, or the mixed area can be specified.

The equal portion can be detected by comparing a difference of the pixel data with a threshold.

The equal portion consisting of adjacent pixel data having the number of pixels greater than or equal to the number of pixels corresponding to an amount of movement of the foreground object can be detected.

The processing for separating the foreground object components and the background object components and the processing for eliminating motion blur from the separated foreground object components can be simultaneously performed by applying a calculation corresponding to a motion vector.

A model corresponding to the unit of processing and a motion vector is acquired. Based on the acquired model, an equation corresponding to a relationship between the pixel data of the unit of processing and the foreground object components and the background object components contained in the unit of processing is generated. The foreground object components and the background object components contained in the unit of processing can be calculated based on the generated equation.

In the above description, a real-space image having a three-dimensional space and time axis information is projected onto a time space having a two-dimensional space and time axis information by using a video camera. However, the present invention is not restricted to this example, and can be applied to the following case. When a greater amount of first information in one-dimensional space is projected onto a smaller amount of second information in a two-dimensional space, distortion generated by the projection can be corrected, significant information can be extracted, or a more natural image can be synthesized.

The sensor is not restricted to a CCD, and may be another type of sensor, such as a solid-state imaging device, for example, a CMOS (Complementary Mental-Oxide Semiconductor) image sensor, a BBD (Bucket Brigade Device), a CID (Charge Injection Device), or a CPD (Charge Priming Device). Also, the sensor does not have to be a sensor in which detection devices are arranged in a matrix, and may be a sensor in which detection devices are arranged in one line.

A recording medium in which a program for performing the signal processing of the present invention is recorded may be formed of a package medium in which the program is recorded, which is distributed for providing the program to a user separately from the computer, as shown in FIG. 1, such as the magnetic disk 51 (including a flexible disk), the optical disc 52 (CD-ROM (Compact Disc-Read Only Memory) and a DVD (Digital Versatile Disc)), the magneto-optical disk 53 (including MD (Mini-Disk)), or the semiconductor memory 54. The recording medium may also be formed of the ROM 22 or a hard disk contained in the storage unit 28 in which the program is recorded, such recording medium being provided to the user while being prestored in the computer.

The steps forming the program recorded in a recording medium may be executed chronologically according to the orders described in the specification. However, they do not have to be executed in a time-series manner, and they may be executed concurrently or individually.

INDUSTRIAL APPLICABILITY

According to the first invention, it is possible to eliminate motion blur contained in a blurred image.

According to the second invention, it is possible to eliminate motion blur contained in a blurred image.

According to the third invention, it is possible to capture an image from which motion blur is eliminated.

According to the fourth invention, it is possible to capture an image from which motion blur is eliminated.

The invention claimed is:

1. An image processing apparatus for performing processing on image data which is formed of a predetermined number of pixel data obtained by an image-capturing device including a predetermined number of pixels and having a time integrating function, apparatus comprising;

an area specifying unit configured to specify one of:
(1) a non-mixed area formed of a foreground area consisting of foreground object components which form a foreground object of the image data and a background area consisting of background object components which form a background object of the image data, and (2) a mixed area in which foreground object components and the background object components are mixed;

a processing unit configured to simultaneously perform processing for separating the foreground object components and the background object components from the pixel data of the mixed area, and processing for eliminating motion blur from the separated foreground object components; and an equal-portion detection unit configured for detecting an equal portion consisting of adjacent pixel data of the foreground area whose values are substantially equal to each other, wherein said processing unit simultaneously performs at least the processing for separating the foreground object components and the background object components from the pixel data of the mixed area and the processing for eliminating motion blur from the separated foreground object components based on the detected equal portion and area result from the area specifying unit.

2. An image processing apparatus according to claim 1, further comprising
a determining unit configured for determining a unit of processing consisting of a plurality of the foreground object components and the background object components based on a position of the equal portion,
wherein said processing unit simultaneously performs, for each unit of processing, the processing for separating the foreground object components and the background object components and the processing for eliminating motion blur from the separated foreground object components.

3. An image processing apparatus according to claim 2, wherein said determining unit determines the unit of processing corresponding to the pixel data belonging to the mixed area or the foreground area which is located on one straight line and which is other than the pixel data of the equal portion.

4. An image processing apparatus according to claim 1, wherein said equal-portion detection unit detects the equal portion by comparing a difference of the pixel data with a threshold.

5. An image processing apparatus according to claim 1, wherein said equal-portion detection unit detects the equal portion consisting of the adjacent pixel data having the number of pixels greater than or equal to the number of pixels corresponding to an amount of movement of the foreground object.

6. An image processing apparatus according to claim 1, wherein said processing unit simultaneously performs the processing for separating the foreground object components and the background object components and the processing for eliminating motion blur from the separated foreground object components by applying a calculation corresponding to a motion vector.

7. An image processing apparatus for performing processing on image data which is formed of a predetermined number of pixel data obtained by an image-capturing device including a predetermined number of pixels and having a time integrating function, said image processing apparatus comprising;
an area specifying unit configured to specify one of:
(1) a non-mixed area formed of a foreground area consisting of foreground object components which form a foreground object of the image data and a background area consisting of background object components which form a background object of the image data, and (2) a mixed area in which the foreground object components and the background object components are mixed; and
a processing unit configured to simultaneously perform processing for separating the foreground object components and the background object components from the pixel data of the mixed area, and processing for eliminating motion blur from the separated foreground object components;
a model acquiring unit configured for acquiring a model corresponding to the processing unit and a motion vector;

an equation generating unit configured for generating, based on the acquired model, an equation corresponding to a relationship between the pixel data of the processing unit and the foreground object components and the background object components contained in the processing unit ; and
a calculator for calculating the foreground object components and the background object components contained in the processing unit based on the generated equation.

8. An image processing method for performing processing on image data which is formed of a predetermined number of pixel data obtained by an image-capturing device including predetermined number of pixels and having a time integrating function, said image processing method comprising:
an area specifying step of specifying one of: (1) a non-mixed area formed of a foreground area consisting of foreground object components which form a foreground object of the image data and a background area consisting of background object components which form a background object of the image data, and (2) a mixed area in which the foreground object components and the background object components are mixed; and
a processing execution step of simultaneously performing, based on a result obtained by said area specifying step, processing for separating the foreground object components and the background object components from the pixel data of the mixed area, and processing for eliminating motion blur from the separated foreground object components:
an equal-portion detection step of detecting an equal portion consisting of adjacent pixel data of the foreground area whose values are substantially equal to each other,
wherein, in the processing of said processing execution step, at least the processing for separating the foreground object components and the background object components from the pixel data of the mixed area and the processing for eliminating motion blur from the separated foreground object components are simultaneously performed based on the detected equal portion and the result obtained by said area specifying step.

9. An image processing method according to claim 8, further comprising
a unit-of-processing determining step of determining a unit of processing consisting of a plurality of the foreground object components and the background object components based on a position of the equal portion,
wherein, in the processing of said processing execution step, the processing for separating the foreground object components and the background object components and the processing for eliminating motion blur from the separated foreground object components are simultaneously performed for each unit of processing.

10. An image processing method according to claim 9, wherein, in the processing of said unit-of-processing determining step, the unit of processing corresponding to the pixel data belonging to the mixed area or the foreground area which is located on one straight line and which is other than the pixel data of the equal portion is determined.

11. An image processing method according to claim 8, wherein, in the processing of said equal-portion detection step, the equal portion is detected by comparing a difference of the pixel data with a threshold.

12. An image processing method according to claim 8, wherein, in the processing of said equal-portion detection step, the equal portion consisting of the adjacent pixel data having the number of pixels greater than or equal to the number of pixels corresponding to an amount of movement of the foreground object is detected.

13. An image processing method according to claim 8, wherein, in the processing of said processing execution step, the processing for separating the foreground object components and the background object components and the processing for eliminating motion blur from the separated foreground object components are simultaneously performed by applying a calculation corresponding to a motion vector.

14. An image processing method for performing processing on image data which is formed of a predetermined number of pixel data obtained by an image-capturing device including a predetermined number of pixels and having a time integrating function, said image processing method comprising:
- an area specifying step of specifying one of: (1) a non-mixed area formed of a foreground area consisting of foreground object components which form a foreground object of the image data and a background area consisting of background object components which form a background object of the image data, and (2) a mixed area in which the foreground object components and the background object components are mixed; and
- a processing execution step of simultaneously performing, based on a result obtained by said area specifying step, processing for separating the foreground object components and the background object components from the pixel data of the mixed area, and processing for eliminating motion blur from the separated foreground object components;
- a model acquiring step of acquiring a model corresponding to the unit of processing and a motion vector;
- an equation generating step of generating, based on the acquired model, an equation corresponding to a relationship between the pixel data of the unit of processing and the foreground object components and the background object components contained in the unit of processing; and
- a calculation step of calculating the foreground object components and the background object components contained in the unit of processing based on the generated equation.

15. A non-transitory computer-readable storage medium in which a computer-readable program for performing processing on image data which is formed of a predetermined number of pixel data obtained by an image-capturing device including a predetermined number of pixels and having a time integrating function is stored, said computer-readable program performing the method comprising:
- an area specifying step of specifying one of: (1) a non-mixed area formed of a foreground area consisting of foreground object components which form a foreground object of the image data and a background area consisting of background object components which form a background object of the image data, and (2) a mixed area in which the foreground object components and the background object components are mixed; and
- a processing execution step of simultaneously performing, based on a result obtained by said area specifying step, processing for separating the foreground object components and the background object components from the pixel data of the mixed area, and processing for eliminating motion blur from the separated foreground object components;
- an equal-portion detection step of detecting an equal portion consisting of adjacent pixel data of the foreground area whose values are substantially equal to each other,
- wherein in the processing of said processing execution step at least the processing for separating the foreground object components and the background object components from the pixel data of the mixed area and the processing for eliminating motion blur from the separated foreground object components are simultaneously performed based on the detected equal portion and the result obtained by said area specifying step.

16. A program embodied in a non-transitory computer-readable medium for controlling a computer to perform processing on image data which is formed of a predetermined number of pixel data obtained by an image-capturing device including a predetermined number of pixels and having a time integrating function, said program controlling the computer to execute:
- an area specifying step of specifying one of (1) a non-mixed area formed of a foreground area consisting of foreground object components which form a foreground object of the image data and a background area consisting of background object components which form a background object of the image data, and (2) a mixed area in which the foreground object components and the background object components are mixed; and
- a processing execution step of simultaneously performing, based on a result obtained by said area specifying step, processing for separating the foreground object components and the background object components from the pixel data of the mixed area, and processing for eliminating motion blur from the separated foreground object components;
- a model acquiring step of acquiring a model corresponding to the unit of processing and a motion vector;
- an equation generating step of generating, based on the acquired model, an equation corresponding to a relationship between the pixel data of the unit of processing and the foreground object components and the background object components contained in the unit of processing; and
- a calculation step of calculating the foreground object components and the background object components contained in the unit of processing based on the generated equation.

17. An image processing apparatus for performing processing on image data which is formed of a predetermined number of pixel data obtained by an image-capturing device including a predetermined number of pixels and having a time integrating function, said image processing apparatus comprising:
- an input for inputting the image data having an object area consisting of object components which form an object; and
- a motion-blur eliminating unit configured for eliminating motion blur occurring in the object area by assuming that each of the values of a part of pixel data in the object area of the input image data are substantially equal,
- wherein said input inputs the image data having a foreground area consisting of foreground object components which form a foreground object, a background area consisting of background object components which form a background object, and a mixed area in which the foreground object components and the background object components are mixed; and
- wherein said the motion-blur eliminating unit eliminates motion blur occurring in the foreground area by assuming that values of part of the pixel data in the foreground area of the input image data are substantially equal; and an equal-portion detection unit configured for detecting an equal portion in which the values of the pixel data in the foreground area of the image data are substantially equal, wherein said the motion-blur eliminating unit eliminates motion blur occurring in the foreground area based on the equal portion detected by said equal-portion detection unit.

18. An image processing apparatus according to claim 17, further comprising a determining unit configured for determining a unit of processing consisting of a plurality of the foreground object components based on a position of the equal portion, wherein said the motion-blur eliminating unit eliminates motion blur of the foreground area for each unit of processing.

19. An image processing apparatus according to claim 18, wherein said determining unit determines the unit of processing corresponding to the pixel data belonging to the mixed area or the foreground area which is located on one straight line and which is other than the pixel data of the equal portion.

20. An image processing apparatus according to claim 17, further comprising an area specifying unit configured for specifying the foreground area, the background area, or the mixed area.

21. An image processing apparatus according to claim 17, wherein said equal-portion detection unit detects the equal portion by comparing a difference of the pixel data with a threshold.

22. An image processing apparatus according to claim 17, wherein said equal-portion detection unit detects the equal portion consisting of the adjacent pixel data having the number of pixels greater than or equal to the number of pixels corresponding to an amount of movement of the foreground object.

23. An image processing apparatus according to claim 17, wherein said the motion-blur eliminating unit eliminates motion blur occurring in the foreground area by applying a calculation corresponding to a motion vector.

24. An image processing apparatus according to claim 17, wherein said motion-blur eliminating unit comprises:

a model acquiring unit configured for acquiring a model corresponding to the unit of processing and a motion vector;

a generator configured for generating, based on the acquired model, an equation corresponding to a relationship between the pixel data of the unit of processing and the foreground object components contained in the unit of processing; and a calculator configured for calculating the foreground object components contained in a unit of processing based on the generated equation.

25. An image processing apparatus according to claim 17, wherein said motion-blur eliminating unit simultaneously performs processing for separating the pixel data of the mixed area into the foreground object components and the background object components and processing for eliminating motion blur from the separated foreground object components based on area information indicating a non-mixed area consisting of the foreground area and the background area or the mixed area and based on the equal portion.

26. An image processing apparatus according to claim 25, further comprising a processor configured for determining a unit of processing consisting of a plurality of the foreground object components and the background object components based on a position of the equal portion, wherein said processing execution unit simultaneously performs, for each unit of processing, the processing for separating the foreground object components and the background object components and the processing for eliminating motion blur from the separated foreground object components.

27. An image processing apparatus according to claim 26, wherein said processor determines the unit of processing corresponding to the pixel data belonging to the mixed area or the foreground area which is located on one straight line and which is other than the pixel data of the equal portion.

28. An image processing apparatus according to claim 25, further comprising an area specifying unit configured for specifying the foreground area, the background area, or the mixed area.

29. An image processing apparatus according to claim 25, wherein said equal-portion detection unit detects the equal portion by comparing a difference of the pixel data with a threshold.

30. An image processing apparatus according to claim 25, wherein said equal-portion detection unit detects the equal portion consisting of adjacent pixel data having the number of pixels greater than or equal to the number of pixels corresponding to an amount of movement of the foreground object.

31. An image processing apparatus according to claim 25, further comprising a processor, wherein said processor simultaneously performs the processing for separating the foreground object components and the background object components and the processing for eliminating motion blur from the separated foreground object components by applying a calculation corresponding to a motion vector.

32. An image processing apparatus according to claim 25, further comprising a processor, wherein said processor comprises:

a model acquiring unit configured for acquiring a model corresponding to a unit of processing and a motion vector;

an equation generator for generating, based on the acquired model, an equation corresponding to a relationship between the pixel data of the unit of processing and the foreground object components and the background object components contained in the unit of processing; and a calculator for calculating the foreground object components and the background object components contained in the unit of processing based on the generated equation.

33. An image processing method for performing processing on image data which is formed of a predetermined number of pixel data obtained by an image-capturing device including a predetermined number of pixels and having a time integrating function, said image processing method comprising:

an input step of inputting the image data having an object area consisting of object components which form an object; and a motion-blur eliminating step of eliminating motion blur occurring in the object area by assuming that the values of a part of pixel data in the object area of the image data input by the processing of said input step are substantially equal, wherein in the processing of said input step, the image data having a foreground area consisting of foreground object components which form a foreground object, a background area consisting of background object components which form a background object, and a mixed area in which the foreground object components and the background object components are mixed are input, and wherein, in the processing of said motion-blur eliminating step, motion blur occurring in the foreground area is eliminated by assuming that values of part of the pixel data in the foreground area of the image data input by the processing of said input step are substantially equal; and an equal-portion detection step of detecting an equal portion in which the values of the pixel data in the foreground area of the image data are substantially equal, wherein in the processing of said motion-blur eliminating step, the motion blur occurring in the foreground area is eliminated based on the equal portion detected by the processing of said equal-portion detection step.

34. An image processing method according to claim 33, further comprising a unit-of-processing determining step of determining a unit of processing consisting of a plurality of the foreground object components based on a position of the equal portion, wherein, in the processing of said motion-blur eliminating step, the motion blur of the foreground area is eliminated for each unit of processing.

35. An image processing method according to claim 34, wherein, in the processing of said unit-of-processing determining step, the unit of processing corresponding to the pixel data belonging to the mixed area or the foreground area which is located on one straight line and which is other than the pixel data of the equal portion is determined.

36. An image processing method according to claim 33, further comprising an area specifying step of specifying the foreground area, the background area, or the mixed area.

37. An image processing method according to claim 33, wherein, in the processing of said equal-portion detection step, the equal portion is detected by comparing a difference of the pixel data with a threshold.

38. An image processing method according to claim 33, wherein, in the processing of said equal-portion detection step, the equal portion consisting of the adjacent pixel data having the number of pixels greater than or equal to the number of pixels corresponding to an amount of movement of the foreground object is detected.

39. An image processing method according to claim 33, wherein, in the processing of said motion-blur eliminating step, motion blur occurring in the foreground area is eliminated by applying a calculation corresponding to a motion vector.

40. An image processing method according to claim 33, wherein the processing of said motion-blur eliminating step comprises:
  a model acquiring step of acquiring a model corresponding to a unit of processing and a motion vector;
  an equation generating step of generating, based on the acquired model, an equation corresponding to a relationship between the pixel data of the unit of processing and the foreground object components contained in the unit of processing; and
  a calculation step of calculating the foreground object components contained in the unit of processing based on the generated equation.

41. An image processing method according to claim 33, wherein, in the processing of said motion-blur eliminating step, processing for separating the pixel data of the mixed area into the foreground object components and the background object components and processing for eliminating motion blur from the separated foreground object components are simultaneously performed based on area information indicating a non-mixed area consisting of the foreground area and the background area or the mixed area and based on the equal portion.

42. An image processing method according to claim 41, further comprising a unit-of-processing determining step of determining a unit of processing consisting of a plurality of the foreground object components and the background object components based on a position of the equal portion, wherein, in the processing of said processing execution step, the processing for separating the foreground object components and the background object components and the processing for eliminating motion blur from the separated foreground object components are simultaneously performed for each unit of processing.

43. An image processing method according to claim 42, wherein, in the processing of said unit-of-processing determining step, the unit of processing corresponding to the pixel data belonging to the mixed area or the foreground area which is located on one straight line and which is other than the pixel data of the equal portion is determined.

44. An image processing method according to claim 41, further comprising an area specifying step of specifying the foreground area, the background area, or the mixed area.

45. An image processing method according to claim 41, wherein, in the processing of said equal-portion detection step, the equal portion is detected by comparing a difference of the pixel data with a threshold.

46. An image processing method according to claim 41, wherein, in the processing of said equal-portion detection step, the equal portion consisting of adjacent pixel data having the number of pixels greater than or equal to the number of pixels corresponding to an amount of movement of the foreground object is detected.

47. An image processing method according to claim 41, wherein;
  the processing for separating the foreground object components and the background object components and the processing for eliminating motion blur from the separated foreground object components are simultaneously performed by applying a calculation corresponding to a motion vector.

48. An image processing method according to claim 41, further comprising:
  a model acquiring step of acquiring a model corresponding to the unit of processing and a motion vector;
  an equation generating step of generating, based on the acquired model, an equation corresponding to a relationship between the pixel data of the unit of processing and the foreground object components and the background object components contained in the unit of processing; and
  a calculation step of calculating the foreground object components and the background object components contained in the unit of processing based on the generated equation.

49. A non-transitory computer-readable medium for storing a computer program for performing processing on image data which is formed of a predetermined number of pixel data obtained by an image-capturing device including a predetermined number of pixels and having a time integrating function is stored, said computer program performing the processing comprising:
  an input step of inputting the image data having an object area consisting of object components which form an object; and
  a motion-blur eliminating step of eliminating motion blur occurring in the object area by assuming that the values of a part of the pixel data in the object area of the image data input by the processing of said input step are substantially equal, wherein in the processing of said input step, the image data having a foreground area consisting of foreground object components which form a foreground object, a background area consisting of background object components which form a background object, and a mixed area in which the foreground object components and the background object components are mixed are input, and wherein, in the processing of said motion-blur eliminating step, motion blur occurring in the foreground area is eliminated by assuming that values of part of the pixel data in the foreground area of the image data input by the processing of said input step are substantially equal; and an equal-portion detection step of detecting an equal portion in which the values of the pixel data in the foreground area of the image data are substantially equal, wherein in the processing, of said the motion-blur eliminating step motion blur occurring in the foreground area is eliminated based on the equal portion detected by the processing of said equal-portion detection step.

50. A non-transitory computer-readable medium for storing a computer program for processing on image data which is formed of a predetermined number of pixel data obtained by an image-capturing device including a predetermined number of pixels and having a time integrating function, said computer program controlling the computer to execute:

an input step of inputting the image data having an object area consisting of object components which form an object; and a motion-blur eliminating step of eliminating motion blur occurring in the object area by assuming that the values of a part of the-pixel data in the object area of the image data input by the processing of said input step are substantially equal, wherein in the processing of said input step, the image data having a foreground area consisting of foreground object components which form the object, a background area consisting of background object components which form a background object, and a mixed area in which the foreground object components and the background object components are mixed are input, and wherein, in the processing of said motion-blur eliminating step, motion blur occurring in the foreground area is eliminated by assuming that values of part of the pixel data in the foreground area of the image data input by the processing of said input step are substantially equal; and an equal-portion detection step of detecting an equal portion in which the values of the pixel data in the foreground area of the image data are substantially equal, wherein in the processing of said motion-blur eliminating step, motion blur occurring in the foreground area is eliminated based on the equal portion detected by the processing of said equal-portion detection step.

51. An image processing apparatus in accordance with claim 1, wherein said time integrating function is based on said image data formed of the predetermined number of pixel data.

52. An image-capturing apparatus comprising:

an image-capturing unit configured for outputting a subject image captured by an image-capturingdevice including a predetermined number of pixels and having a time integrating function as image data formed of a predetermined number of pixel data and having an object area consisting of object components which form an object; and a motion-blur eliminating unit configured to eliminate motion blur occurring in the object area by assuming that the values of a part of pixel data in the object area of the image data are substantially equal, wherein the subject image data having a foreground area consisting of foreground object components which form a foreground object, a background area consisting of background object components which form a background object, and a mixed area in which the foreground object components and the background object components are mixed; and wherein said motion-blur eliminating unit eliminates motion blur occurring in the foreground area by assuming that values of part of the pixel data in the foreground area of the input image data are substantially equal; and an equal-portion detection unit configured for detecting an equal portion in which the values of the pixel data in the foreground area of the image data are substantially equal, wherein said the motion-blur eliminating unit eliminates motion blur occurring in the foreground area based on the equal portion detected by said equal-portion detection unit.

53. An image processing apparatus according to claim 1 further comprising:

an image-capturing unit configured to output a subject image captured by said image-capturing device as the image data formed of a predetermined number of pixel data.

54. An image processing apparatus according to claim 17 further comprising:

an image-capturing unit configured to output a subject image captured by said image-capturing device as the image data formed of the predetermined number of pixel data and having the object area consisting of the object components which form the object.

* * * * *